US012649879B2

(12) United States Patent
Gold et al.

(10) Patent No.: US 12,649,879 B2
(45) Date of Patent: Jun. 9, 2026

(54) SYSTEMS AND METHODS FOR MAKING HYDROCARBON COMPOSITIONS DERIVED FROM PYROLYSIS OF POST-CONSUMER AND/OR POST-INDUSTRIAL PLASTICS

(71) Applicant: Nexus Circular LLC, Atlanta, GA (US)

(72) Inventors: Jeffrey W. Gold, Atlanta, GA (US); Connor Cudney, Atlanta, GA (US); Sarah Engelhardt, Atlanta, GA (US); Steven Adams, Atlanta, GA (US)

(73) Assignee: Nexus Circular LLC, Atlanta, GA (US)

( * ) Notice: Subject to any disclaimer, the term of this patent is extended or adjusted under 35 U.S.C. 154(b) by 0 days.

(21) Appl. No.: 19/006,127

(22) Filed: Dec. 30, 2024

(65) Prior Publication Data

US 2025/0320410 A1 Oct. 16, 2025

Related U.S. Application Data

(60) Provisional application No. 63/626,488, filed on Jan. 29, 2024.

(51) Int. Cl.
*C10B 47/22* (2006.01)
*B01J 6/00* (2006.01)
(Continued)

(52) U.S. Cl.
CPC ............... *C10B 47/22* (2013.01); *B01J 6/008* (2013.01); *B01J 19/0066* (2013.01); *B29B 17/04* (2013.01); *C08J 11/12* (2013.01); *C10B 19/00* (2013.01); *C10B 41/00* (2013.01); *C10B 47/18* (2013.01); *C10B 47/30* (2013.01);
(Continued)

(58) Field of Classification Search
CPC ....... C10B 47/32; C10B 47/30; C10B 57/005; B29B 17/04; B29B 2017/0496
See application file for complete search history.

(56) References Cited

U.S. PATENT DOCUMENTS 2,246,563 A 6/1941 Winters
3,901,961 A 8/1975 Goerter et al.
(Continued)

FOREIGN PATENT DOCUMENTS

CA 2287564 A1 4/2001
CA 3226858 A1 7/2021
(Continued)

OTHER PUBLICATIONS

Shell uses plastic waste to produce resin feedsocks, Plastics Today, Jan. 21, 2020, https://www.plasticstoday.com/sustainability/shell-uses-plastic-waste-to-produce-resin-feedstocks, Accessed Mar. 3, 2025.
(Continued)

*Primary Examiner* — Ali Z Fadhel
(74) *Attorney, Agent, or Firm* — Meunier Carlin & Curfman LLC

(57) ABSTRACT

Disclosed herein are methods for pyrolysis of plastic feedstock comprising post-consumer and/or post-industrial plastics. In various implementations, the methods include directing the plastic feedstock into an internal volume of a reactor vessel, and pyrolyzing the plastic feedstock in the internal volume of the reactor vessel.

28 Claims, 38 Drawing Sheets

(51) Int. Cl.

| | |
|---|---|
| ***B01J 19/00*** | (2006.01) |
| ***B29B 17/04*** | (2006.01) |
| ***C08J 11/12*** | (2006.01) |
| ***C10B 19/00*** | (2006.01) |
| ***C10B 41/00*** | (2006.01) |
| ***C10B 47/18*** | (2006.01) |
| ***C10B 47/30*** | (2006.01) |
| ***C10B 47/32*** | (2006.01) |
| ***C10B 53/07*** | (2006.01) |
| ***C10B 57/00*** | (2006.01) |
| ***C10G 1/02*** | (2006.01) |

(52) U.S. Cl.

CPC .............. *C10B 47/32* (2013.01); *C10B 53/07* (2013.01); *C10B 57/005* (2013.01); *C10G 1/02* (2013.01); *B01J 2219/00006* (2013.01); *B01J 2219/00132* (2013.01); *B01J 2219/00162* (2013.01); *B01J 2219/00164* (2013.01); *B01J 2219/185* (2013.01); *B29B 2017/0496* (2013.01); *C08J 2323/06* (2013.01); *C08J 2323/12* (2013.01); *C08J 2325/06* (2013.01); *C10G 2300/1003* (2013.01)

(56) References Cited

U.S. PATENT DOCUMENTS

| | | | | |
|---|---|---|---|---|
| 3,940,233 | A | 2/1976 | Fox et al. | |
| 3,947,256 | A | 3/1976 | Tsukagoshi | |
| 3,952,053 | A | 4/1976 | Brown, Jr. et al. | |
| 3,984,288 | A | 10/1976 | Yoshida | |
| 4,098,649 | A | 7/1978 | Redker | |
| 4,208,252 | A | 6/1980 | Yoshida | |
| 4,776,784 | A | 10/1988 | Batiuk | |
| 4,851,601 | A | 7/1989 | Fukuda et al. | |
| 5,135,638 | A | 8/1992 | Miller | |
| 5,208,005 | A | 5/1993 | Miller | |
| 5,216,149 | A | 6/1993 | Evans et al. | |
| 5,253,479 | A | 10/1993 | Di Cintio et al. | |
| 5,292,862 | A | 3/1994 | Miura et al. | |
| 5,300,704 | A | 4/1994 | Evans et al. | |
| 5,321,174 | A | 6/1994 | Evans et al. | |
| 5,329,696 | A | 7/1994 | Morita | |
| 5,354,930 | A | 10/1994 | Atkins et al. | |
| 5,359,061 | A | 10/1994 | Evans et al. | |
| 5,359,099 | A | 10/1994 | Evans et al. | |
| 5,364,985 | A | 11/1994 | Hermanson | |
| 5,364,995 | A | 11/1994 | Kirkwood et al. | |
| 5,481,052 | A | 1/1996 | Hardman et al. | |
| 5,523,502 | A | 6/1996 | Rubin | |
| 5,542,372 | A | 8/1996 | Sun et al. | |
| 5,584,969 | A | 12/1996 | Nagai | |
| 5,608,136 | A | 3/1997 | Maezawa et al. | |
| 5,639,937 | A | 6/1997 | Hover et al. | |
| 5,731,483 | A | 3/1998 | Stabel | |
| 5,738,025 | A | 4/1998 | Tachibana | |
| 5,744,668 | A | 4/1998 | Zhou et al. | |
| 5,821,553 | A | 10/1998 | Evans et al. | |
| 5,824,193 | A | 10/1998 | Edwards | |
| 5,849,964 | A | 12/1998 | Holighaus et al. | |
| 5,904,838 | A | 5/1999 | Kalnes et al. | |
| 6,011,187 | A | 1/2000 | Horizoe | |
| 6,048,380 | A | 4/2000 | Asanuma | |
| 6,111,156 | A | 8/2000 | Oballa et al. | |
| 6,143,940 | A | 11/2000 | Miller et al. | |
| 6,150,577 | A | 11/2000 | Miller et al. | |
| 6,288,296 | B1 | 9/2001 | Miller et al. | |
| 6,346,220 | B1 | 2/2002 | Kosugi | |
| 6,620,895 | B1 | 9/2003 | Cotts | |
| 6,703,535 | B2 | 3/2004 | Johnson et al. | |
| 6,774,272 | B2 | 8/2004 | Miller | |
| 6,777,581 | B1 | 8/2004 | Zmuda | |
| 6,808,305 | B2 | 10/2004 | Sharpe | |
| 6,822,126 | B2 | 11/2004 | Miller | |
| 6,881,303 | B2 | 4/2005 | Inoue | |
| H2118 | H | 5/2005 | Winter | |
| RE40,124 | E | 3/2008 | Kaiser et al. | |
| 7,452,392 | B2 | 11/2008 | Nick et al. | |
| 7,604,791 | B2 | 10/2009 | Sato | |
| 7,714,178 | B2 | 5/2010 | Bylicki et al. | |
| 7,758,729 | B1 | 7/2010 | Dewhitt | |
| 7,834,226 | B2 | 11/2010 | Miller | |
| 7,862,651 | B2 | 1/2011 | Stein et al. | |
| 7,867,959 | B2 | 1/2011 | Miller et al. | |
| 7,968,006 | B2 | 6/2011 | Johnson et al. | |
| 7,968,022 | B1 | 6/2011 | Brooks et al. | |
| 8,017,040 | B2 | 9/2011 | Johnson et al. | |
| 8,017,041 | B2 | 9/2011 | Johnson et al. | |
| 8,021,577 | B2 | 9/2011 | Johnson et al. | |
| 8,088,961 | B2 | 1/2012 | Miller | |
| 8,137,508 | B2 | 3/2012 | Grispin | |
| 8,187,428 | B2 | 5/2012 | Shimo et al. | |
| 8,192,586 | B2 | 6/2012 | Garrison et al. | |
| 8,192,587 | B2 | 6/2012 | Garrison et al. | |
| 8,222,471 | B2 | 7/2012 | Elomari et al. | |
| 8,323,589 | B2 | 12/2012 | Hamby et al. | |
| 8,404,912 | B1 | 3/2013 | Miller | |
| 8,420,875 | B1 | 4/2013 | Mackay et al. | |
| 8,460,410 | B2 | 6/2013 | Tsang et al. | |
| 8,480,880 | B2 | 7/2013 | Miller | |
| 8,500,959 | B2 | 8/2013 | Lehto | |
| 8,524,968 | B2 | 9/2013 | Elomari et al. | |
| 8,552,245 | B2 | 10/2013 | Simon et al. | |
| 8,575,081 | B2 | 11/2013 | Miller et al. | |
| 8,581,015 | B2 | 11/2013 | Jeon | |
| 8,668,810 | B1 | 3/2014 | Vardanyan et al. | |
| 8,674,154 | B2 | 3/2014 | Podeszfa et al. | |
| 8,680,349 | B2 | 3/2014 | Fraczak et al. | |
| 8,680,394 | B2 | 3/2014 | Korcz et al. | |
| 8,696,994 | B2 | 4/2014 | Miller | |
| 8,864,946 | B2 | 10/2014 | Scheirs | |
| 8,927,797 | B2 | 1/2015 | Sarker | |
| 8,975,459 | B2 | 3/2015 | Vermeiren et al. | |
| 9,017,522 | B2 | 4/2015 | Gildenhuys et al. | |
| 9,074,140 | B2 | 7/2015 | Fraczak et al. | |
| 9,080,107 | B2 | 7/2015 | Fraczak et al. | |
| 9,096,801 | B2 | 8/2015 | Baker | |
| 9,109,238 | B2 | 8/2015 | Miller et al. | |
| 9,309,452 | B2 | 4/2016 | Elomari et al. | |
| 9,365,775 | B1 | 6/2016 | La Crosse et al. | |
| 9,376,632 | B2 | 6/2016 | Fraczak et al. | |
| 9,399,179 | B2 | 7/2016 | Venter et al. | |
| 9,404,046 | B2 | 8/2016 | Sarker | |
| 9,428,695 | B2 | 8/2016 | Narayanaswamy et al. | |
| 9,447,332 | B2 | 9/2016 | Narayanaswamy et al. | |
| 9,714,391 | B2 | 7/2017 | Combs | |
| 10,093,860 | B2 * | 10/2018 | Griffiths | C10G 1/10 |
| 10,106,750 | B2 | 10/2018 | Gutierrez et al. | |
| 10,131,847 | B2 | 11/2018 | Mcnamara et al. | |
| 10,233,393 | B2 | 3/2019 | Oluwaseun et al. | |
| 10,294,433 | B2 | 5/2019 | Grainger et al. | |
| 10,301,235 | B1 | 5/2019 | Cavinaw et al. | |
| 10,377,951 | B2 | 8/2019 | Vanttinen et al. | |
| 10,421,911 | B2 | 9/2019 | Ullom | |
| 10,442,997 | B2 | 10/2019 | Narayanaswamy et al. | |
| 10,472,487 | B2 | 11/2019 | Gil et al. | |
| 10,513,661 | B2 | 12/2019 | Narayanaswamy et al. | |
| 10,518,242 | B2 | 12/2019 | Van Cauwenberge et al. | |
| 10,519,047 | B2 | 12/2019 | Johnson et al. | |
| 10,519,077 | B2 | 12/2019 | Kreischer | |
| 10,551,059 | B2 | 2/2020 | Inskip | |
| 10,598,882 | B2 | 3/2020 | Bohler et al. | |
| 10,717,934 | B2 | 7/2020 | Griffiths | |
| 10,731,082 | B2 | 8/2020 | Tenore et al. | |
| 10,738,244 | B2 | 8/2020 | Ershag et al. | |
| 10,814,525 | B1 | 10/2020 | Geronimi | |
| 10,858,593 | B2 | 12/2020 | Ramamurthy et al. | |
| 10,899,991 | B2 | 1/2021 | Atkins et al. | |
| 10,968,394 | B2 | 4/2021 | Posmyk et al. | |
| 11,015,127 | B2 | 5/2021 | Geronimi | |
| 11,041,123 | B1 | 6/2021 | Cavinaw et al. | |
| 11,072,693 | B2 | 7/2021 | Gil et al. | |
| 11,091,700 | B2 | 8/2021 | Atkins et al. | |

(56) References Cited

U.S. PATENT DOCUMENTS 11,118,114 B2 9/2021 Schabel
11,136,507 B2 10/2021 Niu et al.
11,174,436 B2 11/2021 Timken
11,174,437 B2 11/2021 Timken
11,192,080 B2 12/2021 Aratjjo
11,254,877 B2 2/2022 Rooney et al.
11,306,253 B2 4/2022 Timken et al.
11,339,330 B2 5/2022 Humphreys et al.
11,359,147 B2 6/2022 Timken
11,365,357 B2 6/2022 Bitting et al.
11,447,402 B2 9/2022 Johnson et al.
11,471,817 B2 10/2022 Kurkijärvi et al.
11,473,015 B2 10/2022 Ershag et al.
11,473,016 B2 10/2022 Timken
11,473,017 B1 10/2022 Horlacher
11,479,726 B2 10/2022 Abbott et al.
11,518,940 B2 12/2022 Chia
11,518,942 B2 12/2022 Abbott et al.
11,518,943 B2 12/2022 Timken
11,518,944 B2 12/2022 Timken
11,518,945 B2 12/2022 Timken
11,530,358 B2 12/2022 Bertrand et al.
11,530,359 B2 12/2022 Sarker et al.
11,530,539 B2 12/2022 Roh et al.
11,566,182 B2 1/2023 Timken et al.
11,578,271 B1 2/2023 Griffin, II
11,584,890 B2 2/2023 Timken
11,603,338 B2 3/2023 Yun et al.
11,618,855 B2 4/2023 Abbott et al.
11,639,472 B2 5/2023 Timken
11,732,197 B2 8/2023 Timken
11,739,191 B2 8/2023 Gil et al.
11,739,272 B2 8/2023 Timken
11,746,297 B2 9/2023 Abbott et al.
11,746,298 B2 9/2023 Kapaun et al.
11,773,330 B2 10/2023 Tenore et al.
11,781,073 B2 10/2023 Abbott et al.
11,795,401 B2 10/2023 Chakraborty et al.
11,802,250 B1 10/2023 Murray et al.
11,845,900 B2 12/2023 Atkins et al.
11,884,884 B1 1/2024 Gold et al.
11,884,885 B2 1/2024 Liu et al.
11,891,518 B1 2/2024 Gold et al.
11,905,466 B2 2/2024 Timken
11,920,089 B1 3/2024 Dockter et al.
11,920,094 B2 3/2024 Derks
11,939,527 B1 3/2024 Timken et al.
11,939,530 B2 3/2024 Löw
11,939,531 B2 3/2024 Paasikallio et al.
11,952,545 B1 4/2024 Gold
11,959,025 B2 4/2024 Timken
11,964,315 B1 4/2024 Gold et al.
11,969,689 B2 4/2024 Kurkijärvi et al.
11,981,779 B2 5/2024 Parrott et al.
12,018,213 B2 6/2024 Besong et al.
12,031,091 B2 7/2024 Slivensky et al.
12,077,713 B2 9/2024 Abbott et al.
12,338,393 B2 6/2025 Van Meirhaeghe et al.
12,410,370 B2 9/2025 Gold
2004/0235655 A1 11/2004 Sato
2007/0179326 A1* 8/2007 Baker .................... C10B 27/06
201/25
2009/0151233 A1 6/2009 Miller
2009/0170739 A1 7/2009 Miller
2011/0020190 A1 1/2011 Miller
2011/0072967 A1 3/2011 Wood et al.
2011/0230689 A1 9/2011 Scheirs
2011/0289826 A1 12/2011 Srinakruang
2012/0070347 A1 3/2012 Bacon et al.
2012/0184787 A1 7/2012 Miller
2013/0184505 A1 7/2013 Maxwell
2014/0127343 A1 5/2014 Oravits
2014/0228204 A1 8/2014 Narayanaswamy et al.
2014/0228205 A1 8/2014 Narayanaswamy et al.
2014/0228605 A1 8/2014 Narayanaswamy et al.
2014/0228606 A1 8/2014 Narayanaswamy et al.
2015/0247096 A1 9/2015 Barger et al.
2016/0090539 A1 3/2016 Frey et al.
2016/0137932 A1 5/2016 Kulprathipanja et al.
2016/0264874 A1 9/2016 Narayanaswamy et al.
2016/0264883 A1 9/2016 Narayanaswamy et al.
2016/0264885 A1 9/2016 Narayanaswamy et al.
2016/0362609 A1 12/2016 Ward et al.
2017/0044465 A1 2/2017 Scheibel et al.
2017/0283706 A1 10/2017 Schabel
2017/0327663 A1 11/2017 Gil et al.
2018/0002609 A1 1/2018 Narayanaswamy et al.
2018/0010049 A1 1/2018 Tenore et al.
2018/0187087 A1 7/2018 Atkins et al.
2018/0273848 A1 9/2018 Atkins et al.
2019/0016960 A1 1/2019 Griffiths
2019/0144755 A1 5/2019 Atkins et al.
2019/0161683 A1 5/2019 Narayanaswamy et al.
2019/0177626 A1 6/2019 Ramamurthy et al.
2019/0177652 A1 6/2019 Atkins et al.
2019/0233744 A1 8/2019 Narayanaswamy et al.
2019/0241838 A1 8/2019 Scheibel et al.
2019/0275486 A1 9/2019 Peltekis
2019/0284476 A1 9/2019 Gaber et al.
2019/0299491 A1 10/2019 Stanislaus et al.
2019/0367428 A1 12/2019 Ramamurthy et al.
2019/0382672 A1 12/2019 Sorensen
2020/0017772 A1 1/2020 Ramamurthy et al.
2020/0017773 A1 1/2020 Ramamurthy et al.
2020/0071619 A1 3/2020 Humphreys et al.
2020/0080009 A1 3/2020 Derks
2020/0181498 A1 6/2020 Heeres et al.
2020/0199457 A1 6/2020 Schabel
2020/0308492 A1 10/2020 Streiff et al.
2020/0362248 A1 11/2020 Cartolano et al.
2020/0369965 A1 11/2020 Bitting et al.
2020/0369966 A1 11/2020 Bitting et al.
2021/0032545 A1 2/2021 Harandi et al.
2021/0061972 A1 3/2021 Nagy et al.
2021/0070958 A1 3/2021 Brita et al.
2021/0070959 A1 3/2021 Brita et al.
2021/0108154 A1 4/2021 Schiebel et al.
2021/0122989 A1 4/2021 White
2021/0130262 A1 5/2021 Wu et al.
2021/0130698 A1 5/2021 Sundaram
2021/0130699 A1 5/2021 Bitting et al.
2021/0130700 A1 5/2021 Wu et al.
2021/0139620 A1 5/2021 Slivensky et al.
2021/0189248 A1 6/2021 Timken
2021/0189249 A1 6/2021 Timken
2021/0189250 A1 6/2021 Timken
2021/0189251 A1 6/2021 Timken
2021/0189252 A1 6/2021 Timken
2021/0189253 A1 6/2021 Timken
2021/0189254 A1 6/2021 Timken
2021/0284818 A1 9/2021 Doucet et al.
2021/0301209 A1 9/2021 Timken et al.
2021/0301210 A1 9/2021 Timken
2021/0308644 A1 10/2021 Araujo Carreira
2021/0332299 A1 10/2021 Timken
2021/0332300 A1 10/2021 Timken
2021/0363432 A1 11/2021 Bitting et al.
2022/0010211 A1 1/2022 Allegro, II et al.
2022/0010212 A1 1/2022 Shi et al.
2022/0010213 A1 1/2022 Sun et al.
2022/0010217 A1 1/2022 Barger et al.
2022/0010218 A1 1/2022 Davydov
2022/0041905 A1 2/2022 Boaventura et al.
2022/0065535 A1 3/2022 Schabel
2022/0073826 A1 3/2022 Van Zijl et al.
2022/0081372 A1 3/2022 Niessner et al.
2022/0081634 A1 3/2022 Arnst et al.
2022/0098045 A1 3/2022 Stapela
2022/0098490 A1 3/2022 Abbott et al.
2022/0098491 A1 3/2022 Abbott et al.
2022/0154077 A1 5/2022 Bitting et al.
2022/0195311 A1 6/2022 Löw
2022/0204870 A1 6/2022 Portela et al.
2022/0220391 A1 7/2022 Slivensky et al.

(56) References Cited

U.S. PATENT DOCUMENTS

| | | | |
|---|---|---|---|
| 2022/0228070 | A1 | 7/2022 | Chakraborty et al. |
| 2022/0289648 | A1 | 9/2022 | Arnst et al. |
| 2022/0363994 | A1 | 11/2022 | Besong |
| 2022/0363996 | A1 | 11/2022 | Wu et al. |
| 2022/0389327 | A1 | 12/2022 | Relmers |
| 2022/0396735 | A1 | 12/2022 | Wu et al. |
| 2022/0396736 | A1 | 12/2022 | Wu et al. |
| 2023/0039224 | A1 | 2/2023 | Bozzano et al. |
| 2023/0067668 | A1 | 3/2023 | Abbott et al. |
| 2023/0117658 | A1 | 4/2023 | Bitting et al. |
| 2023/0272293 | A1 | 8/2023 | Weiss et al. |
| 2023/0312437 | A1 | 10/2023 | Schmidt et al. |
| 2023/0312438 | A1 | 10/2023 | Timken |
| 2023/0312439 | A1 | 10/2023 | Timken |
| 2023/0312862 | A1 | 10/2023 | Liu et al. |
| 2023/0313052 | A1 | 10/2023 | Timken |
| 2023/0348342 | A1 | 11/2023 | Timken |
| 2023/0407183 | A1 | 12/2023 | Abbott et al. |
| 2024/0010583 | A1 | 1/2024 | Schmidt et al. |
| 2024/0010927 | A1 | 1/2024 | Liu et al. |
| 2024/0010928 | A1 | 1/2024 | Schmidt et al. |
| 2024/0010940 | A1 | 1/2024 | Liu et al. |
| 2024/0182793 | A1 | 6/2024 | Mathias Aloysius Becker Neto |
| 2024/0384173 | A1 | 11/2024 | McNamara |
| 2025/0188365 | A1* | 6/2025 | Hampton, Jr. ........... C10G 1/10 |
| 2025/0242324 | A1 | 7/2025 | Gold |
| 2025/0243408 | A1 | 7/2025 | Gold |
| 2025/0243410 | A1 | 7/2025 | Gold |
| 2025/0243412 | A1 | 7/2025 | Gold |
| 2025/0243413 | A1 | 7/2025 | Gold |

FOREIGN PATENT DOCUMENTS

| | | | |
|---|---|---|---|
| EP | 1025186 | A1 | 8/2000 |
| EP | 1025186 | B1 | 5/2004 |
| EP | 2406348 | A2 | 1/2012 |
| EP | 3784756 | A1 | 3/2021 |
| EP | 3950889 | A1 | 2/2022 |
| EP | 4108737 | A1 | 12/2022 |
| EP | 4141088 | A1 | 3/2023 |
| EP | 2406348 | B1 | 6/2023 |
| EP | 4458908 | A1 | 11/2024 |
| JP | H0256769 | A | 2/1990 |
| JP | H0841465 | A | 2/1996 |
| JP | H11-302663 | A | 11/1999 |
| WO | 2009087080 | A2 | 7/2009 |
| WO | 2017167947 | A1 | 10/2017 |
| WO | 2018011642 | A1 | 1/2018 |
| WO | 2020152317 | A1 | 7/2020 |
| WO | 2020216893 | A1 | 10/2020 |
| WO | 2020242912 | A1 | 12/2020 |
| WO | 2020242914 | A1 | 12/2020 |
| WO | 2020247192 | A1 | 12/2020 |
| WO | 2020252228 | A1 | 12/2020 |
| WO | 2021133881 | A1 | 7/2021 |
| WO | 2021201932 | A1 | 10/2021 |
| WO | 2022093131 | A1 | 5/2022 |
| WO | 2022193015 | A1 | 9/2022 |
| WO | 2022213021 | A1 | 10/2022 |
| WO | 2023038855 | A1 | 3/2023 |
| WO | 2023187732 | A1 | 10/2023 |

OTHER PUBLICATIONS

The path to zero waste—the value of chemical recycling. Eastman. May 2023 https://www.eastman.com/content/dam/eastman/corporate/en/literature/c/circrt12181.pdf, Accessed Mar. 4, 2025.
Coleman B et al. LCA carbon footprint summary report for Eastman carbon renewal technology. Jun. 10, 2020. 12 pages.
Karanam S. The role of advanced recycling in closing the loop for plastics and circular economy. Mar. 9, 2020. 26 pages.
ChemCycling®: Creating a circular plastics economy with chemical recycling. BASF. Sep. 2024, https://www.basf.com/us/en/who-we-are/sustainability/we-drive-sustainable-solutions/circular-economy/mass-balance-approach/chemcycling; accessed Mar. 4, 2025.
Chemical Recycling: Accelerating Circularity. BASF. Apr. 20, 2023, 5 pages.
Sharuddin SDA et al. A review on pyrolysis of plastic wastes. Energy Conversion and Management, vol. 115, May 1, 2016, pp. 308-326.
Thibodeaux A. Plastic waste is new resource for Shell Norco, Jan. 24, 2020. https://www.heraldguide.com/featured/plastic-waste-is-new-resource-for-shell-norco/; Accessed Mar. 4, 2025.
SABIC Mass Balance. Sep. 11, 2019. https://www.youtube.com/watch?v =-imvDD6i6Lo; Accessed Mar. 4, 2025.
Sharma, B. et al. Production, characterization and fuel properties of alternative diesel fuel from pyrolysis of waste plastic grocery bags. Fuel Processing Technology, vol. 122, Jun. 2014, pp. 79-90.
Khan et al. Pyrolytic waste plastic oil and its diesel blend: fuel characterization. Journal of Environmental and Public Health, vol. 2016, Jun. 5, 2016.
International Search Report and Written Opinion mailed Mar. 28, 2025 in International Application No. PCT/US2025/013656 (13 pages).
Plastic Additives by Grace (Year: 2024).
International Search Report and Written Opinion mailed May 20, 2025 in International Application No. PCT/US2025/013657 (15 pages).
Enabling a circular economy for chemicals with the mass balance approach, A white paper from co.project mass balance, Ellen Macarthur Foundation, 2019, 35 pages.
“Plastic Material Melt and Mould Temperatures” Nov. 4, 2020 (date obtained from WayBack Machine), Retrived from Internet URL: https://www.plastikcity.co.uk/useful-stuff/material-melt-mould-temperatures.
Safety Data Sheet for Crude Oil CAS-2068009-57-2; Oct. 7, 2020; 17 pages.
Dinkel et al., Question 60 publication, AFPM, 2017.
O’Reilly, Defend Against Silicon Poisoning, Hydrocarbon Eng. Special Reports, 2017.
Verdier, et al., Hydroprocessing of Renewable Feedstocks—Challenges and Solutions, Haldor Topsoe Whitepaper, Mar. 6, 2019.
Sundaram, K.M., Stancato, B., Lummus Technology, “How Much is Too Much?—Feed Contaminants and Their Consequences,” AICHE 2018 Spring National Meeting Paper No. 32d, 2018.
Kusenberg et al., “Challenges and Opportunities for Plastic Waste Pyrolysis Oils as Steam Cracking Feedstock,” AICHE 2021 Spring National Meeting Paper No. 41a, 2021.
“Shell uses plastic waste to produce chemicals.” Nov. 21, 2019, https://www.shell.com/business-customers/chemicals/media-releases/2019-media-releases/shell-uses-plastic-waste-to-produce-chemicals.html, accessed Jun. 20, 2024.
Chemical Recycling: Tackling Plastic Waste. Shell Chemicals is working to utilise plastic waste as feedstock in our global chemical plants. https://www.shell.com/business-customers/chemicals/chemical-recycling-tackling-plastic-waste.html#iframe=L3dlYmFwcHMvU2hlbGxfQ2hlbWIjYWxzX1JIY3ljbGluZy8=.
Rezvani Ghomi, Erfan, et al. “The flame retardancy of polyethylene composites: from fundamental concepts to nanocomposites.” Molecules 25.21 (2020): 5157. https://doi.org/10.3390/molecules25215157.
Pan, Y. Q., et al. “Improved flame retardant of intumescent flame retardant flame-retarded high density polyethylene with fullerene decorated by iron compound.” eXPRESS Polymer Letters 13.9 (2019). <https://doi.org/10.3144/ expresspolymlett.2019.72 (Year: 2019).
Deng, Cong, et al. “Effect of two types of iron MMTs on the flame retardation of LDPE composite.” Polymer degradation and stability 103 (2014): 1-10. https://doi.org/10.1016/j.polymdegradstab.2014.03.001.
Gary, J.H., et al., 2007, Petroleum Refining Technology and Economics, 5th ed., CRC Press, 465 pp. (Year: 2007).
Gary, JH et al. 2007, Petroleum Refining Technology and Economics, 5th ed. CRC Press, p. 463.

(56) References Cited

OTHER PUBLICATIONS

Carvalho, Bárbara O., et al. "Replacing harmful flame retardants with biodegradable starch-based materials in polyethylene formulations." Polymers 15.20 (2023): 4078.
International Search Report and Written Opinion mailed Aug. 28, 2024 in International Application No. PCT/ US24/21598 (15 pages).
Extended European Search Report mailed Oct. 8, 2024 in European Application No. 24167096.7 (8 pages).
Extended European Search Report mailed Oct. 4, 2024 in European Application No. 24167095.9 (8 pages).
Extended European Search Report mailed Oct. 8, 2024 in European Application No. 24167097.5 (7 pages).
Nexus and Shell sign strategic supply agreement to scale up commercial production of chemical from plastic waste Nov. 19, 2020. https://www.shell.com/business-customers/chemicals/media-releases/2020-media-releases/nexus-and-shell-sign-strategic-supply-agreement-to-scale-up-commercial-production-of-chemicals-from-plastic-waste.html.
Shell, YouTube, Plastic Waste to mChemicals, 2019.pdf.
Shell, Sustainability Report 2020. 13 pages.
Somoza-Tornos A et al.Realizing the Potential High Benefits of Circular Economy in the Chemical Industry: Ethylene Monomer Recovery via Polyethylene Pyrolysis, ACS Sustainable Chemistry & Engineering 2020, 8, 3561-3572.
Miandad R et al. Catalytic Pyrolysis of Plastic Waste: Moving Toward Pyrolysis Based Biorefineries. Fronteier in Energy Research, 2019, 7, 27 (17 pages).
Miller SJ et al. Conversion of Waste Plastic to Lubricating Base Oil, Energy & Fuels 2005, 19, 1580-1586.
Sarker M et al. Mixture of LDPE, PP and PS Waste Plastics into Fuel by Thermolysis Process, International Journal of Engineering and Technology Research, 2013, 1(1), 16 pages.
Garieb Alla MM et al. Simulation and Design for Process to Convert Plastic Waste to Liquid Fuel Using Aspen Hysys Program, Integer. J. Engg. Res. Tech. 2014, 1(6), 270-274.
Fivga A et al. Pyrolysis of plastic waste for production of heavy fuel substitute: A techno-economic assessment, Energy (2018), doi: 10.1016/j.energy.2018.02.094.
Adeniyi AG et al. Computer Aided Modelling of Low Density Polyethylene Pyrolysis to Produce Synthetic Fuels, Nigerian Journal of Technology, 2018, 37(4), 945-959.
Selvaganapathy T. et al. Simulation of Waste Plastic Pyrolysis Process Using Aspen Hysys V9 Simulator under Steady State Operating Condition, Chapter 11, Emerging Trends in Engineering Research and Technology vol. 2, 2020, pp. 108-118.
Tollini F et al. Influence of the catalytic system on the methanolysis of polyethylene terephthalate at mild conditions: A systematic investigation, Chemical Engineering Science, 2022, 260, 117875.
Jeya G et al. A short review on latest developments in catalytic depolymerization of Poly(ethylene terephathalate) wastes, Journal of the Indian Chemical Society, 2022, 99, 100291.
Xin J et al. Progress in the catalytic glycolysis of polyethylene terephthalate, journal of Environmental Management, 2021, 296, 113267.
Liu Y et al. Catalytic depolymerization of polyethylene terephthalate in hot compressed water, The Journal of Supercritical Fluids, 2012, 62, 226-231.
Khan A et al. Efficient chemical recycling of waste polyethylene terephthalate, Resources, Conservation & Recycling, 2022, 187, 106639.
Pashan RK et al. Chemical Depolymerization of PET Bottles via Combined Chemolysis Methods. Chapter 7, Recycling of Polyethylene Terephthalae Bottles, 2019, pp. 135-147.
Langer E et al. Method of PET Recycling, Plasticizers derived from Post-Consumer PET, chapter 5, pp. 127-171.
Biermann L et al. Development of a continuous PET depolymerization process as a basis for a back-to-monomer recycling method, Green Processing and Synthesis 2021; 10: 361-373.
Tullo AH. Plastic has a problem, is chemistry the solution? Chemical and Engineering News, 2019, 97(39), 8 pages.
Tullo A. Chemical firms back depolymerization. Chemical and Engineering News, 2018, 96(39), 1 page.
Hofmann M et al. Zinc(II) acetate Catalyzed Depolymerization of Poly(ethylene terephthalate), Chemistry Select, 2020, 5, 10010-10014.
Tournier V et al. An engineered PET depolymerase to break down and recycle plastic bottles, Nature, 2020, 580, 216.
Garcia JM et al. The future of plastics recycling, Science, 2017, 358, 870.
Chen JY et al. Depolymerization of poly(ethylene terephthalate) resin under pressure, Journal of Applied Polymer Science, 1991, 42(6), 1501-1507.
Zope VS et al. Kinetics of Neutral Hydrolytic Depolymerization of PET (Polyethylene Terephthalate) Waste at Higher Temperature and Autogenious Pressures, Journal of Applied Polymer Science, 2008, 110, 2179-2183.
Kao et al. Kinetics of Hydrolytic Depolymerization of Melt Poly-(ethylene terephthalate), Ind. Eng. Chem. Res. 1998, 37, 1228-1234.
Guo Z et al. An efficient recycling process of glycolysis of PET in the presence of a sustainable nanocatalyst, Journal of Applied Polymer Science, 2018, 135(21), 46285.
Ma M et al. Insights into the depolymerization of polyethylene terephthalate in methanol, Journal of Applied POlymer Science, 2022, 139(35), e52814.
Zenda K. et al. Depolymerization of poly(ethylene terephthalate) in dilute aqueous ammonia solution under hydrothermal , conditions. J Chem Technol Biotechnol 83:1381-1386 (2008).
Fukushima K et al. Organocatalytic Depolymerization of Poly(ethylene terephthalate), Journal of Polymer Science Part A: Polymer Chemistry, vol. 49, 1273-1281 (2011).
Goje AS et al. Chemical Kinetics, Simulation, and Thermodynamics of Glycolytic Depolymerization of Poly(ethylene terephthalate) Waste with Catalyst Optimization for Recycling of Value Added Monomeric Products, Macromol. Mater. Eng. 2003, 288, 326-336.
Makower J. Inside Eastman's moonshot goal for endlessly circular plastics, 2020, https://trellis.net/article/inside-eastmans-moonshot-goal-endlessly-circular-plastics/, Accessed Mar. 3, 2025.
Tricker AW et al. Stages and Kinetics of Mechanochemical Depolymerization of Poly(ethylene terephthalate) with Sodium Hydroxide, ACS Sustainable Chem. Eng. 2022, 10, 11338-11347.
Pudak C et al. PET Recycling—Contributions of Crystallization to Sustainability, Chem. Ing. Tech. 2020, 92, No. 4, 452-458.
Khoonkari M et al. Chemical Recycling of PET Wastes with Different Catalysts, Hindawi Publishing Corporation International Journal of Polymer Science, vol. 2015, Article ID 124524, 11 pages, http://dx.doi.org/10.1155/2015/124524.
Singh A et al. Techno-economic, life-cycle, and socioeconomic impact analysis of enzymatic recycling of poly(ethylene terephthalate), Joule 2021, 5, 2479-2503.
Dzhabarov, G.V., et al., A kinetic study on the depolymerization of polyethylene terephthalate waste with crude glycerol. Chemical Papers, 2021. 75(11): p. 6035-6046.
Zhao YB et al. Solvent-based separation and recycling of waste plastics: A review. Chemosphere, 2018. 209: p. 707-720.
Hajighasemi, M., et al., Biochemical and Structural Insights into Enzymatic Depolymerization of Polylactic Acid and Other Polyesters by Microbial Carboxylesterases. Biomacromolecules, 2016. 17(6), 2027.
Zhang, L.N., et al., From Aminolysis Product of PET Waste to Value-added Products of Polymer and Assistants. Polymers & Polymer Composites, 2014. 22(1): p. 13-16.
Goto, M., Chemical recycling of plastics using sub- and supercritical fluids. The Journal of Supercritical Fluids, 2009. 47(3): p. 500-507.
Krehula, L.K., et al., Study of PET depolymerization during recycling. E-Polymers, 2008: 089, 12 pages.
"Cracking the problem of waste plastic," ISCC Press Release dated Apr. 15, 2019, https://www.iscc-system.org/news/cracking-the-problem-of-waste-plastics/, Accessed Mar. 3, 2025.
Al-Salem SM et al. A review on thermal and catalytic pyrolysis of plastic solid waste (PSW), Journal of Environmental Management 197 (2017) 177-198.

(56) References Cited

OTHER PUBLICATIONS

Kaminsky W et al. Recycling of polymers by pyrolysis. Journal de Physique IV Proceedings, 1993, 03 (C7), pp.C7-1543-C7-1552.
Kiran N et al. Recyling of plastic wastes via pyrolysis, Resources, Conservation and Recycling 29 (2000) 273-283.
Laermann M. Chemical Recycling of Plastic—Waste No More? Apr. 10, 2019. https://global-recycling.info/archives/3236, Accessed Mar. 3, 2025.
Miandad R et al. Effect of plastic waste types on pyrolysis liquid oil, International Biodeterioration & Biodegradation, vol. 119, Apr. 2017, pp. 239-252.
Miskolczi et al. Fuels by pyrolysis of waste plastics from agricultural and packaging sectors in a pilot scale reactor, Fuel Processing Technology, vol. 90, Issues 7-8, Jul.-Aug. 2009, pp. 1032-1040.
J. Schiers et al. Feedstock Recycling and Pyrolysis of Waste Plastic: Converting Plastics into Diesel and Other Fuels. 2006, John Wiley and Sons.
Cano Londono NA et al. Perspectives on circular economy in the context of chemical engineering and sustainable development, Current Opinion in Chemical Engineering, 2021, vol. 34, 100738.
Mass Balance Approach to Accelerate the Use of Renewable Feedstocks in Chemical Processes, Plastics Europe, Jan. 2020 (6 pages).
Martinho G., et al., "Composition of Plastics From Waste Electrical and Electronic Equipment (WEEE) by Direct Sampling," Waste Management, 2012, vol. 32, No. 6, pp. 1213-1217. ISSN0956-053X, DOI: https://doi.org/10.1016/j.wasman.2012.02.010.
PLASTIKCITY., "Melting Point of Plastics: Insights for Manufacturing and Application," 4 pages, Retrieved from the Internet: URL: https://boyanmfg.com/melting-point-of-plastics-guide/.
Shen J., et al. "The Flame-Retardant Mechanisms and Preparation of Polymer Composites and Their Potential Application in Construction Engineering," Polymers, 2022, vol. 14 No. 1, 82, 23 Pages, DOI: https://doi.org/10.3390/polym14010082.
Pyrolysis, (Nov. 21, 2025), In Wikipedia, https://en.wikipedia.org/wiki/Pyrolysis.
Carbonization, (Nov. 21, 2025), In Wikipedia, https://en.wikipedia.org/wiki/Carbonization.
Dinkel B., et al., "Question 60 Publication: with Today's Current Variety of New Crudes, Synthetic Crudes, Tight Oils, Bio-based Streams, Opportunity Feeds, Etc, That Find Their Way to the FCCU, What New Metal Contaminants (Excluding Nickel, Vanadium, Iron, and Sodium) Do You See That Impact Catalyst and FCC Performance?," AFPM, 2017, 6 Pages, [Retrieved on May 16, 2024] Retrieved from URL: https://www.afpm.org/data-reports/technical-papers/qa-search/question-60-todays-current-variety-new-crudes-synthetic.
International Search Report and Written Opinion for International Application No. PCT/US2024/021598, dated Aug. 28, 2024, 15 Pages.
Youtube: "Plastic Waste to Chemicals," Shell, Nov. 20, 2019, 4 Pages, [Retrieved on Dec. 5, 2024] Retrieved from URL: https://www.youtube.com/watchv=iTGghtDUIG0&t=34s.

* cited by examiner

SYSTEMS AND METHODS FOR MAKING HYDROCARBON COMPOSITIONS DERIVED FROM PYROLYSIS OF POST-CONSUMER AND/OR POST-INDUSTRIAL PLASTICS

CROSS-REFERENCE TO RELATED APPLICATIONS

This application claims the benefit of priority to U.S. Provisional Application No. 63/626,488, filed Jan. 29, 2024, which is incorporated by reference herein in its entirety.

BACKGROUND

Single use plastic waste is a pressing environmental issue. There are currently few options for recycling a mixed polyolefin stream comprised of a broad range of compositions and physical forms of polyethylene, polypropylene, and polystyrene waste plastics to value-added chemical and refinery feedstock products. Improved processes are needed for recycling such plastics at an industrially significant scale and for producing improved products therefrom. The systems, methods, and compositions discussed herein address these and other needs.

SUMMARY

In accordance with the purposes of the disclosed compositions and methods as embodied and broadly described herein, the disclosed subject matter relates to systems and methods for pyrolyzing plastic feedstock comprising post-consumer and/or post-industrial plastics to produce hydrocarbon-based compositions derived therefrom.

Disclosed herein is a method for pyrolysis of plastic feedstock comprising post-consumer and/or post-industrial plastics. In various implementations, the method may comprise directing the plastic feedstock into an internal volume of a reactor vessel, and pyrolyzing the plastic feedstock in the internal volume of the reactor vessel. In certain implementations, the step of pyrolyzing the plastic feedstock may comprise using one or more heaters to heat the plastic feedstock in the reactor vessel's internal volume to a temperature between 200° C. and 1,000° C., and operating the reactor to pyrolyze the plastic feedstock for a cumulative period of 324 hours or more during a time period of 360 hours.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more implementations of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
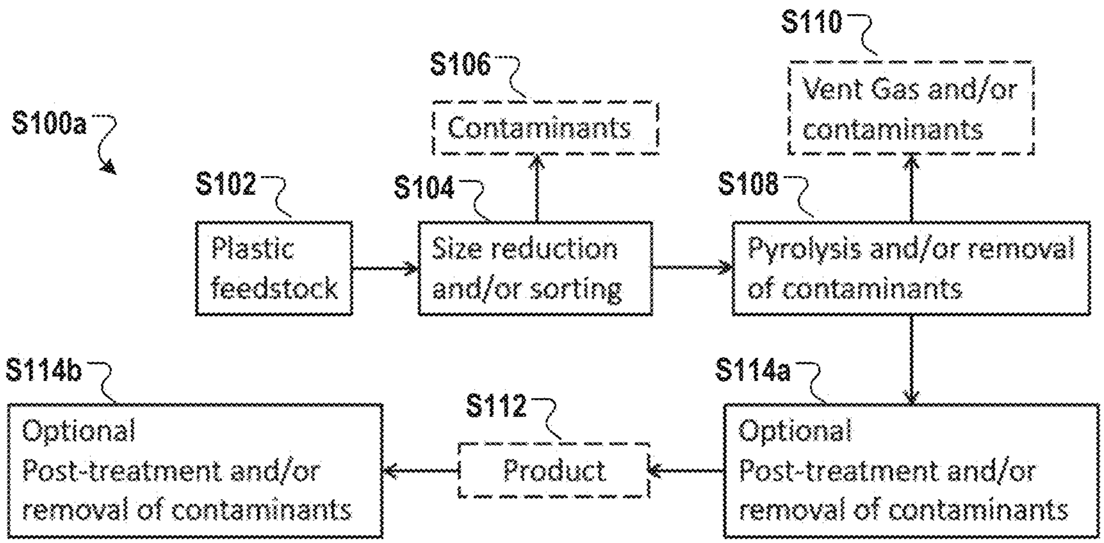
FIG. 1. Schematic diagram of an example system and/or method as disclosed herein according to one implementation.

The compositions, methods, and systems described herein may be understood more readily by reference to the following detailed description of specific aspects of the disclosed subject matter and the Examples included therein.

Before the present compositions, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification, the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values can be expressed herein as an "average" value. "Average" generally refers to the statistical mean value.

By "substantially" is meant within 5%, e.g., within 4%, 3%, 2%, or 1%.

"Exemplary" means "an example of" and is not intended to convey an indication of a preferred or ideal implementation. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

The expressions "ambient temperature" and "room temperature" as used herein are understood in the art and refer generally to a temperature from 0° C. to 30° C., such as from 20° C. to 30° C.

The expressions "ambient pressure" and "room pressure" as used herein are understood in the art and refer generally to a pressure from 14.5 to 14.7 pounds per square inch (psi).

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix Cn-Cm preceding a group or moiety indicates, in each case, the possible number of carbon atoms in the group or moiety that follows.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation, acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acyl, alkyl, alkoxy, alkenyl, alkynyl, aryl, heteroaryl, aldehyde, amino, cyano, carboxylic acid, ester, ether, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure $—CH═CH_2$; 1-propenyl refers to a group with the structure $—CH═CH—CH_3$; and 2-propenyl refers to a group with the structure $—CH_2—CH═CH_2$. Asymmetric structures such as $(Z^1Z^2)C═C(Z^3Z^4)$ are intended to include both the E and Z isomers. This can be presumed in structural formulae herein wherein an asymmetric alkene is present, or it can be explicitly indicated by the bond symbol C═C. Alkenyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some examples, aryl groups include $C_6$-$C_{10}$ aryl groups. Examples of aryl groups include, but are not limited to, benzene, phenyl, biphenyl, naphthyl, tetrahydronaphthyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems (e.g., monocyclic, bicyclic, tricyclic, polycyclic, etc.) that can be substituted or unsubstituted. A cyclic group can contain one or more aryl groups, one or more non-aryl groups, or one or more aryl groups and one or more non-aryl groups.

The term "acyl" as used herein is represented by the formula —C(O)$Z^1$ where $Z^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a shorthand notation for C═O.

The term "acetal" as used herein is represented by the formula $(Z^1Z^2)C({=}OZ^3)({=}OZ^4)$, where $Z^1$, $Z^2$, $Z^3$, and $Z^4$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

The term "alkanol" as used herein is represented by the formula $Z^1OH$, where $Z^1$ can be an alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage; that is, an "alkoxy" group can be defined as to a group of the formula $Z^1$—O—, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula —C(O) H. Throughout this specification "C(O)" is a shorthand notation for C═O.

The term "amino" as used herein are represented by the formula —$NZ^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula —C(O)$NZ^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "anhydride" as used herein is represented by the formula $Z^1C(O)OC(O)Z^2$ where $Z^1$ and $Z^2$, independently, can be an alkyl, alkenyl, alkynyl, aryl, heteroaryl, cycloalkyl, cycloalkenyl, heterocycloalkyl, or heterocycloalkenyl group described above.

The term "cyclic anhydride" as used herein is represented by the formula:

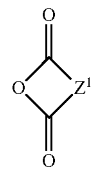

where $Z^1$ can be an alkyl, alkenyl, alkynyl, aryl, heteroaryl, cycloalkyl, cycloalkenyl, heterocycloalkyl, or heterocycloalkenyl group described above.

The term "azide" as used herein is represented by the formula —N═N═N.

The term "carboxylic acid" as used herein is represented by the formula —C(O)OH.

A "carboxylate" or "carboxyl" group as used herein is represented by the formula —C(O)O.

The term "cyano" as used herein is represented by the formula —CN.

The term "ester" as used herein is represented by the formula —OC(O)$Z^1$ or —C(O) O$Z^1$, where $Z^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1OZ^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "epoxy" or "epoxide" as used herein refers to a cyclic ether with a three atom ring and can represented by the formula:

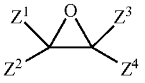

where $Z^1$, $Z^2$, $Z^3$, and $Z^4$ can be, independently, an alkyl, alkenyl, alkynyl, aryl, heteroaryl, cycloalkyl, cycloalkenyl, heterocycloalkyl, or heterocycloalkenyl group described above The term "ketone" as used herein is represented by the formula $Z^1C(O)Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —$NO_2$.

The term "phosphonyl" is used herein to refer to the phospho-oxo group represented by the formula —P(O)$(OZ^1)_2$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula $—SiZ^1Z^2Z^3$, where $Z^1$, $Z^2$, and $Z^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula $—S(O)_2Z^1$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein comprises the formula —S—.

The term "thiol" as used herein is represented by the formula —SH.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amino group, an alkyl group, a halide, and the like. Depending upon the groups that are selected, a first group can be incorporated within a second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Compositions

Disclosed herein are hydrocarbon-based compositions derived from pyrolysis of a feedstock comprising post-consumer and/or post-industrial plastics. Pyrolysis depolymerizes plastics into products comprised of building block molecules. Contaminants are introduced during plastic formulation and manufacturing processes during the first life of plastic in conjunction with the source and collection method of the plastics. Recycling of plastics via pyrolysis is a technology that generates products with a broad range of quality dependent upon a variety of factors, including the feedstock and manufacturing process.

"Post-industrial" or "Pre-consumer" plastics include materials derived from waste streams during a plastic manufacturing process.

"Post-consumer" plastics include materials generated by households or by commercial, industrial, and/or institutional facilities in their roles as end-users of the product which can no longer be used for its intended purpose. This includes returns of material from the distribution chain.

Sources of post-consumer and/or post-industrial plastics include, but are not limited to, plastic resin producers; packaging converters; industrial, commercial, retail, and institutional facilities; households; and waste collectors.

In some examples, the compositions disclosed herein can comprise a wax, an oil, or a combination thereof.

Wax

For example, disclosed herein are waxes derived from pyrolysis of a feedstock comprising post-consumer and/or post-industrial plastics. In some examples, the wax can be produced via pyrolysis at an industrial scale.

In some examples, the wax is a solid or semi-solid at ambient temperature and ambient pressure.

In some examples, the wax comprises relatively long-chain hydrocarbons that are solid or semi-solid at ambient temperature and ambient pressure.

The wax can, for example, have a number average molecular weight and/or a weight average molecular weight of 250 Daltons or more (e.g., 255 Daltons or more, 260 Daltons or more, 265 Daltons or more, 270 Daltons or more, 275 Daltons or more, 280 Daltons or more, 285 Daltons or more, 290 Daltons or more, 295 Daltons or more, 300 Daltons or more, 305 Daltons or more, 310 Daltons or more, 315 Daltons or more, 320 Daltons or more, 325 Daltons or more, 330 Daltons or more, 335 Daltons or more, 340 Daltons or more, 345 Daltons or more, 350 Daltons or more, 355 Daltons or more, 360 Daltons or more, 365 Daltons or more, 370 Daltons or more, 375 Daltons or more, 380 Daltons or more, 385 Daltons or more, 390 Daltons or more, 395 Daltons or more, 400 Daltons or more, 405 Daltons or more, 410 Daltons or more, 415 Daltons or more, 420 Daltons or more, 425 Daltons or more, 430 Daltons or more, 435 Daltons or more, or 440 Daltons or more). In some examples, the wax can have a number average molecular weight and/or a weight average molecular weight of 450 Daltons or less (e.g., 445 Daltons or less, 440 Daltons or less, 435 Daltons or less, 430 Daltons or less, 425 Daltons or less, 420 Daltons or less, 415 Daltons or less, 410 Daltons or less, 405 Daltons or less, 400 Daltons or less, 395 Daltons or less, 390 Daltons or less, 385 Daltons or less, 380 Daltons or less, 375 Daltons or less, 370 Daltons or less, 365 Daltons or less, 360 Daltons or less, 355 Daltons or less, 350 Daltons or less, 345 Daltons or less, 340 Daltons or less, 335 Daltons or less, 330 Daltons or less, 325 Daltons or less, 320 Daltons or less, 315 Daltons or less, 310 Daltons or less, 305 Daltons or less, 300 Daltons or less, 295 Daltons or less, 290 Daltons or less, 285 Daltons or less, 280 Daltons or less, 275 Daltons or less, 270 Daltons or less, 265 Daltons or less, or 260 Daltons or less). The number average molecular weight and/or weight average molecular weight of the wax can range from any of the minimum values described above to any of the maximum values described above. For example, the wax can have a number average molecular weight and/or a weight average molecular weight of from 250 to 450 Daltons (e.g., from 250 to 350 Daltons, from 350 to 450 Daltons, from 250 to 300 Daltons, from 300 to 350 Daltons, from 350 to 400 Daltons, from 400 to 450 Daltons, from 250 to 425 Daltons, from 250 to 400 Daltons, from 250 to 375 Daltons, from 250 to 325 Daltons, from 250 to 275 Daltons, from 275 to 450 Daltons, from 300 to 450 Daltons, from 325 to 450 Daltons, from 375 to 450 Daltons, from 425 to 450 Daltons, from 275 to 425 Daltons, or from 300 to 400 Daltons). In some examples, the wax can have a number average molecular weight and/or a weight average molecular weight of from 300 to 400 Daltons (e.g., from 300 to 350 Daltons, from 350 to 400 Daltons, from 300 to 320 Daltons, from 320 to 340 Daltons, from 340 to 360 Daltons, from 360 to 380 Daltons, from 380 to 400 Daltons, from 300 to 380 Daltons, from 300 to 360 Daltons, from 300 to 340 Daltons, from 320 to 400 Daltons, from 340 to 400 Daltons, from 360 to 400 Daltons, from 310 to 390 Daltons, from 320 to 380 Daltons, from 325 to 375 Daltons, or from 325 to 350 Daltons).

The wax comprises a mixture of different hydrocarbons (e.g., linear, branched, cyclic, acyclic, saturated, unsaturated, aromatic, non-aromatic, etc.), any of which can optionally be substituted. In some examples, the wax comprises a mixture of different hydrocarbons, any of which can optionally be substituted, and 60% or more of the mixture (w/w) comprises $C_{20}$-$C_{45}$ hydrocarbons (e.g., 61% or more, 62% or more, 63% or more, 64% or more, 65% or more, 66% or more, 67% or more, 68% or more, 69% or more, 70% or more, 71% or more, 72% or more, 73% or more, 74% or more, 75% or more, 76% or more, 77% or more, or 78% or more). In some examples, the wax comprises a mixture of different hydrocarbons, any of which can optionally be substituted, and 80% or less of the mixture (w/w) comprises $C_{20}$-$C_{45}$ hydrocarbons (e.g., 79% or less, 78% or less, 77% or less, 76% or less, 75% or less, 74% or less, 73% or less, 72% or less, 71% or less, 70% or less, 69% or less, 68% or less, 67% or less, 66% or less, 65% or less, 64% or less, 63% or less, or 62% or less). The amount of the mixture comprising $C_{20}$-$C_{45}$ hydrocarbons can range from any of the minimum values described above to any of the maximum values described above. For example, the wax comprises a mixture of different hydrocarbons, any of which can optionally be substituted, and from 60% to 80% of the mixture (w/w) comprises $C_{20}$-$C_{45}$ hydrocarbons (e.g., from 60% to 70%, from 70% to 80%, from 60% to 65%, from 65% to 70%, from 70% to 75%, from 75% to 80%, from 60% to 75%, from 65% to 80%, or from 65% to 75%).

In some examples, the wax comprises a mixture of different hydrocarbons, any of which can optionally be substituted, and 80% or more of the mixture (w/w) can comprise $C_9$-$C_{33}$ hydrocarbons (e.g., 81% or more, 82% or more, 83% or more, 84% or more, 85% or more, 86% or more, 87% or more, or 88% or more). In some examples, the wax comprises a mixture of different hydrocarbons, any of which can optionally be substituted, and 90% or less of the mixture (w/w) can comprise $C_9$-$C_{33}$ hydrocarbons (e.g., 89% or less, 88% or less, 87% or less, 86% or less, 85% or less, 84% or less, 83% or less, or 82% or less). The amount of the mixture comprising $C_9$-$C_{33}$ hydrocarbons can range from any of the minimum values described above to any of the maximum values described above. For example, the wax can comprise a mixture of different hydrocarbons, any of which can optionally be substituted, and from 80% to 90% of the mixture (w/w) can comprise $C_9$-$C_{33}$ hydrocarbons (e.g., from 80% to 85%, from 85% to 90%, from 80% to 82%, from 82% to 84%, from 84% to 86%, from 86% to 88%, from 88% to 90%, from 80% to 88%, from 80% to 86%, from 80% to 84%, from 82% to 90%, from 84% to 90%, from 86% to 90%, from 81% to 89%, or from 82% to 88%).

In some examples, the wax comprises a mixture of different hydrocarbons, any of which can optionally be substituted, and 75% or more of the mixture (w/w) comprises $C_9$-$C_{46}$ hydrocarbons (e.g., 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 95.5% or more, 96% or more, 96.5% or more, 97% or more, 97.5% or more, or 98% or more). In some examples, the wax comprises a mixture of different hydrocarbons, any of which can optionally be substituted, and 100% or less of the mixture (w/w) comprises $C_9$-$C_{46}$ hydrocarbons (e.g., 99.5% or less, 99% or less, 98.5% or less, 98% or less, 97.5% or less, 97% or less, 96.5% or less, 96% or less, 95.5% or less, 95% or less, 94% or less, 93% or less, 92% or less, 91% or less, 90% or less, 89% or less, 88% or less, 87% or less, 86% or less, 85% or less, 84% or less, 83% or less, 82% or less, 81% or less, 80% or less, 79% or less, 78% or less, or 77% or less). The amount of the mixture comprising $C_9$-$C_{46}$ hydrocarbons can range from any of the minimum values described above to any of the maximum values described above. For example, the wax comprises a mixture of different hydrocarbons, any of which can optionally be substituted, and from 75% to 100% of the mixture (w/w) comprises $C_9$-$C_{46}$ hydrocarbons (e.g., from 75% to 87.5%, from 87.5% to 100%, from 75% to 80%, from 80% to 85%, from 85% to 90%, from 90% to 95%, from 95% to 100%, from 75% to 95%, from 75% to 90%, from 75% to 85%, from 80% to 100%, from 85% to 100%, from 90% to 100%, or from 80% to 95%). In some examples, the wax comprises a mixture of different hydrocarbons, any of which can optionally be substituted, and from 95% to 99% of the mixture (w/w) comprises $C_9$-$C_{46}$ hydrocarbons (e.g., from 95% to 97%, from 97% to 99%, from 95% to 96%, from 96% to 97%, from 97% to 98%, from 98% to 99%, from 95% to 98%, from 96% to 99%, or from 96% to 98%).

In some examples, the wax comprises a mixture of different hydrocarbons, any of which can optionally be substituted, and 20% or more of the mixture (w/w) comprises $C_9$-$C_{20}$ hydrocarbons (e.g., 21% or more, 22% or more, 23% or more, 24% or more, 25% or more, 26% or more, 27% or more, or 28% or more). In some examples, the wax comprises a mixture of different hydrocarbons, any of which can optionally be substituted, and 30% or less of the mixture (w/w) comprises $C_9$-$C_{20}$ hydrocarbons (e.g., 29% or less, 28% or less, 27% or less, 26% or less, 25% or less, 24% or less, 23% or less, or 22% or less). The amount of the mixture comprising $C_9$-$C_{20}$ hydrocarbons can range from any of the minimum values described above to any of the maximum values described above. For example, the wax comprises a mixture of different hydrocarbons, any of which can optionally be substituted, and from 20% to 30% of the mixture (w/w) comprises $C_9$-$C_{20}$ hydrocarbons (e.g., from 20% to 25%, from 25% to 30%, from 20% to 22%, from 22% to 24%, from 24% to 26%, from 26% to 28%, from 28% to 30%, from 20% to 28%, from 20% to 26%, from 20% to 24%, from 22% to 30%, from 24% to 30%, from 26% to 30%, from 21% to 29%, or from 22% to 28%).

In some examples, the wax comprises a mixture of different hydrocarbons, any of which can optionally be substituted, and 20% or more of the mixture (w/w) comprises $C_{20}$-$C_{24}$ hydrocarbons (e.g., 21% or more, 22% or more, 23% or more, 24% or more, 25% or more, 26% or more, 27% or more, or 28% or more). In some examples, the wax comprises a mixture of different hydrocarbons, any of which can optionally be substituted, and 30% or less of the mixture (w/w) comprises $C_{20}$-$C_{24}$ hydrocarbons (e.g., 29% or less, 28% or less, 27% or less, 26% or less, 25% or less, 24% or less, 23% or less, or 22% or less). The amount of the mixture comprising $C_{20}$-$C_{24}$ hydrocarbons can range from any of the minimum values described above to any of the maximum values described above. For example, the wax comprises a mixture of different hydrocarbons, any of which can optionally be substituted, and from 20% to 30% of the mixture (w/w) comprises $C_{20}$-$C_{24}$ hydrocarbons (e.g., from 20% to 25%, from 25% to 30%, from 20% to 22%, from 22% to 24%, from 24% to 26%, from 26% to 28%, from 28% to 30%, from 20% to 28%, from 20% to 26%, from 20% to 24%, from 22% to 30%, from 24% to 30%, from 26% to 30%, from 21% to 29%, or from 22% to 28%).

In some examples, the wax comprises a mixture of different hydrocarbons, any of which can optionally be substituted, and 20% or more of the mixture (w/w) comprises $C_{24}$-$C_{28}$ hydrocarbons (e.g., 21% or more, 22% or more, 23% or more, 24% or more, 25% or more, 26% or more, 27% or more, or 28% or more). In some examples, the wax comprises a mixture of different hydrocarbons, any of which can optionally be substituted, and 30% or less of the mixture (w/w) comprises $C_{24}$-$C_{28}$ hydrocarbons (e.g., 29% or less, 28% or less, 27% or less, 26% or less, 25% or less, 24% or less, 23% or less, or 22% or less). The amount of the mixture comprising $C_{24}$-$C_{28}$ hydrocarbons can range from any of the minimum values described above to any of the maximum values described above. For example, the wax comprises a mixture of different hydrocarbons, any of which can optionally be substituted, and from 20% to 30% of the mixture (w/w) comprises $C_{24}$-$C_{28}$ hydrocarbons (e.g., from 20% to 25%, from 25% to 30%, from 20% to 22%, from 22% to 24%, from 24% to 26%, from 26% to 28%, from 28% to 30%, from 20% to 28%, from 20% to 26%, from 20% to 24%, from 22% to 30%, from 24% to 30%, from 26% to 30%, from 21% to 29%, or from 22% to 28%).

In some examples, the wax comprises a mixture of different hydrocarbons, any of which can optionally be substituted, and 10% or more of the mixture (w/w) comprises $C_{28}$-$C_{32}$ hydrocarbons (e.g., 11% or more, 12% or more, 13% or more, 14% or more, 15% or more, 16% or more, 17% or more, or 18% or more). In some examples, the wax comprises a mixture of different hydrocarbons, any of which can optionally be substituted, and 20% or less of the mixture (w/w) comprises $C_{28}$-$C_{32}$ hydrocarbons (e.g., 19% or less, 18% or less, 17% or less, 16% or less, 15% or less, 14% or less, 13% or less, or 12% or less). The amount of the mixture comprising $C_{28}$-$C_{32}$ hydrocarbons can range from any of the minimum values described above to any of the maximum values described above. For example, the wax comprises a mixture of different hydrocarbons, any of which can optionally be substituted, and from 10% to 20% of the mixture (w/w) comprises $C_{28}$-$C_{32}$ hydrocarbons (e.g., from 10% to 15%, from 15% to 20%, from 10% to 12%, from 12% to 14%, from 14% to 16%, from 16% to 18%, from 18% to 20%, from 10% to 18%, from 10% to 16%, from 10% to 14%, from 12% to 20%, from 14% to 20%, from 16% to 20%, from 11% to 19%, or from 12% to 18%).

In some examples, the wax comprises a mixture of different hydrocarbons, any of which can optionally be substituted, and the mixture comprises: 20-30% (e.g., 25-30%) $C_9$-$C_{20}$ hydrocarbons, 20-30% (e.g., 20-25%) $C_{20}$-$C_{24}$ hydrocarbons, 20-30% (e.g., 20-25%) $C_{24}$-$C_{28}$ hydrocarbons, and 10-20% (e.g., 10-15%) $C_{28}$-$C_{32}$ hydrocarbons. In some examples, the wax comprises a mixture of different hydrocarbons, any of which can optionally be substituted, and the mixture comprises: 25-30% $C_9$-$C_{20}$ hydrocarbons, 20-25% $C_{20}$-$C_{24}$ hydrocarbons, 20-25% $C_{24}$-$C_{28}$ hydrocarbons, and 10-15% $C_{28}$-$C_{32}$ hydrocarbons.

In some examples, the wax comprises a mixture of different hydrocarbons, any of which can optionally be substituted, and the mixture is substantially free of $C_1$-$C_4$ hydrocarbons. In some examples, the wax comprises a mixture of different hydrocarbons, any of which can optionally be substituted, and the mixture is substantially free of $C_1$-$C_8$ hydrocarbons.

In some examples, the wax comprises a mixture of different hydrocarbons, any of which can optionally be substituted, and the mixture comprises saturated hydrocarbons (e.g., linear, branched, and/or cyclic alkanes), unsaturated (non-aromatic) hydrocarbons (e.g., linear, branched, and/or cyclic alkenes and/or alkynes), and aromatic hydrocarbons. For example, the wax comprises a mixture of different hydrocarbons, any of which can optionally be substituted, and the mixture comprises 80 wt. % or more saturated hydrocarbons (e.g., 81 wt. % or more, 82 wt. % or more, 83 wt. % or more, 84 wt. % or more, 85 wt. % or more, 86 wt. % or more, 87 wt. % or more, 88 wt. % or more, 89 wt. % or more, 90 wt. % or more, 91 wt. % or more, 92 wt. % or more, 93 wt. % or more, 94 wt. % or more, 95 wt. % or more, 96 wt. % or more, 97 wt. % or more, 98 wt. % or more, or 99 wt. % or more). In some examples, the wax comprises a mixture of different hydrocarbons, any of which can optionally be substituted, and the mixture comprises 100 wt. % or less saturated hydrocarbons (e.g., 99 wt. % or less, 98 wt. % or less, 97 wt. % or less, 96 wt. % or less, 95 wt. % or less, 94 wt. % or less, 93 wt. % or less, 92 wt. % or less, 91 wt. % or less, 90 wt. % or less, 89 wt. % or less, 88 wt. % or less, 87 wt. % or less, 86 wt. % or less, 85 wt. % or less, 84 wt. % or less, 83 wt. % or less, or 82 wt. % or less). The amount of the mixture comprising saturated hydrocarbons can range from any of the minimum values described above to any of the maximum values described above. For example, the wax can comprise a mixture of different hydrocarbons, any of which can optionally be substituted, and from 80 wt. % to 100 wt. % of the mixture can comprise saturated hydrocarbons (e.g., from 80 wt. % to 90 wt. %, from 90 wt. % to 100 wt. %, from 80 wt. % to 85 wt. %, from 85 wt. % to 90 wt. %, from 90 wt. % to 95 wt. %, from 95 wt. % to 100 wt. %, from 80 wt. % to 98 wt. %, from 80 wt. % to 96 wt. %, from 80 wt. % to 94 wt. %, from 80 wt. % to 92 wt. %, from 80 wt. % to 88 wt. %, from 80 wt. % to 86 wt. %, from 80 wt. % to 84 wt. %, from 80 wt. % to 82 wt. %, from 82 wt. % to 100 wt. %, from 84 wt. % to 100 wt. %, from 86 wt. % to 100 wt. %, from 88 wt. % to 100 wt. %, from 92 wt. % to 100 wt. %, from 94 wt. % to 100 wt. %, from 96 wt. % to 100 wt. %, from 98 wt. % to 100 wt. %, from 82 wt. % to 98 wt. %, from 85 wt. % to 99 wt. %, from 85 wt. % to 87 wt. %, or from 97 wt. % to 99 wt. %).

In some examples, the wax comprises a mixture of different hydrocarbons, any of which can optionally be substituted, and the mixture comprises 0 wt. % or more unsaturated (non-aromatic) hydrocarbons (e.g., 0.1 wt. % or more, 0.2 wt. % or more, 0.3 wt. % or more, 0.4 wt. % or more, 0.5 wt. % or more, 0.6 wt. % or more, 0.7 wt. % or more, 0.8 wt. % or more, 0.9 wt. % or more, 1 wt. % or more, 1.25 wt. % or more, 1.5 wt. % or more, 1.75 wt. % or more, 2 wt. % or more, 2.25 wt. % or more, 2.5 wt. % or more, 3 wt. % or more, 3.5 wt. % or more, or 4 wt. % or more). In some examples, the wax comprises a mixture of different hydrocarbons, any of which can optionally be substituted, and the mixture comprises 5 wt. % or less unsaturated (non-aromatic) hydrocarbons (e.g., 4.5 wt. % or less, 4 wt. % or less, 3.5 wt. % or less, 3 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.9 wt. % or less, 0.8 wt. % or less, 0.7 wt. % or less, 0.6 wt. % or less, 0.5 wt. % or less, 0.4 wt. % or less, 0.3 wt. % or less, or 0.2 wt. % or less). The amount of the mixture comprising unsaturated (non-aromatic) hydrocarbons can range from any of the minimum values described above to any of the maximum values described above. For example, the wax can comprise a mixture of different hydrocarbons, any of which can optionally be substituted, and from 0 to 5 wt. % of the mixture can comprise unsaturated (non-aromatic) hydrocarbons (e.g., from 0 to 2.5 wt. %, from 2.5 to 5 wt. %, from 0 to 1 wt. %, from 1 to 2 wt. %, from 2 to 3 wt. %, from 3 to 4 wt. %, from 4 to 5 wt. %, from 0 to 4 wt. %, from 0 to 3 wt. %, from 0 to 2 wt. %, from 1 to 5 wt. %, from 2 to 5 wt. %, from 3 to 5 wt. %, from 0.5 to 4.5 wt. %, or from 0.5 to 1.5 wt. %).

In some examples, the wax comprises a mixture of different hydrocarbons, any of which can optionally be substituted, and the mixture comprises 0 wt. % or more aromatic hydrocarbons (e.g., 0.1 wt. % or more, 0.2 wt. % or more, 0.3 wt. % or more, 0.4 wt. % or more, 0.5 wt. % or more, 0.6 wt. % or more, 0.7 wt. % or more, 0.8 wt. % or more, 0.9 wt. % or more, 1 wt. % or more, 1.25 wt. % or more, 1.5 wt. % or more, 1.75 wt. % or more, 2 wt. % or more, 2.25 wt. % or more, 2.5 wt. % or more, 3 wt. % or more, 3.5 wt. % or more, 4 wt. % or more, 4.5 wt. % or more, 5.5 wt. % or more, 6 wt. % or more, 6.5 wt. % or more, 7 wt. % or more, 7.5 wt. % or more, 8 wt. % or more, 8.5 wt. % or more, 9 wt. % or more, 9.5 wt. % or more, 10 wt. % or more, 10.5 wt. % or more, 11 wt. % or more, 11.5 wt. % or more, 12 wt. % or more, 12.5 wt. % or more, 13 wt. % or more, 13.5 wt. % or more, or 14 wt. % or more). In some examples, the wax comprises a mixture of different hydrocarbons, any of which can optionally be substituted, and the mixture comprises 15 wt. % or less aromatic hydrocarbons (e.g., 14.5 wt. % or less, 14 wt. % or less, 13.5 wt. % or less, 13 wt. % or less, 12.5 wt. % or less, 12 wt. % or less, 11.5 wt. % or less, 11 wt. % or less, 10.5 wt. % or less, 10 wt. % or less, 9.5 wt. % or less, 9 wt. % or less, 8.5 wt. % or less, 8 wt. % or less, 7.5 wt. % or less, 7 wt. % or less, 6.5 wt. % or less, 6 wt. % or less, 5.5 wt. % or less, 5 wt. % or less, 4.5 wt. % or less, 4 wt. % or less, 3.5 wt. % or less, 3 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.9 wt. % or less, 0.8 wt. % or less, 0.7 wt. % or less, 0.6 wt. % or less, 0.5 wt. % or less, 0.4 wt. % or less, 0.3 wt. % or less, or 0.2 wt. % or less). The amount of the mixture comprising aromatic hydrocarbons can range from any of the minimum values described above to any of the maximum values described above. For example, the wax can comprise a mixture of different hydrocarbons, any of which can optionally be substituted, and from 0 to 15 wt. % of the mixture can comprise aromatic hydrocarbons (e.g., from 0 to 7.5 wt. %, from 7.5 to 15 wt. %, from 0 to 5 wt. %, from 5 to 10 wt. %, from 10 to 15 wt. %, from 0 to 14 wt. %, from 0 to 12 wt. %, from 0 to 10 wt. %, from 0 to 8 wt. %, from 0 to 6 wt. %, from 0 to 4 wt. %, from 0 to 2.5 wt. %, from 0 to 2 wt. %, from 0 to 1 wt. %, from 1 to 15 wt. %, from 2 to 15 wt. %, from 4 to 15 wt. %, from 6 to 15 wt. %, from 8 to 15 wt. %, from 12 to 15 wt. %, from 0.5 to 14.5 wt. %, from 1 to 14 wt. %, or from 12 to 14 wt. %).

In some examples, the wax comprises a mixture of different hydrocarbons, any of which can optionally be substituted, and the mixture comprises 80-100 wt. % saturated hydrocarbons (e.g., 85-90 wt. % or 95 to 99 wt. %); 0-5 wt. % unsaturated (non-aromatic) hydrocarbons (e.g., 0-2.5 wt. %, or 0-1.5 wt. %); and 0-15 wt. % aromatic hydrocarbons (e.g., 0-2.5 wt. %, or 12-14 wt. %). In some examples, the wax comprises a mixture of different hydrocarbons, any of which can optionally be substituted, and the mixture comprises 85-90 wt. % saturated hydrocarbons; 0-2.5 wt. % unsaturated (non-aromatic) hydrocarbons; and 12-14 wt. % aromatic hydrocarbons. In some examples, the wax comprises a mixture of different hydrocarbons, any of which can optionally be substituted, and the mixture comprises 95-99 wt. % saturated hydrocarbons; 0-1.5 wt. % unsaturated (non-aromatic) hydrocarbons; and 0-2.5 wt. % aromatic hydrocarbons.

The wax can, for example, have a melting point of 30° C. or more or 40° C. or more. In some examples, the wax can have a melting point of 70° C. or less or 60° C. or less. The melting point of the wax can range from any of the minimum values described above to any of the maximum values described above. For example, the wax can have a melting point of from 30° C. to 70° C. In some examples, the wax can have a melting point of from 40° C. to 55° C. (e.g., from 40° C. to 50° C., or from 43° C. to 48° C.). The melting point of the wax can be determined by any suitable method, such as those known in the art. In some examples, the melting point of the wax is determined using the steps described in ASTM D 127.

The wax can, for example, have a congealing point of 30° C. or more or 40° C. or more. In some examples, the wax can have a congealing point of 55° C. or less. The congealing point of the wax can range from any of the minimum values described above to any of the maximum values described above. For example, the wax can have a congealing point of from 30° C. to 55° C. (e.g., from 45° C. to 51° C.). In some examples, the wax can have a congealing point of from 40° C. to 55° C. (e.g., from 45° C. to 51° C.). The congealing point of the wax can be determined by any suitable method, such as those known in the art. In some examples, the congealing point of the wax is determined using the steps described in ASTM D 938.

The wax can, for example, have a final boiling point of 300° F. or more or 950° F. or more. In some examples, the wax can have a final boiling point of 1,300° F. or less. The final boiling point of the wax can range from any of the minimum values described above to any of the maximum values described above. For example, the wax can have a final boiling point of from 300° F. to 1,300° F. (e.g., from 650° F. to 1,300° F., from 750° F. to 1,300° F., or from 950° F. to 1,300° F.). In some examples, the wax can have a final boiling point of 950° F. to 1,300° F. (e.g., from 950° F. to 1,250° F., from 1,100° F. to 1,250° F., or from 995° F. to 1,235° F.). The final boiling point of the wax can be determined by any suitable method, such as those known in the art. In some examples, the final boiling point of the wax is determined using the steps described in ASTM D 7169.

The wax can, for example, have a pour point of 30° F. or more. In some examples, the wax can have a pour point of 150° F. or less or 60° F. or less. The pour point of the wax can range from any of the minimum values described above to any of the maximum values described above. For example, the wax can have a pour point of from 30° F. to 150° F. (e.g., from 50° F. to 130° F., from 30° F. to 100° F., from 30° F. to 80° F., or from 30° F. to 60° F.). In some examples, the wax can have a pour point of from 30° F. to 60° F. (e.g., from 30° F. to 55° F., from 33° F. to 52° F., or from 45° F. to 60° F.). The pour point of the wax can be determined by any suitable method, such as those known in the art. In some examples, the pour point of the wax is determined using the steps described in ASTM D 97.

In some examples, the wax can include one or more contaminants. Contaminants can, for example, comprise an alkali metal, an alkaline earth metal, a transition metal, a basic metal, a semimetal, a nonmetal, a halogen, a salt or compound thereof, or a combination thereof. Examples of contaminants include, but are not limited to, lithium, sodium, beryllium, magnesium, calcium, strontium, titanium, vanadium, chromium, manganese, iron, cobalt, nickel, copper, zinc, molybdenum, cadmium, mercury, aluminum, titanium silicon, tin, lead, nitrogen, phosphorus, arsenic, antimony, oxygen, sulfur, selenium, fluorine, chlorine, bromine, compounds thereof, and combinations thereof. In some examples, the wax includes a contaminant comprising chloride, nitrogen, silicon, sodium, iron, phosphorus, sulfur, calcium, nickel, copper, vanadium, or a combination thereof.

Contaminants are introduced during plastic formulation and manufacturing processes during the first life of plastic and may also be introduced during the sourcing and collection of plastics.

For example, chloride sources in used plastics can comprise PVDC layers. PVDC is often used as a layer or coating in food and pharmaceutical packaging applications because it provides excellent barrier properties against moisture, UV light, acids, salts, and detergents as well as having good transparency. Despite design for recyclability formulation changes, PVDC is forecasted to increase at 3.2% annually through 2028 in the US. Packaging converters produce a range of monolayer and multi-layer packaging. Both types can become mixed in recycled streams. Post-consumer sources will contain higher volumes of materials containing chloride sources that can be difficult to differentiate and remove through standard sorting techniques.

Nitrogen sources in used plastics can, for example, be derived from pyrolysis of nylon (e.g., Nylon 6 (PA-6), Nylon-66 (PA-66) in used plastic sources, often from food and industrial packaging materials. Nylon is used in multilayer flexible packing films to protect oxygen-sensitive foods or when excellent oil and grease resistance and high mechanical strength are required, such as for processed meats and fish, and cheese and other dairy products. Nylon also provides a wide cold to hot temperature range (e.g., −60° C. to 150° C.), which enables foods to move through freezer to the microwave/oven without packaging degradation. In industrial packaging, nylon is often used as a reinforcing layer to provide high mechanical strength and excellent abrasion and puncture resistance (for example, in polypropylene supersacks that contain a nylon interlayer or straps). Nitrogen can also come from protein (food) residue on plastics that arises from the amino acids in decomposed protein. Post-consumer sources will contain higher volumes of materials containing nitrogen sources that can be difficult to differentiate and remove through standard sorting techniques.

Silicon sources in used plastics can, for example, comprise silica desiccant packages. In food packaging and processing plants, silicon products are widely used as release agents in a wide variety of materials and equipment, leaving residue on plastic surfaces. Silicon is also an additive that can be added to a wide range of materials to change the appearance, extrusion properties, and/or end-product characteristics; this applies to films as well as two-dimensional plastics. Post-consumer sources will contain higher volumes of materials containing silicon sources that can be difficult to differentiate and remove through standard sorting techniques.

Silicon dioxide ($SiO_2$) can be applied in a very thin coating to plastics, specifically polyethylene, polypropylene, and/or polystyrene, to act as a barrier layer to improve the shelf life of oxygen and moisture sensitive food. This thin coating can be applied by a vacuum or plasma deposition process; the barrier layer and the plastic forms a covalent bond. The $SiO_2$ barrier coatings are chemically inert and enable benefits in rigid and flexible food packaging applications, including, but not limited to, reducing oxygen and moisture permeability of plastics, ensuring aroma protection and retention of the smell and taste of contents, not sensitive to fluctuations in temperature and humidity, well-suited for pasteurization and sterilization processes, and can increase shelf life of foods without the addition of preservatives. The $SiO_2$ coatings are thin, e.g. significantly thinner than a human hair, and therefore have a negligible impact on the packing weight. For this reason, coated packaging is considered a mono-material that can be mechanically recycled. Recyclability initiatives are promoting the use of $SiO_2$ coatings as a replacement for PVDC and Nylon barriers in flexible and rigid packaging. Although these guidelines are intended for mechanically recycled plastics, several packaging forms and formulations are better suited for pyrolysis-based advanced recycling. $SiO_2$ coatings have the potential to accumulate and carry forward into each successive application (e.g., when used in rigid and flexible polyethylene and polypropylene plastics that are mechanically recycled initially, which, after a few cycles, will then eventually become the used plastic feedstocks for advanced recycling).

Phosphorus-containing flame retardants are widely used in plastics where its rapid oxidation consumes all the oxygen present, thereby stopping the fire. Plastics commonly containing these flame retardants include, but are not limited to, engineered plastics, polyurethane foams, polyamides (e.g., nylon) and glass-fiber reinforced nylon, polyethylene and EVA co-polymers, and intumescent coatings on foams and polypropylene textiles. Phosphate esters are also used as flame retardant plasticizers in PVC, high impact polystyrene (HIPS), polycarbonate (PC), and acrylonitrile butadiene styrene (ABS). Phosphorus sources also include agricultural applications, such as residual glyphosate in HDPE containers and residual phosphorus fertilizers on ground-level films (e.g., mulch films). Post-consumer sources will contain higher volumes of materials containing phosphorus sources that can be difficult to differentiate and remove through standard sorting techniques.

Sources of sulfur, calcium, sodium, iron, phosphorus, or a combination thereof are additives, surface residues, and residual contamination of the incoming post-consumer and/or post-industrial plastics. A wash step can potentially remove certain surface residues, but would add cost and complexity to the advanced (e.g., pyrolysis based) recycling process. Accordingly, post-consumer sources will contain higher volumes of materials containing sources of sulfur, calcium, sodium, iron, phosphorus, or a combination thereof that can be difficult to differentiate and remove through standard sorting techniques.

Copper alloys are commonly and increasingly used to create molds for plastic injection molding processes due to their high thermal conductivity that removes hot spots, reduces warpage and reduces cycle time, ease of machining by a variety of processes, and corrosion resistance to water, cooling fluids and the plastics being injected. Copper alloys often contain nickel and silicon. Plastics manufactured in copper alloy molds can have residual amounts of copper, nickel, and silicon on their surface. In addition, the plating of plastic with nickel and copper can be an effective means of protecting a substrate against corrosion from environmental exposure and make it more resistant to damage from chemicals used in the manufacturing process. In some instances, the plating on plastic can increase the hardness, strength, and wear resistance of the substrate. The presence of copper and nickel on the surface of both pre-consumer and post-consumer sources can be difficult to differentiate and remove through standard sorting techniques.

In some examples, the wax has a total chloride content of 50 ppm or less (e.g., 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax is substantially free of chlorides. The total chloride content of the wax can be determined by any suitable method, such as those known in the art. In some examples, the total chloride content of the wax is determined using the steps described in ASTM D 7359.

In some examples, the wax has a nitrogen content of 300 ppm or less (e.g., 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax is substantially free of nitrogen. The nitrogen content of the wax can be determined using any suitable method, such as those known in the art. In some examples, the nitrogen content of the wax is determined using the steps described in ASTM D 4629.

The wax can, for example, have a silicon content of 125 ppm or less (e.g., 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax is substantially free of silicon. The silicon content of the wax can be determined using any suitable method, such as those known in the art. In some examples the silicon content of the wax is determined using the steps described in ASTM D 5185.

The wax can, for example, have a sodium content of 150 ppm or less (e.g., 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax is substantially free of sodium. The sodium content of the wax can be determined by any suitable method, such as those known in the art. In some examples, the sodium content of the wax is determined using the steps described in ASTM D 5185.

The wax can, for example, have an iron content of 10 ppm or less (e.g., 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax is substantially free of iron. The iron content of the wax can be determined using any suitable method, such as those known in the art. In some examples the iron content of the wax is determined using the steps described in ASTM D 5185.

The wax can, for example, have a phosphorus content of 50 ppm or less (e.g., 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax can be substantially free of phosphorus. The phosphorus content of the wax can be determined using any suitable method, such as those known in the art. In some examples, the phosphorous content of the wax is determined using the steps described in ASTM D 5185.

The wax can, for example, have a sulfur content of 500 ppm or less (e.g., 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax can be substantially free of sulfur. The sulfur content of the wax can be determined by any suitable methods, such as those known in the art. In some examples, the sulfur content of the wax is determined using the steps described in ASTM D 4294.

The wax can, for example, have a calcium content of 50 ppm or less (e.g., 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax can be substantially free of calcium. The calcium content of the wax can be determined using any suitable methods, such as those known in the art. In some examples, the calcium content of the wax is determined using the steps described in ASTM D 5185.

The wax can, for example, have a copper content of 10 ppm or less (e.g., 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax can be substantially free of copper. The copper content of the wax can be determined using any suitable method, such as those known in the art. In some examples, the copper content of the wax is determined using the steps described in ASTM D 5185.

The wax can, for example, have a nickel content of 100 ppm or less (e.g., 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax can be substantially free of nickel. The nickel content of the wax can be determined using any suitable method, such as those known in the art. In some examples, the nickel content is determined using the steps described in ASTM D 5185.

The wax can, for example, have a vanadium content of 25 ppm or less (e.g., 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the wax can be substantially free of vanadium. The vanadium content of the wax can be determined using any suitable method, such as those known in the art. In some examples, the vanadium content of the wax is determined using the steps described in ASTM D 5185.

In some examples, the wax has a total chloride content of 50 ppm or less; a nitrogen content of 300 ppm or less; and a silicon content of 125 ppm or less. In some examples, the wax has a total chloride content of 50 ppm or less; a nitrogen content of 300 ppm or less; a silicon content of 125 ppm or less; and a sodium content of 150 ppm or less. In some examples, the wax has a total chloride content of 50 ppm or less; a nitrogen content of 300 ppm or less; a silicon content of 125 ppm or less; a sodium content of 150 ppm or less; an iron content of 10 ppm or less; a sulfur content of 500 ppm or less; and a calcium content of 50 ppm or less. In some examples, the wax has a total chloride content of 50 ppm or less; a nitrogen content of 300 ppm or less; a silicon content of 125 ppm or less; a sodium content of 150 ppm or less; an iron content of 10 ppm or less; a phosphorus content of 50 ppm or less; a sulfur content of 500 ppm or less; and a calcium content of 50 ppm or less. In some examples, the wax has a total chloride content of 50 ppm or less; a nitrogen content of 300 ppm or less; a silicon content of 125 ppm or less; a sodium content of 150 ppm or less; an iron content of 10 ppm or less; a phosphorus content of 50 ppm or less; a sulfur content of 500 ppm or less; a calcium content of 50 ppm or less; a copper content of 10 ppm or less; a nickel content of 100 ppm or less; and a vanadium content of 25 ppm or less.

In some examples, the wax has a total chloride content of 25 ppm or less; a nitrogen content of 300 ppm or less; and a silicon content of 100 ppm or less. In some examples, the wax has a total chloride content of 25 ppm or less; a nitrogen content of 300 ppm or less; a silicon content of 100 ppm or less; and a sodium content of 10 ppm or less. In some examples, the wax has a total chloride content of 25 ppm or less; a nitrogen content of 300 ppm or less; a silicon content of 100 ppm or less; a sodium content of 10 ppm or less; an iron content of 10 ppm or less; a sulfur content of 10 ppm or less; and a calcium content of 5 ppm or less. In some examples, the wax has a total chloride content of 25 ppm or less; a nitrogen content of 300 ppm or less; a silicon content of 100 ppm or less; a sodium content of 10 ppm or less; an iron content of 10 ppm or less; a phosphorus content of 50 ppm or less; a sulfur content of 10 ppm or less; and a calcium content of 5 ppm or less. In some examples, the wax has a total chloride content of 25 ppm or less; a nitrogen content of 300 ppm or less; a silicon content of 100 ppm or less; a sodium content of 10 ppm or less; an iron content of 10 ppm or less; a phosphorus content of 50 ppm or less; a sulfur content of 10 ppm or less; a calcium content of 5 ppm or less; a copper content of 10 ppm or less; a nickel content of 100 ppm or less; and a vanadium content of 25 ppm or less.

The wax can, for example, have a Gardner color of 2 or more. In some examples, the wax can have a Gardner color of 8 or less. The Gardner color of the wax can range from any of the minimum values described above to any of the maximum values described above. For example, the wax can have a Gardner color of from 2 to 8 (e.g., from 2.5 to 8, or from 6.5 to 8). The Gardner color of the wax can be determined using any suitable method, such as those known in the art. In some examples, the Gardner color of the wax is determined using the steps described in ASTM D 1500.

The wax can, for example, have an oil content of 5% or more by weight (e.g., 10% or more, 15% or more, 20% or more, 25% or more, 30% or more, 35% or more, or 40% or more). In some examples, the wax can have an oil content of 50% or less (e.g., 45% or less, 40% or less, 35% or less, 30% or less, 25% or less, 20% or less, 15% or less, or 10% or less). The oil content of the wax can range from any of the minimum values described above to any of the maximum values described above. For example, the wax can have an oil content of from 5% to 50% (e.g., from 5% to 25%, from 25% to 50%, from 5% to 15%, from 10% to 15%, from 15% to 20%, from 20% to 25%, from 25% to 30%, from 30% to 35%, from 35% to 40%, from 40% to 45%, from 45% to 50%, from 5% to 45%, from 5% to 40%, from 5% to 35%, from 5% to 30%, from 5% to 20%, from 5% to 15%, from 10% to 50%, from 15% to 50%, from 20% to 50%, from 30% to 50%, from 35% to 50%, from 40% to 50%, from 10% to 45%, or from 25% to 45%). The oil content of the wax can be determined using any suitable method, for example those known in the art. In some examples, the oil content of the wax is determined using the steps described in ASTM D 721.

The wax can, for example, have a Reid Vapor Pressure of 12.5 psig or less (e.g., 12 psig or less, 11.5 psig or less, 11 psig or less, 10.5 psig or less, 10 psig or less, 9.5 psig or less, 9 psig or less, 8.5 psig or less, 8 psig or less, 7.5 psig or less, 7 psig or less, 6.5 psig or less, 6 psig or less, 5.5 psig or less, 5 psig or less, 4.5 psig or less, 4 psig or less, 3.5 psig or less, 3 psig or less, or 2.5 psig or less). In some examples, the wax can have a Reid Vapor Pressure of 2 psig or more (e.g., 2.5 psig or more, 3 psig or more, 3.5 psig or more, 4 psig or more, 4.5 psig or more, 5 psig or more, 5.5 psig or more, 6 psig or more, 6.5 psig or more, 7 psig or more, 7.5 psig or more, 8 psig or more, 8.5 psig or more, 9 psig or more, 9.5 psig or more, 10 psig or more, 10.5 psig or more, or 11 psig or more). The Reid Vapor Pressure of the wax can range from any of the minimum values described above to any of the maximum values described above. For example, the wax can have a Reid Vapor Pressure of from 2 to 12.5 psig (e.g., from 5 to 7 psig, from 7 to 12.5 psig, from 2 to 4 psig, from 4 to 6 psig, from 6 to 8 psig, from 8 to 10 psig, from 10 to 12.5 psig, from 2 to 12 psig, from 2 to 11 psig, from 2 to 10 psig, from 2 to 9 psig, from 2 to 8 psig, from 2 to 6 psig, from 2 to 5 psig, from 3 to 12.5 psig, from 4 to 12.5 psig, from 5 to 12.5 psig, from 6 to 12.5 psig, from 7 to 12.5 psig, from 8 to 12.5 psig, from 9 to 12.5 psig, from 3 to 12 psig, from 5 to 11 psig, or from 7 to 10 psig). The Reid Vapor Pressure of the wax can be determined using any suitable method, such as those known in the art. In some examples, the Reid Vapor Pressure of the wax is determined using the steps described in ASTM D 5191.

The wax can, for example, have a water by distillation amount of 0.5 vol. % or less (e.g., 0.45 vol. % or less, 0.4 vol. % or less, 0.35 vol. % or less, 0.3 vol. % or less, 0.25 vol. % or less, 0.2 vol. % or less, 0.15 vol. % or less, 0.1 vol. % or less, 0.075 vol. % or less, 0.05 vol. % or less, 0.025 vol. % or less, or 0.01 vol. % or less). In some examples, the wax can have a water by distillation amount of 0 vol. % or more (e.g., 0.01 vol. % or more, 0.025 vol. % or more, 0.05 vol. % or more, 0.075 vol. % or more, 0.1 vol. % or more, 0.15 vol. % or more, 0.2 vol. % or more, 0.25 vol. % or more, 0.3 vol. % or more, 0.35 vol. % or more, or 0.4 vol. % or more). The amount of water by distillation in the wax can range from any of the minimum values described above to any of the maximum values described above. For example, the wax can have a water by distillation amount of from 0 to 0.5 vol. % (e.g., from 0 to 0.25 vol. %, from 0.25 to 0.5 vol. %, from 0 to 0.1 vol. %, from 0.1 to 0.2 vol. %, from 0.2 to 0.3 vol. %, from 0.3 to 0.4 vol. %, from 0.4 to 0.5 vol. %, from 0 to 0.4 vol. %, from 0 to 0.3 vol. %, from 0 to 0.2 vol. %, from 0 to 0.05 vol. %, or from 0 to 0.01 vol. %). The amount of water by distillation in the wax can be determined by any suitable method, such as those known in the art. In some examples, the water by distillation amount in the wax is determined using the steps described in ASTM D 95.

The wax can, for example, have a total sediment content of 0.5 vol. % or less (e.g., 0.45 vol. % or less, 0.4 vol. % or less, 0.35 vol. % or less, 0.3 vol. % or less, 0.25 vol. % or less, 0.2 vol. % or less, 0.15 vol. % or less, 0.1 vol. % or less, 0.075 vol. % or less, 0.05 vol. % or less, 0.025 vol. % or less, or 0.01 vol. % or less). In some examples, the wax can have a total sediment content of 0 vol. % or more (e.g., 0.01 vol. % or more, 0.025 vol. % or more, 0.05 vol. % or more, 0.075 vol. % or more, 0.1 vol. % or more, 0.15 vol. % or more, 0.2 vol. % or more, 0.25 vol. % or more, 0.3 vol. % or more, 0.35 vol. % or more, or 0.4 vol. % or more). The total sediment content of the wax can range from any of the minimum values described above to any of the maximum values described above. For example, the wax can have a total sediment content of from 0 to 0.5 vol. % (e.g., from 0 to 0.25 vol. %, from 0.25 to 0.5 vol. %, from 0 to 0.1 vol. %, from 0.1 to 0.2 vol. %, from 0.2 to 0.3 vol. %, from 0.3 to 0.4 vol. %, from 0.4 to 0.5 vol. %, from 0 to 0.4 vol. %, from 0 to 0.3 vol. %, from 0 to 0.2 vol. %, from 0 to 0.05 vol. %, or from 0 to 0.01 vol. %). The total sediment content of the wax can be determined by any suitable method, such as those known in the art. In some examples, the total sediment content of the wax is determined using the steps described in ASTM D 4870.

The wax can, for example, have an n-heptane insoluble content of 0.5 wt. % or less (e.g., 0.45 wt. % or less, 0.4 wt. % or less, 0.35 wt. % or less, 0.3 wt. % or less, 0.25 wt. % or less, 0.2 wt. % or less, 0.15 wt. % or less, 0.1 wt. % or less, 0.075 wt. % or less, 0.05 wt. % or less, 0.025 wt. % or less, or 0.01 wt. % or less). In some examples, the wax can have an n-heptane insoluble content of 0 wt. % or more (e.g., 0.01 wt. % or more, 0.025 wt. % or more, 0.05 wt. % or more, 0.075 wt. % or more, 0.1 wt. % or more, 0.15 wt. % or more, 0.2 wt. % or more, 0.25 wt. % or more, 0.3 wt. % or more, 0.35 wt. % or more, or 0.4 wt. % or more). The n-heptane insoluble content of the wax can range from any of the minimum values described above to any of the maximum values described above. For example, the wax can have an n-heptane insoluble content of from 0 to 0.5 wt. % (e.g., from 0 to 0.25 wt. %, from 0.25 to 0.5 wt. %, from 0 to 0.1 wt. %, from 0.1 to 0.2 wt. %, from 0.2 to 0.3 wt. %, from 0.3 to 0.4 wt. %, from 0.4 to 0.5 wt. %, from 0 to 0.4 wt. %, from 0 to 0.3 wt. %, from 0 to 0.2 wt. %, from 0 to 0.05 wt. %, or from 0 to 0.01 wt. %). The n-heptane insoluble content of the wax can be determined by any suitable method, such as those known in the art. In some examples, the n-heptane insoluble content of the wax is determined using the steps described in ASTM D 3279.

The wax can, for example, have a total acid number of 1 mg KOH/g or less (e.g., 0.9 mg KOH/g or less, 0.8 mg KOH/g or less, 0.7 mg KOH/g or less, 0.6 mg KOH/g or less, 0.5 mg KOH/g or less, 0.4 mg KOH/g or less, 0.3 mg KOH/g or less, 0.2 mg KOH/g or less, or 0.1 mg KOH/g or less). In some examples, the wax can have a total acid number of 0 mg KOH/g or more (e.g., 0.1 mg KOH/g or more, 0.2 mg KOH/g or more, 0.3 mg KOH/g or more, 0.4 mg KOH/g or more, 0.5 mg KOH/g or more, 0.6 mg KOH/g or more, 0.7 mg KOH/g or more, 0.8 mg KOH/g or more, or 0.9 mg KOH/g or more). The total acid number of the wax can range from any of the minimum values described above to any of the maximum values described above. For example, the wax can have a total acid number of from 0 to 1 mg KOH/g (e.g., from 0 to 0.5 mg KOH/g, from 0.5 to 1 mg KOH/g, from 0 to 0.2 mg KOH/g, from 0.2 to 0.4 mg KOH/g, from 0.4 to 0.6 mg KOH/g, from 0.6 to 0.8 mg KOH/g, from 0.8 to 1 mg KOH/g, from 0 to 0.8 mg KOH/g, from 0 to 0.6 mg KOH/g, from 0 to 0.4 mg KOH/g, or from 0 to 0.1 mg KOH/g). The total acid number of the wax can be determined using any suitable method, such as those known in the art. In some examples, the total acid number of the wax is determined using the steps described in ASTM D 664.

In some examples, the wax has a Reid Vapor Pressure of 12.5 psig or less; and a final boiling point of 300° F. to 1,300° F. In some examples, the wax has a Reid Vapor Pressure of 12.5 psig or less; and a final boiling point of 950° F. to 1,300° F. In some examples, the wax has a Reid Vapor Pressure of from 7 to 10 psig; and a final boiling point of from 995° F. to 1,235° F.

In some examples, the wax has a Reid Vapor Pressure of 12.5 psig or less; and a pour point of 30° F. to 150° F. In some examples, the wax has a Reid Vapor Pressure of 12.5 psig or less; and a pour point of 30° F. to 60° F. In some examples, the wax has a Reid Vapor Pressure of from 7 to 10 psig; and a pour point of from 33° F. to 52° F.

In some examples, the wax has a final boiling point of 300° F. to 1,300° F.; and a pour point of 30° F. to 150° F. In some examples, the wax has a final boiling point of 950° F. to 1,300° F.; and a pour point of 30° F. to 60° F. In some examples, the wax has a final boiling point of from 995° F. to 1,235° F.; and a pour point of from 33° F. to 52° F.

In some examples, the wax has a Reid Vapor Pressure of 12.5 psig or less; a final boiling point of 300° F. to 1,300° F.; and a pour point of 30° F. to 150° F. In some examples, the wax has a Reid Vapor Pressure of 12.5 psig or less; a final boiling point of 950° F. to 1,300° F.; and a pour point of 30° F. to 60° F. In some examples, the wax has a Reid Vapor Pressure of from 7 to 10 psig; a final boiling point of from 995° F. to 1,235° F.; and a pour point of from 33° F. to 52° F.

In some examples, the wax has a Reid Vapor Pressure of 12.5 psig or less; a final boiling point of 300° F. to 1,300° F.; a pour point of 30° F. to 150° F.; a total chloride content of 50 ppm or less; a nitrogen content of 300 ppm or less; a silicon content of 125 ppm or less; a sodium content of 150 ppm or less; an iron content of 10 ppm or less; a phosphorus content of 50 ppm or less; a sulfur content of 500 ppm or less; and a calcium content of 50 ppm or less. In some examples, the wax has a Reid Vapor Pressure of 12.5 psig or less; a final boiling point of 950° F. to 1,300° F.; a pour point of 30° F. to 60° F.; a total chloride content of 50 ppm or less; a nitrogen content of 300 ppm or less; a silicon content of 125 ppm or less; a sodium content of 150 ppm or less; an iron content of 10 ppm or less; a phosphorus content of 50 ppm or less; a sulfur content of 500 ppm or less; and a calcium content of 50 ppm or less. In some examples, the wax has a Reid Vapor Pressure of from 7 to 10 psig; a final boiling point of from 995° F. to 1,235° F.; a pour point of from 33° F. to 52° F.; a total chloride content of 25 ppm or less; a nitrogen content of 300 ppm or less; a silicon content of 100 ppm or less; a sodium content of 10 ppm or less; an iron content of 10 ppm or less; a phosphorus content of 50 ppm or less; a sulfur content of 10 ppm or less; and a calcium content of 5 ppm or less.

In some examples, the wax is a raw pyrolysis product, meaning the wax is produced by a method that substantially excludes any hydrotreatment or further refining steps after pyrolysis.

Oil

Also disclosed herein are oils derived from pyrolysis of a feedstock comprising post-consumer and/or post-industrial plastics. In some examples, the oil can be produced via pyrolysis at an industrial scale.

In some examples, the oil is liquid at ambient temperature and ambient pressure.

In some examples, the oil comprises relatively short-chain hydrocarbons that are a liquid at ambient temperature and ambient pressure.

The oil can, for example, have a number average molecular weight and/or a weight average molecular weight of 50 Daltons or more (e.g., 55 Daltons or more, 60 Daltons or more, 65 Daltons or more, 70 Daltons or more, 75 Daltons or more, 80 Daltons or more, 85 Daltons or more, 90 Daltons or more, 95 Daltons or more, 100 Daltons or more, 110 Daltons or more, 120 Daltons or more, 130 Daltons or more, 140 Daltons or more, 150 Daltons or more, 160 Daltons or more, 170 Daltons or more, 180 Daltons or more, 190 Daltons or more, 200 Daltons or more, 225 Daltons or more, 250 Daltons or more, 275 Daltons or more, 300 Daltons or more, or 325 Daltons or more). In some examples, the oil can have a number average molecular weight and/or a weight average molecular weight of 350 Daltons or less (e.g., 325 Daltons or less, 300 Daltons or less, 275 Daltons or less, 250 Daltons or less, 225 Daltons or less, 200 Daltons or less, 190 Daltons or less, 180 Daltons or less, 170 Daltons or less, 160 Daltons or less, 150 Daltons or less, 140 Daltons or less, 130 Daltons or less, 120 Daltons or less, 110 Daltons or less, 100 Daltons or less, 95 Daltons or less, 90 Daltons or less, 85 Daltons or less, 80 Daltons or less, 75 Daltons or less, 70 Daltons or less, 65 Daltons or less, or 60 Daltons or less). The number average molecular weight and/or a weight average molecular weight of the oil can range from any of the minimum values described above to any of the maximum values described above. For example, the oil can have a number average molecular weight and/or a weight average molecular weight of from 50 to 350 Daltons (e.g., from 50 to 200 Daltons, from 200 to 350 Daltons, from 50 to 150 Daltons, from 150 to 250 Daltons, from 250 to 350 Daltons, from 50 to 300 Daltons, from 50 to 250 Daltons, from 50 to 100 Daltons, from 75 to 350 Daltons, from 100 to 350 Daltons, from 150 to 350 Daltons, from 300 to 350 Daltons, from 75 to 325 Daltons, or from 100 to 300 Daltons). In some examples, the oil can have a number average molecular weight and/or a weight average molecular weight of from 50 to 300 Daltons. In some examples, the oil can have a number average molecular weight and/or a weight average molecular weight of from 50 to 250 Daltons.

The oil comprises a mixture of different hydrocarbons (e.g., linear, branched, cyclic, acyclic, saturated, unsaturated, aromatic, non-aromatic, etc.), any of which can optionally be substituted. In some examples, the oil comprises a mixture of different hydrocarbons, any of which can optionally be substituted, and 70% or more of the mixture (w/w) comprises $C_1$-$C_{20}$ hydrocarbons (e.g., 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 90.5% or more, 91% or more, 91.5% or more, 92% or more, 92.5% or more, 93% or more, 93.5% or more, 94% or more, 94.5% or more, 95% or more, 95.5% or more, 96% or more, 96.5% or more, 97% or more, 97.5% or more, 98% or more, 98.5% or more, or 99% or more). In some examples, the oil comprises a mixture of different hydrocarbons, any of which can optionally be substituted, and 100% or less of the mixture (w/w) comprises $C_1$-$C_{20}$ hydrocarbons (e.g., 99.5% or less, 99% or less, 98.5% or less, 98% or less, 97.5% or less, 97% or less, 96.5% or less, 96% or less, 95.5% or less, 95% or less, 94.5% or less, 94% or less, 93.5% or less, 93% or less, 92.5% or less, 92% or less, 91.5% or less, 91% or less, 90.5% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, or 71% or less). The amount of the mixture comprising $C_1$-$C_{20}$ hydrocarbons can range from any of the minimum values described above to any of the maximum values described above. For example, the oil comprises a mixture of different hydrocarbons, any of which can optionally be substituted, and from 70% to 100% of the mixture (w/w) can comprise $C_1$-$C_{20}$ hydrocarbons (e.g., from 70% to 85%, from 85% to 100%, from 70% to 80%, from 80% to 90%, from 90% to 100%, from 70% to 95%, from 70% to 90%, from 70% to 75%, from 75% to 100%, from 80% to 100%, or from 75% to 95%). In some examples, the oil comprises a mixture of different hydrocarbons, any of which can optionally be substituted, and from 90% to 100% of the mixture (w/w) can comprise $C_1$-$C_{20}$ hydrocarbons (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 91% to 99%, from 92% to 98%, or from 92% to 96%).

The oil comprises a mixture of different hydrocarbons (e.g., linear, branched, cyclic, acyclic, saturated, unsaturated, aromatic, non-aromatic, etc.), any of which can optionally be substituted. In some examples, the oil comprises a mixture of different hydrocarbons, any of which can optionally be substituted, and 70% or more of the mixture (w/w) comprises $C_4$-$C_{20}$ hydrocarbons (e.g., 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 90.5% or more, 91% or more, 91.5% or more, 92% or more, 92.5% or more, 93% or more, 93.5% or more, 94% or more, 94.5% or more, 95% or more, 95.5% or more, 96% or more, 96.5% or more, 97% or more, 97.5% or more, 98% or more, 98.5% or more, or 99% or more). In some examples, the oil comprises a mixture of different hydrocarbons, any of which can optionally be substituted, and 100% or less of the mixture (w/w) comprises $C_4$-$C_{20}$ hydrocarbons (e.g., 99.5% or less, 99% or less, 98.5% or less, 98% or less, 97.5% or less, 97% or less, 96.5% or less, 96% or less, 95.5% or less, 95% or less, 94.5% or less, 94% or less, 93.5% or less, 93% or less, 92.5% or less, 92% or less, 91.5% or less, 91% or less, 90.5% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, or 71% or less). The amount of the mixture comprising $C_4$-$C_{20}$ hydrocarbons can range from any of the minimum values described above to any of the maximum values described above. For example, the oil comprises a mixture of different hydrocarbons, any of which can optionally be substituted, and from 70% to 100% of the mixture (w/w) can comprise $C_4$-$C_{20}$ hydrocarbons (e.g., from 70% to 85%, from 85% to 100%, from 70% to 80%, from 80% to 90%, from 90% to 100%, from 70% to 95%, from 70% to 90%, from 70% to 75%, from 75% to 100%, from 80% to 100%, or from 75% to 95%). In some examples, the oil comprises a mixture of different hydrocarbons, any of which can optionally be substituted, and from 90% to 100% of the mixture (w/w) can comprise $C_4$-$C_{20}$ hydrocarbons (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 91% to 99%, from 92% to 98%, or from 92% to 96%).

The oil comprises a mixture of different hydrocarbons (e.g., linear, branched, cyclic, acyclic, saturated, unsaturated, aromatic, non-aromatic, etc.), any of which can optionally be substituted. In some examples, the oil comprises a mixture of different hydrocarbons, any of which can optionally be substituted, and 70% or more of the mixture (w/w) comprises $C_4$-$C_{29}$ hydrocarbons (e.g., 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 90.5% or more, 91% or more, 91.5% or more, 92% or more, 92.5% or more, 93% or more, 93.5% or more, 94% or more, 94.5% or more, 95% or more, 95.5% or more, 96% or more, 96.5% or more, 97% or more, 97.5% or more, 98% or more, 98.5% or more, or 99% or more). In some examples, the oil comprises a mixture of different hydrocarbons, any of which can optionally be substituted, and 100% or less of the mixture (w/w) comprises $C_4$-$C_{29}$ hydrocarbons (e.g., 99.5% or less, 99% or less, 98.5% or less, 98% or less, 97.5% or less, 97% or less, 96.5% or less, 96% or less, 95.5% or less, 95% or less, 94.5% or less, 94% or less, 93.5% or less, 93% or less, 92.5% or less, 92% or less, 91.5% or less, 91% or less, 90.5% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, or 71% or less). The amount of the mixture comprising $C_4$-$C_{29}$ hydrocarbons can range from any of the minimum values described above to any of the maximum values described above. For example, the oil comprises a mixture of different hydrocarbons, any of which can optionally be substituted, and from 70% to 100% of the mixture (w/w) can comprise $C_4$-$C_{29}$ hydrocarbons (e.g., from 70% to 85%, from 85% to 100%, from 70% to 80%, from 80% to 90%, from 90% to 100%, from 70% to 95%, from 70% to 90%, from 70% to 75%, from 75% to 100%, from 80% to 100%, or from 75% to 95%). In some examples, the oil comprises a mixture of different hydrocarbons, any of which can optionally be substituted, and from 90% to 100% of the mixture (w/w) can comprise $C_4$-$C_{29}$ hydrocarbons (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 91% to 99%, from 92% to 98%, or from 92% to 96%).

In some examples, the oil comprises a mixture of different hydrocarbons, any of which can optionally be substituted, and 0% or more of the mixture (w/w) can comprise $C_{12}$-$C_{29}$ hydrocarbons (e.g., 0.5% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 11% or more, 12% or more, 13% or more, 14% or more, 15% or more, 20% or more, 25% or more, 30% or more, 35% or more, 40% or more, 45% or more, 50% or more, 55% or more, 60% or more, or 65% or more). In some examples, the oil comprises a mixture of different hydrocarbons, any of which can optionally be substituted, and 70% or less of the mixture (w/w) can comprise $C_{12}$-$C_{29}$ hydrocarbons (e.g., 65% or less, 60% or less, 55% or less, 50% or less, 45% or less, 40% or less, 35% or less, 30% or less, 25% or less, 20% or less, 15% or less, 14% or less, 13% or less, 12% or less, 11% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, or 1% or less). The amount of the mixture comprising $C_{12}$-$C_{29}$ hydrocarbons can range from any of the minimum values described above to any of the maximum values described above. For example, the oil comprises a mixture of different hydrocarbons, any of which can optionally be substituted, and from 0% to 70% of the mixture (w/w) can comprise $C_{12}$-$C_{29}$ hydrocarbons (e.g., from 0% to 35%, from 35% to 70%, from 0% to 25%, from 25% to 50%, from 50% to 70%, from 0% to 60%, from 0% to 50%, from 0% to 40%, from 0% to 30%, from 0% to 20%, from 0% to 10%, from 0% to 5%, from 1% to 70%, from 5% to 70%, from 10% to 70%, from 20% to 70%, from 30% to 70%, from 40% to 70%, from 60% to 70%, from 5% to 65%, from 10% to 60%, or from 40% to 60%). In some examples, the oil comprises a mixture of different hydrocarbons, any of which can optionally be substituted, and from 0% to 10% of the mixture (w/w) can comprise $C_{12}$-$C_{29}$ hydrocarbons (e.g., from 0% to 5%, from 5% to 10%, from 0% to 2%, from 2% to 4%, from 4% to 6%, from 6% to 8%, from 8% to 10%, from 0% to 8%, from 0% to 6%, from 0% to 4%, from 1% to 10%, from 2% to 10%, from 4% to 10%, from 6% to 10%, from 0.5% to 9.5%, from 1% to 9%, or from 2% to 8%).

In some examples, the oil comprises a mixture of different hydrocarbons, any of which can optionally be substituted, and 25% or more of the mixture (w/w) comprises $C_1$-$C_8$ hydrocarbons (e.g., 25.5% or more, 26% or more, 26.5% or more, 27% or more, 27.5% or more, 28% or more, 28.5% or more, 29% or more, 29.5% or more, 30% or more, 30.5% or more, 31% or more, 31.5% or more, 32% or more, 32.5% or more, 33% or more, 33.5% or more, or 34% or more). In some examples, the oil comprises a mixture of different hydrocarbons, any of which can optionally be substituted, and 35% or less of the mixture (w/w) comprises $C_1$-$C_8$ hydrocarbons (e.g., 34.5% or less, 34% or less, 33.5% or less, 33% or less, 32.5% or less, 32% or less, 31.5% or less, 31% or less, 30.5% or less, 30% or less, 29.5% or less, 29% or less, 28.5% or less, 28% or less, 27.5% or less, 27% or less, 26.5% or less, or 26% or less). The amount of the mixture comprising $C_1$-$C_8$ hydrocarbon can range from any of the minimum values described above to any of the maximum values described above. For example, the oil comprises a mixture of different hydrocarbons, any of which can optionally be substituted, and from 25% to 35% of the mixture (w/w) can comprise $C_1$-$C_8$ hydrocarbons (e.g., from 25% to 30%, from 30% to 35%, from 25% to 27%, from 27% to 29%, from 29% to 31%, from 31% to 33%, from 33% to 35%, from 25% to 33%, from 25% to 31%, from 25% to 29%, from 27% to 35%, from 29% to 35%, from 31% to 35%, from 25.5% to 34.5%, or from 26% to 34%).

In some examples, the oil comprises a mixture of different hydrocarbons, any of which can optionally be substituted, and 25% or more of the mixture (w/w) comprises $C_4$-$C_8$ hydrocarbons (e.g., 25.5% or more, 26% or more, 26.5% or more, 27% or more, 27.5% or more, 28% or more, 28.5% or more, 29% or more, 29.5% or more, 30% or more, 30.5% or more, 31% or more, 31.5% or more, 32% or more, 32.5% or more, 33% or more, 33.5% or more, or 34% or more). In some examples, the oil comprises a mixture of different hydrocarbons, any of which can optionally be substituted, and 35% or less of the mixture (w/w) comprises $C_4$-$C_8$ hydrocarbons (e.g., 34.5% or less, 34% or less, 33.5% or less, 33% or less, 32.5% or less, 32% or less, 31.5% or less, 31% or less, 30.5% or less, 30% or less, 29.5% or less, 29% or less, 28.5% or less, 28% or less, 27.5% or less, 27% or less, 26.5% or less, or 26% or less). The amount of the mixture comprising $C_4$-$C_8$ hydrocarbon can range from any of the minimum values described above to any of the maximum values described above. For example, the oil comprises a mixture of different hydrocarbons, any of which can optionally be substituted, and from 25% to 35% of the mixture (w/w) can comprise $C_4$-$C_8$ hydrocarbons (e.g., from 25% to 30%, from 30% to 35%, from 25% to 27%, from 27% to 29%, from 29% to 31%, from 31% to 33%, from 33% to 35%, from 25% to 33%, from 25% to 31%, from 25% to 29%, from 27% to 35%, from 29% to 35%, from 31% to 35%, from 25.5% to 34.5%, or from 26% to 34%).

In some examples, the oil comprises a mixture of different hydrocarbons, any of which can optionally be substituted, and 50% or more of the mixture (w/w) can comprise $C_9$-$C_{20}$ hydrocarbons (e.g., 50.5% or more, 51% or more, 51.5% or more, 52% or more, 52.5% or more, 53% or more, 53.5% or more, 54% or more, 54.5% or more, 55% or more, 55.5% or more, 56% or more, 56.5% or more, 57% or more, 57.5% or more, 58% or more, 58.5% or more, 59% or more, 59.5% or more, 60% or more, 60.5% or more, 61% or more, 61.5% or more, 62% or more, 62.5% or more, 63% or more, 63.5% or more, 64% or more, 64.5% or more, 65% or more, 65.5% or more, 66% or more, 66.5% or more, 67% or more, 67.5% or more, 68% or more, 68.5% or more, 69% or more, 69.5% or more, 70% or more, 70.5% or more, 71% or more, 71.5% or more, 72% or more, 72.5% or more, 73% or more, 73.5% or more, or 74% or more). In some examples, the oil comprises a mixture of different hydrocarbons, any of which can optionally be substituted, and 75% or less of the mixture (w/w) can comprise $C_9$-$C_{20}$ hydrocarbons (e.g., 74.5% or less, 74% or less, 73.5% or less, 73% or less, 72.5% or less, 72% or less, 71.5% or less, 71% or less, 70.5% or less, 70% or less, 69.5% or less, 69% or less, 68.5% or less, 68% or less, 67.5% or less, 67% or less, 66.5% or less, 66% or less, 65.5% or less, 65% or less, 64.5% or less, 64% or less, 63.5% or less, 63% or less, 62.5% or less, 62% or less, 61.5% or less, 61% or less, 60.5% or less, 60% or less, 59.5% or less, 59% or less, 58.5% or less, 58% or less, 57.5% or less, 57% or less, 56.5% or less, 56% or less, 55.5% or less, 55% or less, 54.5% or less, 54% or less, 53.5% or less, 53% or less, 52.5% or less, 52% or less, 51.5% or less, or 51% or less). The amount of the mixture comprising $C_9$-$C_{20}$ hydrocarbons can range from any of the minimum values described above to any of the maximum values described above. For example, the oil comprises a mixture of different hydrocarbons, any of which can optionally be substituted, and from 50% to 75% of the mixture (w/w) can comprise $C_9$-$C_{20}$ hydrocarbons (e.g., from 50% to 62.5%, from 62.5% to 75%, from 50% to 55%, from 55% to 60%, from 60% to 65%, from 65% to 70%, from 70% to 75%, from 50% to 70%, from 50% to 65%, from 50% to 60%, from 55% to 75%, from 60% to 75%, from 65% to 75%, from 51% to 74%, from 52% to 73%, from 55% to 60%, or from 55% to 65%). In some examples, the oil comprises a mixture of different hydrocarbons, any of which can optionally be substituted, and from 55% to 65% of the mixture (w/w) can comprise $C_9$-$C_{20}$ hydrocarbons (e.g., from 55% to 60%, from 60% to 65%, from 55% to 57%, from 57% to 59%, from 59% to 61%, from 61% to 63%, from 63% to 65%, from 55% to 63%, from 55% to 61%, from 55% to 59%, from 57% to 65%, from 59% to 65%, from 61% to 65%, from 55.5% to 64.5%, or from 56% to 64%).

In some examples, the oil comprises a mixture of different hydrocarbons, any of which can optionally be substituted, and 1% or more of the mixture (w/w) can comprise $C_{21}$-$C_{29}$ hydrocarbons (e.g., 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, or 9% or more). In some examples, the oil comprises a mixture of different hydrocarbons, any of which can optionally be substituted, and 10% or less of the mixture (w/w) can comprise $C_{21}$-$C_{29}$ hydrocarbons (e.g., 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, or 2% or less). The amount of the mixture comprising $C_{21}$-$C_{29}$ hydrocarbons can range from any of the minimum values described above to any of the maximum values described above. For example, the oil comprises a mixture of different hydrocarbons, any of which can optionally be substituted, and from 1% to 10% of the mixture (w/w) can comprise $C_{21}$-$C_{29}$ hydrocarbons (e.g., from 1% to 4.5%, from 4.5% to 10%, from 1% to 4%, from 4% to 7%, from 7% to 10%, from 1% to 9%, from 1% to 8%, from 1% to 7%, from 1% to 6%, from 1% to 5%, from 1% to 3%, from 2% to 10%, from 3% to 10%, from 4% to 10%, from 5% to 10%, from 6% to 10%, from 8% to 10%, from 1.5% to 9.5%, from 2% to 9%, or from 3% to 8%).

In some examples, the oil comprises a mixture of different hydrocarbons, any of which can optionally be substituted, and the mixture comprises: 25-35% (e.g., 30-35%) $C_1$-$C_8$ hydrocarbons, 50-75% (e.g., 55-65%, or 60-65%) $C_9$-$C_{20}$ hydrocarbons, and 1-10% (e.g., 3-8%) $C_{21}$-$C_{29}$ hydrocarbons. In some examples, the oil comprises a mixture of different hydrocarbons, any of which can optionally be substituted, and the mixture comprises: 25-35% (e.g., 30-35%) $C_1$-$C_8$ hydrocarbons, 55-65% (e.g., 60-65%) $C_9$-$C_{20}$ hydrocarbons, and 1-10% (e.g., 3-8%) $C_{21}$-$C_{29}$ hydrocarbons. In some examples, the oil comprises a mixture of different hydrocarbons, any of which can optionally be substituted, and the mixture comprises: 30-35% $C_1$-$C_8$ hydrocarbons, 60-65% $C_9$-$C_{20}$ hydrocarbons, and 3-8% $C_{21}$-$C_{29}$ hydrocarbons.

In some examples, the oil comprises a mixture of different hydrocarbons, any of which can optionally be substituted, and the mixture comprises: 25-35% (e.g., 30-35%) $C_4$-$C_8$ hydrocarbons, 50-75% (e.g., 55-65%, or 60-65%) $C_9$-$C_{20}$ hydrocarbons, and 1-10% (e.g., 3-8%) $C_{21}$-$C_{29}$ hydrocarbons. In some examples, the oil comprises a mixture of different hydrocarbons, any of which can optionally be substituted, and the mixture comprises: 25-35% (e.g., 30-35%) $C_4$-$C_8$ hydrocarbons, 55-65% (e.g., 60-65%) $C_9$-$C_{20}$ hydrocarbons, and 1-10% (e.g., 3-8%) $C_{21}$-$C_{29}$ hydrocarbons. In some examples, the oil comprises a mixture of different hydrocarbons, any of which can optionally be substituted, and the mixture comprises: 30-35% $C_4$-$C_8$ hydrocarbons, 60-65% $C_9$-$C_{20}$ hydrocarbons, and 3-8% $C_{21}$-$C_{29}$ hydrocarbons.

In some examples, the oil comprises a mixture of different hydrocarbons, any of which can optionally be substituted, and the mixture is substantially free of $C_1$-$C_4$ hydrocarbons.

In some examples, the oil comprises a mixture of different hydrocarbons, any of which can optionally be substituted, and the mixture is substantially free of hydrocarbons comprising 30 or more carbons.

In some examples, the oil comprises a mixture of different hydrocarbons, any of which can optionally be substituted, and the mixture is substantially free of $C_1$-$C_4$ hydrocarbons and hydrocarbons comprising 30 or more carbons.

In some examples, the oil comprises a mixture of different hydrocarbons, any of which can optionally be substituted, and the mixture comprises saturated hydrocarbons (e.g., linear, branched, and/or cyclic alkanes), unsaturated (non-aromatic) hydrocarbons (e.g., linear, branched, and/or cyclic alkenes and/or alkynes), and aromatic hydrocarbons. For example, the oil comprises a mixture of different hydrocarbons, any of which can optionally be substituted, and the mixture comprises 80 wt. % or more saturated hydrocarbons (e.g., 80.5 wt. % or more, 81 wt. % or more, 81.5 wt. % or more, 82 wt. % or more, 82.5 wt. % or more, 83 wt. % or more, 83.5 wt. % or more, 84 wt. % or more, 84.5 wt. % or more, 85 wt. % or more, 85.5 wt. % or more, 86 wt. % or more, 86.5 wt. % or more, 87 wt. % or more, 87.5 wt. % or more, 88 wt. % or more, 88.5 wt. % or more, 89 wt. % or more, 89.5 wt. % or more, 90 wt. % or more, 90.5 wt. % or more, 91 wt. % or more, 91.5 wt. % or more, 92 wt. % or more, 92.5 wt. % or more, 93 wt. % or more, 93.5 wt. % or more, 94 wt. % or more, 94.5 wt. % or more, 95 wt. % or more, 95.5 wt. % or more, 96 wt. % or more, 96.5 wt. % or more, 97 wt. % or more, 97.5 wt. % or more, 98 wt. % or more, 98.5 wt. % or more, or 99 wt. % or more). In some examples, the oil comprises a mixture of different hydrocarbons, any of which can optionally be substituted, and the mixture comprises 100 wt. % or less saturated hydrocarbons (e.g., 99.5 wt. % or less, 99 wt. % or less, 98.5 wt. % or less, 98 wt. % or less, 97.5 wt. % or less, 97 wt. % or less, 96.5 wt. % or less, 96 wt. % or less, 95.5 wt. % or less, 95 wt. % or less, 94.5 wt. % or less, 94 wt. % or less, 93.5 wt. % or less, 93 wt. % or less, 92.5 wt. % or less, 92 wt. % or less, 91.5 wt. % or less, 91 wt. % or less, 90.5 wt. % or less, 90 wt. % or less, 89.5 wt. % or less, 89 wt. % or less, 88.5 wt. % or less, 88 wt. % or less, 87.5 wt. % or less, 87 wt. % or less, 86.5 wt. % or less, 86 wt. % or less, 85.5 wt. % or less, 85 wt. % or less, 84.5 wt. % or less, 84 wt. % or less, 83.5 wt. % or less, 83 wt. % or less, 82.5 wt. % or less, 82 wt. % or less, 81.5 wt. % or less, or 81 wt. % or less). The amount of the mixture comprising saturated hydrocarbons can range from any of the minimum values described above to any of the maximum values described above. For example, the oil comprises a mixture of different hydrocarbons, any of which can optionally be substituted, and the mixture comprises from 90 wt. % to 100 wt. % saturated hydrocarbons (e.g., from 80 to 90 wt. %, from 90 to 100 wt. %, from 80 to 85 wt. %, from 85 to 90 wt. %, from 90 to 95 wt. %, from 95 to 100 wt. %, from 80 to 82 wt. %, from 82 to 84 wt. %, from 84 to 86 wt. %, from 86 to 88 wt. %, from 88 to 90 wt. %, from 90 to 92 wt. %, from 92 to 94 wt. %, from 94 to 96 wt. %, from 96 to 98 wt. %, from 98 to 100 wt. %, from 80 to 98 wt. %, from 80 to 96 wt. %, from 80 to 94 wt. %, from 80 to 92 wt. %, from 80 to 88 wt. %, from 80 to 86 wt. %, from 80 to 84 wt. %, from 82 to 100 wt. %, from 84 to 100 wt. %, from 86 to 100 wt. %, from 88 to 100 wt. %, from 92 to 100 wt. %, from 94 to 100 wt. %, from 96 to 100 wt. %, from 80 to 95 wt. %, from 85 to 100 wt. %, from 85 to 95 wt. %, from 90 to 98 wt. %, from 90 to 96 wt. %, from 90 to 94 wt. %, from 91 to 99 wt. %, from 92 to 98 wt. %, or from 94 to 96 wt. %). In some examples, the oil comprises a mixture of different hydrocarbons, any of which can optionally be substituted, and the mixture comprises from 90 wt. % to 100 wt. % saturated hydrocarbons. the oil comprises a mixture of different hydrocarbons, any of which can optionally be substituted, and the mixture comprises from 94 wt. % to 96 wt. % saturated hydrocarbons.

In some examples, the oil comprises a mixture of different hydrocarbons, any of which can optionally be substituted, and the mixture comprises 0 wt. % or more unsaturated (non-aromatic) hydrocarbons (e.g., 0.25 wt. % or more, 0.5 wt. % or more, 0.75 wt. % or more, 1 wt. % or more, 1.25 wt. % or more, 1.5 wt. % or more, 1.75 wt. % or more, 2 wt. % or more, 2.25 wt. % or more, 2.5 wt. % or more, 3 wt. % or more, 3.5 wt. % or more, or 4 wt. % or more). In some examples, the oil comprises a mixture of different hydrocarbons, any of which can optionally be substituted, and the mixture comprises 5 wt. % or less unsaturated (non-aromatic) hydrocarbons (e.g., 4.5 wt. % or less, 4 wt. % or less, 3.5 wt. % or less, 3 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.75 wt. % or less, or 0.5 wt. % or less). The amount of unsaturated (non-aromatic) hydrocarbons in the mixture can range from any of the minimum values described above to any of the maximum values described above. For example, the oil comprises a mixture of different hydrocarbons, any of which can optionally be substituted, and the mixture can comprise from 0 wt. % to 5 wt. % unsaturated (non-aromatic) hydrocarbons (e.g., from 0 to 2.5 wt. %, from 2.5 to 5 wt. %, from 0 to 1 wt. %, from 1 to 2 wt. %, from 2 to 3 wt. %, from 3 to 4 wt. %, from 4 to 5 wt. %, from 0 to 4 wt. %, from 0 to 3 wt. %, from 0 to 2 wt. %, from 1 to 5 wt. %, from 2 to 5 wt. %, from 3 to 5 wt. %, from 0.5 to 4.5 wt. %, or from 3.5 to 4.5 wt. %).

In some examples, the oil comprises a mixture of different hydrocarbons, any of which can optionally be substituted, and the mixture comprises 0 wt. % or more aromatic hydrocarbons (e.g., 0.25 wt. % or more, 0.5 wt. % or more, 0.75 wt. % or more, 1 wt. % or more, 1.25 wt. % or more, 1.5 wt. % or more, 1.75 wt. % or more, 2 wt. % or more, 2.25 wt. % or more, 2.5 wt. % or more, 3 wt. % or more, 3.5 wt. % or more, 4 wt. % or more, 4.5 wt. % or more, 5.5 wt. % or more, 6 wt. % or more, 6.5 wt. % or more, 7 wt. % or more, 7.5 wt. % or more, 8 wt. % or more, 8.5 wt. % or more, 9 wt. % or more, 9.5 wt. % or more, 10 wt. % or more, 10.5 wt. % or more, 11 wt. % or more, 11.5 wt. % or more, 12 wt. % or more, 12.5 wt. % or more, 13 wt. % or more, 13.5 wt. % or more, or 14 wt. % or more). In some examples, the oil comprises a mixture of different hydrocarbons, any of which can optionally be substituted, and the mixture comprises 15 wt. % or less aromatic hydrocarbons (e.g., 14.5 wt. % or less, 14 wt. % or less, 13.5 wt. % or less, 13 wt. % or less, 12.5 wt. % or less, 12 wt. % or less, 11.5 wt. % or less, 11 wt. % or less, 10.5 wt. % or less, 10 wt. % or less, 9.5 wt. % or less, 9 wt. % or less, 8.5 wt. % or less, 8 wt. % or less, 7.5 wt. % or less, 7 wt. % or less, 6.5 wt. % or less, 6 wt. % or less, 5.5 wt. % or less, 5 wt. % or less, 4.5 wt. % or less, 4 wt. % or less, 3.5 wt. % or less, 3 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.75 wt. % or less, or 0.5 wt. % or less). The amount of the mixture comprising aromatic hydrocarbons can range from any of the minimum values described above to any of the maximum values described above. For example, the oil comprises a mixture of different hydrocarbons, any of which can optionally be substituted, and the mixture can comprise from 0 to 15 wt. % aromatic hydrocarbons (e.g., from 0 to 7.5 wt. %, from 7.5 to 15 wt. %, from 0 to 5 wt. %, from 5 to 10 wt. %, from 10 to 15 wt. %, from 0 to 14 wt. %, from 0 to 12 wt. %, from 0 to 10 wt. %, from 0 to 8 wt. %, from 0 to 6 wt. %, from 0 to 4 wt. %, from 0 to 2.5 wt. %, from 0 to 2 wt. %, from 0 to 1 wt. %, from 1 to 15 wt. %, from 2 to 15 wt. %, from 4 to 15 wt. %, from 6 to 15 wt. %, from 8 to 15 wt. %, from 12 to 15 wt. %, from 0.5 to 14.5 wt. %, or from 1 to 14 wt. %). In some examples, the oil comprises a mixture of different hydrocarbons, any of which can optionally be substituted, and the mixture can comprise from 0 wt. % to 2.5 wt. % aromatic hydrocarbons (e.g., from 0 to 1.25 wt. %, from 1.25 to 2.5 wt. %, from 0 to 0.5 wt. %, from 0.5 to 1 wt. %, from 1 to 1.5 wt. %, from 1.5 to 2 wt. %, from 2 to 2.5 wt. %, from 0 to 2 wt. %, from 0 to 1.5 wt. %, from 0 to 1 wt. %, from 0.5 to 2.5 wt. %, from 1 to 2.5 wt. %, from 1.5 to 2.5 wt. %, from 0.5 to 2 wt. %, or from 1 to 2 wt. %).

In some examples, the oil comprises a mixture of different hydrocarbons, any of which can optionally be substituted, and the mixture comprises: 80-100 wt. % saturated hydrocarbons (e.g., 90-100 wt. %, or 94-96 wt. %); 0-5 wt. % unsaturated (non-aromatic) hydrocarbons (e.g., 3.5-4.5 wt. %); and 0-15 wt. % aromatic hydrocarbons (e.g., 0-2.5 wt. %, or 1-2 wt. %). In some examples, the oil comprises a mixture of different hydrocarbons, any of which can optionally be substituted, and the mixture comprises: 90-100 wt. % saturated hydrocarbons (e.g., 94-96 wt. %); 0-5 wt. % unsaturated (non-aromatic) hydrocarbons (e.g., 3.5-4.5 wt. %); and 0-2.5 wt. % aromatic hydrocarbons (e.g., 1-2 wt. %). In some examples, the oil comprises a mixture of different hydrocarbons, any of which can optionally be substituted, and the mixture comprises: 94-96 wt. % saturated hydrocarbons; 3.5-4.5 wt. % unsaturated (non-aromatic) hydrocarbons; and 1-2 wt. % aromatic hydrocarbons.

The oil can, for example, have a final boiling point of 400° F. or more or 750° F. or more. In some examples, the oil can have a final boiling point of 1,000° F. or less. The final boiling point of the oil can range from any of the minimum values described above to any of the maximum values described above. For example, the oil can have a final boiling point of from 400° F. to 1,000° F. (e.g., from 400° F. to 850° F.). In some examples, the oil can have a final boiling point of from 750° F. to 1,000° F. (e.g., from 900° F. to 950° F., from 920° F. to 950° F., or from 935° F. to 950° F.). The final boiling point of the oil can be determined using any suitable method, such as those known in the art. In some examples, the final boiling point of the oil is determined using the steps described in ASTM D 7169.

The oil can, for example, have a pour point of −200° F. or more or 0° F. or more. In some examples, the oil can have a pour point of 100° F. or less or 20° F. or less. The pour point of the oil can range from any of the minimum values described above to any of the maximum values described above. For example, the oil can have a pour point of from −200° F. to 100° F. In some examples, the oil can have a pour point of from 0° F. to 20° F. (e.g., from 5° F. to 15° F., from 8° F. to 15° F., or from 10° F. to 15° F.). The pour point of the oil can be determined using any suitable method, such as those known in the art. In some examples, the pour point of the oil is determined using the steps described in ASTM D 97.

In some examples, the oil can include one or more contaminants. Contaminants can for example, comprise an alkali metal, an alkaline earth metal, a transition metal, a basic metal, a semimetal, a nonmetal, a halogen, a salt or compound thereof, or a combination thereof. Examples of contaminants include, but are not limited to, lithium, sodium, beryllium, magnesium, calcium, strontium, titanium, vanadium, chromium, manganese, iron, cobalt, nickel, copper, zinc, molybdenum, cadmium, mercury, aluminum, titanium silicon, tin, lead, nitrogen, phosphorus, arsenic, antimony, oxygen, sulfur, selenium, fluorine, chlorine, bromine, compounds thereof, and combinations thereof. In some examples, the oil includes a contaminant comprising chloride, nitrogen, silicon, sodium, iron, phosphorus, sulfur, calcium, nickel, copper, vanadium, or a combination thereof.

Contaminants are introduced during plastic formulation and manufacturing processes during the first life of plastic in conjunction with the source and collection method of the plastics.

For example, chloride sources in used plastics can comprise PVDC layers. PVDC is often used as a layer or coating in food and pharmaceutical packaging applications because it provides excellent barrier properties against moisture, UV light, acids, salts, and detergents as well as having good transparency. Despite design for recyclability formulation changes, PVDC is forecasted to increase at 3.2% annually through 2028 in the US. Packaging converters produce a range of monolayer and multi-layer packaging. Both types can become mixed in recycled streams. Post-consumer sources will contain higher volumes of materials containing chloride sources that can be difficult to differentiate and remove through standard sorting techniques.

Nitrogen sources in used plastics can, for example, be derived from pyrolysis of nylon (e.g., Nylon 6 (PA-6), Nylon-66 (PA-66) in used plastic sources, often from food and industrial packaging materials. Nylon is used in multi-layer flexible packing films to protect oxygen-sensitive foods or when excellent oil and grease resistance and high mechanical strength are required, such as for processed meats and fish, and cheese and other dairy products. Nylon also provides a wide cold to hot temperature range (e.g., −60° C. to 150° C.), which enables foods to move through freezer to the microwave/oven without packaging degradation. In industrial packaging, nylon is often used as a reinforcing layer to provide high mechanical strength and excellent abrasion and puncture resistance (for example, in polypropylene supersacks that contain a nylon interlayer or straps). Nitrogen can also come from protein (food) residue on plastics that arises from the amino acids in decomposed protein. Post-consumer sources will contain higher volumes of materials containing nitrogen sources that can be difficult to differentiate and remove through standard sorting techniques.

Silicon sources in used plastics can, for example, comprise silica desiccant packages. In food packaging and processing plants, silicon products are widely used as release agents in a wide variety of materials and equipment, leaving residue on plastic surfaces. Silicon is also an additive that can be added to a wide range of materials to change the appearance, extrusion properties, and/or end-product characteristics; this applied to films as well as two-dimensional plastics. Post-consumer sources will contain higher volumes of materials containing silicon sources that can be difficult to differentiate and remove through standard sorting techniques.

Silicon dioxide can be applied in a very thin coating to plastics, specifically polyethylene, polypropylene, and/or polystyrene, to act as a barrier layer to improve the shelf life of oxygen and moisture sensitive food. This thin coating can be applied by a vacuum or plasma deposition process; the barrier layer and the plastic forma covalent bond. The $SiO_2$ barrier coatings are chemically inert and enable benefits in rigid and flexible food packaging applications, including, but not limited to, reducing oxygen and moisture permeability of plastics, ensuring aroma protection and retention of the smell and taste of contents, not sensitive to fluctuations in temperature and humidity, well-suited for pasteurization and sterilization processes, and can increase shelf life of foods without the addition of preservatives. The $SiO_2$ coatings are thin, e.g. significantly thinner than a human hair, and therefore have a negligible impact on the packing weight. For this reason, coated packaging is considered a mono-material that can be mechanically recycled. Recyclability initiatives are promoting the use of $SiO_2$ coatings as a replacement for PVDC and Nylon barriers in flexible and rigid packaging. Although these guidelines are intended for mechanically recycled plastics, several packaging forms and formulations are better suited for pyrolysis-based advanced recycling. $SiO_2$ coatings have the potential to be the "gift that keeps on giving", especially when used in rigid and flexible polyethylene and polypropylene plastics that are mechanically recycled initially, which, after a few cycles, will then eventually become the used plastic feedstocks for advanced recycling; the silicon is predicted to accumulate and carry forward into each successive application.

Phosphorus-containing flame retardants are widely used in plastics where its rapid oxidation consumes all the oxygen present, thereby stopping the fire. Plastics commonly containing these flame retardants include, but are not limited to, engineered plastics, polyurethane foams, polyamides (e.g., nylon) and glass-fiber reinforced nylon, polyethylene and EVA co-polymers, and intumescent coatings on foams and polypropylene textiles. Phosphate esters are also used as flame retardant plasticizers in PVC, high impact polystyrene (HIPS), polycarbonate (PC), and acrylonitrile butadiene styrene (ABS). Phosphorus sources also include agricultural applications, such as residual glyphosate in HDPE containers and residual phosphorus fertilizers on ground-level films (e.g., mulch films). Post-consumer sources will contain higher volumes of materials containing phosphorus sources that can be difficult to differentiate and remove through standard sorting techniques.

Sources of sulfur, calcium, sodium, iron, phosphorus, or a combination thereof are additives, surface residues, and residual contamination of the incoming post-consumer and/or post-industrial plastics. A wash step can potentially remove certain surface residues, but would add cost and complexity to the advanced (e.g., pyrolysis based) recycling process. Accordingly, post-consumer sources will contain higher volumes of materials containing sources of sulfur, calcium, sodium, iron, phosphorus, or a combination thereof that can be difficult to differentiate and remove through standard sorting techniques.

Copper alloys are commonly and increasingly used to create molds for plastic injection molding processes due to their high thermal conductivity that removes hot spots, reduces warpage and reduces cycle time, ease of machining by a variety of processes, and corrosion resistance to water, cooling fluids and the plastics being injected. Copper alloys often contain nickel and silicon. Plastics manufactured in copper alloy molds can have residual amounts of copper, nickel, and silicon on their surface. In addition, the plating of plastic with nickel and copper can be an effective means of protecting a substrate against corrosion from environmental exposure and make it more resistant to damage from chemicals used in the manufacturing process. In some instances, the plating on plastic can increase the hardness, strength, and wear resistance of the substrate. The presence of copper and nickel on the surface of both pre-consumer and post-consumer sources can be difficult to differentiate and remove through standard sorting techniques.

In some examples, the oil has a total chloride content of 500 ppm or less (e.g., 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil is substantially free of chlorides. The total chloride content of the oil can be determined using any suitable method. In some examples, the total chloride content of the oil is determined using the steps described in ASTM D 7359.

The oil can, for example, have a nitrogen content of 600 ppm or less (e.g., 575 ppm or less, 550 ppm or less, 525 ppm or less, 500 ppm or less, 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of nitrogen. The nitrogen content of the oil can be determined using any suitable method, such as those known in the art. In some examples, the nitrogen content of the oil is determined using the steps described in ASTM D 4629.

The oil can, for example, have a silicon content of 2,000 ppm or less (e.g., 1,900 ppm or less, 1,800 ppm or less, 1,700 ppm or less, 1,600 ppm or less, 1,500 ppm or less, 1,400 ppm or less, 1,300 ppm or less, 1,200 ppm or less, 1,100 ppm or less, 1,000 ppm or less, 950 ppm or less, 900 ppm or less, 850 ppm or less, 800 ppm or less, 750 ppm or less, 700 ppm or less, 650 ppm or less, 600 ppm or less, 550 ppm or less, 500 ppm or less, 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of silicon. The silicon content of the oil can be determined using any suitable method, such as those known in the art. In some examples, the silicon content of the oil is determined using the steps described in ASTM D 5185.

The oil can, for example, have a sodium content of 100 ppm or less (e.g., 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of sodium. The sodium content of the oil can be determined using any suitable method, such as those known in the art. In some examples, the sodium content of the oil is determined using the steps described in ASTM D 5185.

The oil can, for example, have an iron content of 10 ppm or less (e.g., 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of iron. The iron content of the oil can be determined using any suitable method, such as those known in the art. In some examples, the iron content of the oil is determined using the steps described in ASTM D 5185.

The oil can, for example, have a phosphorus content of 25 ppm or less (e.g., 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of phosphorus. The phosphorus content of the oil can be determined using any suitable method, such as those known in the art. In some examples, the phosphorus content of the oil is determined using the steps described in ASTM D 5185.

The oil can, for example, have a sulfur content of 250 ppm or less (e.g., 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of sulfur. The sulfur content of the oil can be determined by any suitable method, such as those known in the art. In some examples, the sulfur content of the oil is determined using the steps described in ASTM D 4294.

The oil can, for example, have a calcium content of 50 ppm or less (e.g., 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of calcium. The calcium content of the oil can be determined using any suitable methods, such as those known in the art. In some examples, the calcium content of the oil is determined using the steps described in ASTM D 5185.

The oil can, for example, have a copper content of 10 ppm or less (e.g., 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of copper. The copper content of the oil can be determined using any suitable method, such as those known in the art. In some examples, the copper content of the oil is determined using the steps described in ASTM D 5185.

The oil can, for example, have a nickel content of 250 ppm or less (e.g., 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially fee of nickel. The nickel content of the oil can be determined using any suitable method, such as those known in the art. In some examples, the nickel content of the oil is determined using the steps described in ASTM D 5185.

The oil can, for example, have a vanadium content of 25 ppm or less (e.g., 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the oil can be substantially free of vanadium. The vanadium content of the oil can be determined using any suitable method, such as those known in the art. In some examples, the vanadium content of the oil is determined using the steps described in ASTM D 5185.

In some examples, the oil has a total chloride content of 500 ppm or less; a nitrogen content of 600 ppm or less; and a silicon content of 2,000 ppm or less. In some examples, the oil has a total chloride content of 500 ppm or less; a nitrogen content of 600 ppm or less; a silicon content of 2,000 ppm or less; and a sodium content of 100 ppm or less. In some examples, the oil has a total chloride content of 500 ppm or less; a nitrogen content of 600 ppm or less; a silicon content of 2,000 ppm or less; a sodium content of 100 ppm or less; an iron content of 10 ppm or less; a sulfur content of 250 ppm or less; and a calcium content of 50 ppm or less. In some examples, the oil has a total chloride content of 500 ppm or less; a nitrogen content of 600 ppm or less; a silicon content of 2,000 ppm or less; a sodium content of 100 ppm or less; an iron content of 10 ppm or less; a phosphorus content of 25 ppm or less; a sulfur content of 250 ppm or less; and a calcium content of 50 ppm or less. In some examples, the oil has a total chloride content of 500 ppm or less; a nitrogen content of 600 ppm or less; a silicon content of 2,000 ppm or less; a sodium content of 100 ppm or less; an iron content of 10 ppm or less; a phosphorus content of 25 ppm or less; a sulfur content of 250 ppm or less; a calcium content of 50 ppm or less; a copper content of 10 ppm or less; a nickel content of 250 ppm or less; and a vanadium content of 25 ppm or less.

In some examples, the oil has a total chloride content of 100 ppm or less; a nitrogen content of 600 ppm or less; and a silicon content of 250 ppm or less. In some examples, the oil has a total chloride content of 100 ppm or less; a nitrogen content of 600 ppm or less; a silicon content of 250 ppm or less; and a sodium content of 25 ppm or less. In some examples, the oil has a total chloride content of 100 ppm or less; a nitrogen content of 600 ppm or less; a silicon content of 250 ppm or less; a sodium content of 25 ppm or less; an iron content of 10 ppm or less; a sulfur content of 10 ppm or less; and a calcium content of 5 ppm or less. In some examples, the oil has: a total chloride content of 100 ppm or less; a nitrogen content of 600 ppm or less; a silicon content of 250 ppm or less; a sodium content of 25 ppm or less; an iron content of 10 ppm or less; a phosphorus content of 10 ppm or less; a sulfur content of 10 ppm or less; and a calcium content of 5 ppm or less. In some examples, the oil has a total chloride content of 100 ppm or less; a nitrogen content of 600 ppm or less; a silicon content of 250 ppm or less; a sodium content of 25 ppm or less; an iron content of 10 ppm or less; a phosphorus content of 10 ppm or less; a sulfur content of 10 ppm or less; a calcium content of 5 ppm or less; a copper content of 1 ppm or less; a nickel content of 50 ppm or less; and a vanadium content of 1 ppm or less.

The oil can, for example, have a Reid Vapor Pressure of 12.5 psig or less (e.g., 12 psig or less, 11.5 psig or less, 11 psig or less, 10.5 psig or less, 10 psig or less, 9.5 psig or less, 9 psig or less, 8.5 psig or less, 8 psig or less, 7.5 psig or less, 7 psig or less, 6.5 psig or less, 6 psig or less, 5.5 psig or less, 5 psig or less, 4.5 psig or less, 4 psig or less, 3.5 psig or less, 3 psig or less, or 2.5 psig or less). In some examples, the oil can have a Reid Vapor Pressure of 2 psig or more (e.g., 2.5 psig or more, 3 psig or more, 3.5 psig or more, 4 psig or more, 4.5 psig or more, 5 psig or more, 5.5 psig or more, 6 psig or more, 6.5 psig or more, 7 psig or more, 7.5 psig or more, 8 psig or more, 8.5 psig or more, 9 psig or more, 9.5 psig or more, 10 psig or more, 10.5 psig or more, or 11 psig or more). The Reid Vapor Pressure of the oil can range from any of the minimum values described above to any of the maximum values described above. For example, the oil can have a Reid Vapor Pressure of from 2 to 12.5 psig (e.g., from 5 to 7 psig, from 7 to 12.5 psig, from 2 to 4 psig, from 4 to 6 psig, from 6 to 8 psig, from 8 to 10 psig, from 10 to 12.5 psig, from 2 to 12 psig, from 2 to 11 psig, from 2 to 10 psig, from 2 to 9 psig, from 2 to 8 psig, from 2 to 6 psig, from 2 to 5 psig, from 3 to 12.5 psig, from 4 to 12.5 psig, from 5 to 12.5 psig, from 6 to 12.5 psig, from 7 to 12.5 psig, from 8 to 12.5 psig, from 9 to 12.5 psig, from 3 to 12 psig, from 5 to 11 psig, or from 7 to 10 psig). The Reid Vapor Pressure of the oil can be determined using any suitable method, such as those known in the art. In some examples, the Reid Vapor Pressure of the oil is determined using the steps described in ASTM D 5191.

The oil can, for example, have a water by distillation amount of 0.5 vol. % or less (e.g., 0.45 vol. % or less, 0.4 vol. % or less, 0.35 vol. % or less, 0.3 vol. % or less, 0.25 vol. % or less, 0.2 vol. % or less, 0.15 vol. % or less, 0.1 vol. % or less, 0.075 vol. % or less, 0.05 vol. % or less, 0.025 vol. % or less, or 0.01 vol. % or less). In some examples, the oil can have a water by distillation amount of 0 vol. % or more (e.g., 0.01 vol. % or more, 0.025 vol. % or more, 0.05 vol. % or more, 0.075 vol. % or more, 0.1 vol. % or more, 0.15 vol. % or more, 0.2 vol. % or more, 0.25 vol. % or more, 0.3 vol. % or more, 0.35 vol. % or more, or 0.4 vol. % or more). The amount of water by distillation in the oil can range from any of the minimum values described above to any of the maximum values described above. For example, the oil can have a water by distillation amount of from 0 to 0.5 vol. % (e.g., from 0 to 0.25 vol. %, from 0.25 to 0.5 vol. %, from 0 to 0.1 vol. %, from 0.1 to 0.2 vol. %, from 0.2 to 0.3 vol. %, from 0.3 to 0.4 vol. %, from 0.4 to 0.5 vol. %, from 0 to 0.4 vol. %, from 0 to 0.3 vol. %, from 0 to 0.2 vol. %, from 0 to 0.05 vol. %, or from 0 to 0.01 vol. %). The amount of water by distillation in the oil can be determined by any suitable method, such as those known in the art. In some examples, the water by distillation amount in the oil is determined using the steps described in ASTM D 95.

The oil can, for example, have a total sediment content of 0.5 vol. % or less (e.g., 0.45 vol. % or less, 0.4 vol. % or less, 0.35 vol. % or less, 0.3 vol. % or less, 0.25 vol. % or less, 0.2 vol. % or less, 0.15 vol. % or less, 0.1 vol. % or less, 0.075 vol. % or less, 0.05 vol. % or less, 0.025 vol. % or less, or 0.01 vol. % or less). In some examples, the oil can have a total sediment content of 0 vol. % or more (e.g., 0.01 vol. % or more, 0.025 vol. % or more, 0.05 vol. % or more, 0.075 vol. % or more, 0.1 vol. % or more, 0.15 vol. % or more, 0.2 vol. % or more, 0.25 vol. % or more, 0.3 vol. % or more, 0.35 vol. % or more, or 0.4 vol. % or more). The total sediment content of the oil can range from any of the minimum values described above to any of the maximum values described above. For example, the oil can have a total sediment content of from 0 to 0.5 vol. % (e.g., from 0 to 0.25 vol. %, from 0.25 to 0.5 vol. %, from 0 to 0.1 vol. %, from 0.1 to 0.2 vol. %, from 0.2 to 0.3 vol. %, from 0.3 to 0.4 vol. %, from 0.4 to 0.5 vol. %, from 0 to 0.4 vol. %, from 0 to 0.3 vol. %, from 0 to 0.2 vol. %, from 0 to 0.05 vol. %, or from 0 to 0.01 vol. %). The total sediment content of the oil can be determined by any suitable method, such as those known in the art. In some examples, the total sediment content of the oil is determined using the steps described in ASTM D 4870.

The oil can, for example, have an n-heptane insoluble content of 0.1 wt. % or less (e.g., 0.09 wt. % or less, 0.08 wt. % or less, 0.07 wt. % or less, 0.06 wt. % or less, 0.05 wt. % or less, 0.04 wt. % or less, 0.03 wt. % or less, 0.02 wt. % or less, or 0.01 wt. % or less). In some examples, the oil can have an n-heptane insoluble content of 0 wt. % or more (e.g., 0.01 wt. % or more, 0.02 wt. % or more, 0.03 wt. % or more, 0.04 wt. % or more, 0.05 wt. % or more, 0.06 wt. % or more, 0.07 wt. % or more, or 0.08 wt. % or more). The n-heptane insoluble content of the oil can range from any of the minimum values described above to any of the maximum values described above. For example, the oil can have an n-heptane insoluble content of from 0 to 0.1 wt. % (e.g., from 0 to 0.05 wt. %, from 0.05 to 0.1 wt. %, from 0 to 0.02 wt. %, from 0.02 to 0.04 wt. %, from 0.04 to 0.06 wt. %, from 0.06 to 0.08 wt. %, from 0.08 to 0.1 wt. %, from 0 to 0.09 wt. %, from 0 to 0.08 wt. %, from 0 to 0.07 wt. %, from 0 to 0.06 wt. %, from 0 to 0.04 wt. %, from 0 to 0.03 wt. %, or from 0 to 0.01 wt. %). The n-heptane insoluble content of the oil can be determined using any suitable method, such as those known in the art. In some examples, the n-heptane insoluble content of the oil is determined using the steps described in ASTM D 3279.

The oil can, for example, have a total acid number of 1 mg KOH/g or less (e.g., 0.9 mg KOH/g or less, 0.8 mg KOH/g or less, 0.7 mg KOH/g or less, 0.6 mg KOH/g or less, 0.5 mg KOH/g or less, 0.4 mg KOH/g or less, 0.3 mg KOH/g or less, 0.2 mg KOH/g or less, or 0.1 mg KOH/g or less). In some examples, the oil can have a total acid number of 0 mg KOH/g or more (e.g., 0.1 mg KOH/g or more, 0.2 mg KOH/g or more, 0.3 mg KOH/g or more, 0.4 mg KOH/g or more, 0.5 mg KOH/g or more, 0.6 mg KOH/g or more, 0.7 mg KOH/g or more, 0.8 mg KOH/g or more, or 0.9 mg KOH/g or more). The total acid number of the oil can range from any of the minimum values described above to any of the maximum values described above. For example, the oil can have a total acid number of from 0 to 1 mg KOH/g (e.g., from 0 to 0.5 mg KOH/g, from 0.5 to 1 mg KOH/g, from 0 to 0.2 mg KOH/g, from 0.2 to 0.4 mg KOH/g, from 0.4 to 0.6 mg KOH/g, from 0.6 to 0.8 mg KOH/g, from 0.8 to 1 mg KOH/g, from 0 to 0.8 mg KOH/g, from 0 to 0.6 mg KOH/g, from 0 to 0.4 mg KOH/g, or from 0 to 0.1 mg KOH/g). The total acid number of the oil can be determined using any suitable method, such as those known in the art. In some examples, the total acid number of the oil is determined using the steps described in ASTM D 664.

In some examples, the oil has a Reid Vapor Pressure of 12.5 psig or less; and a final boiling point of 400° F. to 1,000° F. In some examples, the oil has a Reid Vapor Pressure of 12.5 psig or less; and a final boiling point of 400° F. to 850° F. In some examples, the oil has a Reid Vapor Pressure of 12.5 psig or less; and a final boiling point of 750° F. to 1,000° F. In some examples, the oil has a Reid Vapor Pressure of from 7 to 10 psig; and a final boiling point of from 935° F. to 950° F.

In some examples, the oil has a Reid Vapor Pressure of 12.5 psig or less; and a pour point of −200° F. to 100° F. In some examples, the oil has a Reid Vapor Pressure of 12.5 psig or less; and a pour point of 0° F. to 20° F. In some examples, the oil has a Reid Vapor Pressure of from 7 to 10 psig; and a pour point of from 10° F. to 15° F.

In some examples, the oil has a final boiling point of 400° F. to 1,000° F.; and a pour point of −200° F. to 100° F. In some examples, the oil has a final boiling point of 400° F. to 850° F.; and a pour point of −200° F. to 100° F. In some examples, the oil has a final boiling point of 750° F. to 1,000° F.; and a pour point of 0° F. to 20° F. In some examples, the oil has a final boiling point of from 935° F. to 950° F.; and a pour point of from 10° F. to 15° F.

In some examples, the oil has a Reid Vapor Pressure of 12.5 psig or less; a final boiling point of 400° F. to 1,000° F.; and a pour point of −200° F. to 100° F. In some examples, the oil has a Reid Vapor Pressure of 12.5 psig or less; a final boiling point of 400° F. to 850° F.; and a pour point of −200° F. to 100° F. In some examples, the oil has a Reid Vapor Pressure of 12.5 psig or less; a final boiling point of 750° F. to 1,000° F.; and a pour point of 0° F. to 20° F. In some examples, the oil has a Reid Vapor Pressure of from 7 to 10 psig; a final boiling point of from 935° F. to 950° F.; and a pour point of from 10° F. to 15° F.;

In some examples, the oil has a Reid Vapor Pressure of 12.5 psig or less; a final boiling point of 400° F. to 1,000° F.; a pour point of −200° F. to 100° F.; a total chloride content of 500 ppm or less; a nitrogen content of 600 ppm or less; a silicon content of 2,000 ppm or less; a sodium content of 100 ppm or less; an iron content of 10 ppm or less; a phosphorus content of 25 ppm or less; a sulfur content of 250 ppm or less; and a calcium content of 50 ppm or less. In some examples, the oil has a Reid Vapor Pressure of 12.5 psig or less; a final boiling point of 400° F. to 850° F.; a pour point of −200° F. to 100° F.; a total chloride content of 500 ppm or less; a nitrogen content of 600 ppm or less; a silicon content of 2,000 ppm or less; a sodium content of 100 ppm or less; an iron content of 10 ppm or less; a phosphorus content of 25 ppm or less; a sulfur content of 250 ppm or less; and a calcium content of 50 ppm or less. In some examples, the oil has a Reid Vapor Pressure of 12.5 psig or less; a final boiling point of 750° F. to 1,000° F.; a pour point of 0° F. to 20° F.; a total chloride content of 500 ppm or less; a nitrogen content of 600 ppm or less; a silicon content of 2,000 ppm or less; a sodium content of 100 ppm or less; an iron content of 10 ppm or less; a phosphorus content of 25 ppm or less; a sulfur content of 250 ppm or less; and a calcium content of 50 ppm or less. In some examples, the oil has a Reid Vapor Pressure of from 7 to 10 psig; a final boiling point of from 935° F. to 950° F.; a pour point of from 10° F. to 15° F.; a total chloride content of 100 ppm or less; a nitrogen content of 600 ppm or less; a silicon content of 250 ppm or less; a sodium content of 25 ppm or less; an iron content of 10 ppm or less; a phosphorus content of 10 ppm or less; a sulfur content of 10 ppm or less; and a calcium content of 5 ppm or less.

In some examples, the oil is a raw pyrolysis product, meaning the oil is produced by a method that substantially excludes any hydrotreatment or further refining steps after pyrolysis.

Compositions, Such as Compositions Comprising the Oil and the Wax, Such as Blends Also disclosed herein are compositions derived from pyrolysis of a feedstock comprising post-consumer and/or post-industrial plastics. In some examples, the compositions can be produced via pyrolysis at an industrial scale.

The compositions can, for example, have a number average molecular weight and/or a weight average molecular weight of 50 Daltons or more (e.g., 55 Daltons or more, 60 Daltons or more, 65 Daltons or more, 70 Daltons or more, 75 Daltons or more, 80 Daltons or more, 85 Daltons or more, 90 Daltons or more, 95 Daltons or more, 100 Daltons or more, 110 Daltons or more, 120 Daltons or more, 130 Daltons or more, 140 Daltons or more, 150 Daltons or more, 160 Daltons or more, 170 Daltons or more, 180 Daltons or more, 190 Daltons or more, 200 Daltons or more, 225 Daltons or more, 250 Daltons or more, 275 Daltons or more, 300 Daltons or more, 325 Daltons or more, 350 Daltons or more, 375 Daltons or more, 400 Daltons or more, or 425 Daltons or more). In some examples, the compositions can have a number average molecular weight and/or a weight average molecular weight of 450 Daltons or less (e.g., 425 Daltons or less, 400 Daltons or less, 375 Daltons or less, 350 Daltons or less, 325 Daltons or less, 300 Daltons or less, 275 Daltons or less, 250 Daltons or less, 225 Daltons or less, 200 Daltons or less, 190 Daltons or less, 180 Daltons or less, 170 Daltons or less, 160 Daltons or less, 150 Daltons or less, 140 Daltons or less, 130 Daltons or less, 120 Daltons or less, 110 Daltons or less, 100 Daltons or less, 95 Daltons or less, 90 Daltons or less, 85 Daltons or less, 80 Daltons or less, 75 Daltons or less, 70 Daltons or less, 65 Daltons or less, or 60 Daltons or less). The number average molecular weight and/or a weight average molecular weight of the composition can range from any of the minimum values described above to any of the maximum values described above. For example, the composition can have a number average molecular weight and/or a weight average molecular weight of from 50 to 450 Daltons (e.g., from 50 to 250 Daltons, from 250 to 450 Daltons, from 50 to 150 Daltons, from 150 to 250 Daltons, from 250 to 350 Daltons, from 350 to 450 Daltons, from 50 to 400 Daltons, from 50 to 350 Daltons, from 50 to 300 Daltons, from 50 to 200 Daltons, from 100 to 450 Daltons, from 150 to 250 Daltons, from 200 to 450 Daltons, from 300 to 450 Daltons, from 75 to 425 Daltons, or from 100 to 400 Daltons).

The composition comprises a mixture of different hydrocarbons (e.g., linear, branched, cyclic, acyclic, saturated, unsaturated, aromatic, non-aromatic, etc.), any of which can optionally be substituted. In some examples, the composition comprises a mixture of different hydrocarbons, any of which can optionally be substituted, and 70% or more of the mixture (w/w) comprises $C_4$-$C_{46}$ hydrocarbons (e.g., 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 90.5% or more, 91% or more, 91.5% or more, 92% or more, 92.5% or more, 93% or more, 93.5% or more, 94% or more, 94.5% or more, 95% or more, 95.5% or more, 96% or more, 96.5% or more, 97% or more, 97.5% or more, 98% or more, 98.5% or more, or 99% or more). In some examples, the composition comprises a mixture of different hydrocarbons, any of which can optionally be substituted, and 100% or less of the mixture (w/w) comprises $C_4$-$C_{46}$ hydrocarbons (e.g., 99.5% or less, 99% or less, 98.5% or less, 98% or less, 97.5% or less, 97% or less, 96.5% or less, 96% or less, 95.5% or less, 95% or less, 94.5% or less, 94% or less, 93.5% or less, 93% or less, 92.5% or less, 92% or less, 91.5% or less, 91% or less, 90.5% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, or 71% or less). The amount of the mixture comprising $C_4$-$C_{46}$ hydrocarbons can range from any of the minimum values described above to any of the maximum values described above. For example, the composition can comprise a mixture of different hydrocarbons, any of which can optionally be substituted, and from 70% to 100% of the mixture (w/w) can comprise $C_4$-$C_{46}$ hydrocarbons (e.g., from 70% to 85%, from 85% to 100%, from 70% to 80%, from 80% to 90%, from 90% to 100%, from 70% to 95%, from 70% to 90%, from 70% to 75%, from 75% to 100%, from 80% to 100%, or from 75% to 95%). In some examples, the composition can comprise a mixture of different hydrocarbons, any of which can optionally be substituted, and from 90% to 100% of the mixture (w/w) can comprise $C_4$-$C_{46}$ hydrocarbons (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 91% to 99%, from 92% to 98%, or from 93% to 97%).

The composition comprises a mixture of different hydrocarbons (e.g., linear, branched, cyclic, acyclic, saturated, unsaturated, aromatic, non-aromatic, etc.), any of which can optionally be substituted. In some examples, the composition comprises a mixture of different hydrocarbons, any of which can optionally be substituted, and 70% or more of the mixture (w/w) comprises $C_4$-$C_{33}$ hydrocarbons (e.g., 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 90.5% or more, 91% or more, 91.5% or more, 92% or more, 92.5% or more, 93% or more, 93.5% or more, 94% or more, 94.5% or more, 95% or more, 95.5% or more, 96% or more, 96.5% or more, 97% or more, 97.5% or more, 98% or more, 98.5% or more, or 99% or more). In some examples, the composition comprises a mixture of different hydrocarbons, any of which can optionally be substituted, and 100% or less of the mixture (w/w) comprises $C_4$-$C_{33}$ hydrocarbons (e.g., 99.5% or less, 99% or less, 98.5% or less, 98% or less, 97.5% or less, 97% or less, 96.5% or less, 96% or less, 95.5% or less, 95% or less, 94.5% or less, 94% or less, 93.5% or less, 93% or less, 92.5% or less, 92% or less, 91.5% or less, 91% or less, 90.5% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, or 71% or less). The amount of the mixture comprising $C_4$-$C_{33}$ hydrocarbons can range from any of the minimum values described above to any of the maximum values described above. For example, the composition can comprise a mixture of different hydrocarbons, any of which can optionally be substituted, and from 70% to 100% of the mixture (w/w) can comprise $C_4$-$C_{33}$ hydrocarbons (e.g., from 70% to 85%, from 85% to 100%, from 70% to 80%, from 80% to 90%, from 90% to 100%, from 70% to 95%, from 70% to 90%, from 70% to 75%, from 75% to 100%, from 80% to 100%, or from 75% to 95%). In some examples, the composition can comprise a mixture of different hydrocarbons, any of which can optionally be substituted, and from 90% to 100% of the mixture (w/w) can comprise $C_4$-$C_{33}$ hydrocarbons (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 91% to 99%, from 92% to 98%, or from 93% to 97%).

The composition comprises a mixture of different hydrocarbons (e.g., linear, branched, cyclic, acyclic, saturated, unsaturated, aromatic, non-aromatic, etc.), any of which can optionally be substituted. In some examples, the composition comprises a mixture of different hydrocarbons, any of which can optionally be substituted, and 7.5% or more of the mixture (w/w) comprises $C_4$-$C_8$ hydrocarbons (e.g., 8% or more, 8.5% or more, 9% or more, 9.5% or more, 10% or more, 11% or more, 12% or more, 13% or more, 14% or more, 15% or more, 16% or more, 17% or more, 18% or more, 19% or more, 20% or more, 21% or more, 22% or more, 23% or more, or 24% or more). In some examples, the composition comprises a mixture of different hydrocarbons, any of which can optionally be substituted, and 25% or less of the mixture (w/w) comprises $C_4$-$C_8$ hydrocarbons (e.g., 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9.5% or less, 9% or less, 8.5% or less, or 8% or less). The amount of the mixture comprising $C_4$-$C_8$ hydrocarbons can range from any of the minimum values described above to any of the maximum values described above. For example, the composition can comprise a mixture of different hydrocarbons, any of which can optionally be substituted, and from 7.5% to 25% of the mixture (w/w) can comprise $C_4$-$C_8$ hydrocarbons (e.g., from 7.5% to 16%, from 16% to 25%, from 7.5% to 10%, from 10% to 15%, from 15% to 20%, from 20% to 25%, from 7.5% to 20%, from 7.5% to 15%, from 10% to 25%, from 15% to 25%, from 8% to 24%, from 9% to 22%, or from 10% to 20%). In some examples, the composition can comprise a mixture of different hydrocarbons, any of which can optionally be substituted, and from 10% to 20% of the mixture (w/w) can comprise $C_4$-$C_8$ hydrocarbons.

The composition comprises a mixture of different hydrocarbons (e.g., linear, branched, cyclic, acyclic, saturated, unsaturated, aromatic, non-aromatic, etc.), any of which can optionally be substituted. In some examples, the composition comprises a mixture of different hydrocarbons, any of which can optionally be substituted, and 30% or more of the mixture (w/w) comprises $C_9$-$C_{20}$ hydrocarbons (e.g., 31% or more, 32% or more, 33% or more, 34% or more, 35% or more, 36% or more, 37% or more, 38% or more, 39% or more, 40% or more, 41% or more, 42% or more, 43% or more, 44% or more, 45% or more, 46% or more, 47% or more, 48% or more, 49% or more, 50% or more, 51% or more, 52% or more, 53% or more, or 54% or more). In some examples, the composition comprises a mixture of different hydrocarbons, any of which can optionally be substituted, and 55% or less of the mixture (w/w) comprises $C_9$-$C_{20}$ hydrocarbons (e.g., 54% or less, 53% or less, 52% or less, 51% or less, 50% or less, 49% or less, 48% or less, 47% or less, 46% or less, 45% or less, 44% or less, 43% or less, 42% or less, 41% or less, 40% or less, 39% or less, 38% or less, 37% or less, 36% or less, 35% or less, 34% or less, 33% or less, 32% or less, or 31% or less). The amount of the mixture comprising $C_9$-$C_{20}$ hydrocarbons can range from any of the minimum values described above to any of the maximum values described above. For example, the composition can comprise a mixture of different hydrocarbons, any of which can optionally be substituted, and from 30% to 55% of the mixture (w/w) can comprise $C_9$-$C_{20}$ hydrocarbons (e.g., from 30% to 42.5%, from 42.5% to 55%, from 30% to 35%, from 35% to 40%, from 40% to 45%, from 45% to 50%, from 50% to 55%, from 30% to 50%, from 30% to 45%, from 30% to 40%, from 35% to 55%, from 40% to 55%, from 45% to 55%, from 31% to 54%, from 32% to 53%, or from 35% to 50%). In some examples, the composition can comprise a mixture of different hydrocarbons, any of which can optionally be substituted, and from 35% to 55% of the mixture (w/w) can comprise $C_9$-$C_{20}$ hydrocarbons.

The composition comprises a mixture of different hydrocarbons (e.g., linear, branched, cyclic, acyclic, saturated, unsaturated, aromatic, non-aromatic, etc.), any of which can optionally be substituted. In some examples, the composition comprises a mixture of different hydrocarbons, any of which can optionally be substituted, and 15% or more of the mixture (w/w) comprises $C_{21}$-$C_{29}$ hydrocarbons (e.g., 16% or more, 17% or more, 18% or more, 19% or more, 20% or more, 21% or more, 22% or more, 23% or more, 24% or more, 25% or more, 26% or more, 27% or more, 28% or more, 29% or more, 30% or more, 31% or more, 32% or more, 33% or more, 34% or more, 35% or more, 36% or more, 37% or more, 38% or more, or 39% or more). In some examples, the composition comprises a mixture of different hydrocarbons, any of which can optionally be substituted, and 40% or less of the mixture (w/w) comprises $C_{21}$-$C_{29}$ hydrocarbons (e.g., 39% or less, 38% or less, 37% or less, 36% or less, 35% or less, 34% or less, 33% or less, 32% or less, 31% or less, 30% or less, 29% or less, 28% or less, 27% or less, 26% or less, 25% or less, 24% or less, 23% or less, 22% or less, 21% or less, 20% or less, 19% or less, 18% or less, 17% or less, or 16% or less). The amount of the mixture comprising $C_{21}$-$C_{29}$ hydrocarbons can range from any of the minimum values described above to any of the maximum values described above. For example, the composition can comprise a mixture of different hydrocarbons, any of which can optionally be substituted, and from 15% to 40% of the mixture (w/w) can comprise $C_{21}$-$C_{29}$ hydrocarbons (e.g., from 15% to 27.5%, from 27.5% to 40%, from 15% to 20%, from 20% to 25%, from 25% to 30%, from 30% to 35%, from 35% to 40%, from 15% to 35%, from 15% to 30%, from 15% to 25%, from 20% to 40%, from 25% to 40%, from 30% to 40%, from 16% to 39%, from 17% to 38%, or from 20% to 35%). In some examples, the composition can comprise a mixture of different hydrocarbons, any of which can optionally be substituted, and from 20% to 40% of the mixture (w/w) can comprise $C_{21}$-$C_{29}$ hydrocarbons.

The composition comprises a mixture of different hydrocarbons (e.g., linear, branched, cyclic, acyclic, saturated, unsaturated, aromatic, non-aromatic, etc.), any of which can optionally be substituted. In some examples, the composition comprises a mixture of different hydrocarbons, any of which can optionally be substituted, and 0% or more of the mixture (w/w) can comprise $C_{30}$-$C_{46}$ hydrocarbons (e.g., 0.5% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, or 14% or more). In some examples, the composition comprises a mixture of different hydrocarbons, any of which can optionally be substituted, and 15% or less of the mixture (w/w) can comprise $C_{30}$-$C_{46}$ hydrocarbons (e.g., 14.5% or less, 14% or less, 13.5% or less, 13% or less, 12.5% or less, 12% or less, 11.5% or less, 11% or less, 10.5% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, 1% or less, or 0.5% or less). The amount of the mixture comprising $C_{30}$-$C_{45}$ hydrocarbons can range from any of the minimum values described above to any of the maximum values described above. For example, the composition can comprise a mixture of different hydrocarbons, any of which can optionally be substituted, and from 0% to 15% of the mixture (w/w) can comprise $C_{30}$-$C_{46}$ hydrocarbons (e.g., from 0% to 7.5%, from 7.5% to 15%, from 0% to 5%, from 5% to 10%, from 10% to 15%, from 0% to 14%, from 0% to 12%, from 0% to 10%, from 0% to 8%, from 0% to 6%, from 0% to 4%, from 0% to 2%, from 1% to 15%, from 3% to 15%, from 5% to 15%, from 7% to 15%, from 9% to 15%, from 11% to 15%, from 13% to 15%, from 1% to 14%, from 2% to 13%, or from 3% to 12%). In some examples, the composition can comprise a mixture of different hydrocarbons, any of which can optionally be substituted, and from 5% to 15% of the mixture (w/w) can comprise $C_{30}$-$C_{46}$ hydrocarbons.

In some examples, the composition comprises a mixture of different hydrocarbons, any of which can optionally be substituted, and the mixture comprises: 7.5-25% (e.g., 10-20%) $C_4$-$C_8$ hydrocarbons, 30-55% (e.g., 35-55%) $C_9$-$C_{20}$ hydrocarbons, 15-40% (e.g., 20-40%) $C_{21}$-$C_{29}$ hydrocarbons, and 0-15% (e.g., 5-15%) $C_{30}$-$C_{46}$ hydrocarbons. In some examples, the composition comprises a mixture of different hydrocarbons, any of which can optionally be substituted, and the mixture comprises: 10-20% $C_4$-$C_8$ hydrocarbons, 35-55% $C_9$-$C_{20}$ hydrocarbons, 20-40% $C_{21}$-$C_{29}$ hydrocarbons, and 5-15% $C_{30}$-$C_{46}$ hydrocarbons.

In some examples, the composition comprises a mixture of different hydrocarbons, any of which can optionally be substituted, and the mixture is substantially free of $C_1$-$C_4$ hydrocarbons.

In some examples, the composition comprises a mixture of different hydrocarbons, any of which can optionally be substituted, and the mixture comprises saturated hydrocarbons (e.g., linear, branched, and/or cyclic alkanes), unsaturated (non-aromatic) hydrocarbons (e.g., linear, branched, and/or cyclic alkenes and/or alkynes), and aromatic hydrocarbons. For example, the composition comprises a mixture of different hydrocarbons, any of which can optionally be substituted, and the mixture comprises 80 wt. % or more saturated hydrocarbons (e.g., 81 wt. % or more, 82 wt. % or more, 83 wt. % or more, 84 wt. % or more, 85 wt. % or more, 86 wt. % or more, 87 wt. % or more, 88 wt. % or more, 89 wt. % or more, 90 wt. % or more, 91 wt. % or more, 92 wt. % or more, 93 wt. % or more, 94 wt. % or more, 95 wt. % or more, 96 wt. % or more, 97 wt. % or more, 98 wt. % or more, or 99 wt. % or more). In some examples, the composition comprises a mixture of different hydrocarbons, any of which can optionally be substituted, and the mixture comprises 100 wt. % or less saturated hydrocarbons (e.g., 99 wt. % or less, 98 wt. % or less, 97 wt. % or less, 96 wt. % or less, 95 wt. % or less, 94 wt. % or less, 93 wt. % or less, 92 wt. % or less, 91 wt. % or less, 90 wt. % or less, 89 wt. % or less, 88 wt. % or less, 87 wt. % or less, 86 wt. % or less, 85 wt. % or less, 84 wt. % or less, 83 wt. % or less, or 82 wt. % or less). The amount of the mixture comprising saturated hydrocarbons can range from any of the minimum values described above to any of the maximum values described above. For example, the composition can comprise a mixture of different hydrocarbons, any of which can optionally be substituted, and from 80 wt. % to 100 wt. % of the mixture can comprise saturated hydrocarbons (e.g., from 80 wt. % to 90 wt. %, from 90 wt. % to 100 wt. %, from 80 wt. % to 85 wt. %, from 85 wt. % to 90 wt. %, from 90 wt. % to 95 wt. %, from 95 wt. % to 100 wt. %, from 80 wt. % to 98 wt. %, from 80 wt. % to 96 wt. %, from 80 wt. % to 94 wt. %, from 80 wt. % to 92 wt. %, from 80 wt. % to 88 wt. %, from 80 wt. % to 86 wt. %, from 80 wt. % to 84 wt. %, from 80 wt. % to 82 wt. %, from 82 wt. % to 100 wt. %, from 84 wt. % to 100 wt. %, from 86 wt. % to 100 wt. %, from 88 wt. % to 100 wt. %, from 92 wt. % to 100 wt. %, from 94 wt. % to 100 wt. %, from 96 wt. % to 100 wt. %, from 98 wt. % to 100 wt. %, from 82 wt. % to 98 wt. %, or from 85 wt. % to 95 wt. %).

In some examples, the composition comprises a mixture of different hydrocarbons, any of which can optionally be substituted, and the mixture comprises 0 wt. % or more unsaturated (non-aromatic) hydrocarbons (e.g., 0.1 wt. % or more, 0.2 wt. % or more, 0.3 wt. % or more, 0.4 wt. % or more, 0.5 wt. % or more, 0.6 wt. % or more, 0.7 wt. % or more, 0.8 wt. % or more, 0.9 wt. % or more, 1 wt. % or more, 1.25 wt. % or more, 1.5 wt. % or more, 1.75 wt. % or more, 2 wt. % or more, 2.25 wt. % or more, 2.5 wt. % or more, 3 wt. % or more, 3.5 wt. % or more, or 4 wt. % or more). In some examples, the composition comprises a mixture of different hydrocarbons, any of which can optionally be substituted, and the mixture comprises 5 wt. % or less unsaturated (non-aromatic) hydrocarbons (e.g., 4.5 wt. % or less, 4 wt. % or less, 3.5 wt. % or less, 3 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.9 wt. % or less, 0.8 wt. % or less, 0.7 wt. % or less, 0.6 wt. % or less, 0.5 wt. % or less, 0.4 wt. % or less, 0.3 wt. % or less, or 0.2 wt. % or less). The amount of the mixture comprising unsaturated (non-aromatic) hydrocarbons can range from any of the minimum values described above to any of the maximum values described above. For example, the composition can comprise a mixture of different hydrocarbons, any of which can optionally be substituted, and from 0 to 5 wt. % of the mixture can comprise unsaturated (non-aromatic) hydrocarbons (e.g., from 0 to 2.5 wt. %, from 2.5 to 5 wt. %, from 0 to 1 wt. %, from 1 to 2 wt. %, from 2 to 3 wt. %, from 3 to 4 wt. %, from 4 to 5 wt. %, from 0 to 4 wt. %, from 0 to 3 wt. %, from 0 to 2 wt. %, from 1 to 5 wt. %, from 2 to 5 wt. %, from 3 to 5 wt. %, from 0.5 to 4.5 wt. %, or from 1 to 4 wt. %).

In some examples, the composition comprises a mixture of different hydrocarbons, any of which can optionally be substituted, and the mixture comprises 0 wt. % or more aromatic hydrocarbons (e.g., 0.1 wt. % or more, 0.2 wt. % or more, 0.3 wt. % or more, 0.4 wt. % or more, 0.5 wt. % or more, 0.6 wt. % or more, 0.7 wt. % or more, 0.8 wt. % or more, 0.9 wt. % or more, 1 wt. % or more, 1.25 wt. % or more, 1.5 wt. % or more, 1.75 wt. % or more, 2 wt. % or more, 2.25 wt. % or more, 2.5 wt. % or more, 3 wt. % or more, 3.5 wt. % or more, 4 wt. % or more, 4.5 wt. % or more, 5.5 wt. % or more, 6 wt. % or more, 6.5 wt. % or more, 7 wt. % or more, 7.5 wt. % or more, 8 wt. % or more, 8.5 wt. % or more, 9 wt. % or more, 9.5 wt. % or more, 10 wt. % or more, 10.5 wt. % or more, 11 wt. % or more, 11.5 wt. % or more, 12 wt. % or more, 12.5 wt. % or more, 13 wt. % or more, 13.5 wt. % or more, or 14 wt. % or more). In some examples, the composition comprises a mixture of different hydrocarbons, any of which can optionally be substituted, and the mixture comprises 15 wt. % or less aromatic hydrocarbons (e.g., 14.5 wt. % or less, 14 wt. % or less, 13.5 wt. % or less, 13 wt. % or less, 12.5 wt. % or less, 12 wt. % or less, 11.5 wt. % or less, 11 wt. % or less, 10.5 wt. % or less, 10 wt. % or less, 9.5 wt. % or less, 9 wt. % or less, 8.5 wt. % or less, 8 wt. % or less, 7.5 wt. % or less, 7 wt. % or less, 6.5 wt. % or less, 6 wt. % or less, 5.5 wt. % or less, 5 wt. % or less, 4.5 wt. % or less, 4 wt. % or less, 3.5 wt. % or less, 3 wt. % or less, 2.5 wt. % or less, 2.25 wt. % or less, 2 wt. % or less, 1.75 wt. % or less, 1.5 wt. % or less, 1.25 wt. % or less, 1 wt. % or less, 0.9 wt. % or less, 0.8 wt. % or less, 0.7 wt. % or less, 0.6 wt. % or less, 0.5 wt. % or less, 0.4 wt. % or less, 0.3 wt. % or less, or 0.2 wt. % or less). The amount of the mixture comprising aromatic hydrocarbons can range from any of the minimum values described above to any of the maximum values described above. For example, the composition can comprise a mixture of different hydrocarbons, any of which can optionally be substituted, and from 0 to 15 wt. % of the mixture can comprise aromatic hydrocarbons (e.g., from 0 to 7.5 wt. %, from 7.5 to 15 wt. %, from 0 to 5 wt. %, from 5 to 10 wt. %, from 10 to 15 wt. %, from 0 to 14 wt. %, from 0 to 12 wt. %, from 0 to 10 wt. %, from 0 to 8 wt. %, from 0 to 6 wt. %, from 0 to 4 wt. %, from 0 to 2.5 wt. %, from 0 to 2 wt. %, from 0 to 1 wt. %, from 1 to 15 wt. %, from 2 to 15 wt. %, from 4 to 15 wt. %, from 6 to 15 wt. %, from 8 to 15 wt. %, from 12 to 15 wt. %, from 0.5 to 14.5 wt. %, or from 1 to 14 wt. %).

In some examples, the composition comprises a mixture of different hydrocarbons, any of which can optionally be substituted, and the mixture comprises 80-100 wt. % saturated hydrocarbons; 0-5 wt. % unsaturated (non-aromatic) hydrocarbons; and 0-15 wt. % aromatic hydrocarbons.

In some examples, the composition can include one or more contaminants. Contaminants can, for example, comprise an alkali metal, an alkaline earth metal, a transition metal, a basic metal, a semimetal, a nonmetal, a halogen, a salt or compound thereof, or a combination thereof. Examples of contaminants include, but are not limited to, lithium, sodium, beryllium, magnesium, calcium, strontium, titanium, vanadium, chromium, manganese, iron, cobalt, nickel, copper, zinc, molybdenum, cadmium, mercury, aluminum, titanium silicon, tin, lead, nitrogen, phosphorus, arsenic, antimony, oxygen, sulfur, selenium, fluorine, chlorine, bromine, compounds thereof, and combinations thereof. In some examples, the composition includes a contaminant comprising chloride, nitrogen, silicon, sodium, iron, phosphorus, sulfur, calcium, nickel, copper, vanadium, or a combination thereof.

Contaminants are introduced during plastic formulation and manufacturing processes during the first life of plastic in conjunction with the source and collection method of the plastics.

For example, chloride sources in used plastics can comprise PVDC layers. PVDC is often used as a layer or coating in food and pharmaceutical packaging applications because it provides excellent barrier properties against moisture, UV light, acids, salts, and detergents as well as having good transparency. Despite design for recyclability formulation changes, PVDC is forecasted to increase at 3.2% annually through 2028 in the US. Packaging converters produce a range of monolayer and multi-layer packaging. Both types can become mixed in recycled streams. Post-consumer sources will contain higher volumes of materials containing chloride sources that can be difficult to differentiate and remove through standard sorting techniques.

Nitrogen sources used in plastics can, for example, be derived from pyrolysis of nylon (e.g., Nylon 6 (PA-6), Nylon-66 (PA-66) in used plastic sources, often from food and industrial packaging materials. Nylon is used in multilayer flexible packing films to protect oxygen-sensitive foods or when excellent oil and grease resistance and high mechanical strength are required, such as for processed meats and fish, and cheese and other dairy products. Nylon also provides a wide cold to hot temperature range (e.g., −60° C. to 150° C.), which enables foods to move through freezer to the microwave/oven without packaging degradation. In industrial packaging, nylon is often used as a reinforcing layer to provide high mechanical strength and excellent abrasion and puncture resistance (for example, in polypropylene supersacks that contain a nylon interlayer or straps). Nitrogen can also come from protein (food) residue on plastics that arises from the amino acids in decomposed protein. Post-consumer sources will contain higher volumes of materials containing nitrogen sources that can be difficult to differentiate and remove through standard sorting techniques.

Silicon sources in used plastics can, for example, comprise silica desiccant packages. In food packaging and processing plants, silicon products are widely used as release agents in a wide variety of materials and equipment, leaving residue on plastic surfaces. Silicon is also an additive that can be added to a wide range of materials to change the appearance, extrusion properties, and/or end-product characteristics; this applied to films as well as two-dimensional plastics. Post-consumer sources will contain higher volumes of materials containing silicon sources that can be difficult to differentiate and remove through standard sorting techniques.

Silicon dioxide can be applied in a very thin coating to plastics, specifically polyethylene, polypropylene, and/or polystyrene, to act as a barrier layer to improve the shelf life of oxygen and moisture sensitive food. This thin coating can be applied by a vacuum or plasma deposition process; the barrier layer and the plastic forma covalent bond. The $SiO_2$ barrier coatings are chemically inert and enable benefits in rigid and flexible food packaging applications, including, but not limited to, reducing oxygen and moisture permeability of plastics, ensuring aroma protection and retention of the smell and taste of contents, not sensitive to fluctuations in temperature and humidity, well-suited for pasteurization and sterilization processes, and can increase shelf life of foods without the addition of preservatives. The $SiO_2$ coatings are thin, e.g. significantly thinner than a human hair, and therefore have a negligible impact on the packing weight. For this reason, coated packaging is considered a mono-material that can be mechanically recycled. Recyclability initiatives are promoting the use of $SiO_2$ coatings as a replacement for PVDC and Nylon barriers in flexible and rigid packaging. Although these guidelines are intended for mechanically recycled plastics, several packaging forms and formulations are better suited for pyrolysis-based advanced recycling. $SiO_2$ coatings have the potential to be the “gift that keeps on giving”, especially when used in rigid and flexible polyethylene and polypropylene plastics that are mechanically recycled initially, which, after a few cycles, will then eventually become the used plastic feedstocks for advanced recycling; the silicon is predicted to accumulate and carry forward into each successive application.

Phosphorus-containing flame retardants are widely used in plastics where its rapid oxidation consumes all the oxygen present, thereby stopping the fire. Plastics commonly containing these flame retardants include, but are not limited to, engineered plastics, polyurethane foams, polyamides (e.g., nylon) and glass-fiber reinforced nylon, polyethylene and EVA co-polymers, and intumescent coatings on foams and polypropylene textiles. Phosphate esters are also used as flame retardant plasticizers in PVC, high impact polystyrene (HIPS), polycarbonate (PC), and acrylonitrile butadiene styrene (ABS). Phosphorus sources also include agricultural applications, such as residual glyphosate in HDPE containers and residual phosphorus fertilizers on ground-level films (e.g., mulch films). Post-consumer sources will contain higher volumes of materials containing phosphorus sources that can be difficult to differentiate and remove through standard sorting techniques.

Sources of sulfur, calcium, sodium, iron, phosphorus, or a combination thereof are additives, surface residues, and residual contamination of the incoming post-consumer and/or post-industrial plastics. A wash step can potentially remove certain surface residues, but would add cost and complexity to the advanced (e.g., pyrolysis based) recycling process. Accordingly, post-consumer sources will contain higher volumes of materials containing sources of sulfur, calcium, sodium, iron, phosphorus, or a combination thereof that can be difficult to differentiate and remove through standard sorting techniques.

Copper alloys are commonly and increasingly used to create molds for plastic injection molding processes due to their high thermal conductivity that removes hot spots, reduces warpage and reduces cycle time, ease of machining by a variety of processes, and corrosion resistance to water, cooling fluids and the plastics being injected. Copper alloys often contain nickel and silicon. Plastics manufactured in copper alloy molds can have residual amounts of copper, nickel, and silicon on their surface. In addition, the plating of plastic with nickel and copper can be an effective means of protecting a substrate against corrosion from environmental exposure and make it more resistant to damage from chemicals used in the manufacturing process. In some instances, the plating on plastic can increase the hardness, strength, and wear resistance of the substrate. The presence of copper and nickel on the surface of both pre-consumer and post-consumer sources can be difficult to differentiate and remove through standard sorting techniques.

In some examples, the composition has a total chloride content of 500 ppm or less (e.g., 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition is substantially free of chlorides. The total chloride content of the composition can be determined using any suitable method. In some examples, the total chloride content of the composition is determined using the steps described in ASTM D 7359.

The composition can, for example, have a nitrogen content of 600 ppm or less (e.g., 575 ppm or less, 550 ppm or less, 525 ppm or less, 500 ppm or less, 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of nitrogen. The nitrogen content of the composition can be determined using any suitable method, such as those known in the art. In some examples, the nitrogen content of the composition is determined using the steps described in ASTM D 4629.

The composition can, for example, have a silicon content of 2,000 ppm or less (e.g., 1900 ppm or less, 1,800 ppm or less, 1,700 ppm or less, 1,600 ppm or less, 1,500 ppm or less, 1,400 ppm or less, 1,300 ppm or less, 1,200 ppm or less, 1,100 ppm or less, 1,000 ppm or less, 950 ppm or less, 900 ppm or less, 850 ppm or less, 800 ppm or less, 750 ppm or less, 700 ppm or less, 650 ppm or less, 600 ppm or less, 550 ppm or less, 500 ppm or less, 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of silicon. The silicon content of the composition can be determined using any suitable method, such as those known in the art. In some examples, the silicon content of the composition is determined using the steps described in ASTM D 5185.

The composition can, for example, have a sodium content of 150 ppm or less (e.g., 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition is substantially free of sodium. The sodium content of the composition can be determined by any suitable method, such as those known in the art. In some examples, the sodium content of the composition is determined using the steps described in ASTM D 5185.

The composition can, for example, have an iron content of 10 ppm or less (e.g., 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition is substantially free of iron. The iron content of the composition can be determined using any suitable method, such as those known in the art. In some examples, the iron content of the composition is determined using the steps described in ASTM D 5185.

The composition can, for example, have a phosphorus content of 50 ppm or less (e.g., 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less).

In some examples, the composition can be substantially free of phosphorus. The phosphorus content of the composition can be determined using any suitable method, such as those known in the art. In some examples, the phosphorous content of the composition is determined using the steps described in ASTM D 5185.

The composition can, for example, have a sulfur content of 500 ppm or less (e.g., 475 ppm or less, 450 ppm or less, 425 ppm or less, 400 ppm or less, 375 ppm or less, 350 ppm or less, 325 ppm or less, 300 ppm or less, 275 ppm or less, 250 ppm or less, 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of sulfur. The sulfur content of the composition can be determined by any suitable methods, such as those known in the art. In some examples, the sulfur content of the composition is determined using the steps described in ASTM D 4294.

The composition can, for example, have a calcium content of 50 ppm or less (e.g., 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of calcium. The calcium content of the composition can be determined using any suitable methods, such as those known in the art. In some examples, the calcium content of the composition is determined using the steps described in ASTM D 5185.

The composition can, for example, have a copper content of 10 ppm or less (e.g., 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of copper. The copper content of the composition can be determined using any suitable method, such as those known in the art. In some examples, the copper content of the composition is determined using the steps described in ASTM D 5185.

The composition can, for example, have a nickel content of 250 ppm or less (e.g., 225 ppm or less, 200 ppm or less, 175 ppm or less, 150 ppm or less, 125 ppm or less, 100 ppm or less, 75 ppm or less, 50 ppm or less, 45 ppm or less, 40 ppm or less, 35 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of nickel. The nickel content of the composition can be determined using any suitable method, such as those known in the art. In some examples, the nickel content of the composition is determined using the steps described in ASTM D 5185.

The composition can, for example, have a vanadium content of 25 ppm or less (e.g., 20 ppm or less, 15 ppm or less, 10 ppm or less, 9 ppm or less, 8 ppm or less, 7 ppm or less, 6 ppm or less, 5 ppm or less, 4.5 ppm or less, 4 ppm or less, 3.5 ppm or less, 3 ppm or less, 2.5 ppm or less, 2 ppm or less, 1.5 ppm or less, 1 ppm or less, 0.75 ppm or less, 0.5 ppm or less, 0.25 ppm or less, 0.1 ppm or less, 0.075 ppm or less, 0.05 ppm or less, 0.025 ppm or less, 0.01 ppm or less, 0.0075 ppm or less, or 0.005 ppm or less). In some examples, the composition can be substantially free of vanadium. The vanadium content of the composition can be determined using any suitable method, such as those known in the art. In some examples, the vanadium content of the composition is determined using the steps described in ASTM D 5185.

In some examples, the composition has a total chloride content of 500 ppm or less; a nitrogen content of 600 ppm or less; and a silicon content of 2,000 ppm or less. In some examples, the composition has a total chloride content of 500 ppm or less; a nitrogen content of 600 ppm or less; a silicon content of 2,000 ppm or less; and a sodium content of 150 ppm or less. In some examples, the composition has a total chloride content of 500 ppm or less; a nitrogen content of 600 ppm or less; a silicon content of 2,000 ppm or less; a sodium content of 150 ppm or less; an iron content of 10 ppm or less; a sulfur content of 500 ppm or less; and a calcium content of 50 ppm or less. In some examples, the composition has a total chloride content of 500 ppm or less; a nitrogen content of 600 ppm or less; a silicon content of 2,000 ppm or less; a sodium content of 150 ppm or less; an iron content of 10 ppm or less; a phosphorus content of 50 ppm or less; a sulfur content of 500 ppm or less; and a calcium content of 50 ppm or less. In some examples, the composition has a total chloride content of 500 ppm or less; a nitrogen content of 600 ppm or less; a silicon content of 2,000 ppm or less; a sodium content of 150 ppm or less; an iron content of 10 ppm or less; a phosphorus content of 50 ppm or less; a sulfur content of 500 ppm or less; a calcium content of 50 ppm or less; a copper content of 10 ppm or less; a nickel content of 250 ppm or less; and a vanadium content of 25 ppm or less.

The composition can, for example, have a water by distillation amount of 0.5 vol. % or less (e.g., 0.45 vol. % or less, 0.4 vol. % or less, 0.35 vol. % or less, 0.3 vol. % or less, 0.25 vol. % or less, 0.2 vol. % or less, 0.15 vol. % or less, 0.1 vol. % or less, 0.075 vol. % or less, 0.05 vol. % or less, 0.025 vol. % or less, or 0.01 vol. % or less). In some examples, the composition can have a water by distillation amount of 0 vol. % or more (e.g., 0.01 vol. % or more, 0.025 vol. % or more, 0.05 vol. % or more, 0.075 vol. % or more, 0.1 vol. % or more, 0.15 vol. % or more, 0.2 vol. % or more, 0.25 vol. % or more, 0.3 vol. % or more, 0.35 vol. % or more, or 0.4 vol. % or more). The amount of water by distillation in the composition can range from any of the minimum values described above to any of the maximum values described above. For example, the composition can have a water by distillation amount of from 0 to 0.5 vol. % (e.g., from 0 to 0.25 vol. %, from 0.25 to 0.5 vol. %, from 0 to 0.1 vol. %, from 0.1 to 0.2 vol. %, from 0.2 to 0.3 vol.

%, from 0.3 to 0.4 vol. %, from 0.4 to 0.5 vol. %, from 0 to 0.4 vol. %, from 0 to 0.3 vol. %, from 0 to 0.2 vol. %, from 0 to 0.05 vol. %, or from 0 to 0.01 vol. %). The amount of water by distillation in the composition can be determined by any suitable method, such as those known in the art. In some examples, the water by distillation amount in the composition is determined using the steps described in ASTM D 95.

The composition can, for example, have a total sediment content of 0.5 vol. % or less (e.g., 0.45 vol. % or less, 0.4 vol. % or less, 0.35 vol. % or less, 0.3 vol. % or less, 0.25 vol. % or less, 0.2 vol. % or less, 0.15 vol. % or less, 0.1 vol. % or less, 0.075 vol. % or less, 0.05 vol. % or less, 0.025 vol. % or less, or 0.01 vol. % or less). In some examples, the composition can have a total sediment content of 0 vol. % or more (e.g., 0.01 vol. % or more, 0.025 vol. % or more, 0.05 vol. % or more, 0.075 vol. % or more, 0.1 vol. % or more, 0.15 vol. % or more, 0.2 vol. % or more, 0.25 vol. % or more, 0.3 vol. % or more, 0.35 vol. % or more, or 0.4 vol. % or more). The total sediment content of the composition can range from any of the minimum values described above to any of the maximum values described above. For example, the composition can have a total sediment content of from 0 to 0.5 vol. % (e.g., from 0 to 0.25 vol. %, from 0.25 to 0.5 vol. %, from 0 to 0.1 vol. %, from 0.1 to 0.2 vol. %, from 0.2 to 0.3 vol. %, from 0.3 to 0.4 vol. %, from 0.4 to 0.5 vol. %, from 0 to 0.4 vol. %, from 0 to 0.3 vol. %, from 0 to 0.2 vol. %, from 0 to 0.05 vol. %, or from 0 to 0.01 vol. %). The total sediment content of the composition can be determined by any suitable method, such as those known in the art. In some examples, the total sediment content of the composition is determined using the steps described in ASTM D 4870.

The composition can, for example, have an n-heptane insoluble content of 0.5 wt. % or less (e.g., 0.45 wt. % or less, 0.4 wt. % or less, 0.35 wt. % or less, 0.3 wt. % or less, 0.25 wt. % or less, 0.2 wt. % or less, 0.15 wt. % or less, 0.1 wt. % or less, 0.075 wt. % or less, 0.05 wt. % or less, 0.025 wt. % or less, or 0.01 wt. % or less). In some examples, the composition can have an n-heptane insoluble content of 0 wt. % or more (e.g., 0.01 wt. % or more, 0.025 wt. % or more, 0.05 wt. % or more, 0.075 wt. % or more, 0.1 wt. % or more, 0.15 wt. % or more, 0.2 wt. % or more, 0.25 wt. % or more, 0.3 wt. % or more, 0.35 wt. % or more, or 0.4 wt. % or more). The n-heptane insoluble content of the composition can range from any of the minimum values described above to any of the maximum values described above. For example, the composition can have an n-heptane insoluble content of from 0 to 0.5 wt. % (e.g., from 0 to 0.25 wt. %, from 0.25 to 0.5 wt. %, from 0 to 0.1 wt. %, from 0.1 to 0.2 wt. %, from 0.2 to 0.3 wt. %, from 0.3 to 0.4 wt. %, from 0.4 to 0.5 wt. %, from 0 to 0.4 wt. %, from 0 to 0.3 wt. %, from 0 to 0.2 wt. %, from 0 to 0.05 wt. %, or from 0 to 0.01 wt. %). The n-heptane insoluble content of the composition can be determined by any suitable method, such as those known in the art. In some examples, the n-heptane insoluble content of the composition is determined using the steps described in ASTM D 3279.

The composition can, for example, have a total acid number of 1 mg KOH/g or less (e.g., 0.9 mg KOH/g or less, 0.8 mg KOH/g or less, 0.7 mg KOH/g or less, 0.6 mg KOH/g or less, 0.5 mg KOH/g or less, 0.4 mg KOH/g or less, 0.3 mg KOH/g or less, 0.2 mg KOH/g or less, or 0.1 mg KOH/g or less). In some examples, the composition can have a total acid number of 0 mg KOH/g or more (e.g., 0.1 mg KOH/g or more, 0.2 mg KOH/g or more, 0.3 mg KOH/g or more, 0.4 mg KOH/g or more, 0.5 mg KOH/g or more, 0.6 mg KOH/g or more, 0.7 mg KOH/g or more, 0.8 mg KOH/g or more, or 0.9 mg KOH/g or more). The total acid number of the composition can range from any of the minimum values described above to any of the maximum values described above. For example, the composition can have a total acid number of from 0 to 1 mg KOH/g (e.g., from 0 to 0.5 mg KOH/g, from 0.5 to 1 mg KOH/g, from 0 to 0.2 mg KOH/g, from 0.2 to 0.4 mg KOH/g, from 0.4 to 0.6 mg KOH/g, from 0.6 to 0.8 mg KOH/g, from 0.8 to 1 mg KOH/g, from 0 to 0.8 mg KOH/g, from 0 to 0.6 mg KOH/g, from 0 to 0.4 mg KOH/g, or from 0 to 0.1 mg KOH/g). The total acid number of the composition can be determined using any suitable method, such as those known in the art. In some examples, the total acid number of the composition is determined using the steps described in ASTM D 664.

The composition can, for example, have a Reid Vapor Pressure of 12.5 psig or less (e.g., 12 psig or less, 11.5 psig or less, 11 psig or less, 10.5 psig or less, 10 psig or less, 9.5 psig or less, 9 psig or less, 8.5 psig or less, 8 psig or less, 7.5 psig or less, 7 psig or less, 6.5 psig or less, 6 psig or less, 5.5 psig or less, 5 psig or less, 4.5 psig or less, 4 psig or less, 3.5 psig or less, 3 psig or less, or 2.5 psig or less). In some examples, the composition can have a Reid Vapor Pressure of 2 psig or more (e.g., 2.5 psig or more, 3 psig or more, 3.5 psig or more, 4 psig or more, 4.5 psig or more, 5 psig or more, 5.5 psig or more, 6 psig or more, 6.5 psig or more, 7 psig or more, 7.5 psig or more, 8 psig or more, 8.5 psig or more, 9 psig or more, 9.5 psig or more, 10 psig or more, 10.5 psig or more, or 11 psig or more). The Reid Vapor Pressure of the composition can range from any of the minimum values described above to any of the maximum values described above. For example, the composition can have a Reid Vapor Pressure of from 2 to 12.5 psig (e.g., from 5 to 7 psig, from 7 to 12.5 psig, from 2 to 4 psig, from 4 to 6 psig, from 6 to 8 psig, from 8 to 10 psig, from 10 to 12.5 psig, from 2 to 12 psig, from 2 to 11 psig, from 2 to 10 psig, from 2 to 9 psig, from 2 to 8 psig, from 2 to 6 psig, from 2 to 5 psig, from 3 to 12.5 psig, from 4 to 12.5 psig, from 5 to 12.5 psig, from 6 to 12.5 psig, from 7 to 12.5 psig, from 8 to 12.5 psig, from 9 to 12.5 psig, from 3 to 12 psig, from 5 to 11 psig, or from 7 to 10 psig). The Reid Vapor Pressure of the composition can be determined using any suitable method, such as those known in the art. In some examples, the Reid Vapor Pressure of the composition is determined using the steps described in ASTM D 5191.

In some examples, the composition has a Reid Vapor Pressure of 12.5 or less, a total chloride content of 500 ppm or less; a nitrogen content of 600 ppm or less; and a silicon content of 2,000 ppm or less. In some examples, the composition has a Reid Vapor Pressure of 12.5 or less, a total chloride content of 500 ppm or less; a nitrogen content of 600 ppm or less; a silicon content of 2,000 ppm or less; and a sodium content of 150 ppm or less. In some examples, the composition has a Reid Vapor Pressure of 12.5 or less, a total chloride content of 500 ppm or less; a nitrogen content of 600 ppm or less; a silicon content of 2,000 ppm or less; a sodium content of 150 ppm or less; an iron content of 10 ppm or less; a sulfur content of 500 ppm or less; and a calcium content of 50 ppm or less. In some examples, the composition has a Reid Vapor Pressure of 12.5 or less, a total chloride content of 500 ppm or less; a nitrogen content of 600 ppm or less; a silicon content of 2,000 ppm or less; a sodium content of 150 ppm or less; an iron content of 10 ppm or less; a phosphorus content of 50 ppm or less; a sulfur content of 500 ppm or less; and a calcium content of 50 ppm or less. In some examples, the composition has a Reid Vapor Pressure of 12.5 or less, total chloride content of 500 ppm or less; a nitrogen content of 600 ppm or less; a silicon content of 2,000 ppm or less; a sodium content of 150 ppm or less; an iron content of 10 ppm or less; a phosphorus content of 50 ppm or less; a sulfur content of 500 ppm or less; a calcium content of 50 ppm or less; a copper content of 10 ppm or less; a nickel content of 250 ppm or less; and a vanadium content of 25 ppm or less.

In some examples, the compositions disclosed herein can comprise any of the waxes and/or any of the oils disclosed herein.

Also disclosed herein are compositions comprising any of waxes disclosed herein and any of the oils disclosed herein.

For example, the composition can comprise 50% or more of the oil by volume (e.g., 51% or more, 52% or more, 53% or more, 54% or more, 55% or more, 56% or more, 57% or more, 58% or more, 59% or more, 60% or more, 61% or more, 62% or more, 63% or more, 64% or more, 65% or more, 66% or more, 67% or more, 68% or more, or 69% or more). In some examples, the composition can comprise 70% or less of the oil by volume (e.g., 69% or less, 68% or less, 67% or less, 66% or less, 65% or less, 64% or less, 63% or less, 62% or less, 61% or less, 60% or less, 59% or less, 58% or less, 57% or less, 56% or less, 55% or less, 54% or less, 53% or less, 52% or less, or 51% or less). The amount of oil by volume in the composition can range from any of the minimum values described above to any of the maximum values described above. For example, the composition can comprise from 50% to 70% of the oil by volume (e.g., from 50% to 60%, from 60% to 70%, from 50% to 55%, from 55% to 60%, from 60% to 65%, from 65% to 70%, from 50% to 65%, from 55% to 70%, or from 55% to 65%).

In some examples, the composition can comprise 30% or more of the wax by volume (e.g., 31% or more, 32% or more, 33% or more, 34% or more, 35% or more, 36% or more, 37% or more, 38% or more, 39% or more, 40% or more, 41% or more, 42% or more, 43% or more, 44% or more, 45% or more, 46% or more, 47% or more, 48% or more, or 49% or more). In some examples, the composition can comprise 50% or less of the wax by volume (e.g., 49% or less, 48% or less, 47% or less, 46% or less, 45% or less, 44% or less, 43% or less, 42% or less, 41% or less, 40% or less, 39% or less, 38% or less, 37% or less, 36% or less, 35% or less, 34% or less, 33% or less, 32% or less, or 31% or less). The amount of wax by volume in the composition can range from any of the minimum values described above to any of the maximum values described above. For example, the composition can comprise from 30% to 50% of the wax by volume (e.g., from 30% to 40%, from 40% to 50%, from 30% to 35%, from 35% to 40%, from 40% to 45%, from 45% to 50%, from 30% to 45%, from 35% to 50%, or from 35% to 45%).

For example, the composition can comprise 50-70% of the oil and 30-50% of the wax by volume. For example, the composition can comprise 65% oil and 35% wax by volume. In some examples, the composition comprises 50% oil and 50% wax by volume. In some examples, the composition comprises a blend of the wax and the oil.

Systems and Methods of Making

Also disclosed herein are methods of making any of the compositions (e.g., waxes, oil, blends, etc.) described herein.

For example, disclosed herein are systems and methods for making hydrocarbon based compositions derived from pyrolysis of a feedstock comprising post-consumer and/or post-industrial plastics, such as any of the compositions described herein above. In some examples, the compositions disclosed herein can comprise a wax, an oil, or a combination thereof.

Recycling of plastics via pyrolysis is a technology that generates products with a broad range of quality dependent upon a variety of factors, including the feedstock and manufacturing process. Pyrolysis depolymerizes plastics into products comprised of building block molecules. Contaminants are introduced during plastic formulation and manufacturing processes during the first life of plastic and may also be introduced during the sourcing and collection of plastics.

For example, described herein are systems and methods for plastic to liquids conversion that can accept, for example, polyethylene, polypropylene, and/or polystyrene plastics that are neither suitable nor desirable for conventional (mechanical) plastic recycling. The plastic is thermally converted to liquid (e.g., oil) and wax hydrocarbon products. The hydrocarbon products can, for example, be used in the production of new plastics through conventional hydrocarbon cracking units. The hydrocarbon products can, for example, also be used as an alternative for naphtha, fuel, etc. The systems and methods herein can also produce char/coke and combustible gases, e.g. as products or byproducts.

Plastics that are typically received would have otherwise been destined for disposal at a landfill or waste to energy plant because of their physical form and/or make-up prevents them from being effectively recycled by current conventional (mechanical) recycling means. Most film plastics fall into this category, as do others that have intermixed types of plastic resins or simply have contaminants (such as paper labels, organic food residue, functional additives, colorants, etc.) that make conventional (mechanical) recycling uneconomical.

The systems and/or methods described herein can, for example, operate on an industrial scale.

In some examples, the systems and/or methods described herein can process 5 metric tons or more of plastic feedstock per day (e.g., 5.5 metric tons or more, 6 metric tons or more, 6.5 metric tons or more, 7 metric tons or more, 7.5 metric tons or more, 8 metric tons or more, 8.5 metric tons or more, 9 metric tons or more, 9.5 metric tons or more, 10 metric tons or more, 11 metric tons or more, 12 metric tons or more, 13 metric tons or more, 14 metric tons or more, 15 metric tons or more, 20 metric tons or more, 25 metric tons or more, 30 metric tons or more, 35 metric tons or more, 40 metric tons or more, 45 metric tons or more, 50 metric tons or more, 60 metric tons or more, 70 metric tons or more, 80 metric tons or more, 90 metric tons or more, 100 metric tons or more, 125 metric tons or more, 150 metric tons or more, 175 metric tons or more, 200 metric tons or more, 225 metric tons or more, 250 metric tons or more, 300 metric tons or more, 350 metric tons or more, 400 metric tons or more, 450 metric tons or more, 500 metric tons or more, 600 metric tons or more, 700 metric tons or more, 800 metric tons or more, or 900 metric tons or more). In some examples, the systems and methods described herein can process 1,000 metric tons or less of plastic feedstock per day (e.g., 900 metric tons or less, 800 metric tons or less, 700 metric tons or less, 600 metric tons or less, 500 metric tons or less, 450 metric tons or less, 400 metric tons or less, 350 metric tons or less, 300 metric tons or less, 250 metric tons or less, 225 metric tons or less, 200 metric tons or less, 175 metric tons or less, 150 metric tons or less, 125 metric tons or less, 100 metric tons or less, 90 metric tons or less, 80 metric tons or less, 70 metric tons or less, 60 metric tons or less, 50 metric tons or less, 45 metric tons or less, 40 metric tons or less, 35 metric tons or less, 30 metric tons or less, 25 metric tons or less, 20 metric tons or less, 15 metric tons or less, 14 metric tons or less, 13 metric tons or less, 12 metric tons or less, 11 metric tons or less, 10 metric tons or less, 9.5 metric tons or less, 9 metric tons or less, 8.5 metric tons or less, 8 metric tons or less, 7.5 metric tons or less, 7 metric tons or less, 6.5 metric tons or less, or 6 metric tons or less). The amount of plastic feedstock processed by the systems and/or methods herein can range from any of the minimum values described above to any of the maximum values described above. For example, the systems and/or methods described herein can process from 5 to 1,000 metric tons of plastic feedstock per day (e.g., from 5 to 500 metric tons, from 500 to 1,000 metric tons, from 5 to 200 metric tons, from 200 to 400 metric tons, from 400 to 600 metric tons, from 600 to 800 metric tons, from 800 to 1,000 metric tons, from 5 to 800 metric tons, from 5 to 600 metric tons, from 5 to 400 metric tons, from 5 to 100 metric tons, from 5 to 50 metric tons, from 5 to 25 metric tons, from 10 to 1,000 metric tons, from 25 to 1,000 metric tons, from 50 to 1,000 metric tons, from 100 to 1,000 metric tons, from 200 to 1,000 metric tons, from 400 to 1,000 metric tons, from 600 to 1,000 metric tons, from 10 to 900 metric tons, from 15 to 800 metric tons, from 25 to 750 metric tons, or from 50 to 500 metric tons).

In some examples, the systems and/or methods described herein can produce 10,000 gallons of pyrolysis product (e.g., oil and/or wax, etc.) or more in an amount of time (e.g., 11,000 gallons or more, 12,000 gallons or more, 13,000 gallons or more, 14,000 gallons or more, 15,000 gallons or more, 20,000 gallons or more, 25,000 gallons or more, 30,000 gallons or more, 35,000 gallons or more, 40,000 gallons or more, 45,000 gallons or more, 50,000 gallons or more, 60,000 gallons or more, 70,000 gallons or more, 80,000 gallons or more, 90,000 gallons or more, 100,000 gallons or more, 125,000 gallons or more, 150,000 gallons or more, 175,000 gallons or more, 200,000 gallons or more, 225,000 gallons or more, 250,000 gallons or more, 300,000 gallons or more; 350,000 gallons or more, 400,000 gallons or more, 450,000 gallons or more, 500,000 gallons or more, 600,000 gallons or more, 700,000 gallons or more, 800,000 gallons or more, or 900,000 gallons or more). In some examples, the systems and/or methods described herein can produce 1,000,000 gallons or less of pyrolysis product (e.g., oil and/or wax, etc.) or more in an amount of time (e.g., 900,000 gallons or less, 800,000 gallons or less, 700,000 gallons or less, 600,000 gallons or less, 500,000 gallons or less, 450,000 gallons or less, 400,000 gallons or less, 350,000 gallons or less, 300,000 gallons or less, 250,000 gallons or less, 225,000 gallons or less, 200,000 gallons or less, 175,000 gallons or less, 150,000 gallons or less, 125,000 gallons or less, 100,000 gallons or less, 90,000 gallons or less, 80,000 gallons or less, 70,000 gallons or less, 60,000 gallons or less, 50,000 gallons or less, 45,000 gallons or less, 40,000 gallons or less, 35,000 gallons or less, 30,000 gallons or less, 25,000 gallons or less, 20,000 gallons or less, 15,000 gallons or less, 14,000 gallons or less, 13,000 gallons or less, or 12,000 gallons or less). The amount of pyrolysis product produced in the amount of time by the systems and/or methods described herein can range from any of the minimum values described above to any of the maximum values described above. For example, the systems and/or methods described herein can produce from 10,000 to 1,000,000 gallons of pyrolysis product (e.g., oil and/or wax, etc.) or more in an amount of time (e.g., from 10,000 to 500,000 gallons, from 500,000 to 1,000,000 gallons, from 10,000 to 200,000 gallons, from 200,000 to 400,000 gallons, from 400,000 to 600,000 gallons, from 600,000 to 800,000 gallons, from 800,000 to 1,000,000 gallons, from 10,000 to 800,000 gallons, from 10,000 to 600,000 gallons, from 10,000 to 400,000 gallons, from 10,000 to 200,000 gallons, from 10,000 to 100,000 gallons, from 10,000 to 50,000 gallons, from 10,000 to 25,000 gallons, from 25,000 to 1,000,000 gallons, from 50,000 to 1,000,000 gallons, from 100,000 to 1,000,000 gallons, from 200,000 to 1,000,000 gallons, from 400,000 to 1,000,000 gallons, from 600,000 to 1,000,000 gallons, from 15,000 to 900,000 gallons, or from 20,000 to 800,000 gallons).

The amount of time in which the pyrolysis product is produced by the systems and/or methods can, for example, be 5 days or more (e.g., 6 days or more, 7 days or more, 8 days or more, 9 days or more, 10 days or more, 11 days or more, 12 days or more, 13 days or more, 14 days or more, 15 days or more, 16 days or more, 17 days or more, 18 days or more, 19 days or more, 20 days or more, 21 days or more, 22 days or more, 23 days or more, 24 days or more, 25 days or more, 26 days or more, 27 days or more, 28 days or more, 29 days or more, 30 days or more, 35 days or more, 40 days or more, 45 days or more, 50 days or more, 60 days or more, 70 days or more, or 80 days or more). In some examples, the amount of time in which the pyrolysis product is produced by the systems and/or methods can be 90 days or less (e.g., 80 days or less, 70 days or less, 60 days or less, 50 days or less, 45 days or less, 40 days or less, 35 days or less, 30 days or less, 29 days or less, 28 days or less, 27 days or less, 26 days or less, 25 days or less, 24 days or less, 23 days or less, 22 days or less, 21 days or less, 20 days or less, 19 days or less, 18 days or less, 17 days or less, 16 days or less, 15 days or less, 14 days or less, 13 days or less, 12 days or less, 11 days or less, 10 days or less, 9 days or less, 8 days or less, or 7 days or less). The amount of time in which the pyrolysis product is produced by the systems and/or methods can range from any of the minimum values described above to any of the maximum values described above. For example, the amount of time in which the pyrolysis product is produced by the systems and/or methods can be from 5 to 90 days (e.g., from 4 to 45 days, from 45 to 90 days, from 5 to 30 days, from 30 to 60 days, from 60 to 90 days, from 5 to 80 days, from 5 to 70 days, from 5 to 60 days, from 5 to 50 days, from 5 to 40 days, from 5 to 21 days, from 5 to 14 days, from 5 to 10 days, from 7 to 90 days, from 10 to 90 days, from 14 to 90 days, from 21 to 90 days, from 30 to 90 days, from 40 to 90 days, from 50 to 90 days, from 70 to 90 days, from 7 to 80 days, or from 10 to 60 days).

In some examples, the systems and/or methods described herein can process from 5 to 1,000 metric tons per day of plastic feedstock and produce from 10,000 to 1,000,000 gallons of pyrolysis product (e.g., oil, wax, or a combination thereof) per 5 to 90 days. In some examples, the systems and/or methods described herein can produce 10,000 gallons of pyrolysis product (e.g., oil and/or wax, etc.) or more in an amount of time FIGS. 1-5 are block flow diagrams of example systems and methods described herein. The systems and methods can, for example, include intake of plastic feedstock, sorting and/or reducing the size of the plastic feedstock, followed by pyrolysis and/or removal of contaminants to produce the hydrocarbon product, which can optionally be post-treated.

FIG. 1 depicts an example system S100*a* for pyrolyzing plastic feedstock comprising post-consumer and/or post-industrial plastics. In the illustrated implementation of FIG. 1, the system S100*a* comprises a plastic feedstock infeed apparatus S102, a size reduction and/or sorting apparatus S104, a pyrolysis and/or contaminant removal apparatus S108, and one or more optional post-treatment and/or contaminant removal apparatuses S114*a*, S114*b*.

As shown in FIG. 1, the plastic feedstock infeed apparatus S102 is configured for receiving plastic feedstock (e.g., plastic feedstock deposited into the plastic feedstock infeed apparatus S102). In various implementations, the plastic feedstock received by the plastic feedstock infeed apparatus S102 can include any of the feedstocks described in the "Feedstock" section herein (e.g., post-consumer and/or post-industrial plastics). In various implementations, the plastic feedstock infeed apparatus S102 may comprise an infeed conveyer, for example, as described in the "Infeed" section herein. As depicted in FIG. 1, the plastic feedstock can be fed into the system S100*a* via the plastic feedstock infeed apparatus S102.

In the illustrated implementation, the plastic infeed apparatus S102 directs the plastic feedstock to the size reduction and/or sorting apparatus S104 (e.g., via a conveyor). In various implementations, the size reduction and/or sorting apparatus S104 is configured for reducing the size of the plastic feedstock and/or sorting the plastic feedstock from contaminants. For example, in the illustrated implementation of FIG. 1, contaminants S106 are removed from the plastic feedstock. In some implementations, the size reduction and/or sorting apparatus S104 may not remove contaminants. In various implementations, the size reduction and/or sorting apparatus S104 may comprise any of the sorting apparatuses or devices described in the "Sorting" section herein and/or any of the size reduction apparatuses or devices described in the "Size Reduction" section herein, either alone or in combination.

Following size reduction and/or sorting of the plastic feedstock, the size reduction and/or sorting apparatus S104 then directs the plastic feedstock into a pyrolysis and/or contaminant removal apparatus S108 as shown in FIG. 1. The pyrolysis and/or contaminant removal apparatus S108 is generally configured for pyrolyzing the plastic feedstock to generate a product S112 (e.g., hydrocarbon vapor). Optionally, the pyrolysis and/or contaminant removal apparatus S108 may be configured for removing vent gas and/or contaminants S110. In various implementations, the pyrolysis and/or contaminant removal apparatus S108 may comprise one or more of the pyrolysis and/or contaminant removal apparatuses or devices described in the "Melting, Removal of Contaminants, and/or Pyrolysis," "Extruders," and "Pyrolysis Reactors" sections herein.

In various implementations, the product S112 shown in FIG. 1 may comprise any of the compositions described in the "Compositions" section herein. For example, in some implementations, the product S112 may comprise a condensable portion that is condensable at ambient pressure (e.g., wax and/or oil) and/or a non-condensable portion that is not condensable at ambient pressure (e.g., gas, for example, the gas described in the "Pyrolysis Reactors" and "Vaporized Product Removal" sections herein). In some implementations, if the product S112 includes a condensable portion, the condensable portion or a portion thereof may be recycled back into the pyrolysis and/or contaminant removal apparatus S108, for example, to be further pyrolyzed into a non-condensable product (e.g., gas, for example, the gas described in the "Pyrolysis Reactors" and "Vaporized Product Removal" sections herein).

In some examples, the product S112 may be directly generated by the pyrolysis and/or contaminant removal apparatus S108. In other examples, the product S112 may be generated by the optional post-treatment and/or contaminant removal apparatus S114*a* (e.g., configured for performing post-treatment or contaminant removal following the pyrolysis and/or contaminant removal apparatus S108). In other examples, the product S112 may be directly generated by the pyrolysis and/or contaminant removal apparatus S108 and also be further processed by an optional post-treatment and/or contaminant removal apparatus S114*b*. In other examples, the product S112 may be generated by the optional post-treatment and/or contaminant removal apparatus S114*a* after the pyrolysis and/or contaminant removal apparatus S108 and also be further processed by the optional post-treatment and/or contaminant removal apparatus S114*b*. In various implementations, the optional post-treatment and/or contaminant removal apparatuses S114*a*, S114*b* can include any of the post-treatment apparatuses or devices described in the "Post-Treatment" section herein and/or any of the contaminant removal apparatuses and devices described in the "Melting, Removal of Contaminants, and/or Pyrolysis" section herein.

Figure 2:
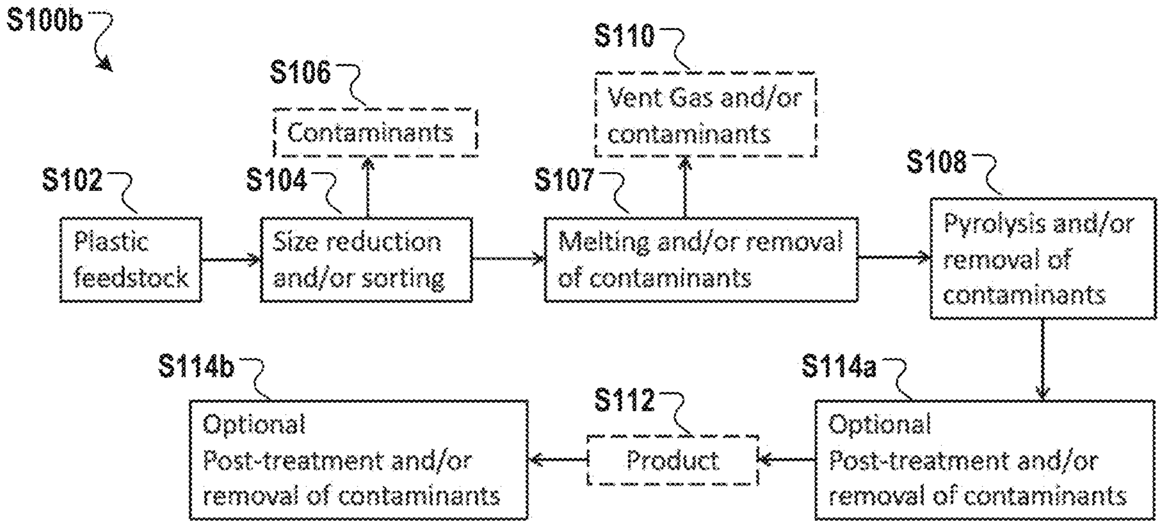
FIG. 2. Schematic diagram of an example system and/or method as disclosed herein according to one implementation.

FIG. 2 depicts another example system S100*b* for pyrolyzing plastic feedstock comprising post-consumer and/or post-industrial plastics (like numbers refer to like elements previously described with respect to the system S100*a* of FIG. 1). In the illustrated implementation of FIG. 2, the system S100*b* comprises the plastic feedstock infeed apparatus S102, the size reduction and/or sorting apparatus S104, a melting and/or contaminant removal apparatus S107, the pyrolysis and/or contaminant removal apparatus S108, and one or more optional post-treatment and/or contaminant removal apparatuses S114*a*, S114*b*.

In the illustrated implementation of FIG. 2, the size reduction and/or sorting apparatus S104 directs the plastic feedstock S102 into the melting and/or contaminant removal apparatus S107. In various implementations, the melting and/or contaminant removal apparatus S107 is configured for melting the plastic feedstock and removing vent gas and/or contaminants (shown as element S110 in FIG. 2). In other examples, melting and/or contaminant removal apparatus S107 may not remove vent gas and/or contaminants. In various implementations, the melting and/or contaminant removal apparatus S107 may comprise one or more of the pyrolysis and/or contaminant removal apparatuses or devices described in the "Melting, Removal of Contaminants, and/or Pyrolysis" and "Extruders" sections herein.

The melting and/or contaminant removal apparatus S107 is configured for directing the molten (or semi-molten) plastic feedstock into the pyrolysis and/or contaminant removal apparatus S108. As explained with respect to FIG. 1, the pyrolysis and/or contaminant removal apparatus S108 is generally configured for pyrolyzing the plastic feedstock and producing a product S112 (which may be optionally subjected to post-treatment or contaminant removal by the one or more optional post-treatment and/or contaminant removal apparatuses S114*a*, S114*b*).

Figure 3:
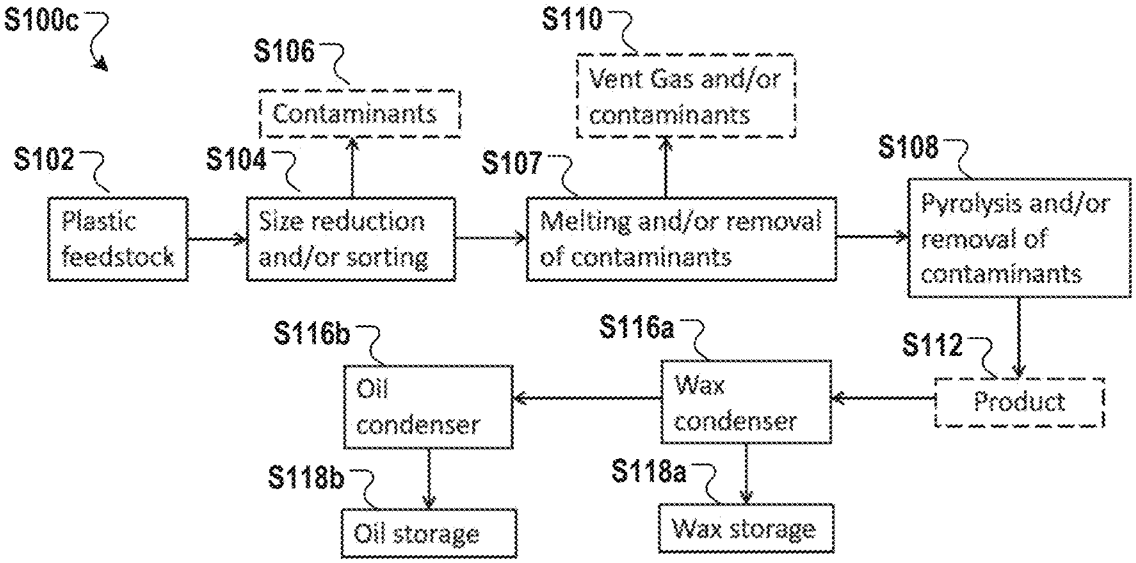
FIG. 3. Schematic diagram of an example system and/or method as disclosed herein according to one implementation.

FIG. 3 depicts another example system S100*c* for pyrolyzing plastic feedstock comprising post-consumer and/or post-industrial plastics (like numbers refer to like elements previously described with respect to the systems S100*a*, S100*b* of FIGS. 1 and 2). In the illustrated implementation of FIG. 3, the system S100*c* comprises a plastic feedstock infeed apparatus S102, a size reduction and/or sorting apparatus S104, a melting and/or contaminant removal apparatus S107, a pyrolysis and/or contaminant removal apparatus S108, a wax condenser S116*a*, an oil condenser S116*b*, a wax storage apparatus S118*a*, and an oil storage apparatus S118*b*. Optional post-treatment and/or contaminant removal apparatuses are not shown, however, it is understood that they may also be included (e.g., as in the system S100*b* of FIG. 2).

In the illustrated implementation of FIG. 3, the product S112 is directed from the pyrolysis and/or contaminant removal apparatus S108 to the wax condenser S116*a*. In various implementations, the wax condenser S116*a* is configured for condensing at least a portion of the product S112 into a wax. The wax produced by the wax condenser S116*a* is then collected and stored in a wax storage apparatus S118*a*. The remaining product S112 is then directed into the oil condenser S116*b*, which condenses the remainder of the product S112 into an oil. The oil produced by the oil condenser S116*b* is collected and stored in an oil storage apparatus S118*b*.

In various implementations, the wax condenser S116*a* and the oil condenser S116*b* may comprise any of the condensers described in the "Vaporized Product Recovery" section herein. In some examples, the wax condenser S116*a* can generate any of the waxes described in the "Wax" section herein. In some examples, the oil condenser S116*b* can generate any of the oils described in the "Oil" section herein. In some examples, the wax storage apparatus S118*a* and the oil storage apparatus S118*b* may comprise any of the storage apparatuses described in the "Product Storage" section herein.

In some examples, the system S100*c* may use other apparatuses besides condensers for product recovery (e.g., any of the other product recovery apparatuses described in the "Vaporized Product Recovery" section herein). In some examples, the system S100*c* may include only one condenser or other product recovery apparatus. In other examples, the system S100*c* may include more than two condensers or other product recovery apparatuses. In some examples, the system S100*c* may include only one storage apparatus. In other examples, the system S100*c* may include more than two storage apparatuses. In some examples, the system S100*c* may use other apparatuses (e.g., any of the other product recovery apparatuses described in the "Vaporized Product Recovery" section herein) to recover non-condensable product (e.g., gas, for example, the gas described in the "Pyrolysis Reactors" and "Vaporized Product Removal" sections herein).

Figure 4:
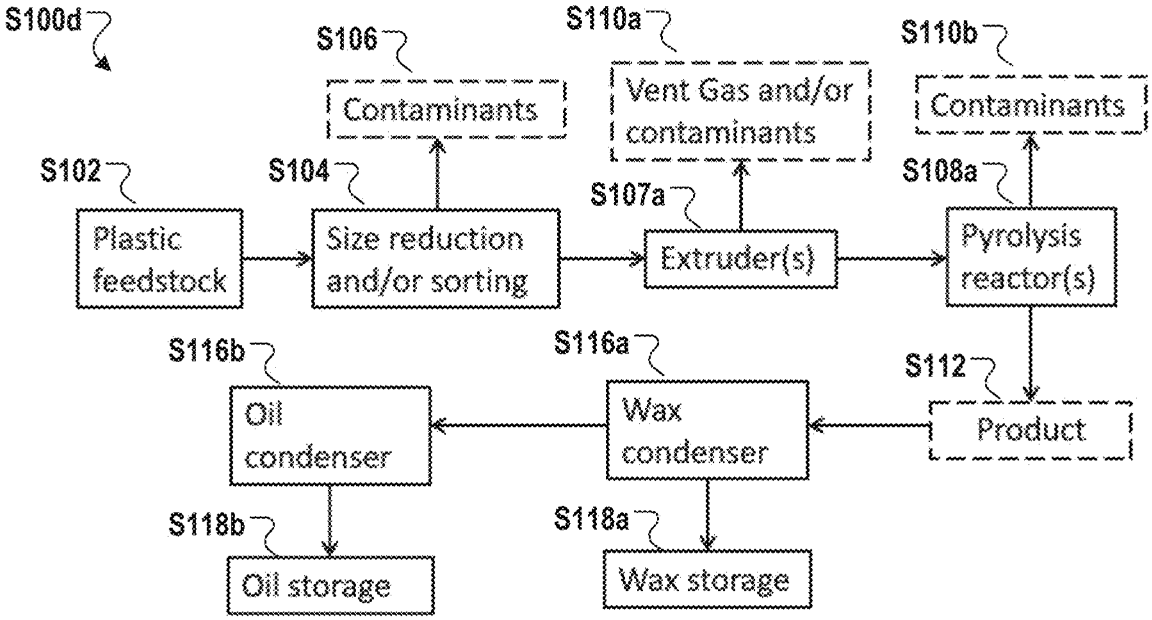
FIG. 4. Schematic diagram of an example system and/or method as disclosed herein according to one implementation.

FIG. 4 depicts another example system S100*d* for pyrolyzing plastic feedstock comprising post-consumer and/or post-industrial plastics (like numbers refer to like elements previously described with respect to the systems S100*a*, S100*b*, and S100*c* of FIGS. 1-3). In the illustrated implementation of FIG. 4, the system S100*d* comprises a plastic feedstock infeed apparatus S102, a size reduction and/or sorting apparatus S104, an extruder apparatus S017*a*, a pyrolysis reactor S108*a*, a wax condenser S116*a*, an oil condenser S116*b*, a wax storage apparatus S118*a*, and an oil storage apparatus S118*b*.

In the illustrated implementation of FIG. 4, the size reduction and/or sorting apparatus S104 directs the plastic feedstock S102 into the extruder apparatus S107*a*. In various implementations, the extruder apparatus S107*a* is configured for melting the plastic feedstock and removing vent gas and/or contaminants (shown as element S110*a* in FIG. 4). In other examples, the extruder apparatus S107*a* may not remove vent gas and/or contaminants. In various implementations, the extruder apparatus S107*a* may comprise one or more of the extruder apparatuses or devices described in the "Extruders" section herein (e.g., one or more of the extruders 100-800 shown and described with respect to FIGS. 24-34).

In various implementations, the extruder apparatus S107*a* depicted in FIG. 4 may comprise one or more (e.g., a plurality of) extruder apparatuses (e.g., arranged in parallel or in series) for melting the plastic feedstock S102. In some examples, the extruder S107*a* may be a single extruder. In other examples, the extruder S107*a* may comprise multiple extruders (e.g., multiple extruders having the same configuration or multiple extruders having different configurations).

As shown in FIG. 4, the extruder apparatus S107*a* is configured for directing the molten (or semi-molten) plastic feedstock into the pyrolysis reactor S108*a*. In various implementations, the pyrolysis reactor S108*a* is generally configured for pyrolyzing the plastic feedstock received from the extruder S107*a* and producing a product S112 (e.g., hydrocarbon vapor). Optionally, the product S112 may be subjected to post-treatment or contaminant removal by the one or more optional post-treatment and/or contaminant removal apparatuses S114*a*, S114*b* (not shown in FIG. 4). In various implementations, the pyrolysis reactor S108*a* may comprise one or more of the pyrolysis reactor apparatuses or devices described in the "Pyrolysis Reactors" section herein (e.g., one or more of the pyrolysis reactors 1000-6000 shown and described with respect to FIGS. 35-49).

In various implementations, the pyrolysis reactor S108*a* depicted in FIG. 4 may comprise one or more (e.g., a plurality of) pyrolysis reactors configured for receiving molten or semi-molten plastic feedstock from the one or more extruder(s) S107*a* and pyrolyzing the plastic feedstock S102 to produce the product S112. In some examples, the pyrolysis reactor S108*a* may be a single pyrolysis reactor. In other examples, the pyrolysis reactor S108*a* may comprise multiple pyrolysis reactors (e.g., multiple pyrolysis reactors having the same configuration or multiple pyrolysis reactors having different configurations).

In some examples, the extruder S107*a* and the pyrolysis reactor S108*a* can remove substantially the same quantity of vent gas and/or contaminants S110*a* or S110*b*, respectively. In other examples, the extruder S107*a* and the pyrolysis reactor S108*a* can remove different quantities of vent gas and/or contaminants S110*a* or S110*b*, respectively. In some examples, the vent gas and/or contaminants S110*a* can have substantially the same composition as the contaminants S110*b*. In other examples, the vent gas and/or contaminants can have different compositions. For example, the extruder S107*a* can be selected to remove a different type of vent gas and/or contaminant than the pyrolysis reactor S108*a*. As another example, the pyrolysis reactor S108*a* may, additionally or alternatively, be selected to remove a different type of contaminant than the extruder S107*a*.

Figure 5:
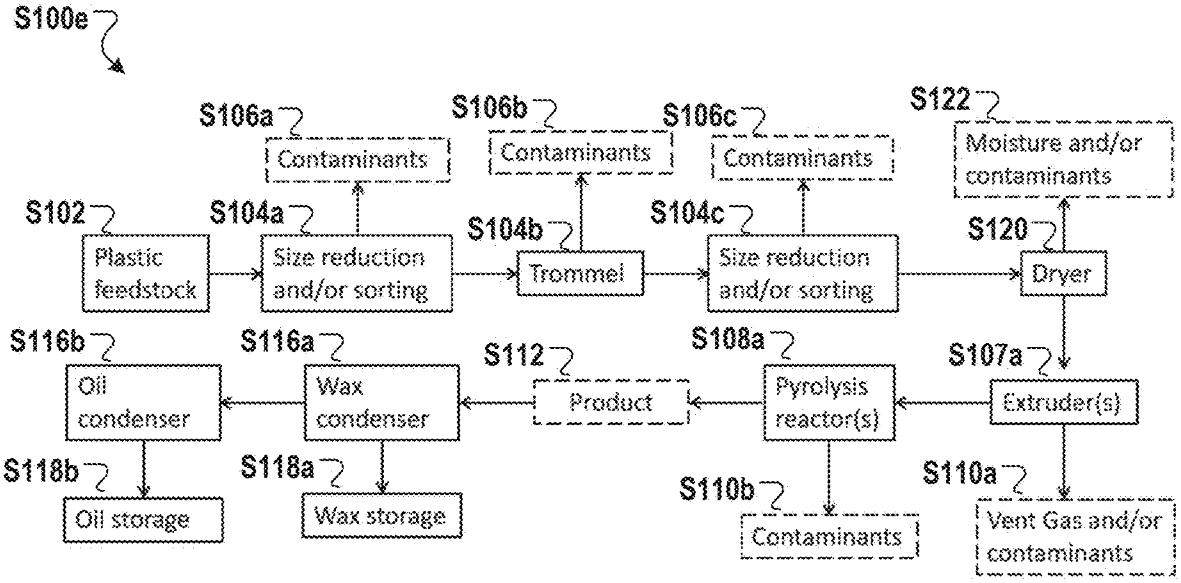
FIG. 5. Schematic diagram of an example system and/or method as disclosed herein according to one implementation.

FIG. 5 depicts another example system S100*e* for pyrolyzing plastic feedstock comprising post-consumer and/or post-industrial plastics (like numbers refer to like elements previously described with respect to the systems S100*a*, S100*b*, S100*c*, and S100*d* of FIGS. 1-4). In the illustrated implementation of FIG. 5, the system S100*e* comprises a plastic feedstock infeed apparatus S102, a first size reduction and/or sorting apparatus S104*a*, a trommel S104*b*, a second size reduction and/or sorting apparatus S104*c*, a dryer S120, an extruder S017*a*, a pyrolysis reactor S108*a*, a wax condenser S116*a*, an oil condenser S116*b*, a wax storage apparatus S118*a*, and an oil storage apparatus S118*b*.

As shown in FIG. 5, the plastic feedstock S102 enters a first size reduction and/or sorting apparatus S104*a*, which removes a first group of contaminants S106*a*. The plastic feedstock S102 is then directed from the first size reduction and/or sorting apparatus S104*a* to a trommel S104*b*, which removes a second group of contaminants S106*b*. The plastic feedstock S102 exiting the trommel S104*b* is then directed to a third size reduction and/or sorting apparatus S104*c*, which removes a third group of contaminants S106*c*. In other examples, any of the first size reduction and/or sorting apparatus S104*a*, the trommel S104*b*, and the third size reduction and/or sorting apparatus S104*c* may not remove contaminants.

In some examples, each of the first size reduction and/or sorting apparatus S104*a* and the third size reduction and/or sorting apparatus S104*c* can include any of the sorting apparatuses described in the "Sorting" section below and/or any of the size reduction apparatuses described in the "Size Reduction" section below. In some examples, the first size reduction and/or sorting apparatus S104*a* can be the same as the third size reduction and/or sorting apparatus S104*c*. In other examples, the first size reduction and/or sorting apparatus S104*a* can be different than the third size reduction and/or sorting apparatus S104*c*.

In some examples, each of the first size reduction and/or sorting apparatus S104*a*, the trommel S104*b*, and the third size reduction and/or sorting apparatus 104*c* can remove substantially the same quantity of contaminants S106*a*, S106*b*, or S106*c* respectively. In other examples, each of the first size reduction and/or sorting apparatus S104*a*, the trommel S104*b*, and the third size reduction and/or sorting apparatus S104*c* can remove different quantities of contaminants S106*a*, S106*b*, or S106*c* respectively.

In some examples, each of the first group of contaminants S106*a*, the second group of contaminants S106*b*, and the third group of contaminants S106*c* can have substantially the same composition. In other examples, each of the first group of contaminants S106*a*, the second group of contaminants S106*b*, and the third group of contaminants S106*c* can have different compositions. For example, the first size reduction and/or sorting apparatus S104*a* may be selected to remove a different type of contaminant than the trommel S104*b* and/or the third size reduction and/or sorting apparatus S104*c*. As another example, the third size reduction and/or sorting apparatus S104*c* may, additionally or alternatively, be selected to remove a different type of contaminant than the trommel S104*b* and/or the first size reduction and/or sorting apparatus S104*a*.

As shown in FIG. 5, the plastic feedstock S102 exiting the second size reduction and/or sorting apparatus S104*c* is directed to a dryer S120. In various implementations, the dryer S120 is configured to remove moisture and/or contaminants S122 from the plastic feedstock S102. In some examples, the dryer S120 can include any of the dryers described in the "Drying Component" section below.

In some examples, any of the systems S100*a*, S100*b*, S100*c*, S100*d*, or S100*e* can include a storage bunker to store plastic feedstock S102 before and/or after the size reduction and/or sorting apparatus S104. In some examples, the storage bunker can include any of the storage bunkers described in the "Storage Bunker" section below. In some examples, any of the systems S100*a*, S100*b*, S100*c*, S100*d*, or S100*e* can include a metals detection and removal apparatus before and/or after the size reduction and/or sorting apparatus S104. In some examples, the metals detection and removal apparatus can include any of the metals detection and removal apparatuses described in the "Metals Detection and Removal" section below. In some examples, the plastic feedstock S102 and/or the product S112 may be transported by one or more conveyors in any of the systems S100*a*, S100*b*, S100*c*, S100*d*, and/or S100*e*. In some examples, the one or more conveyors can include any of the conveyors described in the "Conveyors" section below. In some examples, any of the systems S100*a*, S100*b*, S100*c*, S100*d*, or S100*e* can include one or more heat tracing components. In some examples, the one or more heat tracing components can include any of the heat tracing components described in the "Heat Tracing" section below.

Feedstock

The feedstock comprises post-consumer and/or post-industrial plastics. "Post-industrial" or "Pre-consumer" plastics include materials derived from waste streams during a plastic manufacturing process. "Post-consumer" plastics include materials generated by households or by commercial, industrial, and/or institutional facilities in their roles as end-users of the product which can no longer be used for its intended purpose. This includes returns of material from the distribution chain.

In some examples, the feedstock comprises 50% or more by weight post-consumer and/or post-industrial plastics (e.g., 51% or more, 52% or more, 53% or more, 54% or more, 55% or more, 56% or more, 57% or more, 58% or more, 59% or more, 60% or more, 61% or more, 62% or more, 63% or more, 64% or more, 65% or more, 66% or more, 67% or more, 68% or more, 69% or more, 70% or more, 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, or 99% or more). In some examples, the feedstock comprises 100% or less by weight post-consumer and/or post-industrial plastics (e.g., 99% or less, 98% or less, 97% or less, 96% or less, 95% or less, 94% or less, 93% or less, 92% or less, 91% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, 71% or less, 70% or less, 69% or less, 68% or less, 67% or less, 66% or less, 65% or less, 64% or less, 63% or less, 62% or less, 61% or less, 60% or less, 59% or less, 58% or less, 57% or less, 56% or less, 55% or less, 54% or less, 53% or less, or 52% or less). The percent by weight of the feedstock that is post-consumer and/or post-industrial plastics can range from any of the minimum values described above to any of the maximum values described above. For example, the feedstock can comprise from 50% to 100% by weight post-consumer and/or post-industrial plastics (e.g., from 50% to 75%, from 75% to 100%, from 50% to 60%, from 60% to 70%, from 70% to 80%, from 80% to 90%, from 90 to 100%, from 50 to 99%, from 50 to 95%, from 50 to 90%, from 50% to 80%, from 50% to 70%, from 55% to 100%, from 60% to 100%, from 70% to 100%, from 75 to 100%, from 80 to 100%, from 95 to 100%, from 55% to 99%, from 70% to 99%, or from 75 to 95%).

In some examples, the feedstock comprises 50% or more by weight post-consumer plastics (e.g., 51% or more, 52% or more, 53% or more, 54% or more, 55% or more, 56% or more, 57% or more, 58% or more, 59% or more, 60% or more, 61% or more, 62% or more, 63% or more, 64% or more, 65% or more, 66% or more, 67% or more, 68% or more, 69% or more, 70% or more, 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, or 99% or more). In some examples, the feedstock comprises 100% or less by weight post-consumer plastics (e.g., 99% or less, 98% or less, 97% or less, 96% or less, 95% or less, 94% or less, 93% or less, 92% or less, 91% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, 71% or less, 70% or less, 69% or less, 68% or less, 67% or less, 66% or less, 65% or less, 64% or less, 63% or less, 62% or less, 61% or less, 60% or less, 59% or less, 58% or less, 57% or less, 56% or less, 55% or less, 54% or less, 53% or less, or 52% or less). The percent by weight of the feedstock that is post-consumer plastics can range from any of the minimum values described above to any of the maximum values described above. For example, the feedstock can comprise from 50% to 100% by weight post-consumer plastics (e.g., from 50% to 75%, from 75% to 100%, from 50% to 60%, from 60% to 70%, from 70% to 80%, from 80% to 90%, from 90 to 100%, from 50 to 99%, from 50 to 95%, from 50 to 90%, from 50% to 80%, from 50% to 70%, from 55% to 100%, from 60% to 100%, from 70% to 100%, from 75 to 100%, from 80 to 100%, from 95 to 100%, from 55% to 99%, from 70% to 99%, or from 75 to 95%).

Plastic feedstock can be provided in any suitable form, such as, for example, loose film, baled film, rigids, thermoforms, sheets, foams, non-wovens, strips, pellets, powder, purge patties, densified, shredded, etc. In some examples, the feedstock comprises films, such as single and/or multi-layered films.

In some examples, the plastic feedstock can be packaged, e.g. in bales, boxes, drums, etc.

The feedstock can, for example, comprise polyethylene (e.g., LDPE, LLDPE, VLDPE, MDPE, HDPE, UHMWPE, PEX, etc.), polypropylene, polystyrene, or a combination thereof. In some examples, the feedstock includes plastics with a plastic type classification #2, 4, 5, 6, or a combination thereof.

In some examples, a majority of the plastic that is processed by the systems and methods described herein comprises low-density or linear-low density polyethylene (LDPE-#4) and high-density polyethylene (HDPE-#2), in particular film plastic, and the systems and methods described herein are optimized to effectively process these materials.

A substantial portion of polyethylene and polypropylene polymers are used in single use plastics and get discarded after its use. Polyethylene is used widely in various consumer and industrial products. Polyethylene is the most common plastic, over 100 million tons of polyethylene resins are produced annually. Its primary use is in packaging (plastic bags, plastic films, geomembranes, containers including bottles, etc.). Polyethylene is produced in a variety of forms (e.g., ultra-high molecular weight polyethylene (UHMWPE), high-density polyethylene (HDPE), medium density polyethylene (MDPE), linear low-density polyethylene (LLDPE), low-density polyethylene (LDPE), very low density polyethylene (VLDPE), crosslinked polyethylene (PEX)) with the same chemical formula $(C_2H_4)_n$ but different molecular structure. HDPE has a low degree of branching with short side chains while LDPE has a very high degree of branching with long side chains. LLDPE is a substantially linear polymer with significant numbers of short branches, commonly made by copolymerization of ethylene with short-chain alpha-olefins.

The feedstock can, for example, comprise polyethylene, polypropylene, polystyrene, or a combination thereof in an amount of 90% or more by weight (e.g., 91% or more, 92% or more, 93% or more, 94% or more, 95% or more, 96% or more, 97% or more, 98% or more, or 99% or more). In some examples, the feedstock comprises polyethylene, polypropylene, polystyrene, or a combination thereof in an amount of 100% or less by weight (e.g., 99% or less, 98% or less, 97% or less, 96% or less, 95% or less, 94% or less, 93% or less, 92% or less, or 91% or less). The amount of polyethylene, polypropylene, polystyrene, or a combination thereof in the feedstock can range from any of the minimum values described above to any of the maximum values described above. For example, the feedstock can comprise polyethylene, polypropylene, polystyrene, or a combination thereof in an amount of from 90% to 100% by weight (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 91% to 99%, from 92% to 98%, or from 93% to 97%).

In some examples, the feedstock comprises moisture (e.g., water) in an amount of 20% or less by weight (e.g., 19.5% or less, 19% or less, 18.5% or less, 18% or less, 17.5% or less, 17% or less, 16.5% or less, 16% or less, 15.5% or less, 15% or less, 14.5% or less, 14% or less, 13.5% or less, 13% or less, 12.5% or less, 12% or less, 11.5% or less, 11% or less, 10.5% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, 1% or less, or 0.5% or less). In some examples, the feedstock comprises moisture in an amount of 0% or more by weight (e.g., 0.5% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, 14% or more, 14.5% or more, 15% or more, 15.5% or more, 16% or more, 16.5% or more, 17% or more, 17.5% or more, 18% or more, 18.5% or more, or 19% or more). The amount of moisture in the feedstock can range from any of the minimum values described above to any of the maximum values described above. For example, the feedstock can comprise moisture in an amount of from 0% to 20% by weight (e.g., from 0% to 10%, from 10% to 20%, from 0% to 5%, from 5% to 10%, from 5% to 15%, from 15% to 20%, from 0% to 2.5%, 2.5% to 5%, from 5% to 7.5%, from 7.5% to 10%, from 10% to 12.5%, from 12.5% to 15%, from 15% to 17.5%, from 17.5% to 20.%, from 0% to 19%, from 0% to 18%, from 0% to 17%, from 0% to 16%, from 0% to 15%, from 0% to 14%, from 0% to 13%, from 0% to 12%, from 0% to 11%, from 0% to 9%, from 0% to 8%, from 0% to 7%, from 0% to 6%, from 0% to 4%, from 0% to 3%, from 0% to 2%, from 0% to 1%, from 1% to 20%, from 2% to 20%, from 3% to 20%, from 4% to 20%, from 6% to 20%, from 7% to 20%, from 8% to 20%, from 9% to 20%, from 11% to 20%, from 12% to 20%, from 13% to 20%, from 14% to 20%, from 16% to 20%, from 17% to 20%, from 18% to 20%, from 0.5% to 19.5%, from 1% to 19%, from 1% to 15%, from 1% to 10%, or from 1% to 5%).

Polyvinyl chlorine (PVC), polyvinylidene chloride (PVDC), polyethylene terephthalate (PET) (commonly used for plastic bottles), nylon, ethylene vinyl alcohol (EVOH), polycarbonate (PC), acrylonitrile butadiene styrene (ABS), rubber, thermosets, and non-plastic components (e.g., metal, glass, wood, cotton, paper, cardboard, dirt, inorganics, etc.) are not desirable and their presence should be minimized.

In some examples, the feedstock comprises 5% or less by weight polyvinyl chloride (PVC), polyvinylidene chloride (PVDC), polyethylene terephthalate (PET), nylon, ethylene vinyl alcohol (EVOH), polycarbonate (PC), acrylonitrile butadiene styrene (ABS), rubber, thermosets, or a combination thereof (e.g., 4.5% or less, 4% or less, 3.5% or less, 3% or less, 2.5% or less, 2% or less, 1.75% or less, 1.5% or less, 1.25% or less, 1% or less, 0.9% or less, 0.8% or less, 0.7% or less, 0.6% or less, 0.5% or less, 0.4% or less, 0.3% or less, 0.2% or less, or 0.1% or less). In some examples, the feedstock comprises 0% or more by weight polyvinyl chloride (PVC), polyvinylidene chloride (PVDC), polyethylene terephthalate (PET), nylon, ethylene vinyl alcohol (EVOH), polycarbonate (PC), acrylonitrile butadiene styrene (ABS), rubber, thermosets, or a combination thereof (e.g., 0.1% or more, 0.2% or more, 0.3% or more, 0.4% or more, 0.5% or more, 0.6% or more, 0.7% or more, 0.8% or more, 0.9% or more, 1% or more, 1.25% or more, 1.5% or more, 1.75% or more, 2% or more, 2.5% or more, 3% or more, 3.5% or more, or 4% or more). The amount of polyvinyl chloride (PVC), polyvinylidene chloride (PVDC), polyethylene terephthalate (PET), nylon, ethylene vinyl alcohol (EVOH), polycarbonate (PC), acrylonitrile butadiene styrene (ABS), rubber, thermosets, or a combination thereof in the feedstock can range from any of the minimum values described above to any of the maximum values described above. For example, the feedstock can comprise from 0% to 5% by weight polyvinyl chloride (PVC), polyvinylidene chloride (PVDC), polyethylene terephthalate (PET), nylon, ethylene vinyl alcohol (EVOH), polycarbonate (PC), acrylonitrile butadiene styrene (ABS), rubber, thermosets, or a combination thereof (e.g., from 0% to 2.5%, from 2.5% to 5%, from 0% to 1%, from 1% to 2%, from 2% to 3%, from 3% to 4%, from 4% to 5%, from 0% to 4.5%, from 0% to 4%, from 0% to 3.5%, from 0% to 3%, from 0% to 2%, from 0% to 1.5%, from 0% to 0.5%, from 0.5% to 5%, from 1% to 5%, from 1.5% to 5%, from 2% to 5%, from 3% to 5%, from 3.5% to 5%, from 0.1% to 4.5%, from 0.2% to 4%, or from 0.3% to 3%).

The feedstock can, for example, comprise 15% by weight or less non-plastic materials, such as metal, glass, wood, cotton, paper, cardboard, dirt, inorganics, etc., or a combination thereof (e.g., 14.5% or less, 14% or less, 13.5% or less, 13% or less, 12.5% or less, 12% or less, 11.5% or less, 11% or less, 10.5% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, 1% or less, or 0.5% or less). In some examples, the feedstock comprises 0% or more by weight non-plastic materials (e.g., 0.5% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, or 14% or more). The amount of non-plastic materials in the feedstock can range from any of the minimum values described above to any of the maximum values described above. For example, the feedstock can comprise non-plastic materials in an amount of from 0% to 15% by weight (e.g., from 0% to 7.5%, from 7.5% to 15%, from 0% to 5%, from 5% to 10%, from 10% to 15%, from 0% to 2.5%, 2.5% to 5%, from 5% to 7.5%, from 7.5% to 10%, from 10% to 12.5%, from 12.5% to 15%, from 0% to 14%, from 0% to 13%, from 0% to 12%, from 0% to 11%, from 0% to 10%, from 0% to 9%, from 0% to 8%, from 0% to 7%, from 0% to 6%, from 0% to 4%, from 0% to 3%, from 0% to 2%, from 1% to 15%, from 2% to 15%, from 3% to 15%, from 4% to 15%, from 5% to 15%, from 6% to 15%, from 7% to 15%, from 8% to 15%, from 9% to 15%, from 11% to 15%, from 12% to 15%, from 15% to 15%, from 0.5% to 14.5%, from 1% to 14%, or from 1% to 10%).

In some examples, the feedstock can include plastic having an average initial size of 0.25 inches or more (longest dimension) (e.g., 0.5 inches or more, 1 inch or more, 1.5 inches or more, 2 inches or more, 3 inches or more, 4 inches or more, 5 inches or more, 6 inches or more, 7 inches or more, 8 inches or more, 9 inches or more, 10 inches or more, 11 inches or more, 12 inches or more, 13 inches or more, 14 inches or more, 15 inches or more, 16 inches or more, 17 inches or more, 18 inches or more, 20 inches or more, 22 inches or more, 24 inches or more, 26 inches or more, 28 inches or more, 30 inches or more, 32 inches or more, or 34 inches or more, 36 inches or more, 42 inches or more, 48 inches or more, 54 inches or more, 60 inches or more). In some examples, the feedstock can include plastic having an average initial size of 60 inches or less (longest dimension) (e.g., 54 inches or less, 48 inches or less, 42 inches or less, 36 inches or less, 34 inches or less, 32 inches or less, 30 inches or less, 28 inches or less, 26 inches or less, 24 inches or less, 22 inches or less, 20 inches or less, 18 inches or less, 17 inches or less, 16 inches or less, 15 inches or less, 14 inches or less, 13 inches or less, 12 inches or less, 11 inches or less, 10 inches or less, 9 inches or less, 8 inches or less, 7 inches or less, 6 inches or less, 5 inches or less, 4 inches or less, 3 inches or less, 2 inches or less, or 1 inch or less). The average longest dimension of the plastic in the feedstock can range from any of the minimum values described above to any of the maximum values described above. For example, the feedstock can include plastic having an average initial size of from 0.25 inches to 36 inches (longest dimension) (e.g., from 0.25 to 18 inches, from 18 to 36 inches, from 0.25 to 6 inches, from 6 to 12 inches, from 12 to 18 inches, from 18 to 24 inches, from 24 to 30 inches, from 30 to 36 inches, from 0.25 to 30 inches, from 0.25 to 24 inches, from 0.25 to 18 inches, from 0.25 to 16 inches, from 0.25 to 14 inches, from 0.25 to 12 inches, from 0.25 to 10 inches, from 0.25 to 8 inches, from 0.25 to 4 inches, from 0.25 to 2 inches, from 0.25 inches to 1 inch, from 1 to 36 inches, from 2 to 36 inches, from 4 to 36 inches, from 6 to 36 inches, from 8 to 36 inches, from 10 to 36 inches, from 12 to 36 inches, from 14 to 36 inches, from 16 to 36 inches, from 18 to 36 inches, from 1 to 30 inches, from 2 to 18 inches, from 12 inches to 60 inches, from 18 inches to 60 inches, from 24 inches to 60 inches, from 30 inches to 60 inches, from 36 inches to 60 inches, from 42 inches to 60 inches, from 48 inches to 60 inches, from 54 inches to 60 inches).

In some examples, the feedstock can initially be manually (e.g., visually) and/or automatically (e.g., by an automated system/component) checked to ensure it contains the correct material and does not contain an inordinate amount of obvious contamination. During the manual/visual/automated inspection of the feedstock, the feedstock is inspected for large contaminant items, such as metal, glass, PVC, paper, wood, PET plastics, and cardboard, which are removed when identified.

In some examples, the feedstock can further be assessed, e.g. for chemical and/or physical properties. This can include, for example, assessing at least a representative sample portion of each feedstock via infrared analysis (e.g., portable infrared analyzer), gas chromatography-mass spectrometry (GC-MS), a bench-scale pyrolysis test, ASTM testing for specific contaminants and physical properties, melt-index test, ash test, or a combination thereof.

Feedstock that fails to meet the initial inspection criteria is not further processed by the systems or methods described herein.

After the initial inspection is complete, the acceptable feedstock can be stored for future use (e.g., in a stockpile, a hopper, etc.) and/or loaded into the system for processing.

Infeed

In some examples, the feedstock can be loaded into the system via an infeed conveyor. The rate at which the infeed conveyor provides feedstock to the system (e.g., the feed rate) can, for example, be 500 pounds per hour (lb./hr.) or more (e.g., 550 lb./hr. or more, 600 lb./hr. or more, 650 lb./hr. or more, 700 lb./hr. or more, 750 lb./hr. or more, 800 lb./hr. or more, 850 lb./hr. or more, 900 lb./hr. or more, 950 lb./hr. or more, 1,000 lb./hr. or more, 1,100 lb./hr. or more, 1,200 lb./hr. or more, 1,300 lb./hr. or more, 1,400 lb./hr. or more, 1,500 lb./hr. or more, 1,750 lb./hr. or more, 2,000 lb./hr. or more, 2,250 lb./hr. or more, 2,500 lb./hr. or more, 2,750 lb./hr. or more, 3,000 lb./hr. or more, 3,250 lb./hr. or more, 3,500 lb./hr. or more, 3,750 lb./hr. or more, 4,000 lb./hr. or more, 4,250 lb./hr. or more, 4,500 lb./hr. or more, 4,750 lb./hr. or more, 5,000 lb./hr. or more, 5,500 lb./hr. or more, 6,000 lb./hr. or more, 6,500 lb./hr. or more, 7,000 lb./hr. or more, 7,500 lb./hr. or more, 8,000 lb./hr. or more, 8,500 lb./hr. or more, 9,000 lb./hr. or more, 9,500 lb./hr. or more, 10,000 lb./hr. or more, 11,000 lb./hr. or more, 12,000 lb./hr. or more, 13,000 lb./hr. or more, 14,000 lb./hr. or more, 15,000 lb./hr. or more, 16,000 lb./hr. or more, 17,000 lb./hr. or more, 18,000 lb./hr. or more, or 19,000 lb./hr. or more). In some examples, the rate at which the infeed conveyor provides feedstock to the system (e.g., the feed rate) can be 20,000 lb./hr. or less (e.g., 19,000 lb./hr. or less, 18,000 lb./hr. or less, 17,000 lb./hr. or less, 16,000 lb./hr. or less, 15,000 lb./hr. or less, 14,000 lb./hr. or less, 13,000 lb./hr. or less, 12,000 lb./hr. or less, 11,000 lb./hr. or less, 10,000 lb./hr. or less, 9,500 lb./hr. or less, 9,000 lb./hr. or less, 8,500 lb./hr. or less, 8,000 lb./hr. or less, 7,500 lb./hr. or less, 7,000 lb./hr. or less, 6,500 lb./hr. or less, 6,000 lb./hr. or less, 5,500 lb./hr. or less, 5,000 lb./hr. or less, 4,750 lb./hr. or less, 4,500 lb./hr. or less, 4,250 lb./hr. or less, 4,000 lb./hr. or less, 3,750 lb./hr. or less, 3,500 lb./hr. or less, 3,250 lb./hr. or less, 3,000 lb./hr. or less, 2,750 lb./hr. or less, 2,500 lb./hr. or less, 2,250 lb./hr. or less, 2,000 lb./hr. or less, 1,750 lb./hr. or less, 1,500 lb./hr. or less, 1,400 lb./hr. or less, 1,300 lb./hr. or less, 1,200 lb./hr. or less, 1,100 lb./hr. or less, 1,000 lb./hr. or less, 950 lb./hr. or less, 900 lb./hr. or less, 850 lb./hr. or less, 800 lb./hr. or less, 750 lb./hr. or less, 700 lb./hr. or less, 650 lb./hr. or less, or 600 lb./hr. or less). The rate at which the infeed conveyor provides feedstock to the system can range from any of the minimum values described above to any of the maximum values described above. For example, the rate at which the infeed conveyor provides feedstock to the system can be from 500 pounds per hour (lb./hr.) to 20,000 lb./hr. (e.g., from 500 to 5000 lb./hr., from 5000 to 20,000 lb./hr., from 500 to 4,000 lb./hr., from 4,000 to 8,000 lb./hr., from 8,000 to 12,000 lb./hr., from 12,000 to 16,000 lb./hr., from 16,000 to 20,000 lb./hr., from 500 to 15,000 lb./hr., from 500 to 10,000 lb./hr., from 500 to 9,000 lb./hr., from 500 to 8,000 lb./hr., from 500 to 7,000 lb./hr., from 500 to 6,000 lb./hr., from 500 to 2,500 lb./hr., from 1,000 to 20,000 lb./hr., from 2,500 to 20,000 lb./hr., from 6,000 to 20,000 lb./hr., from 7,000 to 20,000 lb./hr., from 8,000 to 20,000 lb./hr., from 9,000 to 20,000 lb./hr., from 10,000 to 20,000 lb./hr., from 550 to 19,000 lb./hr., from 600 to 19,000 lb./hr., or from 1,000 to 15,000 lb./hr.).

Sorting

In some examples, feedstock loaded into the system can undergo additional sorting.

In some examples, the plastic feedstock can be deposited onto a conveyor and/or further processed to remove contaminants. This can, for example, include visual inspection and manual removal, automated inspection and removal, positioning one or more magnets to magnetically remove ferrous contaminants (e.g., various components such as nuts, bolts, screws, small pieces of wire, etc. comprising ferrous metals and/or alloys), washing and/or drying, size based separation (e.g., screening, sifting, etc.), air jets, sink float, etc.

In some examples, the feedstock can be transported to a trommel, such as a screen trommel. The screen trommel can, for example, be used to remove fine dust, particles, and other contaminants from the incoming feedstock stream, for example before and/or after it has passed through a shredder. The trommel can receive feedstock and trommel rotation can agitate incoming feedstock and promote removal of granular materials (e.g., sand, pigment, binder, food particulates, dirt, etc.) in the feedstock through the trommel screen. The remaining oversized material from the trommel can be deposited, for example, onto a conveyor for further inspection and/or sorting.

In some examples, visual inspection and manual sorting and/or automated inspection and sorting is used to remove contaminants from the plastic feedstock, e.g., before and/or after passing through the trommel and/or shredder. Contaminants to be removed can, for example, include undesirable plastic (such as PET, PVC, nylon, and thermosets) as well as other materials that can damage downstream equipment or degrade the quality of the finished products such as strapping, paper, cardboard, rope, batteries, beverage bottles still containing liquid, glass, wood, metal, electronics, and a wide range of other non-plastic materials.

Size Reduction

In some examples, feedstock loaded into the system can undergo one or more size reductions. The size reduction can be accomplished by any suitable means, such as those known in the art. For example, the feedstock can be shredded, pelletized, densified, or a combination thereof. For example, the system can include one or more size reduction components, such as a chipper, granulator, grinder, hammermill, shredder (e.g., a shear shredder), pelletizer, densifier, agglomerator, or a combination thereof.

In some examples, the feedstock can be shredded, for example using one or more shredders. Each shredder can comprise any suitable type of shredder, such as those known in the art. In some examples, the system can include one or more shear shredders.

The shredder can perform a size reduction on incoming plastic, for example to a range of 0.25 to 36 inches (longest dimension). For example, the shredder can reduce the average initial size of the incoming plastic to 0.25 inches or more (longest dimension) (e.g., 0.5 inches or more, 1 inch or more, 1.5 inches or more, 2 inches or more, 3 inches or more, 4 inches or more, 5 inches or more, 6 inches or more, 7 inches or more, 8 inches or more, 9 inches or more, 10 inches or more, 11 inches or more, 12 inches or more, 13 inches or more, 14 inches or more, 15 inches or more, 16 inches or more, 17 inches or more, 18 inches or more, 20 inches or more, 22 inches or more, 24 inches or more, 26 inches or more, 28 inches or more, 30 inches or more, 32 inches or more, or 34 inches or more). In some examples, the shredder can reduce the average initial size of the incoming plastic to 36 inches or less (longest dimension) (e.g., 34 inches or less, 32 inches or less, 30 inches or less, 28 inches or less, 26 inches or less, 24 inches or less, 22 inches or less, 20 inches or less, 18 inches or less, 17 inches or less, 16 inches or less, 15 inches or less, 14 inches or less, 13 inches or less, 12 inches or less, 11 inches or less, 10 inches or less, 9 inches or less, 8 inches or less, 7 inches or less, 6 inches or less, 5 inches or less, 4 inches or less, 3 inches or less, 2 inches or less, or 1 inch or less). The average longest dimension of the plastic processed by the shredder can range from any of the minimum values described above to any of the maximum values described above. For example, the shredder can reduce the average initial size of the incoming plastic to from 0.25 inches to 36 inches (longest dimension) (e.g., from 0.25 to 18 inches, from 18 to 36 inches, from 0.25 to 6 inches, from 6 to 12 inches, from 12 to 18 inches, from 18 to 24 inches, from 24 to 30 inches, from 30 to 36 inches, from 0.25 to 30 inches, from 0.25 to 24 inches, from 0.25 to 18 inches, from 0.25 to 16 inches, from 0.25 to 14 inches, from 0.25 to 12 inches, from 0.25 to 10 inches, from 0.25 to 8 inches, from 0.25 to 4 inches, from 0.25 to 2 inches, from 0.25 inches to 1 inch, from 1 to 36 inches, from 2 to 36 inches, from 4 to 36 inches, from 6 to 36 inches, from 8 to 36 inches, from 10 to 36 inches, from 12 to 36 inches, from 14 to 36 inches, from 16 to 36 inches, from 18 to 36 inches, from 1 to 30 inches, or from 2 to 18 inches).

Plastic feedstock that passes through the shredder can then be stored in a hopper and/or transported for further processing.

In some examples, the shredded feedstock can go through a second size reduction process using any suitable size reduction technique.

Drying Component

In some examples, the systems and methods can further include washing and/or drying the feedstock.

For example, the systems and methods can further comprise drying the feedstock, for example to remove at least a portion of the moisture or other liquids comprising a contaminant within the feedstock.

In some examples, the feedstock can be deposited onto a conveyor which passes the feedstock through a dryer before depositing the feedstock in a storage bunker and/or transporting the feedstock to a further system component for further processing.

The dryer can comprise any suitable equipment, such as a rotary dryer. Heated air can be directed through the dryer across the feedstock to remove moisture from the feedstock. The surface area exposed can allow the heated air flow to remove moisture or free water that may be present in the feedstock. The moist air along with small, entrained particles from the dryer can be exhausted using any suitable means. The required air can be heated by any suitable means, such as electrically heated. The maximum air temperature will be below the softening point of any of the plastics. Using an effective drying solution upstream of the extruders and/or reactors can reduce the problems of vent flow at downstream extrusion equipment and water intrusion to the reactors.

Storage Bunker

In some examples, the system can further include a storage bunker, for example to store feedstock before undergoing melting, removal of contaminants, pyrolysis, or a combination thereof.

In some examples, the system includes a storage bunker that receives the feedstock from the infeed conveyor, the shredder (when present), the dryer (when present), the trommel (when present), etc. or a combination thereof.

The storage bunker can, for example, have the capacity to store enough feedstock to provide an uninterrupted supply of plastic to the downstream components (e.g., extruder(s)) for a period of time (e.g., up to two hours), for example if any of the upstream equipment has to be shut down briefly for maintenance or repair.

Feedstock levels inside the storage bunker can be monitored, for example using one or more cameras or other feedback mechanisms.

Metals Detection and Removal

In some examples, feedstock loaded into the system can undergo additional metals detection and removal. In some examples, the plastic feedstock can be deposited onto a conveyor and/or further processed to metal contaminants. This can, for example, include visual inspection and manual removal, automated inspection and removal, positioning one or more magnets to magnetically remove ferrous contaminants (e.g., various components such as nuts, bolts, screws, small pieces of wire, etc. comprising ferrous metals and/or alloys), washing and/or drying, size based separation (e.g., screening, sifting, etc.), air jets, sink float, etc.

For example, at one or more points in any of the systems or methods described herein, there can be one or more additional magnetic components to magnetically remove ferrous contaminants from the feedstock, for example before the shredder, after the shredder, before the trommel, after the trommel, before the dryer, after the dryer, before the storage bunker, after the storage bunker, before the components for melting, removal of contaminants, and/or pyrolysis, or a combination thereof. For example, the system can include magnets positioned before, after, or as part of each of the one or more conveyors that transport the feedstock between each system location/component. The strength of the magnets can be selected based on the location in the system and/or the throughput of feedstock processed.

In addition, the system can further include a metal detection and rejection system to eliminate further metal contaminants, such as non-ferrous metals (e.g., copper, brass, bronze, stainless steel, aluminum and other non-ferrous alloys). Non-ferrous metals can be present in a variety of forms, such as, for example, nuts, bolts, screws, washers, batteries, machine parts, tools, etc. The additional metal detection system can be included in the system, for example, on the conveyors feeding the storage bunkers. This additional metal detection system can detect non-ferrous metals and then trigger a quick-acting diverter gate (or another similar device) that moves this metal off the conveyor and into a collection bin (or the conveyor can be stopped entirely to allow operators to manually remove the detected metal). While aluminum is the primary target of this system, copper, stainless steel, and brass can also be detected and rejected.

Conveyors

In the system described herein, each of the conveyors can comprise any suitable type of conveyor. Examples of conveyors include, but are not limited to, belt conveyors, roller conveyors, slat conveyors, apron conveyors, ball transfer conveyors, magnetic conveyors, bucket conveyors, chute conveyors, chain conveyors, pneumatic conveyors, vacuum conveyors, screw conveyors, vibrating conveyors, wheel conveyors, sandwich conveyors, and combinations thereof. In some examples, each of the conveyors can comprise a screw conveyor, a belt conveyor, or a combination thereof. In some examples, the system can include a plurality of belt conveyors. The belt conveyors can, for example, be designed with side walls. The belt conveyors can include any type of belt conveyor, such as standard flat belts, cleated belts, semi-trough belts, compound belts (e.g., hockey stick configurations), or a combination thereof.

The dimensions and/or speed of any of the conveyors can be selected in view of a variety of factors. For example, the dimensions and/or speed of the conveyor can be selected to regulate the flow of materials at a desired rate.

Melting, Removal of Contaminants, and/or Pyrolysis

In some examples, the systems can include one or more energy transfer apparatuses for melting the feedstock, volatilizing various contaminants in the feedstock, pyrolyzing the feedstock, or a combination thereof.

While some contaminants can be physically removed by one or more of the processes discussed above, for certain feedstock components, such as multilayer films, it is difficult to physically remove the contaminants and instead they can be removed by using one or more energy transfer apparatuses (e.g., extruders and/or pyrolysis reactors) to heat the feedstock to a temperature sufficient to volatilize said contaminant.

For example, the systems and methods can comprise pyrolyzing the feedstock, wherein the pyrolysis reactor and method includes a component or step for removal of volatile contaminants. The pyrolysis can be accomplished using any suitable pyrolysis reactor, such as, for example, an auger pyrolysis reactor, a screw pyrolysis reactor, a rotary kiln pyrolysis reactor, a drum pyrolysis reactor, a tubular pyrolysis reactor, a fluidized bed reactor, a spouted bed reactor, a molten salt reactor, a molten material reactor, a fixed-bed reactor, a continuously stirred reactor, a Heinz Retort Pyrolysis reactor, a vortex pyrolysis reactor, a batch pyrolysis reactor, a semi-batch pyrolysis reactor, or a combination thereof.

In some examples, the systems and methods can comprise heating and/or melting the feedstock before introducing the melted feedstock into a pyrolysis reactor, wherein the feedstock is heated and/or melted at a temperature sufficient to volatilize a contaminant and the systems and methods can further include removing said volatilized contaminants. Any suitable component for heating and/or melting can be used, such as those known in the art. In some examples, the systems and methods can include one or more extruders, wherein the feedstock is heated and/or melted within the extruder and optionally wherein the extruder includes one or more vents for removing volatile contaminants from the heated and/or melted feedstock.

In various implementations, one or more energy transfer apparatuses may be implemented and configured for receiving the plastic feedstock, applying energy to the plastic feedstock, and pyrolyzing the plastic feedstock at industrial scale. In some implementations, the one or more energy transfer apparatuses may comprise one or more extruders and/or one or more pyrolysis reactors. For example, as explained herein with respect to the systems S100*a-e* described with respect to FIGS. 1-5, the one or more extruders may be configured for receiving the plastic feedstock, transferring energy to the plastic feedstock to melt the plastic feedstock to produce at least semi-molten feedstock, and directing the at least semi-molten feedstock to at least one of the one or more pyrolysis reactors. The one or more pyrolysis reactors are configured for receiving the plastic feedstock (e.g., in a molten or semi-molten state from the one or more extruders) and pyrolyzing the plastic feedstock at industrial scale. In particular, the one or more pyrolysis reactors may comprise a reactor vessel defining an internal volume configured for receiving and pyrolyzing the plastic feedstock at an industrial scale, and one or more heaters configured for heating the feedstock in the reactor vessel's internal volume to a temperature between 200° C. and 1,000° C.

In some implementations, the one or more energy transfer apparatuses (e.g., the one or more extruders and/or one or more pyrolysis reactors) of the pyrolysis system are collectively configured for using energy at an average rate of 0.80 kW or less per pound of pyrolyzed product produced by the system per hour (e.g., 0.78 kW or less, 0.76 kW or less, 0.74 KW or less, 0.72 kW or less, 0.70 kW or less, 0.68 kW or less, 0.66 kW or less, 0.64 kW or less, 0.62 kW or less, 0.60 kW or less, 0.58 kW or less, 0.56 kW or less, 0.54 kW or less, 0.52 kW or less, 0.50 kW or less, 0.48 kW or less, 0.46 kW or less, 0.44 kW or less, 0.42 kW or less, 0.40 kW or less, 0.38 kW or less, 0.36 kW or less, 0.34 kW or less, 0.32 kW or less, 0.30 kW or less, 0.28 kW or less, 0.26 kW or less, 0.24 kW or less, 0.22 kW or less, 0.20 kW or less). As used herein, the term "using energy" refers to energy consumed by the one or more energy transfer apparatuses, or energy applied by the one or more energy transfer apparatuses to the plastic feedstock, or energy transferred by the one or more energy transfer apparatuses to the plastic feedstock.

In some implementations, the one or more energy transfer apparatuses (e.g., the one or more extruders and/or one or more pyrolysis reactors) of the pyrolysis system are collectively configured for using energy at an average rate from 0.20 kW to 0.80 KW per pound of pyrolyzed product produced by the system per hour (e.g., from 0.20 kW to 0.78 KW, from 0.20 kW to 0.76 kW, from 0.20 kW to 0.74 KW, from 0.20 kW to 0.72 kW, from 0.20 kW to 0.70 kW, from 0.20 kW to 0.68 kW, from 0.20 kW to 0.66 KW, from 0.20 kW to 0.64 kW, from 0.20 kW to 0.62 kW, from 0.20 kW to 0.60 kW, from 0.20 kW to 0.58 kW, from 0.20 kW to 0.56 kW, from 0.20 kW to 0.54 kW, from 0.20 kW to 0.52 kW, from 0.20 kW to 0.50 kW, from 0.20 kW to 0.48 kW, from 0.20 kW to 0.46 kW, from 0.20 kW to 0.44 kW, from 0.20 kW to 0.42 kW, from 0.20 kW to 0.40 kW, from 0.20 kW to 0.38 kW, from 0.20 kW to 0.36 kW, from 0.20 kW to 0.34 kW, from 0.20 kW to 0.32 kW, from 0.20 kW to 0.30 kW). In some specific implementations, the foregoing average energy efficiency ranges may be achieved using the pyrolysis system S100*e* of FIG. 5, where the extruder S107*a* comprises the extruder 800 shown and described with respect to FIG. 33 and the pyrolysis reactor S108*a* comprises the pyrolysis reactor 5000 shown and described with respect to FIG. 47.

Extruders

In some examples, plastic feedstock (e.g., optionally shredded plastic feedstock) from the storage bunker is conveyed separately to one or more extruders (e.g., two or more), for example using a conveyor. The extruders can be any suitable type of extruder. The extruders can, for example, be designed to heat the plastic feedstock and convert the plastic feedstock into a semi-molten state that is moved to the reactors. In some examples, the pyrolysis systems described herein include two or more extruders and the two or more extruders can be in operation simultaneously. In some implementations, one or more extruders may be configured to pyrolyze the plastic feedstock and thereby function as a pyrolysis reactor.

In some examples, the system includes a plurality of extruders and each extruder is configured to process a portion of normal throughput, for example so as to allow feedstock flow to and operation of the reactors to continue when one of the extruders is taken out of service for repair or maintenance. In some examples, the system can include three extruders, with two extruders being in operation simultaneously and the third extruder being a redundancy, for example the third extruder can be operated while one of the other extruders is taken out of service for repair or maintenance.

Each extruder can, for example, use an internal pneumatically operated ram to increase the density of the plastic in order to achieve the desired throughput rate. The ram can also move the plastic from the extruder inlet into the extruder's screw mechanism. In other implementations, plastic feedstock fed into the extruder may be fed using a screw or auger device that is capable of both moving feedstock into the extruder and compressing it in the same.

In some examples, the extruder barrel can include one or more openings (e.g. one or more vents or ports) at one or more positions along the length of the extruder barrel. In some examples, each extruder barrel can include a plurality of vents (e.g., two or more vents) along the length of the extruder barrel. The vent(s) can allow vapors and/or gases produced from the plastic feedstock during the heating process to escape from the extruder. Moisture in the feedstock is converted to steam at the high temperatures created in the extruder and this steam typically exits at one or more vents. Other gaseous material such as volatile inks from plastic labels, various lipids and fats from food contamination on the plastic, and decomposed PVC and PET polymers can also exit at one or more vents along with gas made up of entrained fine particulates. This system allows removal of significant amounts of chlorides and other undesirable elements that otherwise would end up in the reactor and potentially affect the quality of both oil and wax products and/or corrode the processing equipment.

In some examples, each extruder comprises two or more vents (e.g., wherein the extruder includes at least a first vent and a second vent). In some examples, the first vent of the extruder comprises an ambient pressure vent. In some examples, the second vent of the extruder comprises a vacuum vent, for example where a vacuum is applied through the vent to pull gases and/or contaminants out of the semi-molten feedstock.

In some examples, a vent feeding device can be used at one or more of the extruder vents to prevent expulsion of melted feedstock from that vent. The vent feeder can force any feedstock that is flowing or being expelled from the vent back into the barrel where it is then carried forward down the extruder. This feeder can be equipped with a vent section that can allow steam and other volatiles to pass by the feeder.

In some examples, the barrel of the extruder can be heated, for example by one or more externally mounted heaters. In some examples, the barrel of the extruder can be heated by a plurality of externally mounted heaters. The heaters can be any suitable type of heater, such as resistive electric heaters and/or inductive heaters. Additional heating can, for example, be provided by friction as the feedstock is forced through the internal geometry of the extruder barrel by the screw. Multiple zones along the length of the extruder can, in some examples, be independently heated and cooled using barrel heaters and/or cooling fans to achieve a pre-set temperature profile that varies depending on the type of material being fed into the extruder.

In some examples, the barrel of the extruder can be heated such that the feedstock within the extruder has a temperature of 20° C. or more at the first of the one or more vents (e.g., 25° C. or more, 50° C. or more, 75° C. or more, 100° C. or more, 125° C. or more, 150° C. or more, 175° C. or more, 200° C. or more, 225° C. or more, 250° C. or more, 275° C. or more, 280° C. or more, 285° C. or more, 290° C. or more, 295° C. or more, 300° C. or more, 305° C. or more, 310° C. or more, 315° C. or more, 320° C. or more, 325° C. or more, 350° C. or more, 375° C. or more, 400° C. or more, or 425° C. or more). In some examples, the barrel of the extruder can be heated such that the feedstock within the extruder has a temperature of 450° C. or less at the first of the one or more vents (e.g., 425° C. or less, 400° C. or less, 375° C. or less, 350° C. or less, 325° C. or less, 320° C. or less, 315° C. or less, 310° C. or less, 305° C. or less, 300° C. or less, 295° C. or less, 290° C. or less, 285° C. or less, 285° C. or less, 280° C. or less, 275° C. or less, 250° C. or less, 225° C. or less, 200° C. or less, 175° C. or less, 150° C. or less, 125° C. or less, 100° C. or less, 75° C. or less, or 50° C. or less). The temperature of the feedstock within the extruder at the first vent can range from any of the minimum values described above to any of the maximum values described above. For example, the barrel of the extruder can be heated such that the feedstock within the extruder has a temperature of from 20° C. to 450° C. at the first of the one or more vents (e.g., from 20° C. to 225° C., from 225° C. to 450° C., from 20° C. to 125° C., from 125° C. to 225° C., from 225° C. to 325° C., from 325° C. to 450° C., from 20° C. to 400° C., from 20° C. to 350° C., from 20° C. to 300° C., from 20° C. to 250° C., from 20° C. to 200° C., from 20° C. to 250° C., from 20° C. to 100° C., from 20° C. to 50° C., from 50° C. to 450° C., from 100° C. to 450° C., from 150° C. to 450° C., from 200° C. to 250° C., from 250° C. to 250° C., from 300° C. to 450° C., from 350° C. to 450° C., from 50° C. to 400° C., from 100° C. to 375° C., from 250° C. to 350° C., or from 275° C. to 325° C.).

In some examples, each extruder includes a screw with multiple zones, such as a pumping section, a compression section, a decompression section, a mixing section, or a combination thereof. In some examples, each extruder screw includes a decompression section at or before the first vent, for example to promote expulsion of entrained air, moisture, and/or other gases (e.g., volatiles) from the feedstock at the first vent.

The residence time of the feedstock within each extruder can be selected in view of a variety of factors. For example, the residence time of the feedstock within each extruder can be selected in view of the speed at which the extruder is run (which in turn can be selected based on the throughput rate of the reactor(s) that the extruder is feeding), the identity of the plastics within the feedstock, the melt flow characteristics of the plastic, or a combination thereof.

In some examples, the residence time of the feedstock within the extruder can be 30 seconds or more (e.g., 1 minute or more, 1.5 minutes or more, 2 minutes or more, 2.5 minutes or more, 3 minutes or more, 3.5 minutes or more, 4 minutes or more, 5 minutes or more, 5.5 minutes or more, 6 minutes or more, 6.5 minutes or more, 7 minutes or more, 7.5 minutes or more, 8 minutes or more, 8.5 minutes or more, or 9 minutes or more). In some examples, the residence time of the feedstock within the extruder can be 10 minutes or less (e.g., 9.5 minutes or less, 9 minutes or less, 8.5 minutes or less, 8 minutes or less, 7.5 minutes or less, 7 minutes or less, 6.5 minutes or less, 6 minutes or less, 5.5 minutes or less, 5 minutes or less, 4.5 minutes or less, 4 minutes or less, 3.5 minutes or less, 3 minutes or less, 2.5 minutes or less, 2 minutes or less, 1.5 minutes or less, or 1 minute or less). The residence time of the feedstock within the extruder can range from any of the minimum values described above to any of the maximum values described above. For example, the residence time of the feedstock within the extruder can be from 30 seconds to 10 minutes (e.g., from 30 seconds to 5 minutes, from 5 minutes to 10 minutes, from 30 seconds to 2.5 minutes, from 2.5 to 5 minutes, from 5 to 7.5 minutes, from 7.5 minutes to 10 minutes, from 30 seconds to 9 minutes, from 30 seconds to 8 minutes, from 30 seconds to 7 minutes, from 30 seconds to 6 minutes, from 30 seconds to 4 minutes, from 30 seconds to 3 minutes, from 30 seconds to 2 minutes, from 1 minute to 10 minutes, from 2 to 10 minutes, from 3 to 10 minutes, from 4 to 10 minutes, from 6 to 10 minutes, from 7 to 10 minutes, from 8 to 10 minutes, from 1 minute to 9 minutes, or from 1.5 minutes to 5 minutes).

Feedstock material subsequently enters the extruder screw's pumping section where it is propelled out of the extruder and into the pyrolysis reactor, for example via a heated transfer pipe. A rupture disk can be provided for emergency pressure relief to prevent down-stream damage to piping and equipment.

In some implementations, one or more extruders of the pyrolysis system are collectively configured for using energy at an average rate of 0.40 kW or less per pound of pyrolyzed product produced by the system per hour (e.g., 0.40 kW or less, 0.38 kW or less, 0.36 kW or less, 0.34 kW or less, 0.32 kW or less, 0.30 kW or less, 0.28 kW or less, 0.26 kW or less, 0.24 kW or less, 0.22 kW or less, 0.20 kW or less, 0.18 kW or less, 0.16 kW or less, 0.14 kW or less, 0.12 kW or less, 0.10 kW or less, 0.08 kW or less, 0.06 kW or less, 0.04 kW or less, or 0.02 kW or less). In some implementations, the one or more energy transfer apparatuses (e.g., the one or more extruders and/or one or more pyrolysis reactors) of the pyrolysis system are collectively configured for using energy at an average rate from 0.02 kW to 0.40 KW per pound of pyrolyzed product produced by the system per hour (e.g., from 0.02 kW to 0.40 KW, from 0.02 kW to 0.38 kW, from 0.02 kW to 0.36 kW, from 0.02 kW to 0.34 kW, from 0.02 kW to 0.32 kW, from 0.02 kW to 0.30 kW, from 0.02 kW to 0.28 kW, from 0.02 kW to 0.26 kW, from 0.02 kW to 0.24 kW, from 0.02 kW to 0.22 kW, from 0.02 kW to 0.20 kW, from 0.02 kW to 0.18 kW, from 0.02 kW to 0.16 kW, from 0.02 kW to 0.14 kW, from 0.02 kW to 0.12 kW, from 0.02 kW to 0.10 KW, from 0.02 kW to 0.08 kW, from 0.02 kW to 0.06 kW, from 0.02 kW to 0.04 KW). In some specific implementations, the foregoing average energy efficiency ranges may be achieved using the extruder 800 shown and described with respect to FIG. 33.

Figure 24:
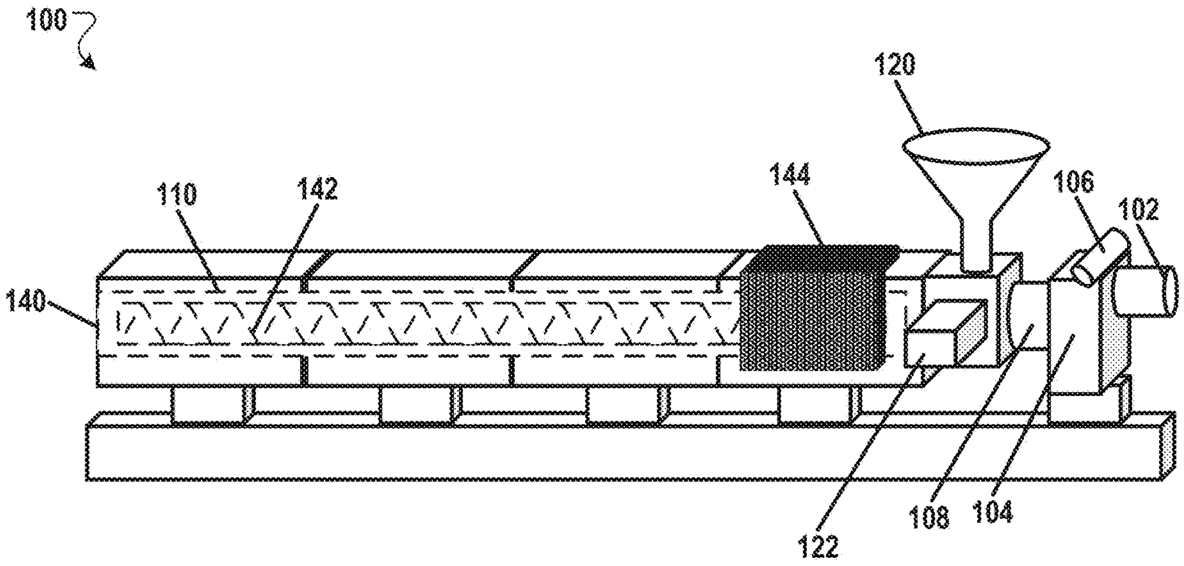
FIG. 24. Schematic perspective side view of an example single-screw extruder with an electrically heated barrel.
Figure 25:
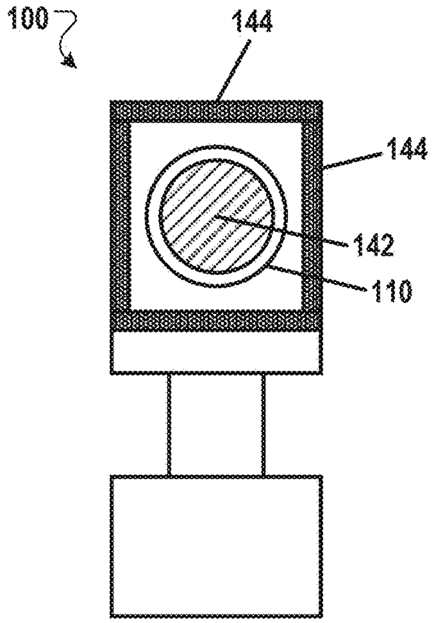
FIG. 25. Cross-sectional view of the example single-screw extruder of FIG. 24.

FIG. 24 provides a perspective view of an example implementation of an extruder 100 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. The molten or semi-molten state output by the extruder 100 may be directed to a pyrolysis reactor for pyrolysis of the plastic feedstock (e.g., various implementations of the pyrolysis reactors discussed herein). FIG. 25 shows a cross-sectional view of the extruder 100 shown in FIG. 24. Certain elements depicted in FIG. 24 are also depicted in FIG. 25 and, accordingly, reference to either figure may be regarded as a reference to both figures.

As shown in FIG. 24, the extruder 100 includes a motor 102 (e.g., three-phase AC motor) configured to drive a screw 142 within an extruder barrel 110. The motor 102 is coupled to a reducer assembly 104 and cooling system 106. The cooling system 106 is configured to maintain desired temperatures within the reducer assembly and or motor. The extruder screw 142 is coupled to a drive shaft via a seal assembly 108, allowing the motor 302 to drive rotation of the extruder screw 142.

Plastic feedstock is directed into the extruder barrel 110 via a hopper 120, which is configured to receive plastic feedstock (e.g., loose film, baled film, rigids, thermoforms, sheets, foams, non-wovens, strips, pellets, powder, purge patties, densified, shredded, and other post-consumer and/or post-industrial plastics). A pneumatic ram 122 is configured to increase the density of the plastic feedstock in order to assist in achieving a desired throughput rate within the extruder 100.

The extruder 100 includes a single extruder screw 142 housed within a heated barrel 110. As shown in FIG. 24, the barrel 110 can be encased by heating elements 144 configured for heating various zones along the length of the extruder barrel 110. In one implementation, the heating elements 144 can comprise electric heaters. In other implementations, the heating elements 144 can comprise forced-air, gas, indirect, or direct heating arrangements. In various implementations, the extruder 100 may include multiple heating elements 144 positioned throughout the length of the extruder 100 configured to heat the extruder barrel 110. For example, in one implementation, the extruder 300 includes between two and fifteen electric heaters defining between two and fifteen heating zones along the length of the barrel 110. The heaters (e.g., electric heaters) can be controlled to obtain a desired temperature gradient along the length of the extruder barrel 110, such that the temperature of the feedstock within the extruder barrel 110 reaches desired temperatures. Additional heating is provided by friction as the plastic is forced through the internal geometry of the extruder barrel by the screw. In other implementations, two extruder screws may be used within the barrel 110.

In various implementations, the extruder screw 142 within the barrel 110 is provided with multiple zones (e.g., a pumping section, a compression section, and a decompression section). In the pumping section, the molten (or semi-molten) feedstock material is propelled out of the extruder (e.g., via a barrel outlet 140 shown in FIG. 24) and into the pyrolysis reactor (e.g., via a heated transfer pipe).

Figure 26:
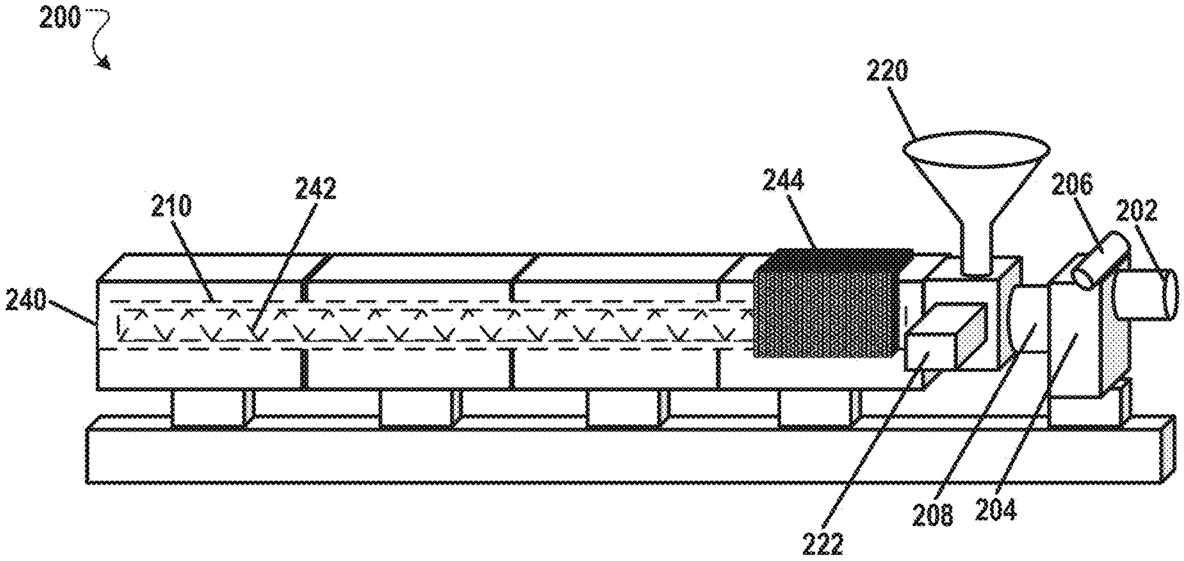
FIG. 26. Schematic perspective side view of an example dual-screw extruder with an electrically heated barrel.
Figure 27:
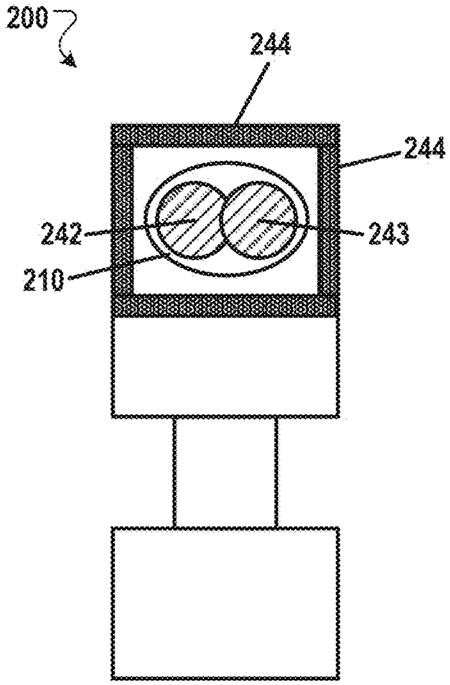
FIG. 27. Cross-sectional view of the example dual-screw extruder of FIG. 26.

FIG. 26 provides a perspective view of another example implementation of an extruder 200 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 200's barrel is labeled 210). FIG. 27 shows a cross-sectional view of the extruder 200 shown in FIG. 26. Certain elements depicted in FIG. 26 are also depicted in FIG. 27 and, accordingly, reference to either figure may be regarded as a reference to both figures.

In the illustrated implementation, the extruder 200 is configured as a twin screw extruder. As shown in FIGS. 26 and 27, a pair of extruder screws 242, 243 are provided in the extruder's barrel 210. In various implementations, the screws are configured for 242, 243 are configured for driving the feedstock material through the barrel 210 as the feedstock material is heated.

Figure 28:
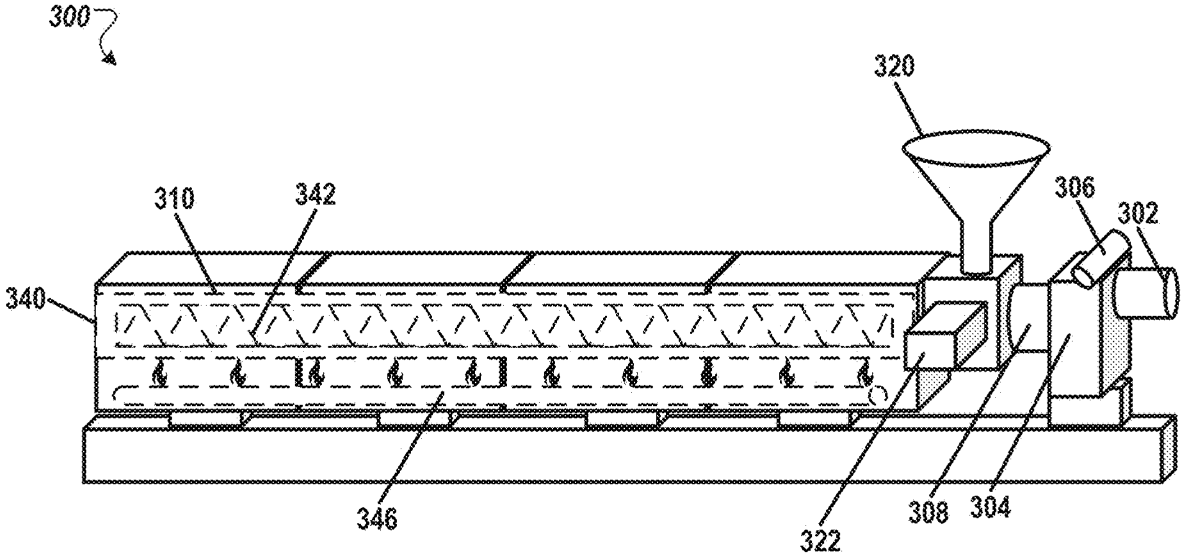
FIG. 28. Schematic perspective side view of an example single-screw extruder with a gas/flame heated barrel.

FIG. 28 provides a perspective view of another example implementation of an extruder 300 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 300's barrel is labeled 310).

In the illustrated implementation, the extruder 300 includes one or more gas powered heating elements 346. As shown in FIG. 28, the gas-powered heating elements 346 are configured for heating the extruder's barrel 310 in order to thereby heat the feedstock material being translated through the barrel 310. Although the extruder 300 is depicted with a single screw 342, in other implementations, the extruder 300 may be provided with twin screws. Additionally, various implementations may include a combination of gas and electric heating elements for heating the barrel 310.

Figure 29:
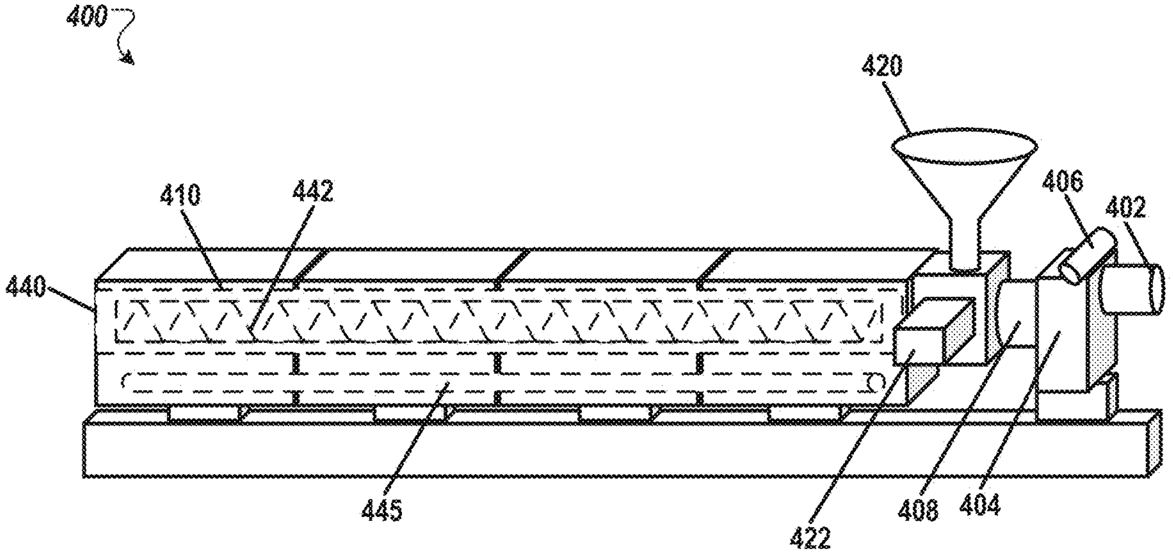
FIG. 29. Schematic perspective side view of an example single-screw extruder with an oil heated barrel.

FIG. 29 provides a perspective view of another example implementation of an extruder 400 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 400's barrel is labeled 410).

In the illustrated implementation, the extruder 400 includes one or more oil-based heating elements 346. As shown in FIG. 28, the oil-based heating elements 445 may define a series of conduits or channels around the barrel 410, through which heated oil (or another suitable liquid) may be pumped. In this way, the oil-based heating elements 445 are configured for heating the extruder's barrel 410 in order to thereby heat the feedstock material being translated through the barrel 410. In various implementations, the heated oil may be heated by electric or gas-powered heating elements associated with the oil-based heating elements 445. In some implementations, the oil-based heating elements 346 may comprise one or more molten salt heating elements. Although the extruder 400 is depicted with a single screw 442, in other implementations, the extruder 400 may be provided with twin screws. Additionally, various implementations may include a combination of oil, gas, and electric heating elements for heating the barrel 410.

Figure 30:
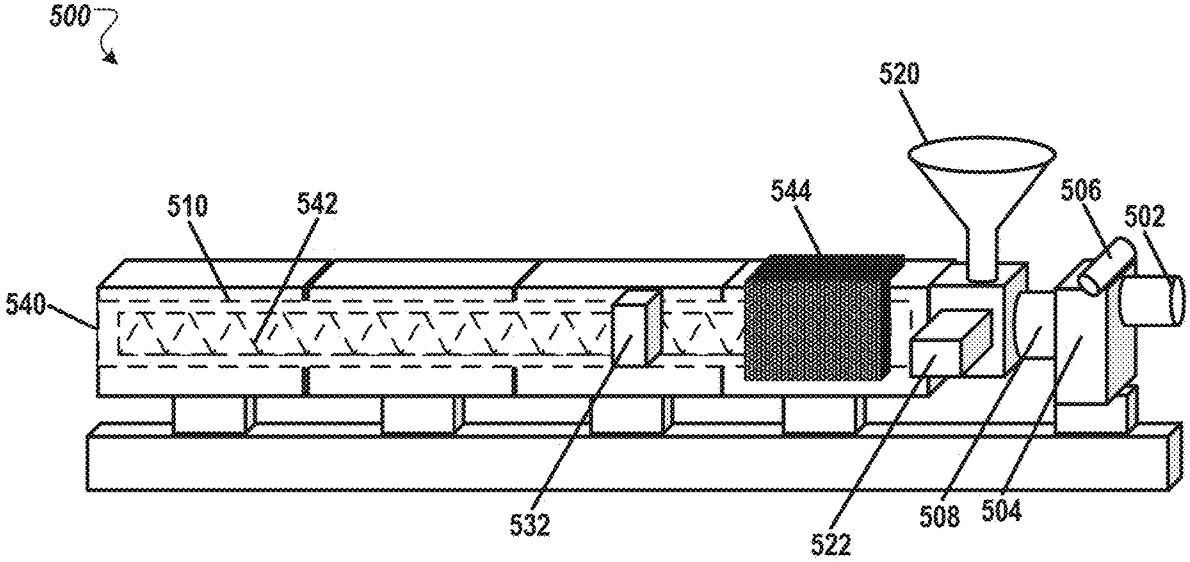
FIG. 30. Schematic perspective side view of an example single-screw extruder with an electrically heated barrel and a single vent.

FIG. 30 provides a perspective view of another example implementation of an extruder 500 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 500's barrel is labeled 510).

As shown in FIG. 30, electric heaters 544 are positioned around the extruder's barrel 510. In addition, a vent 532. Generally, the vent 532 is configured to allow vapors and/or gases produced from the plastic feedstock during the heating process to escape from the extruder 500. In this way, the vent 532 may allow for removal of residual vapor and contaminants that can have a negative impact on the oil, wax, or gas product quality. In one implementation, the vent 532 is an ambient pressure vent. In other implementations, the vent 532 is under vacuum.

Although the extruder 500 is depicted with a single screw 542, in other implementations, the extruder 500 may be provided with twin screws. Additionally, various implementations may include a combination of oil, gas, and electric heating elements for heating the barrel 510.

Figure 31:
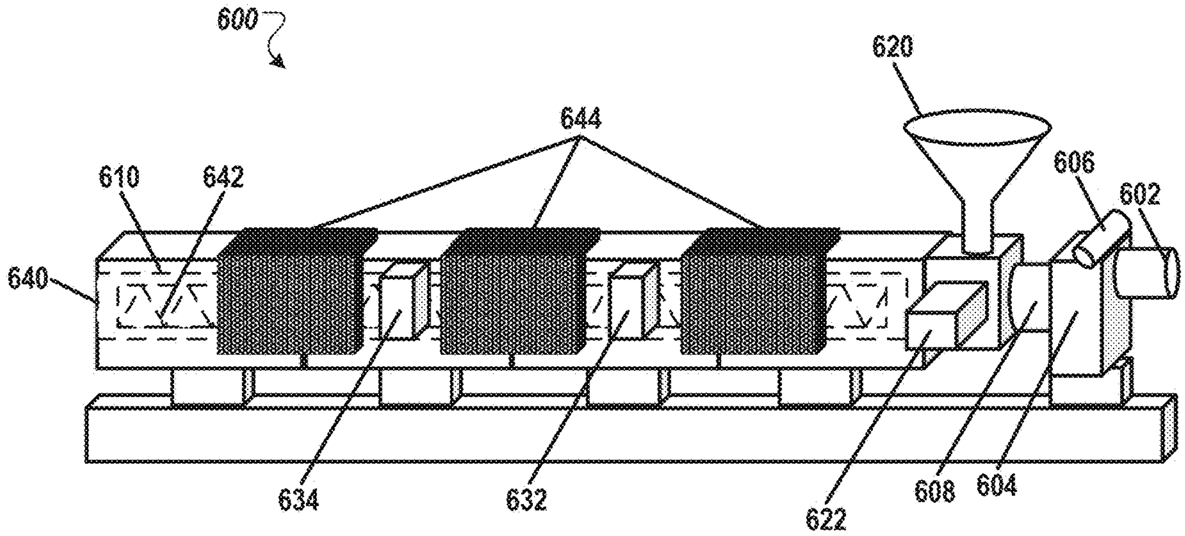
FIG. 31. Schematic perspective side view of an example single-screw extruder with an electrically heated barrel and two vents.

FIG. 31 provides a perspective view of another example implementation of an extruder 600 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 600's barrel is labeled 610).

As shown in FIG. 31, electric heaters 644 are positioned around the extruder's barrel 610. In addition, a pair of vents 632, 634 are provided along the extruder's barrel 610. Generally, the vents 632, 634 are configured to allow vapors and/or gases produced from the plastic feedstock during the heating process to escape from the extruder 600. In this way, the vents 632, 634 may allow for removal of residual vapor and contaminants that can have a negative impact on the oil, wax, or gas product quality. In one implementation, both vents 632, 634 are ambient pressure vents. In other implementations, both vents 632, 634 are under vacuum. In other implementations, the first vent 632 is an ambient pressure vent while the second vent 634 is under vacuum.

Although the extruder 600 is depicted with a single screw 642, in other implementations, the extruder 600 may be provided with twin screws. Additionally, various implementations may include a combination of oil, gas, and electric heating elements for heating the barrel 610.

Figure 32:
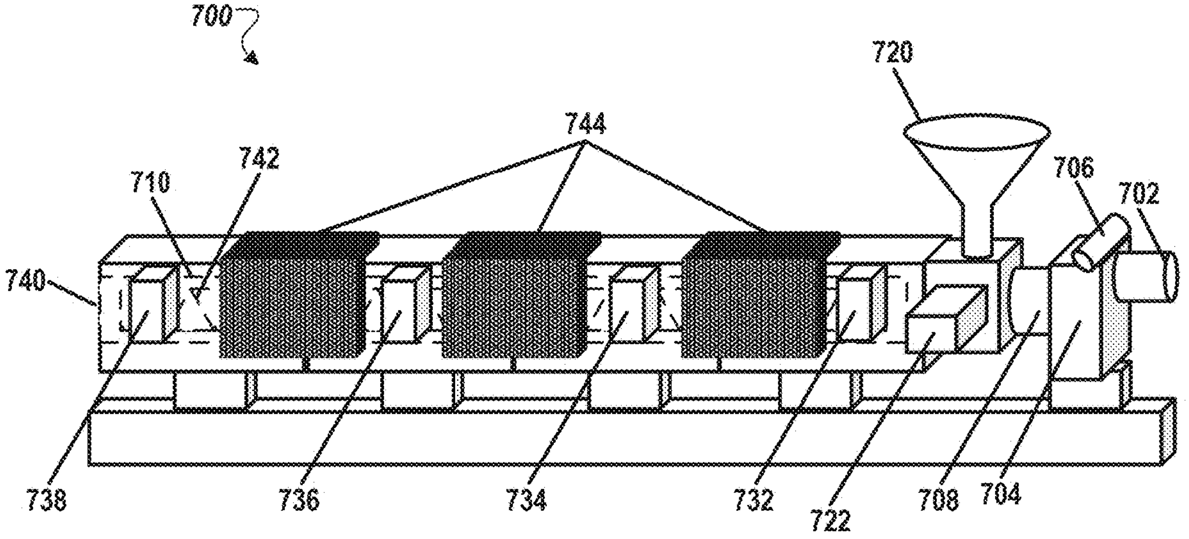
FIG. 32. Schematic perspective side view of an example single-screw extruder with an electrically heated barrel and four vents.

FIG. 32 provides a perspective view of another example implementation of an extruder 700 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 700's barrel is labeled 710).

As shown in FIG. 32, electric heaters 744 are positioned around the extruder's barrel 710. In addition, four vents 732, 734, 736, 738 are provided along the extruder's barrel 710. Generally, the vents 732, 734, 736, 738 are configured to allow vapors and/or gases produced from the plastic feedstock during the heating process to escape from the extruder 700. In this way, the vents 732, 734, 736, 738 may allow for removal of residual vapor and contaminants that can have a negative impact on the oil, wax, or gas product quality. In one implementation, the vents 732, 734, 736, 738 are ambient pressure vents. In other implementations, the vents 732, 734, 736, 738 are under vacuum. In other implementations, one or more of the vents 732, 734, 736, 738 are ambient pressure vents while one or more of the vents 732, 734, 736, 738 are under vacuum.

Although the extruder 700 is depicted with a single screw 742, in other implementations, the extruder 700 may be provided with twin screws. Additionally, various implementations may include a combination of oil, gas, and electric heating elements for heating the barrel 710.

Figure 33:
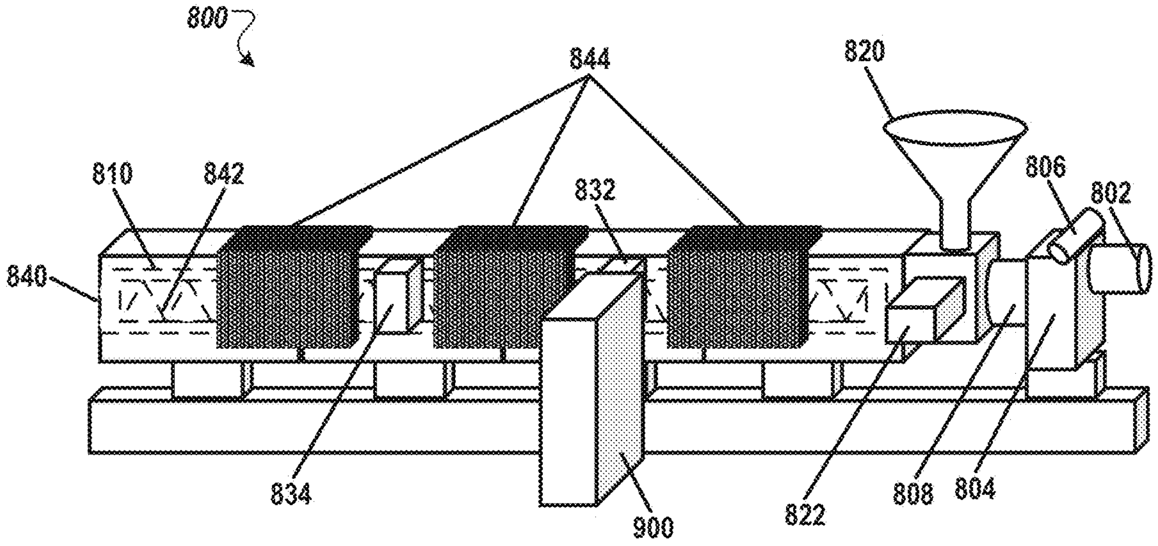
FIG. 33. Schematic perspective side view of an example single-screw extruder with an electrically heated barrel, two vents, and a vent stuffer.

FIG. 33 provides a perspective view of another example implementation of an extruder 800 configured for heating plastic feedstock (e.g., loose film, baled film, rigids, thermoforms, sheets, foams, non-wovens, strips, pellets, powder, purge patties, densified, shredded, and other post-consumer and/or post-industrial plastics) and converting the feedstock into a molten or semi-molten state. Elements shared with the extruder 100 are given common references (e.g., the extruder 100's barrel is labeled 110 while the extruder 800's barrel is labeled 810).

As shown in FIG. 33, electric heaters 844 are positioned around the extruder's barrel 810. In addition, a pair of vents 832, 834 are provided along the extruder's barrel 810. Generally, the vents 832, 834 are configured to allow vapors and/or gases produced from the plastic feedstock during the heating process to escape from the extruder 800. In this way, the vents 832, 834 may allow for removal of residual vapor and contaminants that can have a negative impact on the oil, wax, or gas product quality. In one implementation, both vents 832, 834 are ambient pressure vents. In other implementations, both vents 832, 834 are under vacuum. In other implementations, the first vent 832 is an ambient pressure vent while the second vent 834 is under vacuum.

Although the extruder 800 is depicted with a single screw 842, in other implementations, the extruder 800 may be provided with twin screws. Additionally, various implementations may include a combination of oil, gas, and electric heating elements for heating the barrel 810.

Figure 34:
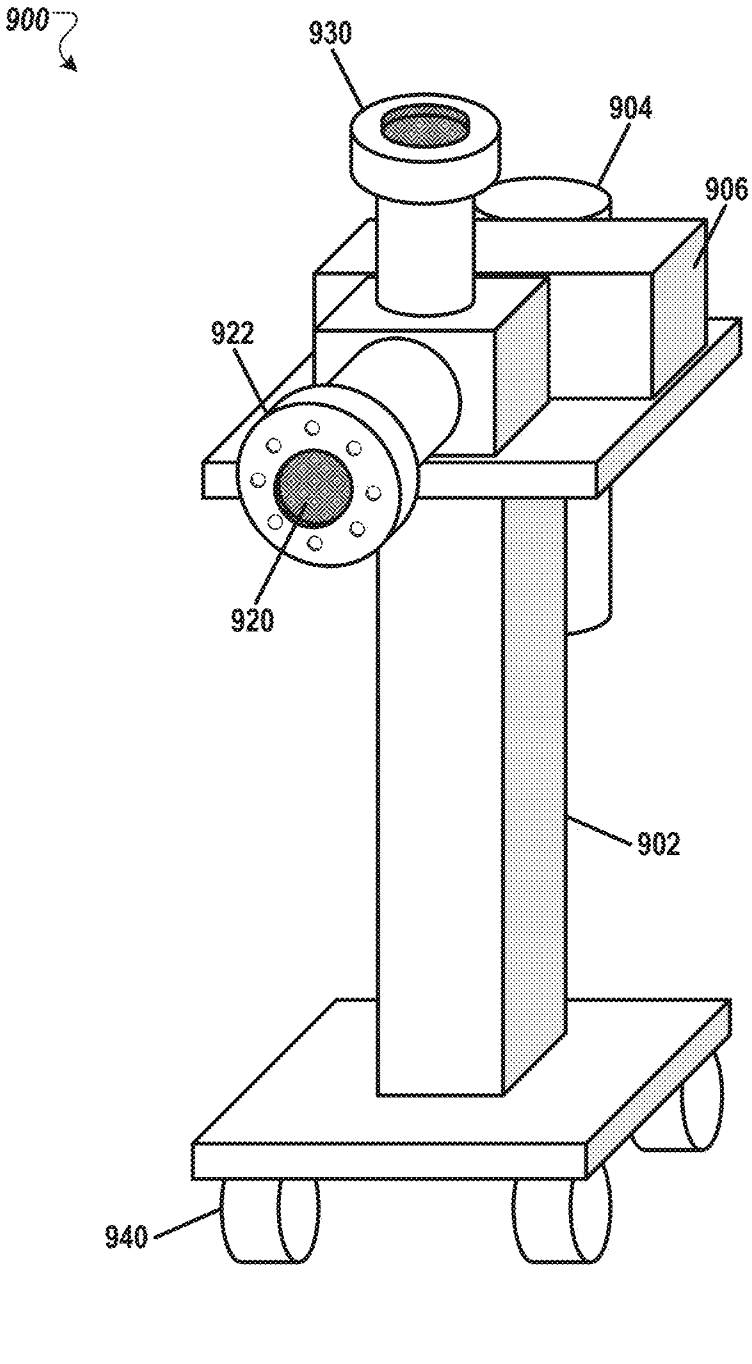
FIG. 34. Schematic perspective front view of an example vent stuffer.

In the illustrated implementation, a vent feeding device 900 is used at the first vent 832 to prevent expulsion of melted plastic from the vent 832. As an example, FIG. 34 shows a vent feeding device 900 according to one implementation. As shown in FIG. 34, the vent feeding device 900 is elevated on a stand 902 with wheels 940 and configured to be selectively engaged with the vent 832 via a vent inlet interface 922. The vent feeding device 900 further includes a motor 904 that is coupled to a gearbox 906 and configured for driving single or twin screw elements (not shown) positioned within a vent inlet 920. The vent feeder 900 also includes a vapor outlet 930 (e.g., a vent) that will allow vapor and contaminants to pass by the screw(s) (e.g., into a scrubber system). In addition to removing contaminants, the vent feeding device 900 serves to prevent the occurrence of vent flow from the extruder (e.g., preventing molten feedstock from being expelled from the extruder vent 832).

Pyrolysis Reactors

The hydrocarbons that make up the feedstock plastic polymers include chains and rings of hydrocarbon molecules linked together to form the solid materials with some additives to the structures to adjust properties such as plasticity, stabilization against ultraviolet light degradation, and extrusion slip.

Oil and wax production is accomplished by heating the incoming stream of plastic (e.g., raw feedstock, melted feedstock, semi-molten feedstock from the extruders, etc.) in an oxygen-free environment to the point where the plastic is a fully molten liquid and the polymers "depolymerize". During the conversion process, the hydrocarbon plastic chains and groups of rings are split apart by the heating process into smaller segments until they are small and light enough to exit the reactor as a vapor.

For example, the systems and methods can include one or more pyrolysis reactors (e.g., two or more, or three or more) for pyrolyzing the feedstock. The pyrolysis can be accomplished using any suitable pyrolysis reactor, such as, for example, an auger pyrolysis reactor, a screw pyrolysis reactor, a rotary kiln pyrolysis reactor, a drum pyrolysis reactor, a tubular pyrolysis reactor, a fluidized bed reactor, a spouted bed reactor, a molten salt reactor, a molten metal reactor, a fixed-bed reactor, a continuously stirred reactor, a Heinz Retort Pyrolysis reactor, a vortex pyrolysis reactor, a batch pyrolysis reactor, a semi-batch pyrolysis reactor, or a combination thereof. In some examples, the system and methods can include one or more batch pyrolysis reactors, semi-batch pyrolysis reactors, a continuously stirred reactor, or a combination thereof. The reactors can have any suitable orientation, such as horizonal or vertical. In some examples, the reactors are vertical reactors.

Each reactor can receive feedstock from one or more upstream components (e.g., storage bunker, extruder, etc.).

In some examples, the system includes one or more reactors (e.g., two or more, or three or more) configured to receive the semi-molten feedstock from the extruder(s). In some examples, the system can include a plurality of reactors. Each reactor can, for example, process the output of one or more extruders.

The volume of each reactor can be selected, for example, in view of the throughput of the system.

In some examples, the volume of each reactor can independently be 1 cubic foot ($ft^3$) or more (e.g., 2 $ft^3$ or more, 3 $ft^3$ or more, 4 $ft^3$ or more, 5 $ft^3$ or more, 10 $ft^3$ or more, 15 $ft^3$ or more, 20 $ft^3$ or more, 25 $ft^3$ or more, 30 $ft^3$ or more, 35 $ft^3$ or more, 40 $ft^3$ or more, 45 $ft^3$ or more, 50 $ft^3$ or more, 60 $ft^3$ or more, 70 $ft^3$ or more, 80 $ft^3$ or more, 90 $ft^3$ or more, 100 $ft^3$ or more, 125 $ft^3$ or more, 150 $ft^3$ or more, 175 $ft^3$ or more, 200 $ft^3$ or more, 225 $ft^3$ or more, 250 $ft^3$ or more, 300 $ft^3$ or more, 350 $ft^3$ or more, 400 $ft^3$ or more, 450 $ft^3$ or more, 500 $ft^3$ or more, 600 $ft^3$ or more, 700 $ft^3$ or more, 800 $ft^3$ or more, 900 $ft^3$ or more, 1,000 $ft^3$ or more, 1,100 $ft^3$ or more, 1,200 $ft^3$ or more, 1,300 $ft^3$ or more, 1,400 $ft^3$ or more, 1,500 $ft^3$ or more, 1,600 $ft^3$ or more, 1,700 $ft^3$ or more, 1,800 $ft^3$ or more, 1900 $ft^3$ or more, 2,000 $ft^3$ or more, 2,100 $ft^3$ or more, 2,200 $ft^3$ or more, 2,300 $ft^3$ or more, 2,400 $ft^3$ or more, 2,500 $ft^3$ or more, 2,600 $ft^3$ or more, 2,700 $ft^3$ or more, or 2,800 $ft^3$ or more). In some examples, the volume of each reactor can independently be 3,000 $ft^3$ or less (e.g., 2,900 $ft^3$ or less, 2,800 $ft^3$ or less, 2,700 $ft^3$ or less, 2,600 $ft^3$ or less, 2,500 $ft^3$ or less, 2,400 $ft^3$ or less, 2,300 $ft^3$ or less, 2,200 $ft^3$ or less, 2,100 $ft^3$ or less, 2,000 $ft^3$ or less, 1900 $ft^3$ or less, 1,800 $ft^3$ or less, 1,700 $ft^3$ or less, 1,600 $ft^3$ or less, 1,500 $ft^3$ or less, 1,400 $ft^3$ or less, 1,300 $ft^3$ or less, 1,200 $ft^3$ or less, 1,100 $ft^3$ or less, 1,000 $ft^3$ or less, 900 $ft^3$ or less, 800 $ft^3$ or less, 700 $ft^3$ or less, 600 $ft^3$ or less, 500 $ft^3$ or less, 450 $ft^3$ or less, 400 $ft^3$ or less, 350 $ft^3$ or less, 300 $ft^3$ or less, 250 $ft^3$ or less, 225 $ft^3$ or less, 200 $ft^3$ or less, 175 $ft^3$ or less, 150 $ft^3$ or less, 125 $ft^3$ or less, 100 $ft^3$ or less, 90 $ft^3$ or less, 80 $ft^3$ or less, 70 $ft^3$ or less, 60 $ft^3$ or less, 50 $ft^3$ or less, 45 $ft^3$ or less, 40 $ft^3$ or less, 35 $ft^3$ or less, 30 $ft^3$ or less, 25 $ft^3$ or less, 20 $ft^3$ or less, 15 $ft^3$ or less, 10 $ft^3$ or less, 5 $ft^3$ or less, 4 $ft^3$ or less, 3 $ft^3$ or less, or 2 $ft^3$ or less). The volume of each reactor can independently range from any of the minimum values described above to any of the maximum values described above. For example, the volume of each reactor can independently be from 1 $ft^3$ to 3,000 $ft^3$ (e.g., from 1 to 1,500 $ft^3$, from 1,500 to 3,000 $ft^3$, from 1 to 750 $ft^3$, from 750 to 1,500 $ft^3$, from 1,500 to 2,250 $ft^3$, from 2,250 to 3,000 $ft^3$, from 1 to 500 $ft^3$, from 500 to 1,000 $ft^3$, from 1,000 to 1,500 $ft^3$, from 1,500 to 2,000 $ft^3$, from 2,000 to 2,500 $ft^3$, from 2,500 to 3,000 $ft^3$, from 1 to 2,800 $ft^3$, from 1 to 2,600 $ft^3$, from 1 to 2,400 $ft^3$, from 1 to 2,200 $ft^3$, from 1 to 2,000 $ft^3$, from 1 to 1,800 $ft^3$, from 1 to 1,600 $ft^3$, from 1 to 1,400 $ft^3$, from 1 to 1,300 $ft^3$, from 1 to 1,200 $ft^3$, from 1 to 1,100 $ft^3$, from 1 to 1,000 $ft^3$, from 1 to 900 $ft^3$, from 1 to 800 $ft^3$, from 1 to 700 $ft^3$, from 1 to 600 $ft^3$, from 1 to 400 $ft^3$, from 1 to 300 $ft^3$, from 1 to 200 $ft^3$, from 1 to 100 $ft^3$, from 1 to 50 $ft^3$, from 1 to 25 $ft^3$, from 1 to 10 $ft^3$, from 10 to 3,000 $ft^3$, from 25 to 3,000 $ft^3$, from 50 to 3,000 $ft^3$, from 100 to 3,000 $ft^3$, from 200 to 3,000 $ft^3$, from 300 to 3,000 $ft^3$, from 400 to 3,000 $ft^3$, from 500 to 3,000 $ft^3$, from 600 to 3,000 $ft^3$, from 700 to 3,000 $ft^3$, from 800 to 3,000 $ft^3$, from 900 to 3,000 $ft^3$, from 1,000 to 3,000 $ft^3$, from 1,200 to 3,000 $ft^3$, from 1,400 to 3,000 $ft^3$, from 1,600 to 3,000 $ft^3$, from 1,800 to 3,000 $ft^3$, from 2,000 to 3,000 $ft^3$, from 2,200 to 3,000 $ft^3$, from 2,400 to 3,000 $ft^3$, from 2,600 to 3,000 $ft^3$, from 5 to 2,500 $ft^3$, from 10 to 1,500 $ft^3$, from 25 to 1,500 $ft^3$, from 50 to 1,500 $ft^3$, from 100 to 1,500 $ft^3$, from 200 to 1,500 $ft^3$, from 300 to 1,500 $ft^3$, from 400 to 1,500 $ft^3$, from 500 to 1,500 $ft^3$, from 600 to 1,500 $ft^3$, from 700 to 1,500 $ft^3$, from 800 to 1,500 $ft^3$, from 900 to 1,500 $ft^3$, from 1,200 to 1,500 $ft^3$, from 1,300 to 1,500 $ft^3$, from 10 to 1,400 $ft^3$, from 100 to 1,000 $ft^3$, or from 500 to 750 $ft^3$). For example, the volume of each reactor can independently be from 1 to 1,500 $ft^3$.

In some examples, the volume of each reactor can independently be 100 gallons or more (e.g., 250 gallons or more, 500 gallons or more, 750 gallons or more, 1,000 gallons or more, 1,500 gallons or more, 2,000 gallons or more, 2,500 gallons or more, 3,000 gallons or more, 3,500 gallons or more, 4,000 gallons or more, 4,500 gallons or more, 5,000 gallons or more, 5,500 gallons or more, 6,000 gallons or more, 6,500 gallons or more, 7,000 gallons or more, 7,500 gallons or more, 8,000 gallons or more, 8,500 gallons or more, 9,000 gallons or more, 10,000 gallons or more, 11,000 gallons or more, 12,000 gallons or more, 13,000 gallons or more, 14,000 gallons or more, 15,000 gallons or more, 16,000 gallons or more, 17,000 gallons or more, 18,000 gallons or more, or 19,000 gallons or more). In some examples, the volume of each reactor can independently be 20,000 gallons or less (e.g., 19,000 gallons or less, 18,000 gallons or less, 17,000 gallons or less, 16,000 gallons or less, 15,000 gallons or less, 14,000 gallons or less, 13,000 gallons or less, 12,000 gallons or less, 11,000 gallons or less, 10,000 gallons or less, 9,500 gallons or less, 9,000 gallons or less, 8,500 gallons or less, 8,000 gallons or less, 7,500 gallons or less, 7,000 gallons or less, 6,500 gallons or less, 6,000 gallons or less, 5,500 gallons or less, 5,000 gallons or less, 4,500 gallons or less, 4,000 gallons or less, 3,500 gallons or less, 3,000 gallons or less, 2,500 gallons or less, 2,000 gallons or less, 1,500 gallons or less, 1,000 gallons or less, 750 gallons or less, 500 gallons or less, or 250 gallons or less). The volume of each reactor can independently range from any of the minimum values described above to any of the maximum values described above. For example, the volume of each reactor can independently be from 100 gallons to 20,000 gallons (e.g., from 100 to 1,000 gallons, from 1,000 to 10,000 gallons, from 10,000 to 20,000 gallons, from 100 to 500 gallons, from 500 to 1,000 gallons, from 1,000 to 5,000 gallons, from 5,000 to 10,000 gallons, from 10,000 to 15,000 gallons, from 15,000 to 20,000 gallons, from 100 to 18,000 gallons, from 100 to 16,000 gallons, from 100 to 14,000 gallons, from 100 to 12,000 gallons, from 100 to 10,000 gallons, from 100 to 9,000 gallons, from 100 to 8,000 gallons, from 100 to 8,000 gallons, from 100 to 7,000 gallons, from 100 to 6,000 gallons, from 100 to 5,000 gallons, from 100 to 4,000 gallons, from 100 to 3,000 gallons, from 100 to 2,000 gallons, from 500 to 20,000 gallons, from 1,000 to 20,000 gallons, from 2,000 to 20,000 gallons, from 3,000 to 20,000 gallons, from 4,000 to 20,000 gallons, from 5,000 to 20,000 gallons, from 6,000 to 20,000 gallons, from 8,000 to 20,000 gallons, from 12,000 to 20,000 gallons, from 14,000 to 20,000 gallons, from 16,000 to 20,000 gallons, from 500 to 19,000 gallons, from 1,000 to 15,000 gallons, from 500 to 10,000 gallons, from 1,000 to 10,000 gallons, from 2,000 to 10,000 gallons, from 3,000 to 10,000 gallons, from 4,000 to 10,000 gallons, from 6,000 to 10,000 gallons, from 7,000 to 10,000 gallons, from 8,000 to 10,000 gallons, from 500 to 9,000 gallons, or from 1,000 to 7,500 gallons). In some examples, the volume of each reactor can independently be from 100 gallons to 10,000 gallons.

Each reactor is equipped with heaters, for example internal and/or external heaters. The heaters can be any suitable type of heaters, such as electric, microwave, and/or gas heaters. The heaters provide the heat needed to raise temperatures inside the reactor to a point where the pyrolysis process takes place. The heaters can also provide the heat needed to maintain temperatures inside the reactor at a point where the pyrolysis process takes place. In some examples, a plurality of heaters can be arrayed on the reactor's exterior and/or within its interior.

In some examples, the heaters are gas heaters (e.g., gas powered heaters), which can be fed from commercial gas fuel and/or recycled hydrocarbon gases recovered from the reactor products (e.g., propane, butane, and/or pentane). In some examples, the heaters are electric heaters (e.g., electrically powered heaters, resistive heaters, inductive heaters, etc.). In some examples, the electric heaters can be powered by a generator, which in turn can be gas powered and which can be fed from commercial gas fuel and/or recycled hydrocarbon gases recovered from the reactor products (e.g., propane, butane, and/or pentane).

In some examples, the reactors are equipped with a plurality of internal electric heaters, e.g. a plurality of electric heaters positioned within the reactor (e.g., 2 or more, 3 or more, 4 or more, 5 or more, 6 or more 7 or more, 8 or more, 9 or more, 10 or more, 11 or more, 12 or more, 13 or more, 14 or more, 15 or more, 20 or more, 25 or more, 30 or more, 35 or more, 40 or more, 45 or more, 50 or more, 60 or more, 70 or more, 80 or more, 90 or more, 100 or more, 125 or more, 150 or more, 175 or more, or 200 or more). The electric heaters can, for example, be oriented in any suitable direction (e.g., horizontally, vertically, angled) within each reactor inside dry wells. The electric heater temperature can be controlled to provide a prescribed temperature and energy density and/or heat density to the dry well walls which in turn provide a controlled heat flux into the feedstock bath to drive the reactions and minimizing char formation. The number of internal heaters can, for example, be selected based on the size of the reactor and/or the size of the heaters. Supplemental electric heaters on the outer surface of the reactors can also be provided that operate at the same temperatures and energy density and/or heat density as the internal heaters, as necessary.

In some implementations, the average heat density applied by each of the internal and/or external heaters can, for example, independently be 5 watts per square inch ($W/in^2$) or more (e.g., 6 $W/in^2$ or more, 7 $W/in^2$ or more, 8 $W/in^2$ or more, 9 $W/in^2$ or more, 10 $W/in^2$ or more, 11 $W/in^2$ or more, 12 $W/in^2$ or more, 13 $W/in^2$ or more, 14 $W/in^2$ or more, 15 $W/in^2$ or more, 16 $W/in^2$ or more, 17 $W/in^2$ or more, 18 $W/in^2$ or more, 19 $W/in^2$ or more, 20 $W/in^2$ or more, 21 $W/in^2$ or more, 22 $W/in^2$ or more, 23 $W/in^2$ or more, 24 $W/in^2$ or more, 25 $W/in^2$ or more, 26 $W/in^2$ or more, 27 $W/in^2$ or more, 28 $W/in^2$ or more, 29 $W/in^2$ or more, 30 $W/in^2$ or more, 31 $W/in^2$ or more, 32 $W/in^2$ or more, 33 $W/in^2$ or more, 34 $W/in^2$ or more, 35 $W/in^2$ or more, 36 $W/in^2$ or more, 37 $W/in^2$ or more, 38 $W/in^2$ or more, 39 $W/in^2$ or more, 40 $W/in^2$ or more, 41 $W/in^2$ or more, 42 $W/in^2$ or more, 43 $W/in^2$ or more, 44 $W/in^2$ or more, 45 $W/in^2$ or more, 46 $W/in^2$ or more, 47 $W/in^2$ or more, 48 $W/in^2$ or more, 49 $W/in^2$ or more, 50 $W/in^2$ or more, 51 $W/in^2$ or more, 52 $W/in^2$ or more, 53 $W/in^2$ or more, or 54 $W/in^2$ or more). In some examples, the average heat density applied by each of the internal and/or external heaters can independently be 55 $W/in^2$ or less (e.g., 54 $W/in^2$ or less, 53 $W/in^2$ or less, 52 $W/in^2$ or less, 51 $W/in^2$ or less, 50 $W/in^2$ or less, 49 $W/in^2$ or less, 48 $W/in^2$ or less, 47 $W/in^2$ or less, 46 W/in$^2$ or less, 45 W/in$^2$ or less, 44 W/in$^2$ or less, 43 W/in$^2$ or less, 42 W/in$^2$ or less, 41 W/in$^2$ or less, 40 W/in$^2$ or less, 39 W/in$^2$ or less, 38 W/in$^2$ or less, 37 W/in$^2$ or less, 36 W/in$^2$ or less, 35 W/in$^2$ or less, 34 W/in$^2$ or less, 33 W/in$^2$ or less, 32 W/in$^2$ or less, 31 W/in$^2$ or less, 30 W/in$^2$ or less, 29 W/in$^2$ or less, 28 W/in$^2$ or less, 27 W/in$^2$ or less, 26 W/in$^2$ or less, 25 W/in$^2$ or less, 24 W/in$^2$ or less, 23 W/in$^2$ or less, 22 W/in$^2$ or less, 21 W/in$^2$ or less, 20 W/in$^2$ or less, 19 W/in$^2$ or less, 18 W/in$^2$ or less, 17 W/in$^2$ or less, 16 W/in$^2$ or less, 15 W/in$^2$ or less, 14 W/in$^2$ or less, 13 W/in$^2$ or less, 12 W/in$^2$ or less, 11 W/in$^2$ or less, 10 W/in$^2$ or less, 9 W/in$^2$ or less, 8 W/in$^2$ or less, or 7 W/in$^2$ or less). The average heat density applied by each of the internal and/or external heaters can independently range from any of the minimum values described above to any of the maximum values described above. For example, the average heat density applied by each of the internal and/or external heaters can independently be from 5 to 55 W/in$^2$ (e.g., from 5 to 30 W/in$^2$, from 30 to 55 W/in$^2$, from 5 to 15 W/in$^2$, from 15 to 25 W/in$^2$, from 25 to 35 W/in$^2$, from 35 to 45 W/in$^2$, from 45 to 55 W/in$^2$, from 5 to 50 W/in$^2$, from 5 to 45 W/in$^2$, from 5 to 40 W/in$^2$, from 5 to 35 W/in$^2$, from 5 to 30 W/in$^2$, from 5 to 20 W/in$^2$, from 5 to 25 W/in$^2$, from 10 to 55 W/in$^2$, from 15 to 55 W/in$^2$, from 20 to 55 W/in$^2$, from 25 to 55 W/in$^2$, from 35 to 55 W/in$^2$, from 40 to 55 W/in$^2$, from 10 to 50 W/in$^2$, from 10 to 45 W/in$^2$, from 15 to 45 W/in$^2$, from 20 to 45 W/in$^2$, from 25 to 45 W/in$^2$, from 30 to 45 W/in$^2$, from 10 to 40 W/in$^2$, from 15 to 35 W/in$^2$, from 12 to 30 W/in$^2$, or from 16 to 24 W/in$^2$). In some examples, the average heat density applied by each of the internal and/or external heaters can independently be from 5 to 45 W/in$^2$.

The combined energy density applied by the reactor's internal and/or external heater systems can, for example, independently be 0.05 kilowatts per pound of pyrolyzed product produced within the reactor (kW/lb.) or more (e.g., 0.05 kW/lb. or more, 0.10 kW/lb. or more, 0.15 kW/lb. or more, 0.20 kW/lb. or more, 0.25 kW/lb. or more, 0.30 kW/lb. or more, 0.35 kW/lb. or more, 0.40 kW/lb. or more, 0.45 kW/lb. or more, 0.50 kW/lb. or more, 0.55 kW/lb. or more, 0.60 kW/lb. or more, 0.65 kW/lb. or more, 0.70 kW/lb. or more, 0.75 KW/lb. or more, 0.80 kW/lb. or more, 0.85 kW/lb. or more, 0.90 kW/lb. or more, 0.95 kW/lb. or more). In some examples, the combined energy density applied by the reactor's internal and/or external heater systems can, for example, independently be 1.0 kW/lb. or less (e.g., 0.95 kW/lb. or less, 0.90 kW/lb. or less, 0.85 kW/lb. or less, 0.80 kW/lb. or less, 0.75 KW/lb. or less, 0.70 kW/lb. or less, 0.65 kW/lb. or less, 0.60 kW/lb. or less, 0.55 kW/lb. or less, 0.50 kW/lb. or less, 0.45 kW/lb. or less, 0.40 kW/lb. or less, 0.35 kW/lb. or less, 0.30 kW/lb. or less, 0.25 kW/lb. or less, 0.20 kW/lb. or less, 0.15 kW/lb. or less, 0.10 kW/lb. or less). The combined energy density applied by the reactor's internal and/or external heater systems can, for example, independently range from any of the minimum values described above to any of the maximum values described above. For example, the combined energy density applied by the reactor's internal and/or external heater systems can independently be from 0.05 to 1.0 kW/lb. (e.g., from 0.05 to 0.25 kW/lb., from 0.25 to 0.50 kW/lb., from 0.50 to 0.75 KW/lb., from 0.75 to 1.0 kW/lb., from 0.05 to 0.15 kW/lb., from 0.15 to 0.30 kW/lb., from 0.30 to 0.45 kW/lb., from 0.45 to 0.60 kW/lb., from 0.60 to 0.75 KW/lb., from 0.75 to 0.90 kW/lb., or from 0.90 to 1.0 kW/lb.).

In some implementations, the pyrolysis reactor (or one or more pyrolysis reactors in the pyrolysis system) are configured for using energy at an average rate of 0.70 kW or less per pound of pyrolyzed product produced within the reactor per hour (e.g., 0.68 kW or less, 0.66 kW or less, 0.64 kW or less, 0.62 kW or less, 0.60 kW or less, 0.58 kW or less, 0.56 kW or less, 0.54 kW or less, 0.52 kW or less, 0.50 kW or less, 0.48 kW or less, 0.46 kW or less, 0.44 kW or less, 0.42 kW or less, 0.40 kW or less, 0.38 kW or less, 0.36 kW or less, 0.34 kW or less, 0.32 kW or less, 0.30 kW or less, 0.28 kW or less, 0.26 kW or less, 0.24 kW or less, 0.22 kW or less, 0.20 kW or less, 0.18 kW or less, 0.16 kW or less, 0.14 kW or less, 0.12 kW or less, 0.10 KW or less, 0.08 kW or less). In some implementations, the pyrolysis reactor (or one or more pyrolysis reactors in the pyrolysis system) are configured for using energy at an average rate from 0.08 kW to 0.70 KW per pound of pyrolyzed product produced within the reactor per hour (e.g., from 0.08 kW to 0.68 kW, from 0.08 kW to 0.66 KW, from 0.08 kW to 0.64 kW, from 0.08 kW to 0.62 kW, from 0.08 kW to 0.60 kW, from 0.08 kW to 0.58 kW, from 0.08 kW to 0.56 kW, from 0.08 kW to 0.54 KW, from 0.08 kW to 0.52 kW, from 0.08 kW to 0.50 KW, from 0.08 kW to 0.48 kW, from 0.08 kW to 0.46 kW, from 0.08 kW to 0.44 kW, from 0.08 kW to 0.42 kW, from 0.08 kW to 0.40 KW, from 0.08 kW to 0.38 kW, from 0.08 kW to 0.36 kW, from 0.08 kW to 0.34 kW, from 0.08 to 0.32 kW, from 0.08 kW to 0.30 kW, from 0.08 kW to 0.28 kW, from 0.08 kW to 0.26 kW, from 0.08 kW to 0.24 kW, from 0.08 kW to 0.22 kW, from 0.08 kW to 0.20 kW, from 0.08 kW to 0.20 kW, from 0.08 kW to 0.18 KW, from 0.08 kW to 0.16 kW, from 0.08 kW to 0.14 kW, from 0.08 kW to 0.12 kW, from 0.08 kW to 0.12 kW). In some specific implementations, the foregoing average energy efficiency ranges may be achieved using the pyrolysis reactor 5000 shown and described with respect to FIG. 47. In some specific implementations, the foregoing average energy efficiency ranges may be achieved using the pyrolysis system S100*e* of FIG. 5, where the extruder S107*a* comprises the extruder 800 shown and described with respect to FIG. 33 and the pyrolysis reactor S108*a* comprises the pyrolysis reactor 5000 shown and described with respect to FIG. 47.

The pyrolysis process can produce light hydrocarbon gases (e.g., propane, butane, and/or pentane) which can be separated from the oil and wax product streams and used as an energy source, fuel, or chemical feedstock.

Localized overheating and/or high temperatures can result in solid char (coke) formation. Char buildup can require periodic clean out of a reactor for char removal from heating surfaces. Loose char can also be formed by any wood, cardboard, or paper materials that enter the system as part of the feedstock. Reactor temperature monitoring, accurate and precise individual heater control, and good heat transfer from the heaters into the liquid feedstock can, for example, be selected to control and limit the amount and/or rate of char formation.

The feedstock can, for example, be heated to a temperature of 200° C. or more within the reactor (e.g., 225° C. or more, 250° C. or more, 275° C. or more, 300° C. or more, 325° C. or more, 350° C. or more, 375° C. or more, 400° C. or more, 425° C. or more, 450° C. or more, 475° C. or more, 500° C. or more, 550° C. or more, 600° C. or more, 650° C. or more, 700° C. or more, 750° C. or more, 800° C. or more, 850° C. or more, 900° C. or more, 950° C. or more). In some examples, the feedstock can be heated to a temperature of 1,000° C. or less within the reactor (e.g., 950° C. or less, 900° C. or less, 850° C. or less, 800° C. or less, 750° C. or less, 700° C. or less, 650° C. or less, 600° C. or less, 550° C. or less, 500° C. or less, 475° C. or less, 450° C. or less, 425° C. or less, 400° C. or less, 375° C. or less, 350° C. or less, 325° C. or less, 300° C. or less, 275° C. or less, or 250° C. or less). The temperature to which the feedstock is heated within the reactor can range from any of the minimum values described above to any of the maximum values described above. For example, the feedstock can be heated to a temperature of from 200° C. to 1,000° C. within the reactor (e.g., from 200° C. to 800° C., from 200° C. to 500° C., from 500° C. to 800° C., from 200° C. to 300° C., from 300° C. to 400° C., from 400° C. to 500° C., from 500° C. to 600° C., from 600° C. to 700° C., from 700° C. to 800° C., from 200° C. to 700° C., from 200° C. to 600° C., from 200° C. to 400° C., from 300° C. to 800° C., from 400° C. to 800° C., from 600° C. to 800° C., from 250° C. to 750° C., from 300° C. to 700° C., from 350° C. to 500° C., from 375° C. to 425° C., or from 385° C. to 415° C.).

The feedstock can also, for example, be maintained at a temperature of 200° C. or more within the reactor (e.g., 225° C. or more, 250° C. or more, 275° C. or more, 300° C. or more, 325° C. or more, 350° C. or more, 375° C. or more, 400° C. or more, 425° C. or more, 450° C. or more, 475° C. or more, 500° C. or more, 550° C. or more, 600° C. or more, 650° C. or more, 700° C. or more, 750° C. or more, 800° C. or more, 850° C. or more, 900° C. or more, 950° C. or more). In some examples, the feedstock can be maintained at a temperature of 1,000° C. or less within the reactor (e.g., 950° C. or less, 900° C. or less, 850° C. or less, 800° C. or less, 750° C. or less, 700° C. or less, 650° C. or less, 600° C. or less, 550° C. or less, 500° C. or less, 475° C. or less, 450° C. or less, 425° C. or less, 400° C. or less, 375° C. or less, 350° C. or less, 325° C. or less, 300° C. or less, 275° C. or less, or 250° C. or less). The temperature at which the feedstock is maintained within the reactor can range from any of the minimum values described above to any of the maximum values described above. For example, the feedstock can be maintained at a temperature of from 200° C. to 1,000° C. within the reactor (e.g., from 200° C. to 800° C., from 200° C. to 500° C., from 500° C. to 800° C., from 200° C. to 300° C., from 300° C. to 400° C., from 400° C. to 500° C., from 500° C. to 600° C., from 600° C. to 700° C., from 700° C. to 800° C., from 200° C. to 700° C., from 200° C. to 600° C., from 200° C. to 400° C., from 300° C. to 800° C., from 400° C. to 800° C., from 600° C. to 800° C., from 250° C. to 750° C., from 300° C. to 700° C., from 350° C. to 500° C., from 375° C. to 425° C., or from 385° C. to 415° C.).

In various implementations, the feedstock can be maintained within a given tolerance of a target temperature (i.e., within an acceptable range of temperatures above or below the target temperature). For example, the feedstock can be maintained within a given tolerance of a target temperature of from 200° C. to 1,000° C. Examples of suitable tolerances and control systems for maintaining temperature are described in further detail below.

The liquid and/or vapor phase feedstock inside a reactor can be agitated. For example, the pyrolysis reactor can comprise an auger pyrolysis reactor, a screw pyrolysis reactor, a rotary kiln pyrolysis reactor, a fluidized bed reactor, a continuously stirred reactor, or a combination thereof, wherein the reactor agitates the liquid and/or vapor phase feedstock.

In some examples, the liquid and/or vapor phase feedstock inside a reactor can be kept in continuous motion using an agitator that circulates the liquid and/or vapor phase feedstock inside the reactor. For example, the liquid feedstock can be agitated in a manner that fosters heat transfer from the internal and/or external heaters to the liquid. Liquid feedstock is a good insulator (i.e., has a low thermal conductivity) and the ability to get heat into it in a way that does not lead to charring but still provides enough heat to promote pyrolysis can be an important factor.

For example, each reactor can include an agitator, for example a mixer or stirrer comprising one or more blades. The agitator can be configured so that it can produce liquid flow velocities inside the reactor such that the bath acquires the necessary heat and also avoids long residence times at the heated surfaces. For example, the agitator can be configured such that the entire liquid bath is agitated, e.g. substantially none of the liquid bath is static.

The agitator can, for example, be operated at a speed of 20 RPM or more (e.g., 25 RPM or more, 30 RPM or more, 35 RPM or more, 40 RPM or more, 45 RPM or more, 50 RPM or more, 55 RPM or more, 60 RPM or more, 65 RPM or more, 70 RPM or more, 75 RPM or more, 80 RPM or more, 85 RPM or more, 90 RPM or more, 95 RPM or more, 100 RPM or more, 105 RPM or more, 110 RPM or more, 115 RPM or more, 120 RPM or more, 125 RPM or more, 130 RPM or more, 135 RPM or more, 140 RPM or more, 145 RPM or more, 150 RPM or more, 155 RPM or more, 160 RPM or more, 165 RPM or more, 170 RPM or more, 175 RPM or more, 180 RPM or more, 185 RPM or more, or 190 RPM or more). In some examples, the agitator can be operated at a speed of 200 RPM or less (e.g., 195 RPM or less, 190 RPM or less, 185 RPM or less, 180 RPM or less, 175 RPM or less, 170 RPM or less, 165 RPM or less, 160 RPM or less, 155 RPM or less, 150 RPM or less, 145 RPM or less, 140 RPM or less, 135 RPM or less, 130 RPM or less, 125 RPM or less, 120 RPM or less, 115 RPM or less, 110 RPM or less, 105 RPM or less, 100 RPM or less, 95 RPM or less, 90 RPM or less, 85 RPM or less, 80 RPM or less, 75 RPM or less, 70 RPM or less, 65 RPM or less, 60 RPM or less, 55 RPM or less, 50 RPM or less, 45 RPM or less, 40 RPM or less, 35 RPM or less, or 30 RPM or less). The speed at which the agitator is operated can range from any of the minimum values described above to any of the maximum values described above. For example, the agitator can be operated at a speed of from 20 to 200 RPM (e.g., from 20 to 125 RPM, from 125 to 200 RPM, from 20 to 60 RPM, from 60 to 100 RPM, from 100 RPM to 140 RPM, from 140 to 200 RPM, from 20 to 180 RPM, from 20 to 160 RPM, from 20 to 140 RPM, from 20 to 120 RPM, from 20 to 100 RPM, from 20 to 80 RPM, from 20 to 40 RPM, from 40 to 200 RPM, from 60 to 200 RPM, from 80 to 200 RPM, from 100 to 200 RPM, from 120 to 200 RPM, from 140 to 200 RPM, from 160 to 200 RPM, from 25 to 195 RPM, from 30 to 190 RPM, from 50 to 175 RPM, from 75 to 150 RPM, or from 120 to 160 RPM).

The agitator can be configured to produce homogeneous or inhomogeneous fluid (e.g., liquid and/or vapor) flow inside the reactor. In some examples, the agitator is configured to produce average fluid flow velocities inside the reactor of greater than 0 meters per second (m/s) (e.g., 0.05 m/s or more, 0.1 m/s or more, 0.15 m/s or more, 0.2 m/s or more, 0.25 m/s or more, 0.3 m/s or more, 0.35 m/s or more, 0.4 m/s or more, 0.45 m/s or more, 0.5 m/s or more, 0.6 m/s or more, 0.7 m/s or more, 0.8 m/s or more, 0.9 m/s or more, 1 m/s or more, 1.25 m/s or more, 1.5 m/s or more, 1.75 m/s or more, 2 m/s or more, 2.25 m/s or more, 2.5 m/s or more, 2.75 m/s or more, 3 m/s or more, 3.5 m/s or more, 4 m/s or more, 4.5 m/s or more, 5 m/s or more, 5.5 m/s or more, 6 m/s or more, 6.5 m/s or more, 7 m/s or more, 7.5 m/s or more, 8 m/s or more, 8.5 m/s or more, or 9 m/s or more). In some examples, the agitator is configured to produce average fluid flow velocities inside the reactor of 10 m/s or less (e.g., 9.5 m/s or less, 9 m/s or less, 8.5 m/s or less, 8 m/s or less, 7.5 m/s or less, 7 m/s or less, 6.5 m/s or less, 6 m/s or less, 5.5 m/s or less, 5 m/s or less, 4.5 m/s or less, 4 m/s or less, 3.5 m/s or less, 3 m/s or less, 2.75 m/s or less, 2.5 m/s or less, 2.25 m/s or less, 2 m/s or less, 1.75 m/s or less, 1.5 m/s or less, 1.25 m/s or less, 1 m/s or less, 0.9 m/s or less, 0.8 m/s or less, 0.7 m/s or less, 0.6 m/s or less, 0.5 m/s or less, 0.45 m/s or less, 0.4 m/s or less, 0.35 m/s or less, 0.3 m/s or less, 0.25 m/s or less, 0.2 m/s or less, 0.15 m/s or less, or 0.1 m/s or less). The average fluid flow velocity inside the reactor produced by the agitator can range from any of the minimum values described above to any of the maximum values described above. For example, the agitator can be configured to produce average fluid flow velocities inside the reactor of from greater than 0 m/s to 10 m/s (e.g., from greater than 0 to 5 m/s, from 5 to 10 m/s, from greater than 0 to 2.5 m/s, from 2.5 to 5 m/s, from 5 to 7.5 m/s, from 7.5 to 10 m/s, from greater than 0 to 2 m/s, from 2 to 4 m/s, from 4 to 6 m/s, from 6 to 8 m/s, from 8 to 10 m/s, from greater than 0 to 9 m/s, from greater than 0 to 8 m/s, from greater than 0 to 7 m/s, from greater than 0 to 6 m/s, from greater than 0 to 4.5 m/s, from greater than 0 to 4 m/s, from greater than 0 to 3.5 m/s, from greater than 0 to 3 m/s, from greater than 0 to 2.5 m/s, from greater than 0 to 1.5 m/s, from 0.05 to 10 m/s, from 0.1 to 10 m/s, from 0.5 to 10 m/s, from 1 to 10 m/s, from 1.5 to 10 m/s, from 2 to 10 m/s, from 3 to 10 m/s, from 4 to 10 m/s, from 6 to 10 m/s, from 7 to 10 m/s, from 9 to 10 m/s, from 0.05 to 9.5 m/s, from 0.1 to 9 m/s, or from 0.25 to 5 m/s). Liquid level inside the reactors can be monitored using any suitable means, for example using one or more (e.g., a series of) thermocouples arranged along the internal reactor wall or through non-contact means, such as radar or ultrasonic sensors. For example, a plurality of thermocouples can be arranged vertically along the internal reactor wall. The liquid bath is typically hotter than the vapor in the headspace above it. As the liquid bath level inside a reactor changes, the change can be seen by changing temperatures. Feedstock input and product output can be monitored and/or adjusted based on the observed variations in the liquid bath level.

The liquid volume in each reactor can, for example, comprise 40% or more of the volume of the reactor (e.g., 41% or more, 42% or more, 43% or more, 44% or more, 45% or more, 46% or more, 47% or more, 48% or more, 49% or more, 50% or more, 51% or more, 52% or more, 53% or more, 54% or more, 55% or more, 56% or more, 57% or more, 58% or more, 59% or more, 60% or more, 61% or more, 62% or more, 63% or more, 64% or more, 65% or more, 66% or more, 67% or more, 68% or more, 69% or more, 70% or more, 71% or more, 72% or more, 73% or more, 74% or more, 75% or more, 76% or more, 77% or more, or 78% or more). In some examples, the liquid volume in the reactor can comprise 80% or less of the volume of the reactor (e.g., 79% or less, 78% or less, 77% or less, 76% or less, 75% or less, 74% or less, 73% or less, 72% or less, 71% or less, 70% or less, 69% or less, 68% or less, 67% or less, 66% or less, 65% or less, 64% or less, 63% or less, 62% or less, 61% or less, 60% or less, 59% or less, 58% or less, 57% or less, 56% or less, 55% or less, 54% or less, 53% or less, 52% or less, 51% or less, 50% or less, 49% or less, 48% or less, 47% or less, 46% or less, 45% or less, 44% or less, 43% or less, or 42% or less). The liquid volume in the reactor can range from any of the minimum values described above to any of the maximum values described above. For example, the liquid volume in the reactor can comprise from 40% to 80% of the volume of the reactor (e.g., from 40% to 60%, from 60% to 80%, from 40% to 50%, from 50% to 60%, from 60% to 70%, from 70% to 80%, from 40% to 75%, from 40% to 70%, from 40% to 65%, from 40% to 55%, from 40% to 45%, from 45% to 80%, from 50% to 80%, from 55% to 80%, from 65% to 80%, from 75% to 680%, from 45% to 75%, or from 50% to 70%).

In some examples, the headspace volume in each reactor comprises 20% or more of the volume of the reactor (e.g., 21% or more, 22% or more, 23% or more, 24% or more, 25% or more, 26% or more, 27% or more, 28% or more, 29% or more, 30% or more, 31% or more, 32% or more, 33% or more, 34% or more, 35% or more, 36% or more, 37% or more, 38% or more, 39% or more, 40% or more, 41% or more, 42% or more, 43% or more, 44% or more, 45% or more, 46% or more, 47% or more, 48% or more, 49% or more, 50% or more, 51% or more, 52% or more, 53% or more, 54% or more, 55% or more, 56% or more, 57% or more, or 58% or more). In some examples, the headspace volume in each reactor comprises 60% or less of the volume of the reactor (e.g., 59% or less, 58% or less, 57% or less, 56% or less, 55% or less, 54% or less, 53% or less, 52% or less, 51% or less, 50% or less, 49% or less, 48% or less, 47% or less, 46% or less, 45% or less, 44% or less, 43% or less, 42% or less, 41% or less, 40% or less, 39% or less, 38% or less, 37% or less, 36% or less, 35% or less, 34% or less, 33% or less, 32% or less, 31% or less, 30% or less, 29% or less, 28% or less, 27% or less, 26% or less, 25% or less, 24% or less, 23% or less, or 22% or less). The headspace volume in the reactor can range from any of the minimum values described above to any of the maximum values described above. For example, the headspace volume in the reactor can comprise from 20% to 60% of the reactor volume (e.g., from 20% to 40%, from 40% to 60%, from 20% to 30%, from 30% to 40%, from 40% to 50%, from 50% to 60%, from 20% to 55%, from 20% to 50%, from 20% to 45%, from 20% to 35%, from 20% to 25%, from 25% to 60%, from 30% to 60%, from 35% to 60%, from 45% to 60%, from 55% to 60%, from 25% to 55%, or from 30% to 50%).

Hydrocarbon vapor generated inside each reactor exits the reactor through a piping or ducting manifold connected to a product recovery system which is described below. In some examples, the reactor vapor pressure is monitored. The type and quality of product output can be controlled to some degree by altering the pressure inside the reactor. Each reactor is connected to a manifold, and vapor flow from each reactor is controlled by a valve designed to operate at the high vapor exit temperature or a down-stream blower/vacuum system, allowing the individual reactors to be maintained as needed between a slight positive pressure and a slight vacuum pressure, depending on reactor performance and the types of hydrocarbon products condensing in the downstream product recovery which operates under a slight vacuum as described below. The piping manifold system also allows inert gases to be introduced when necessary to purge the reactor interior, or displace the liquid bath or vapor headspace in each reactor to another reactor without the use of pumps.

The pressure inside each reactor can, for example, be −7.25 psig or more (e.g., −7 psig or more, −6.5 psig or more, −6 psig or more, −5.5 psig or more, −5 psig or more, −4.5 psig or more, −4 psig or more, −3.5 psig or more, −3 psig or more, −2.5 psig or more, −2 psig or more, −1.5 psig or more, −1 psig or more, −0.5 psig or more, 0 psig or more, 0.5 psig or more, 1 psig or more, 1.5 psig or more, 2 psig or more, 2.5 psig or more, 3 psig or more, 3.5 psig or more, 4 psig or more, 4.5 psig or more, 5 psig or more, 5.5 psig or more, 6 psig or more, 6.5 psig or more, 7 psig or more, 7.5 psig or more, 8 psig or more, 8.5 psig or more, 9 psig or more, 9.5 psig or more, 10 psig or more, 10.5 psig or more, 11 psig or more, 11.5 psig or more, 12 psig or more, 12.5 psig or more, 13 psig or more, 13.5 psig or more, or 14 psig or more). In some examples, the pressure inside the reactor can be 14.5 psig or less (e.g., 14 psig or less, 13.5 psig or less, 13 psig or less, 12.5 psig or less, 12 psig or less, 11.5 psig or less, 11 psig or less, 10.5 psig or less, 10 psig or less, 9.5 psig or less, 9 psig or less, 8.5 psig or less, 8 psig or less, 7.5 psig or less, 7 psig or less, 6.5 psig or less, 6 psig or less, 5.5 psig or less, 5 psig or less, 4.5 psig or less, 4 psig or less, 3.5 psig or less, 3 psig or less, 2.5 psig or less, 2 psig or less, 1.5 psig or less, 1 psig or less, 0.5 psig or less, 0 psig or less, −0.5 psig or less, −1 psig or less, −1.5 psig or less, −2 psig or less, −2.5 psig or less, −3 psig or less, −3.5 psig or less, −4 psig or less, −4.5 psig or less, −5 psig or less, −5.5 psig or less, −6 psig or less, −6.5 psig or less, or −7 psig or less). The pressure within the reactor can range from any of the minimum values described above to any of the maximum values described above. For example, the pressure inside the reactor can be from −7.25 to 14.5 psig (e.g., from −7.25 to 3.5 psig, from 3.5 to 14.5 psig, from −7.25 to 0 psig, from 0 to 7.25 psig, from 7.25 to 14.5 psig, from −7.25 to 10 psig, from −7.25 to 5 psig, from −5 to 14.5 psig, from 5 to 14.5 psig, from −5 to 10 psig, from −5 to 5 psig, or from −2.5 to 2.5 psig).

The residence time of the feedstock within the reactor (e.g., the time that it takes to pyrolyze) can vary based on a variety of factors. For example, the residence time of the feedstock within the reactor can vary based on the type of reactor, the composition of the feedstock, the temperature within the reactor, the pressure within the reactor, the agitation rate, the amount of char, or a combination thereof.

For example, the residence time of a given polymer comprising the feedstock within the reactor can be 1 second or more (e.g., 2 seconds or more, 3 seconds or more, 4 seconds or more, 5 seconds or more, 10 seconds or more, 15 seconds or more, 20 seconds or more, 25 seconds or more, 30 seconds or more, 35 seconds or more, 40 seconds or more, 45 seconds or more, 50 seconds or more, 55 seconds or more, 1 minute or more, 2 minutes or more, 3 minutes or more, 4 minutes or more, 5 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.5 hours or more, 2 hours or more, 2.5 hours or more, 3 hours or more, 3.5 hours or more, 4 hours or more, 4.5 hours or more, 5 hours or more, 5.5 hours or more, 6 hours or more, 7 hours or more, 8 hours or more, 9 hours or more, 10 hours or more, 12 hours or more, 14 hours or more, 16 hours or more, 18 hours or more, 20 hours or more, or 22 hours or more). In some examples, the residence time of a given polymer comprising the feedstock within the reactor can be 24 hours or less (e.g., 22 hours or more, 20 hours or more, 18 hours or more, 16 hours or more, 14 hours or more, 12 hours or more, 10 hours or more, 9 hours or more, 8 hours or more, 7 hours or more, 6 hours or more, 5.5 hours or more, 5 hours or more, 4.5 hours or more, 4 hours or more, 3.5 hours or more, 3 hours or more, 2.5 hours or more, 2 hours or more, 1.5 hours or more, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 5 minutes or less, 4 minutes or less, 3 minutes or less, 2 minutes or less, 1 minute or less, 55 seconds or less, 50 seconds or less, 45 seconds or less, 40 seconds or less, 35 seconds or less, 30 seconds or less, 25 seconds or less, 20 seconds or less, 15 seconds or less, 10 seconds or less, or 5 seconds or less). The residence time of a given polymer comprising the feedstock within the reactor can range from any of the minimum values described above to any of the maximum values described above. For example, the residence time of a given polymer comprising the feedstock within the reactor can be from 1 second to 24 hours (e.g., from 1 second to 12 hours, from 12 hours to 24 hours, from 1 second to 1 minute, from 1 minute to 1 hour, from 1 hour to 24 hours, from 1 second to 1 hour, from 1 hour to 6 hours, from 6 hours to 12 hours, from 12 hours to 18 hours, to 24 hours, from 1 minute to 20 hours, from 1 second to 18 hours, from 1 second to 16 hours, from 1 second to 14 hours, from 1 second to 10 hours, from 1 second to 8 hours, from 1 second to 4 hours, from 1 second to 2 hours, from 1 second to 30 minutes, from 1 second to 15 minutes, from 1 second to 10 minutes, from 1 second to 5 minutes, from 1 minute to 24 hours, from 5 minutes to 24 hours, from 10 minutes to 24 hours, from 15 minutes to 24 hours, from 30 minutes to 24 hours, from 1 hour to 24 hours, from 2 hours to 24 hours, from 4 hours to 24 hours, from 6 hours to 24 hours, from 8 hours to 24 hours, from 10 hours to 24 hours, from 12 hours to 24 hours, from 14 hours to 24 hours, from 16 hours to 24 hours, from 20 ours to 24 hours, from 30 seconds to 22 hours, or from 1 minute to 20 hours).

In some examples, the reactor can be configured for producing an average of 0.30 lb. or more of pyrolyzed product per hour per gallon of the reactor's internal volume for a period of a24 hours or more (e.g., 0.31 lb. or more, 0.32 lb. or more, 0.33 lb. or more, 0.34 lb. or more, 0.35 lb. or more, 0.36 lb. or more, 0.37 lb. or more, 0.38 lb. or more, 0.39 lb. or more, 0.40 lb. or more, 0.41 lb. or more, 0.42 lb. or more, 0.43 lb. or more, 0.44 lb. or more, 0.45 lb. or more, 0.46 lb. or more, 0.47 lb. or more, 0.48 lb. or more, 0.49 lb. or more, 0.50 lb. or more, 0.51 lb. or more, 0.52 lb. or more, 0.53 lb. or more, 0.54 lb. or more, 0.55 lb. or more, 0.56 lb. or more, 0.57 lb. or more, 0.58 lb. or more, 0.59 lb. or more, 0.60 lb. or more, 0.61 lb. or more, 0.62 lb. or more, 0.63 lb. or more, 0.64 lb. or more, 0.65 lb. or more, 0.66 lb. or more, 0.67 lb. or more, 0.68 lb. or more, 0.69 lb. or more, 0.70 lb. or more, 0.71 lb. or more, 0.72 lb. or more, 0.73 lb. or more, 0.74 lb. or more, 0.75 lb. or more). In some implementations, the reactor can be configured for producing an average of from 0.30 lb. to 0.75 lb. of pyrolyzed product per hour per gallon of the reactor's internal volume for a period of 24 hours or more (e.g., from 0.31 lb. to 0.75 lb., from 0.32 lb. to 0.75 lb., from 0.33 lb. to 0.75 lb., from 0.34 lb. to 0.75 lb., from 0.35 lb. to 0.75 lb., from 0.36 lb. to 0.75 lb., from 0.37 lb. to 0.75 lb., from 0.38 lb. to 0.75 lb., from 0.39 lb. to 0.75 lb., from 0.40 lb. to 0.75 lb., from 0.41 lb. to 0.75 lb., from 0.42 lb. to 0.75 lb., from 0.43 lb. to 0.75 lb., from 0.44 lb. to 0.75 lb., from 0.45 lb. to 0.75 lb., from 0.46 lb. to 0.75 lb., from 0.47 lb. to 0.75 lb., from 0.48 lb. to 0.75 lb., from 0.49 lb. to 0.75 lb., from 0.50 lb. to 0.75 lb., from 0.51 lb. to 0.75 lb., from 0.52 lb. to 0.75 lb., from 0.53 lb. to 0.75 lb., from 0.54 lb. to 0.75 lb., from 0.55 lb. to 0.75 lb., from 0.56 lb. to 0.75 lb., from 0.57 lb. to 0.75 lb., from 0.58 lb. to 0.75 lb., from 0.59 lb. to 0.75 lb., from 0.60 lb. to 0.75 lb., from 0.61 lb. to 0.75 lb., from 0.62 lb. to 0.75 lb., from 0.63 lb. to 0.75 lb., from 0.64 lb. to 0.75 lb., from 0.65 lb. to 0.75 lb., from 0.66 lb. to 0.75 lb., from 0.67 lb. to 0.75 lb., from 0.68 lb. to 0.75 lb., from 0.69 lb. to 0.75 lb., from 0.70 lb. to 0.75 lb., from 0.71 lb. to 0.75 lb., from 0.72 lb. to 0.75 lb., from 0.73 lb. to 0.75 lb., from 0.74 lb. to 0.75 lb.). In some specific implementations, the foregoing reactor throughput ranges may be achieved using the pyrolysis reactor 5000 shown and described with respect to FIG. 47. In some specific implementations, the foregoing reactor throughput ranges may be achieved using the pyrolysis system S100*e* of FIG. 5, where the extruder S107*a* comprises the extruder 800 shown and described with respect to FIG. 33 and the pyrolysis reactor S108*a* comprises the pyrolysis reactor 5000 shown and described with respect to FIG. 47.

Inert material that enters the reactors, such as bits of metal and grit, as well as loose char that can be created through the heating process, can optionally be removed by any suitable processing component or step, such as sedimentation, decantation, filtration, sieving, etc.

In some examples, the reactor can further include an additive, such as a catalyst, a diluent, an adsorbent, etc.

Figure 35:
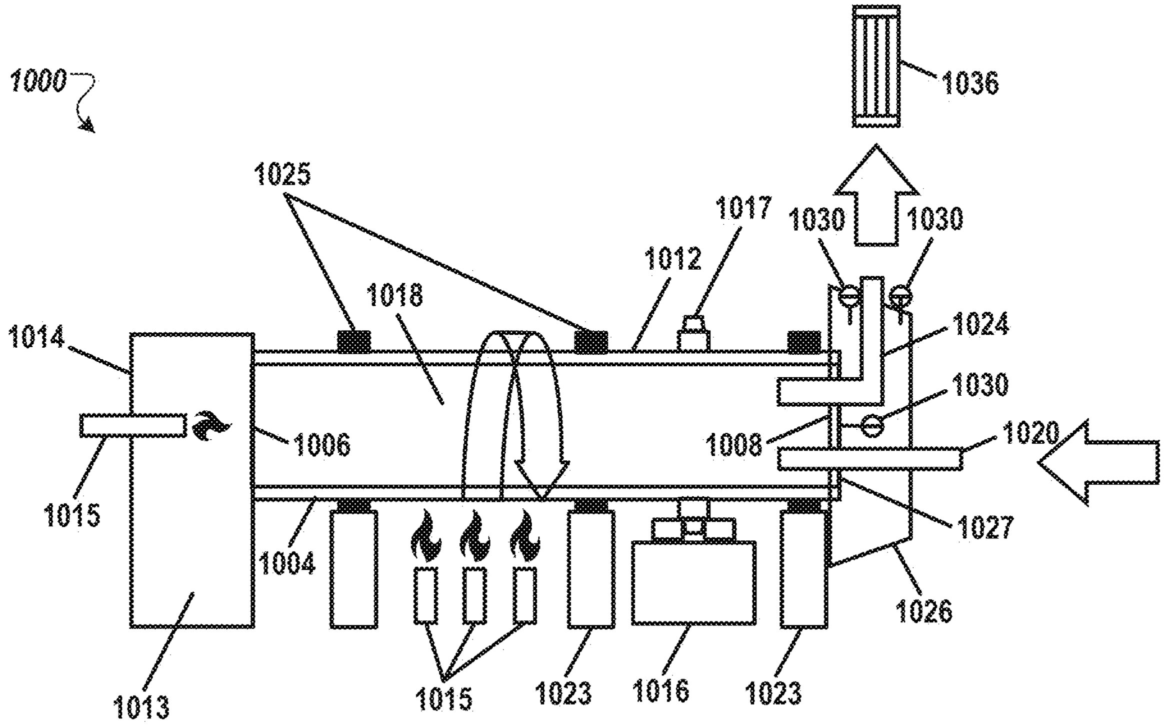
FIG. 35. Schematic side view of an example rotary kiln reactor.
Figure 36:
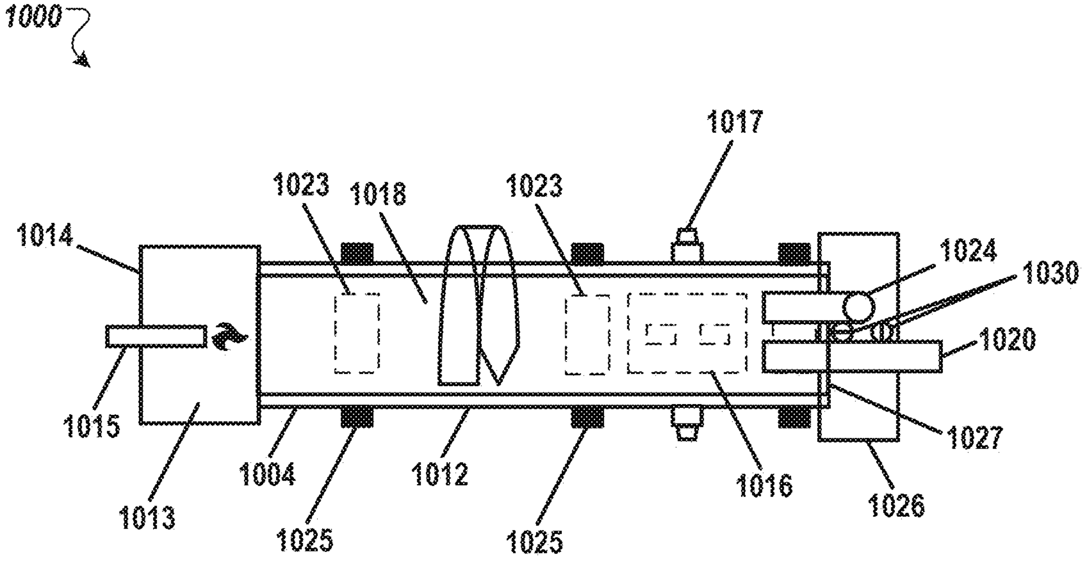
FIG. 36. Schematic top view of the example rotary kiln reactor of FIG. 35.

FIG. 35 shows a side view of a rotary kiln pyrolysis reactor 1000 according to one implementation. The rotary kiln pyrolysis reactor 1000 is generally configured for pyrolyzing feedstock. In some implementations, the rotary kiln pyrolysis reactor 1000 is configured for receiving and pyrolyzing molten or semi-molten feedstock (e.g., received from an extruder). In other implementations, the rotary kiln pyrolysis reactor 1000 is configured for receiving and pyrolyzing solid or semi-solid feedstock (e.g., loose film, baled film, rigids, thermoforms, sheets, foams, non-wovens, strips, pellets, powder, purge patties, densified, shredded, and other post-consumer and/or post-industrial plastics). Accordingly, the rotary kiln pyrolysis reactor 1000 can be used in the methods described herein for producing hydrocarbon-based compositions derived from pyrolysis of feedstock comprising post-consumer and/or post-industrial plastics, including wax, oil, gas, or combinations thereof. FIG. 36 provides a top view of the rotary kiln pyrolysis reactor 1000 shown in FIG. 35. Certain elements depicted in FIG. 35 are also depicted in FIG. 36 and, accordingly, reference to either figure may be regarded as a reference to both figures.

As shown in FIG. 35, the rotary kiln pyrolysis reactor 1000 includes a reactor vessel within which plastic feedstock is deposited and pyrolyzed. In the illustrated implementation, the reactor vessel comprises a reactor barrel 1004. The reactor barrel 1004 is comprised of a cylindrical body 1012 having a first end 1006 and second end 1008. In some implementations, the cylindrical body 1012 defines a horizontal longitudinal axis (e.g., parallel to the ground). In other implementations, the cylindrical body 1012 defines a longitudinal axis that is angled (e.g., 10 degrees relative to the ground). The interior of the cylindrical body 1012 defines the reactor vessel's internal volume 1018. In various implementations, the cylindrical body 1012 may be constructed from steel having a refractory lining (or other materials with suitable structural and thermal properties).

The rotary kiln pyrolysis reactor 1000 further includes a transfer assembly 1026 positioned at the reactor barrel's second end 1008. The transfer assembly 1026 includes a feedstock inlet 1020, a vapor outlet 1024, a sealing interface 1027, and a plurality of reactor sensors 1030. As shown in FIG. 35, the feedstock inlet 1020 defines an external opening and extends into the reactor barrel 1004. In the illustrated implementation, the plastic feedstock (e.g., semi-molten feedstock received from an extruder) is deposited into the reactor vessel's internal volume 1018 by way of the feedstock inlet 1020. In various implementations, the feedstock inlet's external inlet opening is positioned outside of the reactor barrel 1004 and defines an aperture through which plastic feedstock may enter the feedstock inlet 1020. The feedstock inlet 1020, which may comprise, for example, a pipe, extends into the internal volume 1018 and includes an outlet opening positioned within the reactor barrel's internal volume 1018. As will be appreciated from FIG. 35, when plastic feedstock (e.g., semi-molten feedstock) is directed through the feedstock inlet 1020 via its inlet opening, the plastic feedstock will be directed through the feedstock inlet and deposited within the reactor vessel's internal volume 1018 for processing.

The transfer assembly's vapor outlet 1024 defines an internal opening (positioned within the reactor barrel's internal volume 1018) and an external opening (positioned outside of the reactor barrel 1004). The transfer assembly's vapor outlet 1024, which may comprise, for example, a pipe, extends into the reactor barrel 1004 at the reactor barrel's second end 1008 and enables vapor produced during pyrolysis of the feedstock within the reactor barrel 1004 to exit the reactor barrel 1004.

The rotary kiln pyrolysis reactor 1000 further comprises a drive motor 1016 and drive gear 1017 configured for rotating the reactor barrel 1004 about its longitudinal axis. In the illustrated implementation of FIG. 35, the reactor barrel 1004 is rotatably mounted on a plurality of roller supports 1023. As shown in FIG. 35, a plurality of rollers 1025 are positioned on the exterior wall of the reactor barrel's cylindrical body 1012 and configured to enable the reactor barrel 1004 to rotate about its longitudinal axis. In various implementations, the reactor barrel 1004 may be rotated via a chain drive (e.g., such that a chain links the drive motor 1016 to the drive gear 1017 positioned on the reactor barrel 1004). Various implementations of the reactor barrel 1004 are configured for continuously rotating such that the liquid plastic inside the reactor vessel is kept in continuous motion. In this way, the reactor barrel's rotation provides sufficient movement of the liquid plastic to acquire heat for pyrolysis to occur. For example, in one implementation, the reactor barrel 1004 is continuously rotated during the pyrolysis process.

As shown in FIG. 35, the transfer assembly 1026 includes a sealing interface 1027. In various implementations, the sealing interface 1027 is configured to provide a seal between the reactor barrel's second end 1008 and the transfer assembly 1026. In this way, the reactor barrel's internal volume 1018 remains sealed and enclosed as the reactor barrel 1004 rotates about its longitudinal axis and the transfer assembly 1026 remains in a fixed position.

In various implementations, the rotary kiln pyrolysis reactor 1000 includes a heating device configured for heating the internal volume 1018 of the reactor barrel 1004. In the illustrated implementation, the heating device comprises a burner assembly 1013 positioned at the reactor barrel's first end 1006. The burner assembly 1013 comprises a burner pipe 1015 and a kiln hood 1014. As shown in FIG. 35, the burner assembly 1013 is configured as a direct fired kiln system in which the burner pipe 1015 emits a flame that heats the reactor barrel's 1004 internal volume 1018. In the illustrated implementation, the burner pipe 1015 is oriented in a counter-current direction. In other implementations, the burner pipe 1015 may be oriented in a co-current direction. In further implementations, the burner assembly 1013 may be configured as an indirect fired kiln system for heating the reactor barrel 1004.

In various implementations, the burner assembly 1013 is generally configured to provide the heat needed to raise temperatures inside the reactor barrel 1004 to a point where pyrolysis takes place. The burner assembly 1013 can also be configured to provide the heat needed to maintain temperatures inside the reactor barrel 1004 at a point where the pyrolysis process takes place. For example, burner pipe 1015 may be controlled to provide a prescribed temperature and heat density ($W/in^2$) that results in a controlled heat flux into the liquid feedstock within the reactor barrel 1004. In combination with continuous rotation of the reactor barrel

1004 (e.g., driven by the drive motor 1016 and drive gear 1017) the pyrolysis reaction within the reactor barrel 1004 can be controlled to provide a desired reaction temperature and energy density (kW/lb.).

As shown in FIG. 35, the rotary kiln pyrolysis reactor 1000 includes a vapor outlet 1024. As noted above, during the pyrolysis process, the hydrocarbon plastic chains and groups of rings within the liquid plastic are split apart by the heating process into smaller segments until they are small and light enough to vaporize and exit the reactor as a vapor. Accordingly, the reactor's vapor outlet 1024 is configured to provide a conduit for hydrocarbon vapor exiting the reactor 1000 and thus extends upwardly from the transfer assembly 1026. In various implementations, the vapor outlet 1024 may be connected (e.g., via additional piping or a ducting manifold) to a product recovery system. For example, in the illustrated implementation of FIG. 35, the vapor outlet 1024 is configured to direct vapor exiting the reactor barrel 1004 following pyrolysis to a product collection system 1036 configured for product recovery (e.g., oil, wax, gas or combinations thereof as described herein).

In the illustrated implementation of FIG. 35, the reactor's transfer assembly 1026 includes a plurality of reactor sensors 1030. In various implementations, the reactor sensors 1030 may be configured for measuring the dynamic properties of the liquid plastic within the reactor, output and dynamic properties of the heating system, as well as the dynamic properties of the reactor's input (e.g., feedstock input) and output (e.g., vapor production) and a variety of other variables. For example, in various implementations, the reactor sensors 1030 may comprise thermocouples, pressure sensors, flow meters, and the like. In this way, feedstock input (e.g., from an extruder) and product output can be monitored and/or adjusted based on the observed variations in the liquid plastic within the reactor.

In various implementations, a plurality of rotary kiln pyrolysis reactors 1000 can also be provided for use in the production of wax, oil, gas, or combinations thereof. For example, in one implementation, three rotary kiln pyrolysis reactors 1000 are used and can be operational in any combination with one another (e.g., such that all three pyrolysis reactors 1000 are processing feedstock simultaneously, or such that two of the pyrolysis reactors 1000 are processing feedstock while a third remains on standby in the event one of the other reactors requires service or maintenance).

Figure 37:
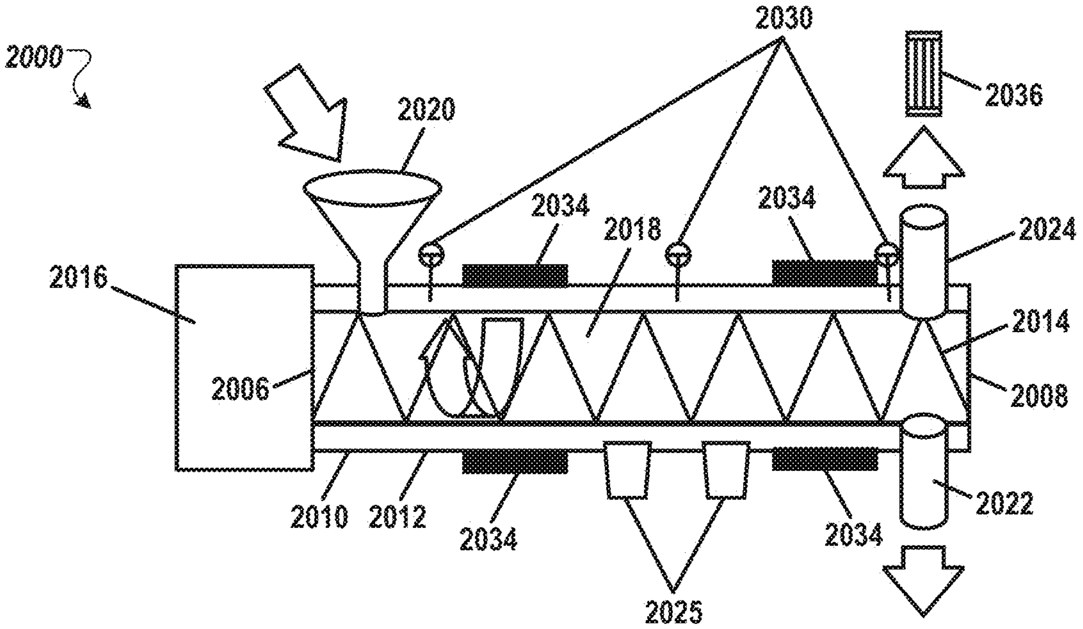
FIG. 37. Schematic side view of an example screw reactor.
Figure 38:
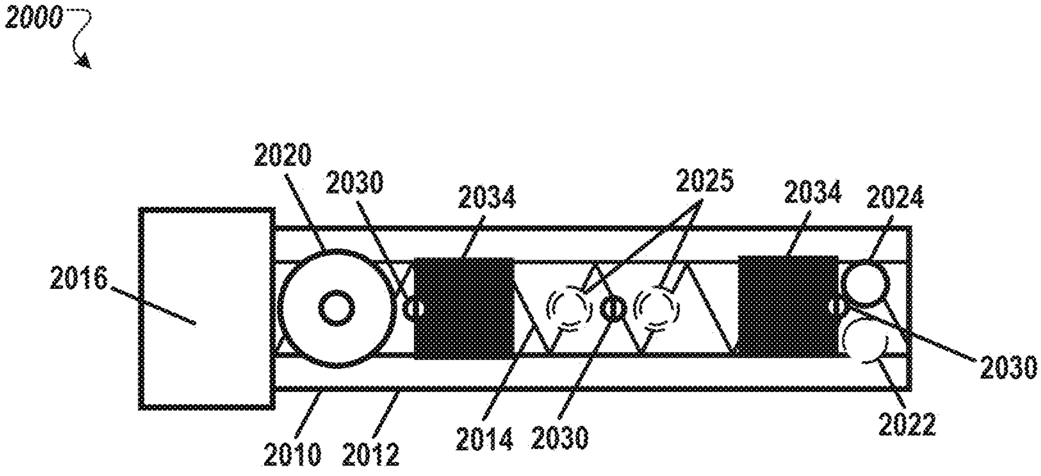
FIG. 38. Schematic top view of the example screw reactor of FIG. 37.

FIG. 37 shows a side view of a screw pyrolysis reactor 2000 according to one implementation. The screw pyrolysis reactor 2000 is generally configured for pyrolyzing feedstock. In some implementations, the screw pyrolysis reactor 2000 is configured for receiving and pyrolyzing semi-molten feedstock (e.g., received from an extruder). In other implementations, the screw pyrolysis reactor 2000 is configured for receiving and pyrolyzing solid or semi-solid plastic feedstock (e.g., loose film, baled film, rigids, thermoforms, sheets, foams, non-wovens, strips, pellets, powder, purge patties, densified, shredded, and other post-consumer and/or post-industrial plastics). Accordingly, the screw pyrolysis reactor 2000 can be used in the methods described herein for producing hydrocarbon-based compositions derived from pyrolysis of feedstock comprising post-consumer and/or post-industrial plastics, including wax, oil, gas, or combinations thereof. FIG. 38 provides a top view of the screw pyrolysis reactor 2000 shown in FIG. 37. Certain elements depicted in FIG. 37 are also depicted in FIG. 38 and, accordingly, reference to either figure may be regarded as a reference to both figures.

As shown in FIG. 37, the screw pyrolysis reactor 2000 includes a reactor vessel within which plastic feedstock is deposited and pyrolyzed. In the illustrated implementation, the reactor vessel comprises a reactor barrel 2010. The reactor barrel 2010 is comprised of a cylindrical body 2012 having a first end 2006 and second end 2008. In some implementations, the cylindrical body 2012 defines a horizontal longitudinal axis (e.g., parallel to the ground). The interior of the cylindrical body 2012 defines the reactor vessel's internal volume 2018. In various implementations, the cylindrical body 2012 may be constructed from steel (or other materials with suitable structural and thermal properties).

The screw pyrolysis reactor 2000 further includes a screw 2014 positioned within the reactor barrel's internal volume 2018. As shown in FIG. 37, the screw 2014 is oriented horizontally and extends longitudinally through the reactor barrel's internal volume 2018 (e.g., such that a longitudinal axis of the screw 2014 is parallel to the longitudinal axis of the rector barrel 2010. In various implementations, the screw 2014 is configured to rotate (e.g., about its longitudinal axis) and transfer plastic feedstock laterally through the reactor barrel's internal volume 2018. As explained in greater detail herein, the reactor barrel's internal volume 2018 is heated to drive pyrolysis of the plastic feedstock as the screw 2014 transfers the feedstock through the reactor barrel 2010.

The screw pyrolysis reactor 2000 further comprises a drive motor and gear assembly 2016 configured for rotating the screw 2014 about its longitudinal axis. In the illustrated implementation of FIG. 35, the screw 2014 includes a helical protrusion that, when rotating, transfers the plastic feedstock through the reactor barrel 2010 (e.g., from the first end 2006 towards the second end 2008). Accordingly, by controlling the speed of the motor and gear assembly 2016, the rotational speed of the screw may be controlled to dictate the velocity of the plastic feedstock as it is transferred through the reactor barrel 2010. Various implementations of the screw 2014 are configured for continuously rotating such that the liquid plastic inside the reactor barrel 2010 is kept in continuous motion. In this way, the screw's rotation provides sufficient movement of the liquid plastic to acquire heat for pyrolysis to occur as it is transferred laterally through the reactor barrel 2010. For example, in one implementation, the reactor barrel 1004 is continuously rotated during the pyrolysis process.

The screw pyrolysis reactor 2000 further comprises a feedstock inlet 2020, a vapor outlet 2024, one or more ports 2025, one or more external heating elements 2034, a discharge manifold 2022, and a plurality of reactor sensors 2030. As shown in FIG. 37, the feedstock inlet 2020 defines an external opening and extends into the reactor barrel 2010. In the illustrated implementation, the plastic feedstock (e.g., semi-molten feedstock received from an extruder or solid feedstock) is deposited into the reactor vessel's internal volume 2018 by way of the feedstock inlet 2020. In various implementations, the feedstock inlet's external inlet opening is positioned outside of the reactor barrel 2010 and defines an aperture through which plastic feedstock may enter the feedstock inlet 2020. The feedstock inlet 2020, which may comprise, for example, a pipe, extends into the internal volume 2018 and includes an outlet opening positioned within the reactor barrel's internal volume 2018. As will be appreciated from FIG. 37, when plastic feedstock (e.g., semi-molten feedstock or solid feedstock) is directed through the feedstock inlet 2020 via its inlet opening, the plastic feedstock will be directed through the feedstock inlet and deposited within the reactor vessel's internal volume 2018 for processing.

As shown in FIG. 37, the screw pyrolysis reactor 2000 includes a plurality of heating elements 2034 configured for heating the internal volume 2018 of the reactor barrel 2010. In the illustrated implementation, the heating elements 2034 comprise electric heaters positioned externally around the reactor barrel 2010. When activated, the transfer of heat from the electric heaters 2034 through the reactor barrel's cylindrical body 2012 thereby heats the internal volume 2018 of the reactor barrel 2010.

In various implementations, the heating elements 2034 are generally configured to provide the heat needed to raise temperatures inside the reactor barrel 2010 to a point where pyrolysis takes place. The heating elements 2034 can also be configured to provide the heat needed to maintain temperatures inside the reactor barrel 2010 at a point where pyrolysis process takes place. For example, the heating elements 2034 may be controlled to provide a prescribed temperature and heat density (W/in$^2$) that results in a controlled heat flux into the liquid feedstock within the reactor barrel 2010. In combination with continuous rotation of the screw 2014 (e.g., driven by the drive motor and gear assembly 2016), which transfers the liquid plastic through the reactor barrel 2010, the pyrolysis reaction within the reactor barrel 2010 can be controlled to provide a desired reaction temperature and average energy density (kW/lb.). Furthermore, in implementations in which heating of the reactor barrel 2010 is provided exclusively by the electric heating elements 2034, the screw pyrolysis reactor 2000 may be configured for driving the pyrolysis process using only electricity (e.g., without using gas as a direct heat source).

In various other implementations, the plurality of heating elements 2034 may comprise gas fired heaters positioned around the reactor barrel 2010. In further implementations, the screw pyrolysis reactor 2000 may also include one or more heat inlets positioned around the reactor barrel 2010. In such implementations, the heat inlets may be configured for receiving heated elements (e.g., heated ceramic balls) deposited into the reactor barrel's internal volume 2018 for transferring heat directly to the liquid plastic feedstock within the reactor barrel 2010. In other implementations, the heat inlets may be configured for receiving heated gas directed into (or around) the reactor barrel 2010 to heat the reactor barrel's internal volume 2018.

As shown in FIG. 37, the screw pyrolysis reactor 2000 further includes one or more vapor outlet ports 2025. In various implementations, the ports 2025 may be positioned and configured to allow certain pre-pyrolysis vapors and/or gases produced from the plastic feedstock during the heating process to escape from the reactor barrel 2010. For example, in various implementations, the ports may be configured to allow air, steam, and other low melting point volatiles to exit the reactor barrel 2010. In certain implementations, such as when a vented extruder is used to feed semi-molten feedstock into the screw pyrolysis reactor 2000, the ports 2025 may be omitted from the screw pyrolysis reactor 2000.

The screw pyrolysis reactor 2000 further includes a discharge manifold 2022 positioned at the reactor barrel's second end 2008. In various implementations, the discharge manifold 2022 is configured to provide an outlet for material within the reactor barrel 2010. For example, the discharge manifold 2022 may be used to transfer or otherwise remove liquid plastic (or other material generated during the pyrolysis process) from the reactor barrel 2010. Accordingly, various implementations of the discharge manifold 2022 may include a sealable discharge opening (e.g., a port which can be selectively opened or sealed and closed).

As shown in FIG. 37, the screw pyrolysis reactor 2000 also includes a vapor outlet 2024. In various implementations, the vapor outlet 2024 defines an internal opening (positioned within the reactor barrel's internal volume 2018) and an external opening (positioned outside of the reactor barrel 2010). The vapor outlet 2024, which may comprise, for example, a pipe, extends into the reactor barrel 2010 at the reactor barrel's second end 2008 and enables vapor produced during pyrolysis of the plastic feedstock within the reactor barrel 2010 to exit the reactor barrel 2010.

As noted above, during the pyrolysis process, the hydrocarbon plastic chains and groups of rings within the liquid plastic are split apart by the heating process into smaller segments until they are small and light enough to vaporize and exit the reactor as a vapor. Accordingly, the reactor's vapor outlet 2024 is configured to provide a conduit for hydrocarbon vapor exiting the reactor 2000 and thus extends upwardly from the reactor barrel 2010. In various implementations, the vapor outlet 2024 may be connected (e.g., via additional piping or a ducting manifold) to a product recovery system. For example, in the illustrated implementation of FIG. 37, the vapor outlet 2024 is configured to direct vapor exiting the reactor barrel 2010 following pyrolysis to a product collection system 2036 (e.g., production of wax, oil, gas, or combinations thereof as described herein).

In the illustrated implementation of FIG. 37, the screw pyrolysis reactor 2000 further includes a plurality of reactor sensors 2030. In various implementations, the reactor sensors 2030 may be configured for measuring dynamic properties of the liquid plastic within the reactor, as well as the dynamic properties of the reactor's input (e.g., feedstock input) and output (e.g., vapor production). For example, in various implementations, the reactor sensors 2030 may comprise thermocouples, pressure sensors, flow meters, and the like. In this way, feedstock input (e.g., from the extruder 400) and product output can be monitored and/or adjusted based on the observed variations in the liquid plastic within the reactor.

In various implementations, a plurality of screw pyrolysis reactors 2000 can also be provided for use in the production of wax, oil, gas, or combinations thereof. For example, in one implementation, three screw pyrolysis reactors 2000 are used and can be operational in any combination with one another (e.g., such that all three pyrolysis reactors 2000 are processing feedstock simultaneously, or such that two of the pyrolysis reactors 2000 are processing feedstock while a third remains on standby in the event one of the other reactors requires service or maintenance).

Figure 39:
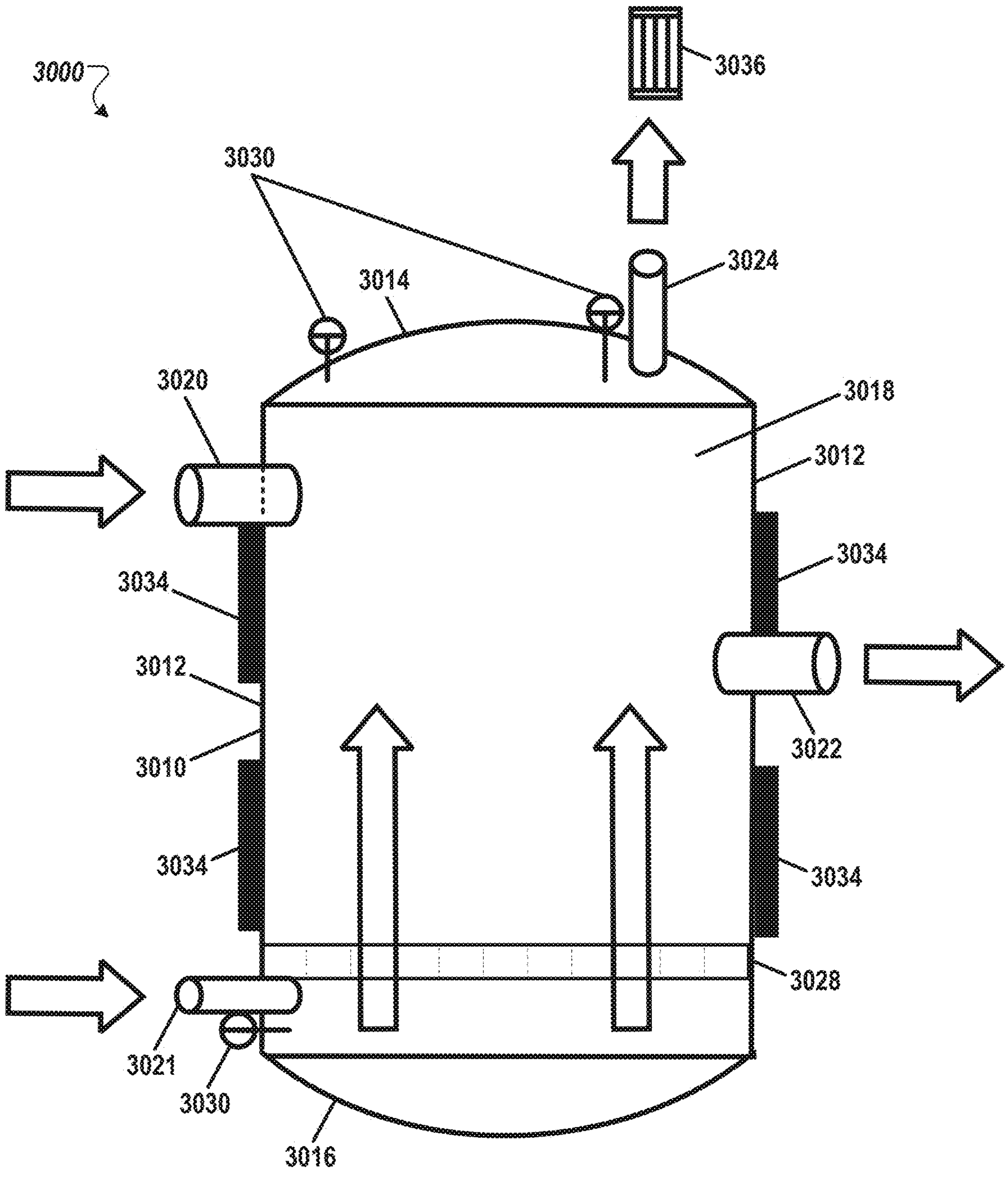
FIG. 39. Schematic side view of an example fluidized bed reactor.
Figure 40:
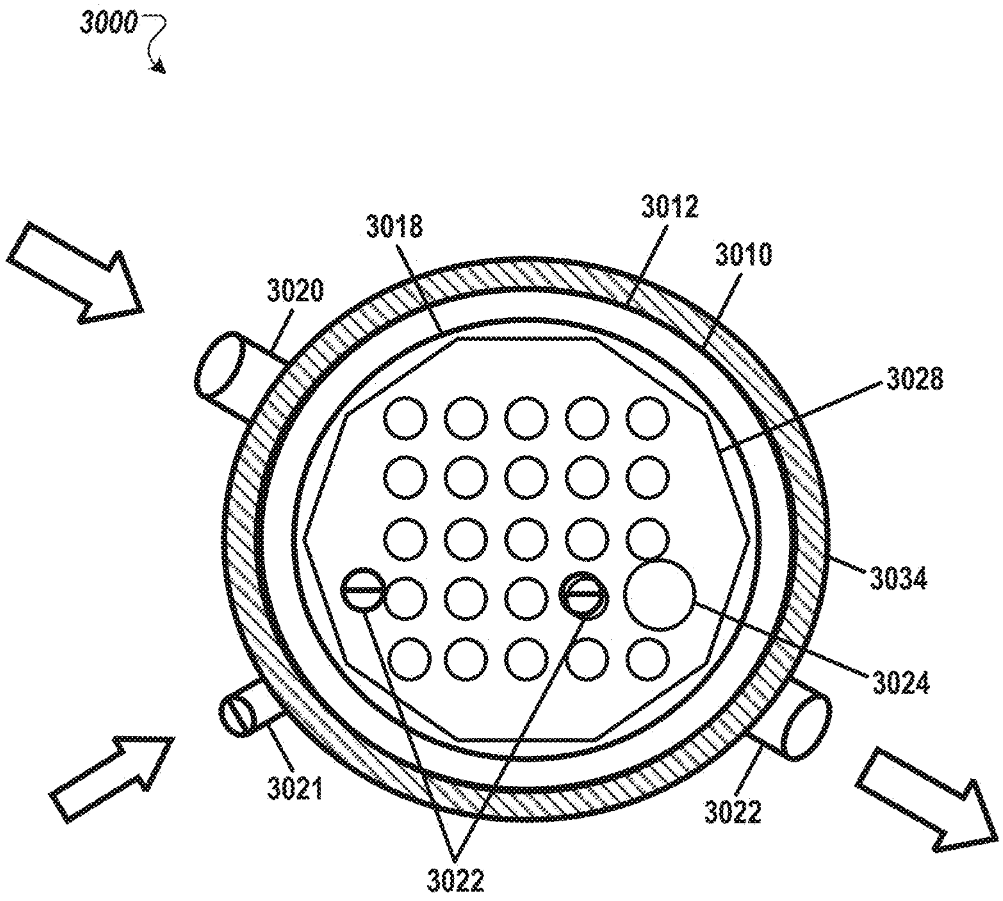
FIG. 40. Schematic top view of the example fluidized bed reactor of FIG. 39.

FIG. 39 shows a side view of a fluidized bed pyrolysis reactor 3000 according to one implementation. The fluidized bed pyrolysis reactor 3000 is generally configured for pyrolyzing feedstock. In some implementations, the fluidized bed pyrolysis reactor 3000 is configured for receiving and pyrolyzing semi-molten feedstock (e.g., received from an extruder). In other implementations, the fluidized bed pyrolysis reactor 3000 is configured for receiving and pyrolyzing solid or semi-solid plastic feedstock (e.g., loose film, baled film, rigids, thermoforms, sheets, foams, non-wovens, strips, pellets, powder, purge patties, densified, shredded, and other post-consumer and/or post-industrial plastics). Accordingly, the fluidized bed pyrolysis reactor 3000 can be used in the methods described herein for producing hydrocarbon-based compositions derived from pyrolysis of feedstock comprising post-consumer and/or post-industrial plastics, including wax, oil, gas, or combinations thereof. FIG. 40 provides a top view of the fluidized bed pyrolysis reactor 3000 shown in FIG. 39. Certain elements depicted in FIG. 39 are also depicted in FIG. 40 and, accordingly, reference to either figure may be regarded as a reference to both figures.

As shown in FIG. 39, the fluidized bed pyrolysis reactor 3000 includes a reactor vessel 3010 within which plastic feedstock is deposited and pyrolyzed. The reactor vessel 3010 is comprised of a cylindrical body 3012, a first ellipsoidal head 3014 positioned at an upper end of the cylindrical body 3012 (herein the upper ellipsoidal head 3014), and a second ellipsoidal head 3016 positioned at a lower end of the cylindrical body 3012 (herein the lower ellipsoidal head 3016). Together, the cylindrical body 3012 and ellipsoidal heads 3014, 3016 define an internal volume 3018 of the reactor vessel 3010 (shown in FIG. 39). In various implementations, the cylindrical body 3012 and ellipsoidal heads 3014, 3016 may be constructed from stainless steel (or other materials with suitable structural and thermal properties).

The fluidized bed pyrolysis reactor 3000 further comprises a catalyst inlet 3020, pressurized feedstock inlet 3021, a discharge manifold 3022, a vapor outlet 3024, a distributor 3028, a plurality of reactor sensors 3030, one or more external heating elements 3034, and a product collection system 3036. As shown in FIG. 39, the pressurized feedstock inlet 3021 defines an external opening and extends into the reactor vessel 3010. In the illustrated implementation, the plastic feedstock (e.g., semi-molten feedstock received from an extruder) is deposited into the reactor vessel's internal volume 3018 by way of the feedstock inlet 3021. In various implementations, the feedstock inlet's external inlet opening is positioned outside of the reactor vessel 3010 and defines an aperture through which plastic feedstock may enter the feedstock inlet 3021. The feedstock inlet 3021, which may comprise, for example, a pipe, extends into the internal volume 3018 and includes an outlet opening positioned within the reactor vessel's internal volume 3018. As will be appreciated from FIG. 39, when plastic feedstock (e.g., semi-molten feedstock) is directed through the feedstock inlet 3021 via its inlet opening, the plastic feedstock will be directed through the feedstock inlet and deposited within the reactor vessel's internal volume 3018 for processing.

In various implementations, the pressurized feedstock inlet 3021 is configured to inject molten or semi-molten feedstock at pressure into the reactor vessel 3010. As depicted in FIG. 39, the pressurized feedstock inlet's outlet opening is positioned in a lower portion of the reactor vessel's internal volume 3018 and below a distributor 3028. In various implementations, the distributor 3028 comprises a porous plate defining a plurality of apertures through which liquid plastic may flow through. The pressure at which the plastic feedstock is injected into the reactor vessel 3010 forces the liquid plastic feedstock upwardly, through the apertures defined in the distributor 3028, and further into the reactor vessel's internal volume 3018. The distributor 3028 divides the liquid plastic into a plurality of streams, thereby exposing a greater surface area of the liquid plastic within the reactor vessel 3018. Furthermore, the distributor's apertures are dimensioned such that the catalyst provided within the reactor vessel 3010 cannot pass through the distributor 3028.

As shown in FIG. 39, the catalyst inlet 3020 is positioned at an upper portion of the reactor vessel 3010 and substantially above the distributor 3028. As shown in FIG. 39, the catalyst inlet 3020 defines an external opening and extends into the reactor vessel 3010. In the illustrated implementation, a catalyst (e.g., Zeolites, metal catalysts, and the like) is deposited into the reactor vessel's internal volume 3018 by way of the catalyst inlet 3020. In various implementations, the catalyst inlet's opening is positioned outside of the reactor vessel 3010 and defines an aperture through which a catalyst material may enter the catalyst inlet 3020. The feedstock inlet 3021, which may comprise, for example, a pipe, extends into the internal volume 3018 and includes an outlet opening positioned within the reactor vessel's internal volume 3018. As will be appreciated from FIG. 39, when a catalyst is directed through the catalyst inlet 3020 via its inlet opening, the catalyst will be directed through the catalyst inlet and deposited within the reactor vessel's internal volume 3018.

In various implementations, the fluidized bed pyrolysis reactor 3000 is configured such that the liquid plastic feedstock is directed into the reactor vessel 3010 (via the feedstock inlet 3021 and through the distributor 3028) with a velocity that is sufficient to reach incipient fluidization. In other words, the velocity of the plastic feedstock is sufficient to balance the weight of the catalyst or catalytic material being deposited into the reactor vessel 3010 via the catalyst inlet 3020 (e.g., such that the bath of liquid plastic and catalyst mix and swirl within the reactor vessel 3010). In this way, the reactor vessel's internal volume 3018 comprises a fluidized bed, which includes the catalyst and liquid plastic feedstock. In various implementations, the catalyst may be selected to accelerate the rate of pyrolysis within the reactor vessel 3010 and/or lower the temperature at which pyrolysis occurs within the reactor vessel 3010.

As shown in FIG. 39, the fluidized bed pyrolysis reactor 3000 includes a plurality of external heating elements 3034 configured for heating the internal volume 3018 of the reactor vessel 3010. In various implementations, the external heating elements 3034 may comprise electric heaters positioned externally around the reactor vessel 3010. When activated, the transfer of heat from the electric heaters 3034 through the reactor vessel's cylindrical body 3012 thereby heats the internal volume 3018 of the reactor vessel 3010.

In various implementations, the heating elements 3034 are generally configured to provide the heat needed to raise temperatures inside the reactor vessel 3010 to a point where pyrolysis takes place. The heating elements 3034 can also be configured to provide the heat needed to maintain temperatures inside the reactor barrel 3010 at a point where pyrolysis process takes place. For example, the heating elements 3034 may be controlled to provide a prescribed temperature and heat density ($W/in^2$) that results in a controlled heat flux into the liquid feedstock within the reactor vessel 3010. In particular, the pyrolysis reaction within the reactor vessel 3010 can be controlled to provide a desired reaction temperature and average energy density (kW/lb.). Furthermore, in implementations in which heating of the reactor vessel 3010 is provided exclusively by the electric heating elements 3034, the fluidized bed pyrolysis reactor 3000 may be configured for driving the pyrolysis process using only electricity (e.g., without using gas as a direct heat source).

In various other implementations, the external heating elements 3034 may comprise gas powered heaters positioned around the reactor vessel 3010. In further implementations, one or more heat inlets may be positioned around the reactor vessel 3010. In such implementations, the heat inlets may be configured for receiving heated elements (e.g., heated ceramic balls) deposited into the reactor vessel's internal volume 3018 for transferring heat directly to the liquid plastic feedstock within the reactor vessel 3010. In other implementations, the heat inlets may be configured for receiving heated gas directed around or within the reactor vessel 3010 to heat the reactor vessel's internal volume 3018.

The fluidized bed pyrolysis reactor 3000 further includes a discharge manifold 3022. In various implementations, the discharge manifold 3022 is configured to provide an outlet for material within the reactor vessel 3010. For example, the discharge manifold 3022 may be used to transfer or otherwise remove liquid plastic (or other material generated during the pyrolysis process) from the reactor vessel 3010. Accordingly, various implementations of the discharge manifold 3022 may include a sealable discharge opening (e.g., a port which can be selectively opened or sealed and closed).

As shown in FIG. 39, the fluidized bed pyrolysis reactor 3000 also includes a vapor outlet 3024. In various implementations, the vapor outlet 3024 defines an internal opening (positioned within the reactor vessel's internal volume 3018) and an external opening (positioned outside of the reactor vessel 3010). The vapor outlet 3024, which may comprise, for example, a pipe, extends into the reactor vessel 3010 through the reactor vessel's ellipsoidal head 3014 and enables vapor produced during pyrolysis of the plastic feedstock within the reactor vessel 3010 to exit the reactor vessel 3010.

As noted above, during the pyrolysis process, the hydrocarbon plastic chains and groups of rings within the liquid plastic are split apart by the heating process into smaller segments until they are small and light enough to vaporize and exit the reactor as a vapor. Accordingly, the reactor's vapor outlet 3024 is configured to provide a conduit for hydrocarbon vapor exiting the reactor 3000 and thus extends upwardly from the reactor vessel 3010. In various implementations, the vapor outlet 3024 may be connected (e.g., via additional piping or a ducting manifold) to a product recovery system. For example, in the illustrated implementation of FIG. 39, the vapor outlet 3024 is configured to direct vapor exiting the reactor vessel 3010 following pyrolysis to a product collection system 3036 configured for product recovery (e.g., production of wax, oil, gas, or combinations thereof as described herein).

In the illustrated implementation of FIG. 39, the fluidized bed pyrolysis reactor 3000 further includes a plurality of reactor sensors 3030. In various implementations, the reactor sensors 3030 may be configured for measuring dynamic properties of the liquid plastic within the reactor vessel 3010, as well as the dynamic properties of the reactor's input (e.g., feedstock input) and output (e.g., vapor production). For example, in various implementations, the reactor sensors 3030 may comprise thermocouples, pressure sensors, flow meters, and the like. In this way, feedstock input (e.g., from the extruder 400) and product output can be monitored and/or adjusted based on the observed variations in the liquid plastic within the reactor 3000.

In various implementations, a plurality of fluidized bed pyrolysis reactor 3000 can also be provided for use in the production of wax, oil, gas, or combinations thereof. For example, in one implementation, three fluidized bed pyrolysis reactor 3000 are used and can be operational in any combination with one another (e.g., such that all three pyrolysis reactors 3000 are processing feedstock simultaneously, or such that two of the pyrolysis reactors 3000 are processing feedstock while a third remains on standby in the event one of the other reactors requires service or maintenance).

In various other implementations, the fluidized bed pyrolysis reactor 3000 may be alternatively configured as a packed bed reactor. In such implementations, the distributor 3028 may be configured for supporting a solid catalytic material through which liquid plastic is forced upwardly (into the reactor vessel 3010).

Figure 41:
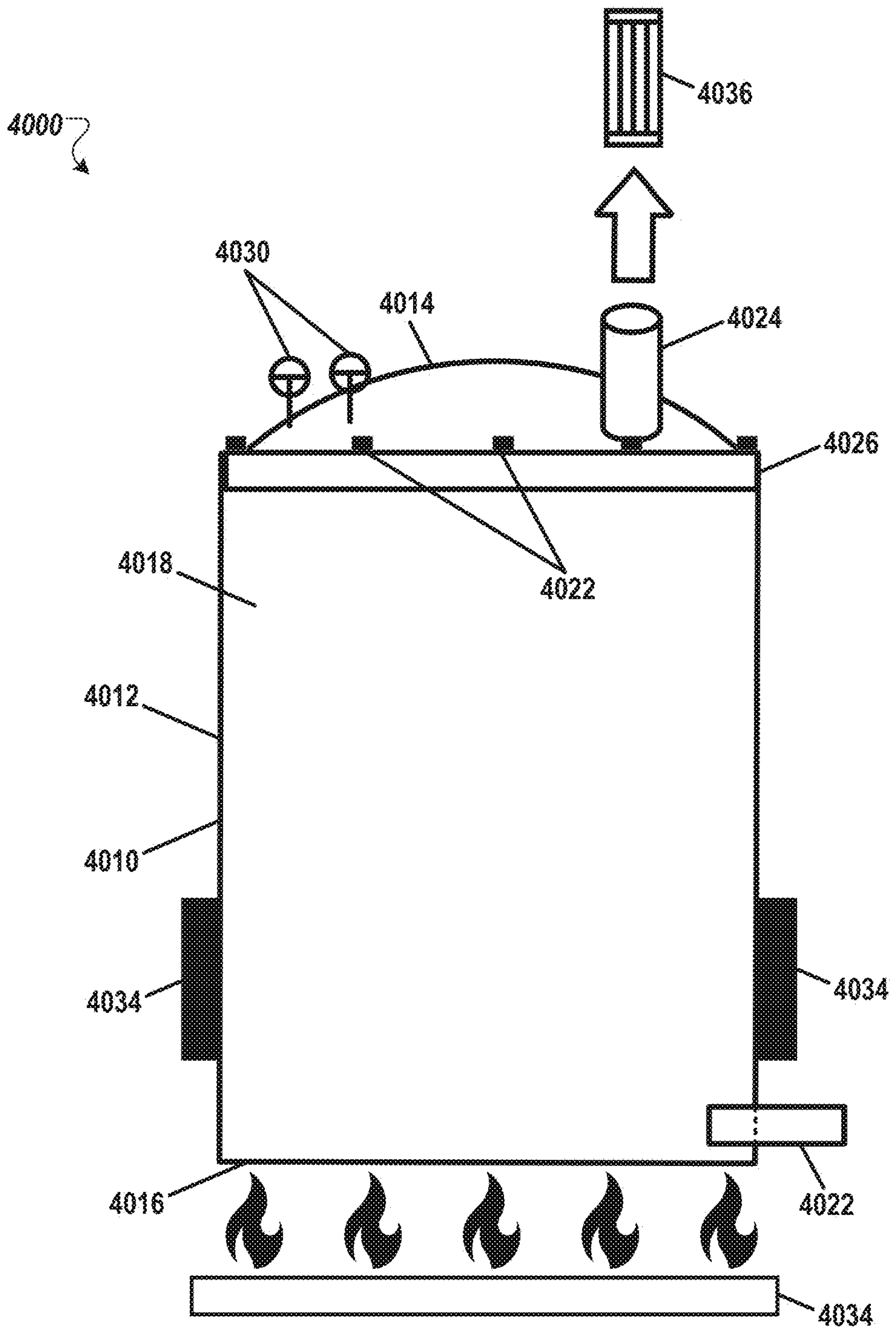
FIG. 41. Schematic side view of an example batch reactor.
Figure 42:
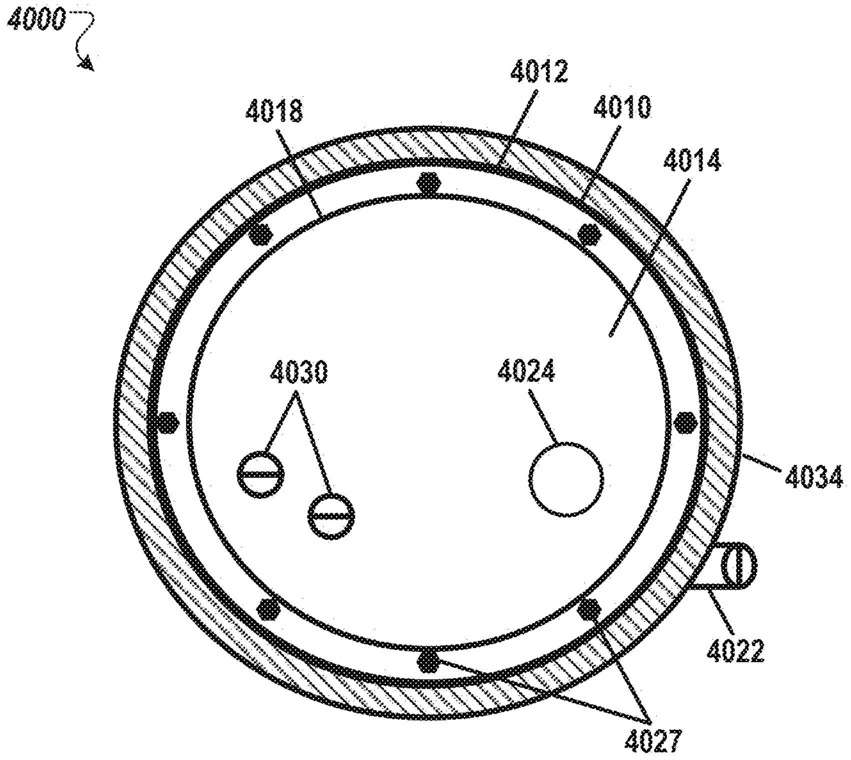
FIG. 42. Schematic top view of the example batch reactor of FIG. 41.

FIG. 41 shows a side view of a batch pyrolysis reactor 4000 according to one implementation. The batch pyrolysis reactor 4000 is generally configured for pyrolyzing feedstock in batches (e.g., not continuously). The batch pyrolysis reactor 4000 is configured for receiving and pyrolyzing semi-molten feedstock (e.g., received from an extruder). In other implementations, the batch pyrolysis reactor 4000 is configured for receiving and pyrolyzing solid or semi-solid plastic feedstock (e.g., loose film, baled film, rigids, thermoforms, sheets, foams, non-wovens, strips, pellets, powder, purge patties, densified, shredded, and other post-consumer and/or post-industrial plastics). Accordingly, the batch pyrolysis reactor 4000 can be used in the methods described herein for producing hydrocarbon-based compositions derived from pyrolysis of feedstock comprising post-consumer and/or post-industrial plastics, including wax, oil, gas, or combinations thereof. FIG. 42 provides a top view of the batch pyrolysis reactor 4000 shown in FIG. 41. Certain elements depicted in FIG. 41 are also depicted in FIG. 42 and, accordingly, reference to either figure may be regarded as a reference to both figures.

As shown in FIG. 41, the batch pyrolysis reactor 4000 includes a reactor vessel 4010 within which plastic feedstock is deposited and pyrolyzed. The reactor vessel 4010 is comprised of a cylindrical body 4012, a removable head 4014 positioned at an upper end of the cylindrical body 4012 (herein the upper head 3014), and a base 4016 positioned at a lower end of the cylindrical body 4012. Together, the cylindrical body 4012, removable head 4014, and the base 4016 define an internal volume 4018 of the reactor vessel 4010 (shown in FIG. 41). In various implementations, the cylindrical body 4012, removable head 4014, and the base 4016 may be constructed from stainless steel (or other materials with suitable structural and thermal properties).

In various implementations, the batch pyrolysis reactor 4000 is configured for pyrolyzing plastic feedstock in batches (e.g., one by one) Accordingly, the reactor vessel's removable head 4014 is secured to the upper portion of the reactor vessel 4010 by a seal interface 4026 and seal interface fasteners 4027. The combination of the seal interface 4026 and fasteners 4027 (e.g., high-strength fasteners) ensures that, when the removable head 4014 is secured to the upper portion of the reactor vessel 4010, the vessel 4010 can maintain desired conditions during pyrolysis.

The batch pyrolysis reactor 4000 further comprises a discharge manifold 4022, a vapor outlet 4024, a seal interface 4026, seal interface fasteners 4027, a plurality of reactor sensors 4030, one or more external heating elements 4034, and a product collection system 4036. In the illustrated implementation, the plastic feedstock is deposited into the reactor vessel's internal volume 4018 by way of the removable head 4020 for processing.

As shown in FIG. 41, the batch pyrolysis reactor 4000 includes a plurality of external heating elements 4034 configured for heating the internal volume 4018 of the reactor vessel 4010. In the illustrated implementation, the external heating elements 4034 comprise both electric heaters (positioned externally around the sides of the reactor vessel's cylindrical body 4012 in FIG. 41) and gas heaters (positioned beneath the reactor vessel's base 4016 in FIG. 41). When activated, the transfer of heat from the heating elements 4034 through the reactor vessel's cylindrical body 4012 thereby heats the internal volume 4018 of the reactor vessel 4010. In other implementations, the heating elements 4034 may comprise all electric, all gas, or a combination of gas and electric heating elements and may be positioned internally or externally to the reactor vessel 4010.

In various implementations, the heating elements 4034 are generally configured to provide the heat needed to raise temperatures inside the reactor vessel 4010 to a point where pyrolysis takes place. The heating elements 4034 can also be configured to provide the heat needed to maintain temperatures inside the reactor barrel 4010 at a point where pyrolysis process takes place. For example, the heating elements 4034 may be controlled to provide a prescribed temperature and heat density ($W/in^2$) that results in a controlled heat flux into the liquid feedstock bath within the reactor vessel 4010. In particular, the pyrolysis reaction within the reactor vessel 4010 can be controlled to provide a desired reaction temperature and energy density (kW/lb.).

In further implementations, one or more heat inlets may be positioned around the reactor vessel 4010. In such implementations, the heat inlets may be configured for receiving heated elements (e.g., heated ceramic balls) deposited into the reactor vessel's internal volume 4018 for transferring heat directly to the liquid plastic feedstock within the reactor vessel 4010. In other implementations, the heat inlets may be configured for receiving heated gas directed around or within the reactor vessel 4010 to heat the reactor vessel's internal volume 4018.

The batch pyrolysis reactor 4000 further includes a discharge manifold 4022. In various implementations, the discharge manifold 4022 is configured to provide an outlet for material within the reactor vessel 4010. For example, the discharge manifold 4022 may be used to transfer or otherwise remove liquid plastic (or other material generated during the pyrolysis process) from the reactor vessel 4010. Accordingly, various implementations of the discharge manifold 4022 may include a sealable discharge opening (e.g., a port which can be selectively opened or sealed and closed).

As shown in FIG. 41, the batch pyrolysis reactor 4000 also includes a vapor outlet 4024. In various implementations, the vapor outlet 4024 defines an internal opening (positioned within the reactor vessel's internal volume 4018) and an external opening (positioned outside of the reactor vessel 4010). The vapor outlet 4024, which may comprise, for example, a pipe, extends into the reactor vessel 4010 through the reactor vessel's removable head 4014 and enables vapor produced during pyrolysis of the plastic feedstock within the reactor vessel 4010 to exit the reactor vessel 4010.

As noted above, during the pyrolysis process, the hydrocarbon plastic chains and groups of rings within the liquid plastic are split apart by the heating process into smaller segments until they are small and light enough to vaporize and exit the reactor as a vapor. Accordingly, the reactor's vapor outlet 4024 is configured to provide a conduit for hydrocarbon vapor exiting the reactor 4000 and thus extends upwardly from the reactor vessel 4010. In various implementations, the vapor outlet 4024 may be connected (e.g., via additional piping or a ducting manifold) to a product recovery system. For example, in the illustrated implementation of FIG. 41, the vapor outlet 4024 is configured to direct vapor exiting the reactor vessel 4010 following pyrolysis to a product collection system 4036 configured for product recovery (e.g., production of wax, oil, gas, or combinations thereof as described herein).

In the illustrated implementation of FIG. 41, the batch pyrolysis reactor 4000 further includes a plurality of reactor sensors 4030. In various implementations, the reactor sensors 4030 may be configured for measuring dynamic properties of the liquid plastic bath within the reactor vessel 4010, as well as the dynamic properties of the reactor's input (e.g., feedstock input) and output (e.g., vapor production). For example, in various implementations, the reactor sensors 4030 may comprise thermocouples, pressure sensors, flow meters, and the like. In this way, feedstock input (e.g., from the extruder 400) and product output can be monitored and/or adjusted based on the observed variations in the liquid plastic bath within the reactor 4000.

In various implementations, a plurality of batch pyrolysis reactors 4000 can also be provided for use in the production of wax, oil, gas, or combinations thereof. For example, in one implementation, three batch pyrolysis reactors 4000 are used and can be operational in any combination with one another (e.g., such that all three pyrolysis reactors 4000 are processing feedstock simultaneously, or such that two of the pyrolysis reactors 4000 are processing feedstock while a third remains on standby in the event one of the other reactors requires service or maintenance).

Figure 43:
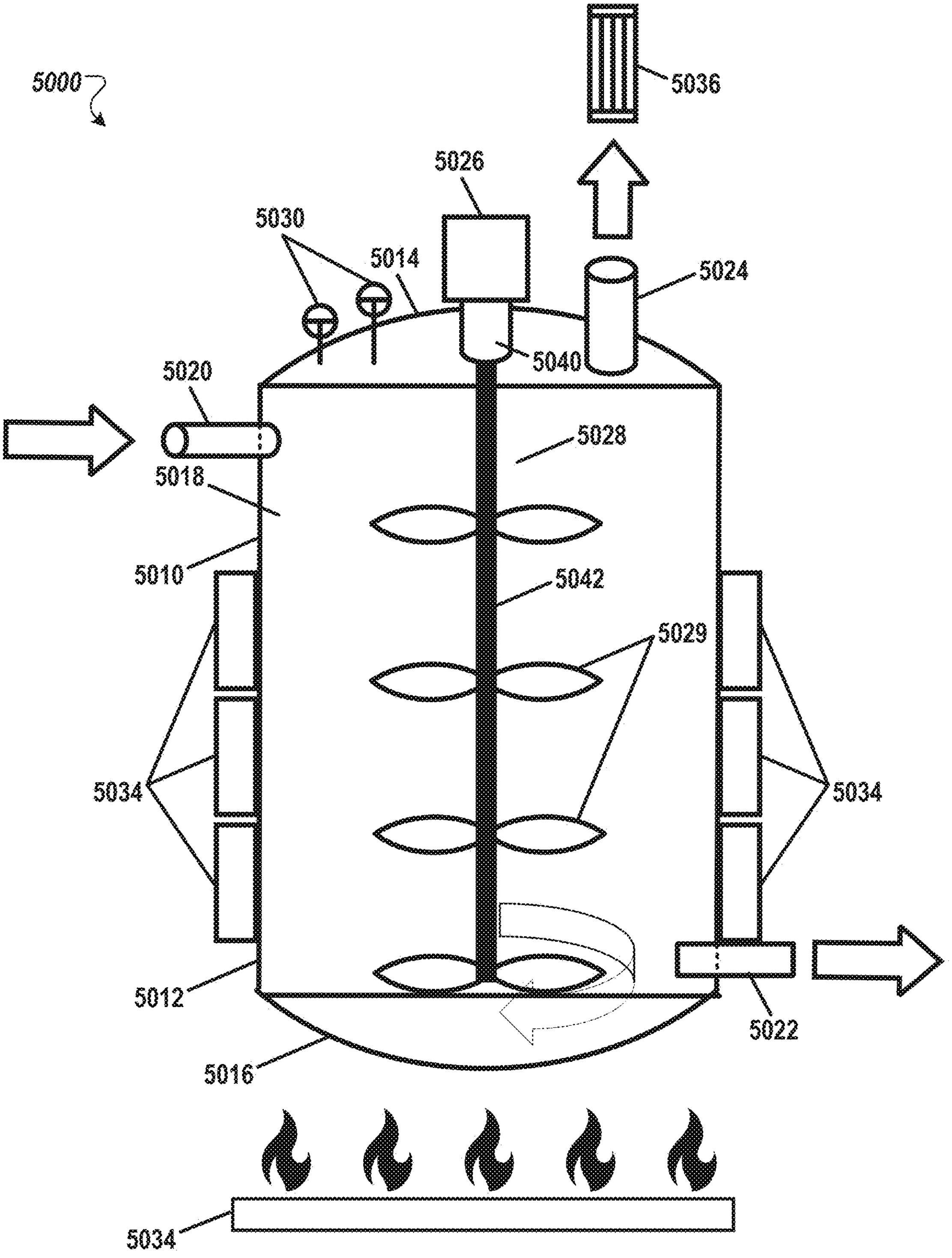
FIG. 43. Schematic side view of an example continuously stirred reactor with external gas heating.
Figure 44:
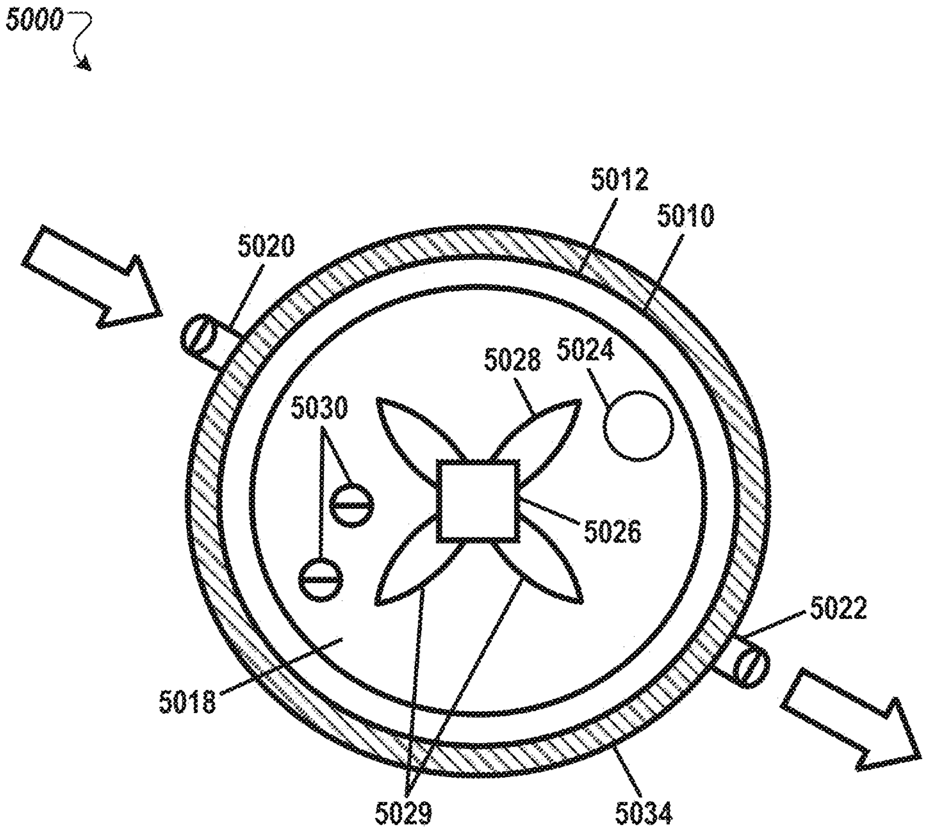
FIG. 44. Schematic top view of the example continuously stirred reactor of FIG. 43.

FIG. 43 shows a continuously stirred pyrolysis reactor 5000 according to one implementation. The continuously stirred pyrolysis reactor 5000 is generally configured for pyrolyzing feedstock (e.g., semi-molten feedstock received from an extruder). Accordingly, the continuously stirred pyrolysis reactor 5000 can be used in the methods described herein for producing hydrocarbon-based compositions derived from pyrolysis of feedstock comprising post-consumer and/or post-industrial plastics, including wax, oil, gas, or combinations thereof. FIG. 44 provides a top view of the continuously stirred pyrolysis reactor 5000 shown in FIG. 43. Certain elements depicted in FIG. 43 are also depicted in FIG. 44 and, accordingly, reference to either figure may be regarded as a reference to both figures.

As shown in FIG. 43, the continuously stirred pyrolysis reactor 5000 includes a reactor vessel 5010 within which solid, molten, or semi-molten feedstock is deposited and pyrolyzed. The reactor vessel 5010 is comprised of a cylindrical body 5012, a first ellipsoidal head 5014 positioned at an upper end of the cylindrical body 5012 (herein the upper ellipsoidal head 5014), and a second ellipsoidal head 5016 positioned at a lower end of the cylindrical body 5012 (herein the lower ellipsoidal head 5016). Together, the cylindrical body 5012 and ellipsoidal heads 5014, 5016 define an internal volume 5018 of the reactor vessel 5010 (shown in FIG. 43). In various implementations, the cylindrical body 5012 and ellipsoidal heads 5014, 5016 may be constructed from stainless steel (or other materials with suitable structural and thermal properties). As shown in FIG. 43, the reactor vessel 5010 may be mounted in a substantially upright position (e.g., such that its longitudinal axis is substantially vertical).

The reactor vessel's cylindrical body 5012 includes an inlet port 5020, a discharge manifold 5022, a vapor outlet 5024, and a plurality of reactor sensors 5030. Semi-molten feedstock (e.g., received from an extruder) is deposited into the reactor vessel's internal volume 5018 by way of the inlet port 5020. In various implementations, the inlet port 5020 defines an external opening and extends into the reactor vessel 5010. In the illustrated implementation, the plastic feedstock (e.g., semi-molten feedstock received from an extruder) is deposited into the reactor vessel's internal volume 5018 by way of the inlet port 5020. In various implementations, the inlet port's external inlet opening is positioned outside of the reactor vessel 5010 and defines an aperture through which plastic feedstock may enter the inlet port 5020. The inlet port 5020, which may comprise, for example, a pipe, extends into the internal volume 5018 and includes an outlet opening positioned within the reactor vessel's internal volume 5018. As will be appreciated from FIG. 43, when plastic feedstock (e.g., semi-molten feedstock) is directed through the inlet port 5020 via its inlet opening, the plastic feedstock will be directed through the inlet port and deposited within the reactor vessel's internal volume 5018 for processing. As the continuously stirred pyrolysis reactor 5000 is configured for continuous operation, in certain implementations, the plastic feedstock may be deposited into the reactor's internal volume 5018 continuously (e.g., such that as the plastic feedstock pyrolyzes and vapor exits the reactor, additional plastic feedstock is deposited into the reactor 5000 to continue the process).

The continuously stirred pyrolysis reactor 5000 further includes a discharge manifold 5022. In various implementations, the discharge manifold 5022 is configured to provide an outlet for material within the reactor vessel 5010. For example, the discharge manifold 5022 may be used to transfer or otherwise remove liquid plastic (or other material generated during the pyrolysis process) from the reactor vessel 5010. Accordingly, various implementations of the discharge manifold 5022 may include a sealable discharge opening (e.g., a port which can be selectively opened or sealed and closed).

As shown in FIG. 43, the continuously stirred pyrolysis reactor 5000 also includes a vapor outlet 5024. In various implementations, the vapor outlet 5024 defines an internal opening (positioned within the reactor vessel's internal volume 5018) and an external opening (positioned outside of the reactor vessel 5010). The vapor outlet 5024, which may comprise, for example, a pipe, extends into the reactor vessel 5010 through the reactor vessel's upper ellipsoidal head 5014 and enables vapor produced during pyrolysis of the plastic feedstock within the reactor vessel 5010 to exit the reactor vessel 5010.

As noted above, during the pyrolysis process, the hydrocarbon plastic chains and groups of rings within the liquid plastic are split apart by the heating process into smaller segments until they are small and light enough to vaporize and exit the reactor as a vapor. Accordingly, the reactor's vapor outlet 5024 is configured to provide a conduit for hydrocarbon vapor exiting the reactor 5000 and thus extends upwardly from the reactor vessel 5010. In various implementations, the vapor outlet 5024 may be connected (e.g., via additional piping or a ducting manifold) to a product recovery system. For example, in the illustrated implementation of FIG. 43, the vapor outlet 5024 is configured to direct vapor exiting the reactor vessel 5010 following pyrolysis to a product collection system 5036 configured for product recovery (e.g., production of wax, oil, gas, or combinations thereof as described herein). In some implementations, the pyrolysis reactor 5000 can be configured for producing an average of 0.30 lb. or more (e.g., 0.40 lb. or more, 0.45 lb. or more, 0.50 lb. or more) of pyrolyzed product per hour per gallon of the reactor's internal volume for a period of 24 hours or more.

As shown in FIG. 43, the continuously stirred pyrolysis reactor 5000 includes a plurality of external gas heating elements 5034 configured for heating the internal volume 5018 of the reactor vessel 5010. In the illustrated implementation, the external heating elements 5034 are gas heaters positioned both laterally on the sides of the reactor vessel's cylindrical body 5012 and beneath the reactor's lower ellipsoidal head 5016 (proximate to the lower portion of the reactor vessel 5010). When activated, the transfer of heat from the gas heating elements 5034 through the reactor vessel's cylindrical body 5012 thereby heats the internal volume 5018 of the reactor vessel 5010.

In various implementations, the gas heating elements 5034 are generally configured to provide the heat needed to raise temperatures inside the reactor vessel 5010 to a point where pyrolysis takes place. The heating elements 5034 can also be configured to provide the heat needed to maintain temperatures inside the reactor barrel 5010 at a point where pyrolysis process takes place. For example, the heating elements 5034 may be controlled to provide a prescribed temperature and heat density ($W/in^2$) that results in a controlled heat flux into the liquid feedstock bath within the reactor vessel 5010. In particular, the pyrolysis reaction within the reactor vessel 5010 can be controlled to provide a desired reaction temperature and energy density (kW/lb.).

The reactor vessel's upper ellipsoidal head 5014 defines an agitator drive mount configured to enable a motor 5026 to be coupled to an agitator 5028 positioned within the pyrolysis reactor 5000. As shown and described herein with respect to FIGS. 43 and 44, the motor-driven agitator 5028 is positioned within the reactor vessel 5010 and is configured to agitate the liquid plastic bath within the vessel 5010 during pyrolysis. In various implementations, the agitator drive mount includes a sealed agitator opening through which the agitator's drive shaft may be accessed and coupled to the drive motor 5026. In particular, the agitator opening is configured to provide a seal between the agitator's drive shaft and the agitator drive mount in order to maintain desired operating conditions within the reactor vessel 5010. For example, in one implementation, the agitator opening may comprise a mechanical seal, bellows-style seal, split-ring stuff box, stuffing box-style seal, or the like.

In various implementations, the agitator 5028 is rotated by the electric motor 5026 and configured to produce liquid flow velocities inside the reactor vessel 5010 such that the heat necessary for pyrolysis is distributed throughout the liquid plastic bath. Furthermore, the agitator 5028 is configured to circulate the liquid plastic bath in a manner that avoids long residence times at heated surfaces.

As shown in FIG. 43, the agitator 5028 includes a vertical drive shaft and a plurality of impellers 5029 spaced along the length of the drive shaft. In the illustrated implementation, the agitator's drive shaft is vertically oriented within the reactor vessel 5010 (e.g., such that the longitudinal axis of the drive shaft is parallel with the longitudinal axis of the reactor vessel's cylindrical body 5012). Additionally, the drive shaft is centrally located within the reactor vessel 5010 (e.g., such that the longitudinal axis of the drive shaft 5042 is aligned with the longitudinal axis of the cylindrical body 5012). The drive shaft includes an upper end, which is operatively coupled to the drive motor 5026 via the agitator drive mount (e.g., such that the drive shaft's upper end extends through the sealed agitator opening).

In the illustrated implementation, the agitator 5028 includes a plurality of impellers 5029. As shown in FIG. 43, the impellers 5029 are attached to the drive shaft and spaced along the drive shaft's length. For example, in various implementations, the impellers 5029 may be positioned along the length of the drive shaft in order to provide sufficient agitation throughout the liquid plastic bath within the reactor vessel 5010. Furthermore, each impeller 5029 may comprise one or more impeller blades (e.g., four impeller blades). In certain implementations, the impeller blades may be configured to extend radially outwardly from the drive shaft.

As noted above, various implementations of the agitator 5028 are configured for continuously rotating (i.e., stirring) such that the liquid plastic inside the reactor vessel is kept in continuous motion. In this way, the agitator 5028 is configured for producing liquid flow velocities inside the reactor vessel 5010 necessary for the liquid plastic bath to acquire sufficient heat for pyrolysis to occur and/or while also avoiding overheating at the heated surfaces. For example, the agitator 5028 continuously circulates the liquid plastic throughout the reactor vessel's internal volume 5018 such that the entire liquid bath is agitated (e.g., substantially none of the liquid bath is static). In doing so, the motion of the agitator 5028 fosters rapid heat transfer from the heating elements 5034 to the liquid plastic.

In the illustrated implementation of FIG. 43, the continuously stirred pyrolysis reactor 5000 further includes a plurality of reactor sensors 5030. In various implementations, the reactor sensors 5030 may be configured for measuring dynamic properties of the liquid plastic bath within the reactor vessel 5010, as well as the dynamic properties of the reactor's input (e.g., feedstock input) and output (e.g., vapor production). For example, in various implementations, the reactor sensors 5030 may comprise thermocouples, pressure sensors, flow meters, and the like. In certain implementations, the reactor sensors 5030 may comprise instrumentation probes having thermocouples arranged vertically along the length of a respective instrumentation probe to measure the liquid plastic bath level with the reactor vessel 5010. Additionally, one or more of the instrumentation probes may be configured for measuring reactor vapor pressure. In this way, feedstock input (e.g., from the extruder 400) and product output can be monitored and/or adjusted based on the observed variations in the liquid plastic bath within the reactor 5000.

In various implementations, a plurality of continuously stirred pyrolysis reactors 5000 can also be provided for use in the production of wax, oil, gas, or combinations thereof. For example, in one implementation, three continuously stirred pyrolysis reactors 5000 are used and can be operational in any combination with one another (e.g., such that all three pyrolysis reactors 5000 are processing feedstock simultaneously, or such that two of the pyrolysis reactors 5000 are processing feedstock while a third remains on standby in the event one of the other reactors requires service or maintenance). Additionally, in various implementations, the multiple pyrolysis reactors 5000 may be connected to a common manifold to direct vapor flow resulting from the pyrolysis process in each reactor.

Figure 45:
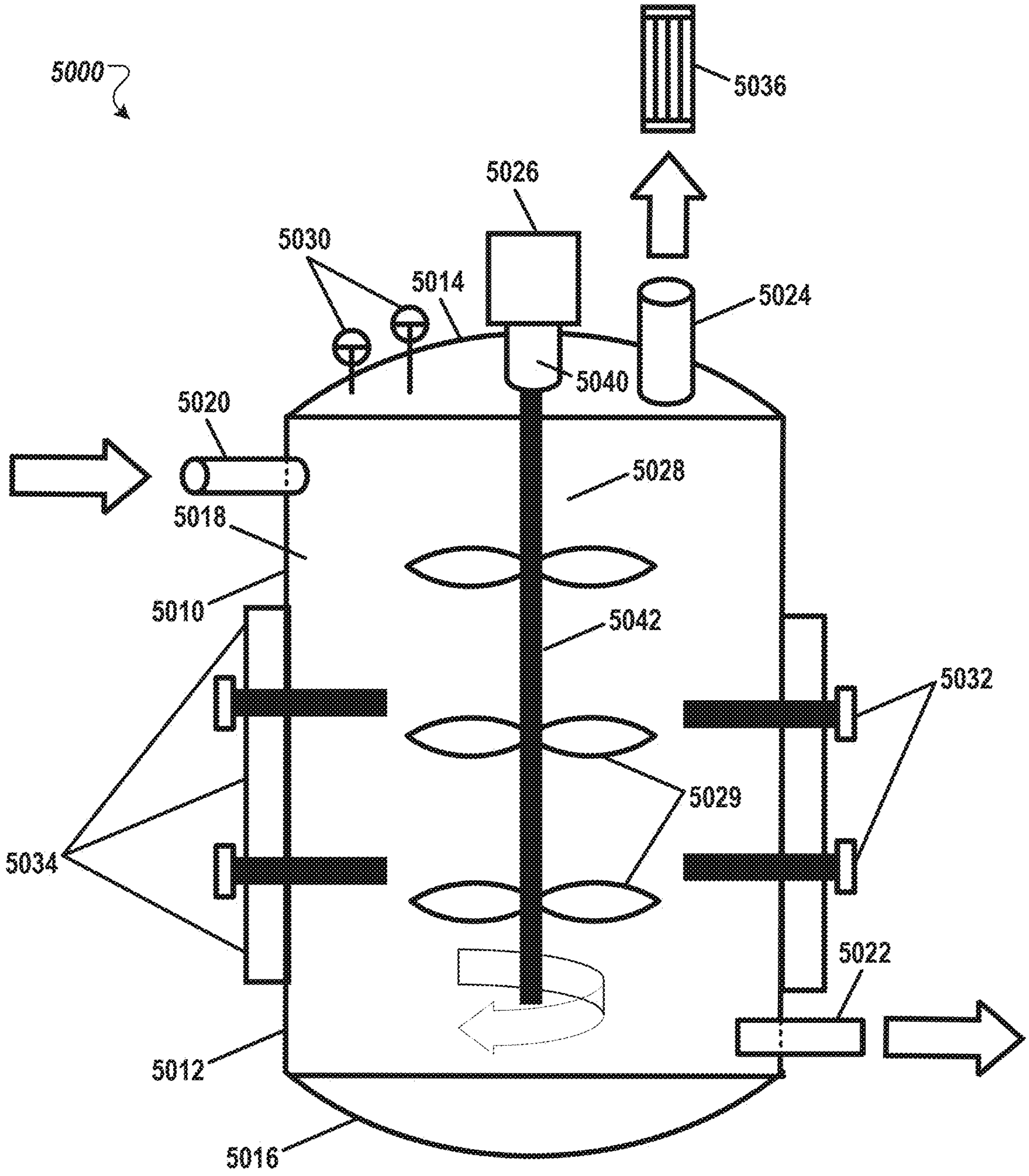
FIG. 45. Schematic side view of an example continuously stirred reactor with external gas heating and internal electric heating.
Figure 46:
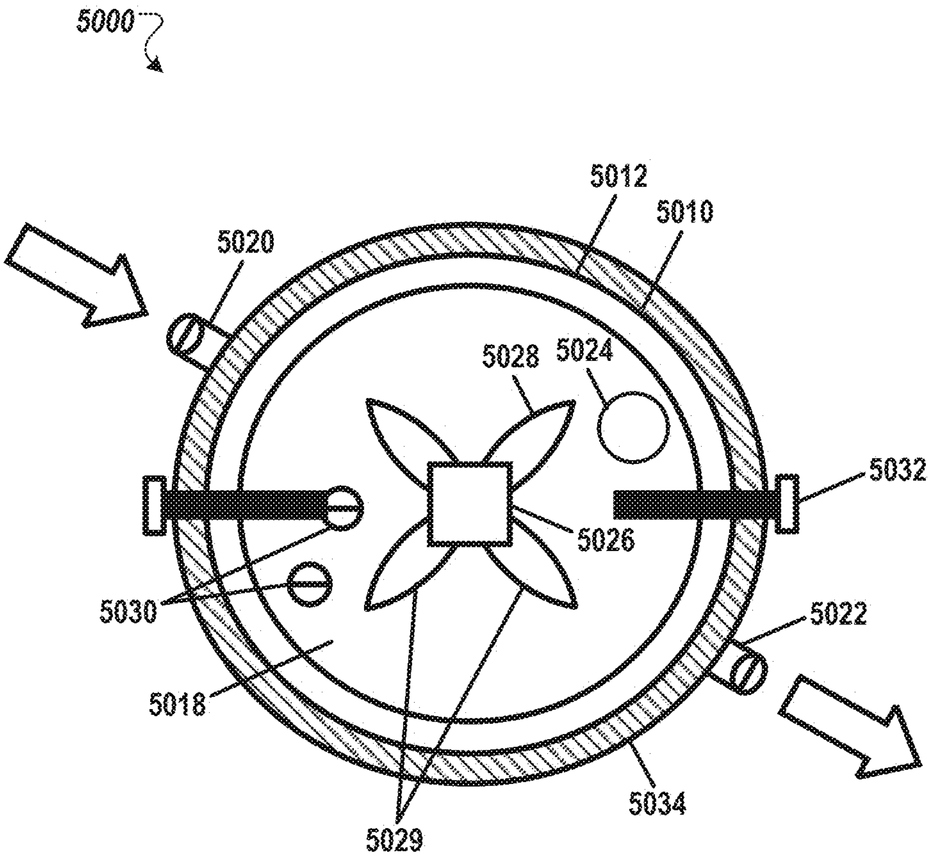
FIG. 46. Schematic top view of the example continuously stirred reactor of FIG. 45.

FIG. 45 shows another implementation of the continuously stirred pyrolysis reactor 5000 (like numbers refer to like elements throughout the figures). FIG. 46 provides a top view of the continuously stirred pyrolysis reactor 5000 shown in FIG. 45. Certain elements depicted in FIG. 45 are also depicted in FIG. 46 and, accordingly, reference to either figure may be regarded as a reference to both figures.

In the illustrated implementation of FIG. 45, the continuously stirred pyrolysis reactor 5000 includes a combination of gas-powered heating elements 5034 and electrically powered heating elements 5032. In the illustrated implementation, the gas-powered heating elements 5034 are positioned laterally on the sides of the reactor vessel's cylindrical body 5012. Furthermore, in the illustrated implementation, the internal heating elements 5032 comprise electric heaters (e.g., electric heating elements positioned within drywells) positioned such that they extend inwardly into the reactor vessel's internal volume 5018. For example, in the illustrated implementation of FIG. 45, the internal heating elements 5032 extend laterally into the reactor vessel's internal volume 5018 from the sides of the reactor vessel 5010. When activated, the transfer of heat from the electric heaters 5034 to the liquid plastic path (as well as the transfer of heat from the gas-powered heaters 5034 through the reactor vessel's cylindrical body 5012) heats the internal volume 5018 of the reactor vessel 5010.

Figure 47:
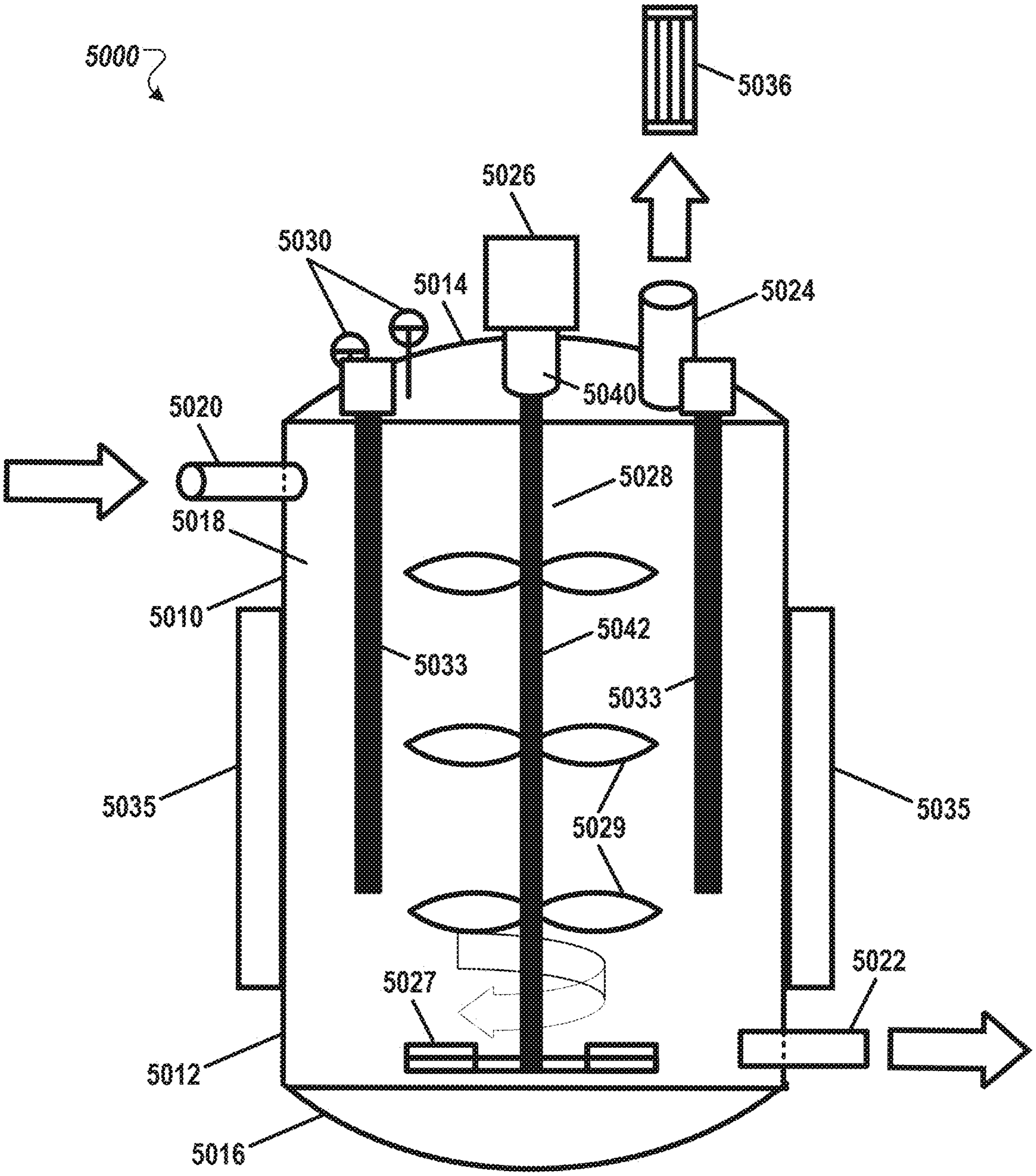
FIG. 47. Schematic side view of an example continuously stirred reactor with external electrical heating and internal electric heating.
Figure 48:
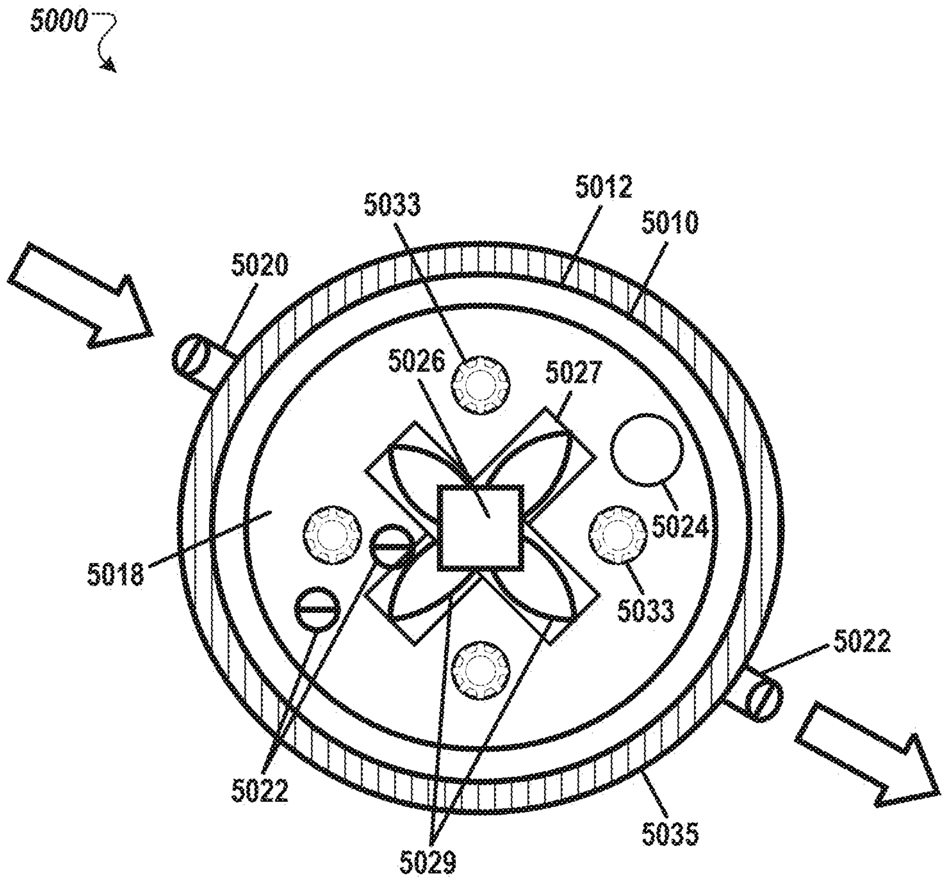
FIG. 48. Schematic top view of the example continuously stirred reactor of FIG. 47.

FIG. 47 shows another implementation of the continuously stirred pyrolysis reactor 5000 (like numbers refer to like elements throughout the figures). FIG. 48 provides a top view of the continuously stirred pyrolysis reactor 5000 shown in FIG. 47. Certain elements depicted in FIG. 47 are also depicted in FIG. 48 and, accordingly, reference to either figure may be regarded as a reference to both figures.

In the illustrated implementation of FIG. 47, the continuously stirred pyrolysis reactor 5000 includes an extruder inlet pipe 5020 having an inlet opening (positioned outside of the reactor vessel 5010) through which semi-molten feedstock may enter the extruder inlet pipe 5020. The extruder inlet pipe 5020 extends into the reactor's internal volume 5018 and includes an outlet opening positioned at a height below the inlet opening. In the illustrated implementation, the extruder inlet pipe 5020 is mounted to the interior of the cylindrical body 5012 by an inlet pipe brace. As will be appreciated from FIG. 47, when semi-molten feedstock is directed into the extruder inlet pipe 5020 via the inlet opening 5022, the semi-molten feedstock will be directed through the extruder inlet pipe 5020 and deposited into the reactor vessel's internal volume 5018 for processing.

In the illustrated implementation of FIG. 47, the reactor 5000 includes a plurality of internal electric heaters 5033 positioned within the reactor vessel 5010 and a plurality of external electric heaters 5035 positioned around the sidewalls of the reactor's cylindrical body 5012. The internal electric heaters 5033 may comprise, for example, one or more heating elements positioned within dry wells. As shown in FIG. 47, the internal electric heaters 5033 are vertically oriented and extend from the reactor vessel's upper ellipsoidal head 5014 and into the reactor's internal volume 5019. For example, in the illustrated implementation the internal electric heaters 5033 each define a longitudinal axis that is parallel to the longitudinal axis of the reactor vessel's cylindrical body 5012. In addition, each of the internal electric heaters 5033 extends into the reactor vessel's internal volume 5018 to a depth sufficient to allow energy transfer throughout the liquid plastic bath.

In various implementations, the electric heaters 5033, 5035 are generally configured to provide the energy needed to raise temperatures inside the pyrolysis reactor 5000 to a point where the pyrolysis process takes place. In various implementations, the electric heaters 5033, 5035 are configured to provide the energy needed to maintain temperatures inside the pyrolysis reactor 5000 at a point where the pyrolysis process takes place.

As described herein, the output of the electric heaters 5033, 5035 is controlled to provide a prescribed temperature and heat density ($W/in^2$) that results in a controlled heat flux into the liquid feedstock bath.

Furthermore, the pyrolysis reaction within the reactor vessel 5010 can be controlled to provide a desired reaction temperature and energy density (kW/lb.). In some implementations, the pyrolysis reactor 5000 can be configured for consuming energy at an average rate of 0.70 kW or less (e.g., 0.30 kW or less, 0.20 kW or less, 0.16 kW or less) per pound of pyrolyzed product produced within the reactor per hour. In other implementations, the pyrolysis reactor 5000 in combination with extruder 800 can be configured for consuming energy at an average rate of 0.80 kW or less (e.g., 0.50 kW or less, 0.40 kW or less, 0.30 kW or less) per pound of pyrolyzed product produced by the system per hour. In combination with continuous stirring of the liquid bath (e.g., via the agitator 5028), the pyrolysis reaction within the reactor 5000 can be driven without producing conditions that promote char formation. Furthermore, as the electric heaters 5033, 5035 are powered by electricity, various implementations of the pyrolysis reactor 5000 are configured for driving the pyrolysis process using only electricity (e.g., without using gas as a direct heat source).

In the illustrated implementation, a plurality of internal electric heaters 5033 are provided within the reactor vessel 5010 and are arranged in a spaced-apart relationship within the reactor vessel 5010. For example, in various implementations, numerous internal electric heaters 5033 may be used (e.g., two, three, four, five, six, seven, eight, nine ten, eleven, twelve, thirteen, fourteen, or fifteen or more internal electrical heaters 5033). For example, the number of internal electric heaters within the reactor 5000 can be selected based on the size of the reactor and/or the size and power of the heaters. As shown in FIG. 48, the internal electric heaters 5033 are arranged in an array within the reactor 5000 (e.g., a circular or semi-circular array). Additionally, in various implementations, the internal electric heaters 5033 may be substantially evenly spaced around the internal volume 5018 of the reactor vessel 5010. By distributing the internal electric heaters 5033 throughout the internal volume 5018 in this way, the reactor 5000 can precisely control and evenly distribute heat input into the liquid feedstock bath.

Referring back to FIG. 47, in the illustrated embodiment, the agitator 5028 further includes a distal impeller 5027. As shown in FIG. 47, the agitator's distal impeller 5027 is positioned at a distal end of the agitator drive shaft 5042. In the illustrated implementation, the distal impeller 5027 comprises an end plate and plurality of upwardly extending fins.

By providing precise temperature control of the electric heaters 5033, 5035 and minimizing the residence time of the liquid plastic against heated surfaces using the agitator 5028, the reactor 5000 provides improved control of the heat input to the liquid plastic bath. In particular, the reactor 5000 offers more precise control over the liquid bath temperature in comparison to gas heater reactors. For example, in various implementations, the reactor 5000 is configured to maintain the temperature of the liquid reactor bath within the reactor vessel 5010 to within 10% or less of a target temperature value (e.g., within 10% above or below the target temperature value, within 5% above or below the target temperature value, or within 2% above or below the target temperature value). Examples of control systems for maintaining the temperature of the liquid plastic within a suitable tolerance of a set point or target temperature are described in further detail herein.

As a result of its precise control over heat input and the liquid plastic temperature, the reactor 5000 can heat the liquid plastic to sufficient temperatures for pyrolysis without causing localized overheating of the liquid plastic. The reactor 5000 can additionally maintain the liquid plastic at sufficient temperatures for pyrolysis without causing localized overheating of the liquid plastic. In this way, the reactor 5000 avoids charring during the pyrolysis process. The reactor's ability to provide more precise heat application and temperature maintenance—thereby avoiding (or reducing) charring—can improve the overall efficiency of the production process for wax, oil, gas, or combinations thereof. This reduced charring can also lead to an increased uptime, since the reactor will not have to be shut down and cleaned out as frequently. In some specific implementations, the reactor 5000 can be configured for operating to pyrolyze the plastic feedstock for a cumulative period of 324 hours or more during a time period of 360 hours (e.g., 342 hours or more during a time period of 360 hours, 576 hours or more during a time period of 720 hours, 756 hours or more during a time period of 1080 hours). In some specific implementations, the reactor 5000 can be configured for operating to pyrolyze the plastic feedstock with 90% uptime over 15 days (e.g., 95% uptime over 15 days, 80% uptime over 30 days, 70% uptime over 45 days). Moreover, as a result of the reactor's improved temperature precision, higher average temperatures may be maintained in the liquid plastic (without causing charring or with minimal charring) and thereby increase overall throughput in the reactor 5000.

Figure 49:
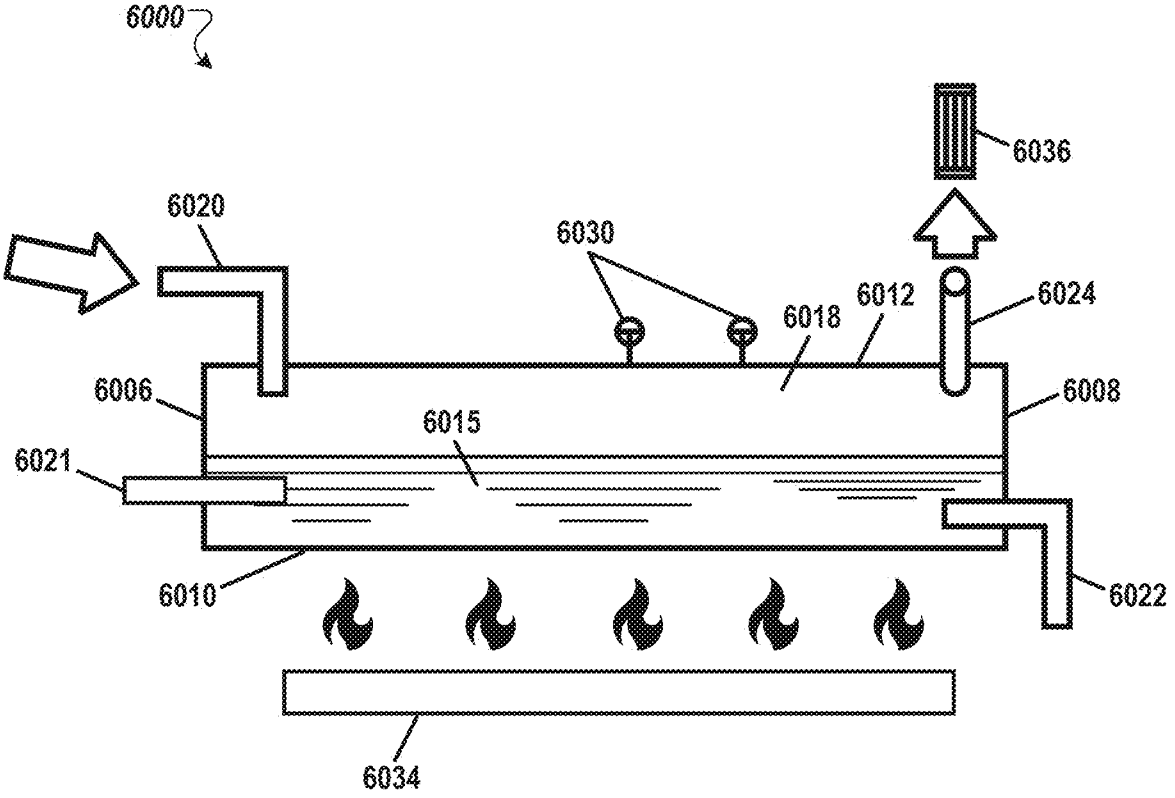
FIG. 49. Schematic side view of an example molten material reactor.

FIG. 49 shows a side view of a molten material reactor 6000 according to one implementation. The molten material reactor 6000 is generally configured for pyrolyzing feedstock (e.g., semi-molten feedstock received from an extruder). Accordingly, the molten material reactor 6000 can be used in the methods described herein for producing hydrocarbon-based compositions derived from pyrolysis of feedstock comprising post-consumer and/or post-industrial plastics, including wax, oil, gas, or combinations thereof. In other implementations, the molten material reactor 6000 is configured for receiving and pyrolyzing solid or semi-solid plastic feedstock (e.g., loose film, baled film, rigids, thermoforms, sheets, foams, non-wovens, strips, pellets, powder, purge patties, densified, shredded, and other post-consumer and/or post-industrial plastics). Accordingly, the molten material reactor 6000 can be used in the methods described herein for producing hydrocarbon-based compositions derived from pyrolysis of feedstock comprising post-consumer and/or post-industrial plastics, including wax, oil, gas, or combinations thereof.

As shown in FIG. 49, the molten material reactor 6000 includes a reactor vessel 6010 within which plastic feedstock is deposited and pyrolyzed. The reactor vessel 6010 can be a vessel of any suitable geometry or shape for containing a molten material 6015 and plastic feedstock. The reactor vessel can, for example, comprise a cylindrical body 6012 extending between a first end 6006 and a second end 6008. Together, the cylindrical body 6012, first end 6006 and second end 6008 define an internal volume 6018. In various implementations, the cylindrical body 6012, first end 6006, and second end 6008 may be constructed from stainless steel (or other materials with suitable structural and thermal properties). As shown in FIG. 49, the reactor vessel 6010 may be mounted in a substantially horizontal position (e.g., such that its longitudinal axis is substantially horizontal).

The molten material reactor 6000 further comprises a feedstock inlet 6020, a material inlet 6021, a discharge manifold 6022, a vapor outlet 6024, a plurality of reactor sensors 6030, one or more external heating elements 6034, and a product collection system 6036. Semi-molten feedstock (e.g., received from an extruder) is deposited into the reactor vessel's internal volume 6018 by way of the feedstock inlet 6020. In various implementations, the feedstock inlet 6020 defines an external opening and extends into the reactor vessel 6010. In the illustrated implementation, the plastic feedstock (e.g., semi-molten feedstock received from an extruder) is deposited into the reactor vessel's internal volume 6018 by way of the feedstock inlet 6020. In various implementations, the feedstock inlet's external inlet opening is positioned outside of the reactor vessel 6010 and defines an aperture through which plastic feedstock may enter the feedstock inlet 6020. The feedstock inlet 6020, which may comprise, for example, a pipe, extends into the internal volume 6018 and includes an outlet opening positioned within the reactor vessel's internal volume 6018. As will be appreciated from FIG. 49, when plastic feedstock (e.g., semi-molten feedstock) is directed through the feedstock inlet 6020 via its inlet opening, the plastic feedstock will be directed through feedstock inlet and deposited within the reactor vessel's internal volume 6018 for processing.

The material utilized for heat transfer in the molten material reactor 6000 is deposited into the reactor vessel's internal volume 6018 by way of the material inlet 6021. In various implementations, the material inlet 6021 is positioned substantially below the feedstock inlet 6020 at the first end 6006 of the reactor vessel 6010. In various implementations, the material inlet 6021 defines includes an external inlet opening positioned outside of the reactor vessel 6010 and defines an aperture through which material may enter the material inlet 6021. The material inlet 6021, which may comprise, for example, a pipe, extends into the internal volume 6018 and includes an outlet opening positioned within the reactor vessel's internal volume 6018. As will be appreciated from FIG. 49, when the material (e.g., a metal or salt) is directed through the material inlet 6021 via its inlet opening, the plastic feedstock will be directed through feedstock inlet and deposited within the reactor vessel's internal volume 6018 for processing.

As shown in FIG. 49, the molten material reactor 6000 can include at least one heating element 6034 configured for heating the internal volume 6018 of the reactor vessel 6010. In some implementations, the heating elements 6034 can comprise both electric heaters (positioned externally around the sides of the reactor vessel's cylindrical body 6012) and gas heaters (positioned beneath or around the reactor vessel's cylindrical body 6012). In one implementation, as shown in FIG. 49, the heating element 6034 comprises an external gas heater positioned beneath the reactor vessel's cylindrical body 6012. When activated, the transfer of heat from the heating elements 6034 through the reactor vessel's cylindrical body 6012 thereby heats the internal volume 6018 of the reactor vessel 6010. In other implementations, the heating elements 6034 may comprise all electric or all electric heating elements and may be positioned internally or externally to the reactor vessel 6010.

In various implementations, the heating elements 6034 are generally configured to provide the heat needed to raise temperatures inside the reactor vessel 6010 to a point where pyrolysis takes place. The heating elements 6034 can also be configured to provide the heat needed to maintain temperatures inside the reactor barrel 6010 at a point where the pyrolysis process takes place. In the molten material reactor 6000, a material, such as a metal (e.g., zinc) or a salt, is heated by the heating element(s) 6034. As a result, when plastic feedstock is directed through the feedstock inlet 6020 into the internal volume 6018, pyrolysis is facilitated through the plastic feedstock's contact directly with the molten material 6015. As a result, the molten material 6015 transfers heat directly to the liquid plastic feedstock within the reactor vessel 6010. The heating elements 6034 may be controlled to provide a prescribed temperature and heat density ($W/in^2$) that results in a controlled heat flux into the mixture of liquid feedstock bath and molten material 6015 within the reactor vessel 6010. In particular, the pyrolysis reaction within the reactor vessel 6010 can be controlled to provide a desired reaction temperature and energy density (kW/lb.).

The molten material reactor 6000 can further include a discharge manifold 6022. In various implementations, the discharge manifold 6022 is configured to provide an outlet for material within the reactor vessel 6010. For example, the discharge manifold 6022 may be used to transfer or otherwise remove liquid plastic (or other material generated during the pyrolysis process) or molten material 6015 from the reactor vessel 6010. Accordingly, various implementations of the discharge manifold 6022 may include a sealable discharge opening (e.g., a port which can be selectively opened or sealed and closed).

As shown in FIG. 49, the molten material reactor 6000 also includes a vapor outlet 6024. In various implementations, the vapor outlet 6024 defines an internal opening (positioned within the reactor vessel's internal volume 6018) and an external opening (positioned outside of the reactor vessel 6010). The vapor outlet 6024, which may comprise, for example, a pipe, extends into the reactor vessel 6010 through the reactor vessel's cylindrical body 6012 and enables vapor produced during pyrolysis of the plastic feedstock within the reactor vessel 6010 to exit the reactor vessel 6010.

As noted above, during the pyrolysis process, the hydrocarbon plastic chains and groups of rings within the liquid plastic are split apart by the heating process into smaller segments until they are small and light enough to vaporize and exit the reactor as a vapor. Accordingly, the reactor's vapor outlet 6024 is configured to provide a conduit for hydrocarbon vapor exiting the reactor 6000 and thus extends upwardly from the reactor vessel 6010. In various implementations, the vapor outlet 6024 may be connected (e.g., via additional piping or a ducting manifold) to a product recovery system. For example, in the illustrated implementation of FIG. 49, the vapor outlet 6024 is configured to direct vapor exiting the reactor vessel 6010 following pyrolysis to a product collection system 6036 configured for product recovery (e.g., production of wax, oil, gas, or combinations thereof as described herein).

In the illustrated implementation of FIG. 49, the molten material reactor 6000 further includes a plurality of reactor sensors 6030. The reactor sensors 6030 can be positioned in various locations throughout the reactor vessel 6010. In various implementations, the reactor sensors 6030 may be configured for measuring dynamic properties of the liquid plastic bath within the reactor vessel 6010, the molten material 6015, as well as the dynamic properties of the reactor's input (e.g., feedstock input) and output (e.g., vapor production). For example, in various implementations, the reactor sensors 6030 may comprise thermocouples, pressure sensors, flow meters, and the like. In this way, feedstock input (e.g., from the extruder 400) and product output can be monitored and/or adjusted based on the observed variations in the liquid plastic bath within the reactor 6000.

In various implementations, a plurality of molten material reactors 6000 can also be provided for use in the production process wax, oil, gas, or combinations thereof. For example, in one implementation, three molten material reactors 6000 are used and can be operational in any combination with one another (e.g., such that all three molten material reactors 6000 are processing feedstock simultaneously, or such that two of the molten material reactors 6000 are processing feedstock while a third remains on standby in the event one of the other reactors requires service or maintenance).

In some examples, the pyrolysis is substantially free of any added catalyst. In some examples, the pyrolysis includes a catalyst.

In various implementations, the pyrolysis reactors 1000-6000 described herein may be implemented with pyrolysis control system configured for controlling the temperature of the liquid bath within the reactor vessel. In such implementations, the pyrolysis reactors 1000-6000 may include one or more temperature sensors (e.g., configured for sensing the temperature of the plastic feedstock in the reactor vessel) and the control system may be configured to control one or more parameters of the pyrolysis reactor (e.g., output of the one or more heaters and/or agitator speed) to maintain the temperature of the reactor vessel's liquid bath at a defined set point (e.g., within a defined range of desired temperature setting).

Figure 50:
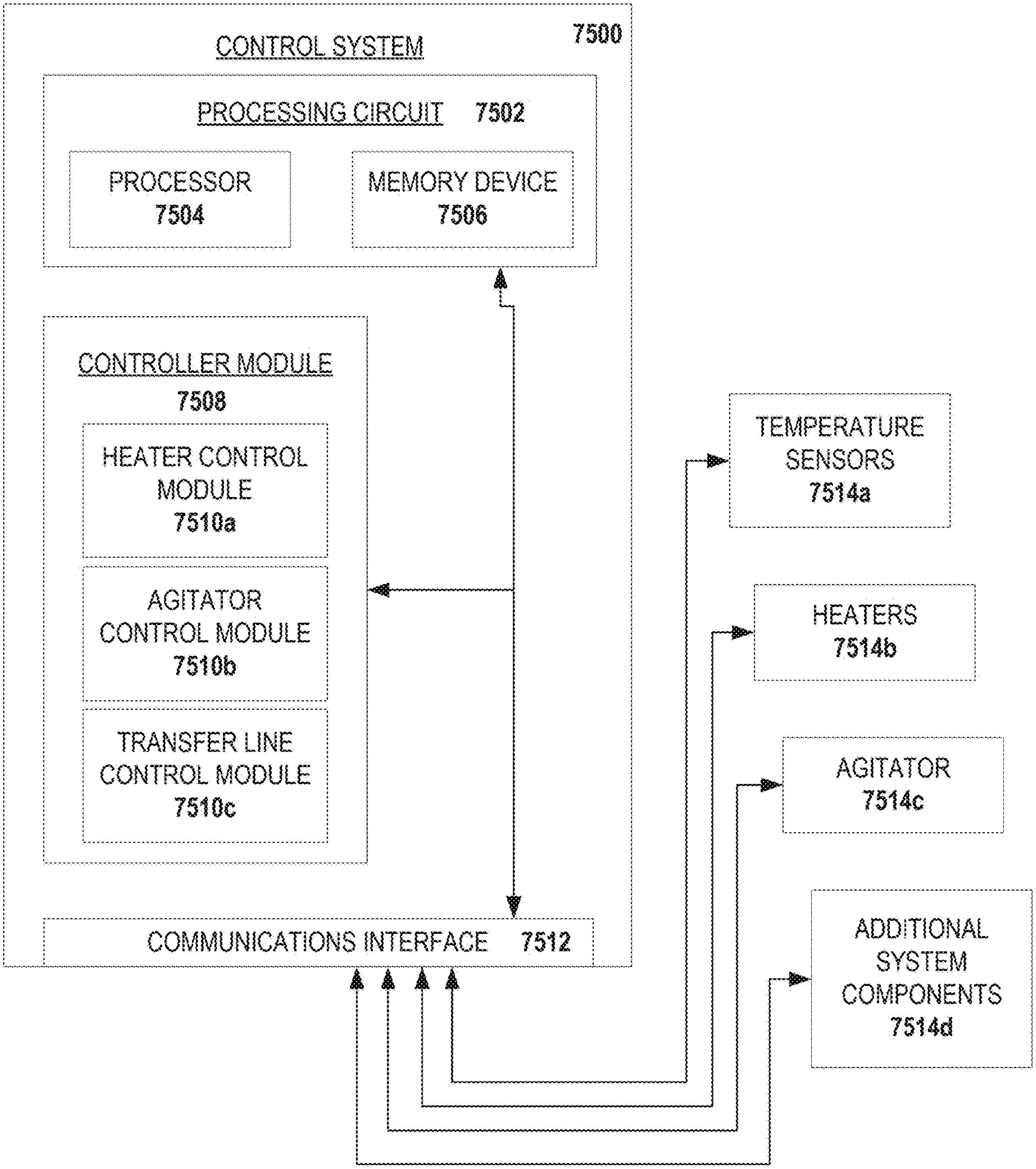
FIG. 50. Schematic diagram of an example pyrolysis control system.

FIG. 50 shows a schematic diagram of a pyrolysis control system 7500 according to an example implementation. The control system 7500 includes a processing circuit 7502 having a processor 7504 and a memory device 7506, a controller module 7508 having a heater control module 7510*a*, an agitator control module 7510*b*, and a transfer line control module 7510*c*, and a communications interface 7512 which receives data from and/or sends instructions to one or more external systems.

As depicted in FIG. 50, the control system 7500 is configured to communicate (via the communications interface 7512) with external systems including reactor temperature sensors 7514*a*, reactor heaters 7514*b*, a reactor agitator 7514*c*, and additional system components 7514*d* (e.g., sensors and/or controllers for monitoring and/or controlling flow rates, pressure, gas level, and/or chemical composition). In various implementations, the temperature sensors 7514*a* may be one or more sensors configured for sensing the temperature of the liquid bath within the reactor vessel. In some examples, the temperature sensors 7514*a* may comprise (e.g., a series of) thermocouples arranged along the internal wall of the reactor vessel or via a non-contact configuration, such as radar or ultrasonic sensors. In some implementations, a plurality of thermocouples (e.g., 2 thermocouples, 3 thermocouples, 4 thermocouples, 5 thermocouples, 6 thermocouples, 7 thermocouples, 8 thermocouples, 9 thermocouples, 10 thermocouples, 11 thermocouples, 12 thermocouples, 13 thermocouples, 14 thermocouples, 15 thermocouples, 16 thermocouples, 17 thermocouples, 18 thermocouples, 19 thermocouples, 20 thermocouples) can be arranged vertically along the internal reactor wall. In some implementations, the thermocouples may simultaneously monitor the temperature of the liquid bath at multiple points within the reactor vessel and the liquid level inside the reactor (as described in further detail above). Furthermore, the heaters 7514*b* and agitator 7514*c* may correspond to any of the one or more heaters and agitators, respectively, described in relation to the pyrolysis reactors 1000-6000 disclosed herein.

Generally, the control system 7500 is configured to control the temperature of the liquid bath within the reactor vessel. In some implementations, the modules 7510*a*, 7510*b*, 7510*c* of the controller module 7508 can be in the form of non-transitory machine or computer-readable media that is executable by a processor, such as the processor 7504. The machine-readable media facilitates performance of operations to enable reception and transmission of data. For example, the machine-readable media may provide an instruction (e.g., command, etc.) to acquire data. The computer readable program code may be executed on one processor, multiple co-located processors, multiple remote processors, or any combination of local and remote processors. Remote processors may be connected to each other through any type of network (e.g., CAN bus, etc.).

In other implementations, the modules 7510*a*, 7510*b*, 7510*c* of the controller module 7508 can be implemented as hardware apparatuses, such as electronic control apparatuses. As such, the modules 7510*a*, 7510*b*, 7510*c* of the controller module 7508 may be implemented as one or more circuitry components including, but not limited to, processing circuitry, network interfaces, peripheral devices, input devices, output devices, sensors, etc. In some implementations, the modules 7510*a*, 7510*b*, 7510*c* of the controller module 7508 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The modules 7510*a*, 7510*b*, 7510*c* of the controller module 7508 may also include programmable hardware devices such as field programmable gate arrays, programmable array logic, programmable logic devices or the like. The modules 7510*a*, 7510*b*, 7510*c* of the controller module 7508 may include one or more memory devices for storing instructions that are executable by the processor(s) of the modules 7510*a*, 7510*b*, 7510*c* of the controller module 7508. In some hardware apparatus configurations, the modules 7510*a*, 7510*b*, 7510*c* of the controller module 7508 may be geographically dispersed throughout separate locations. Alternatively, and as shown, the modules 7510*a*, 7510*b*, 7510*c* of the controller module 7508 may be implemented in or within a single apparatus/housing, which is shown as the control system 7500.

In the illustrated implementation of FIG. 50, the control system 7500 includes the processing circuit 7502 having the processor 7504 and the memory device 7506. The processing circuit 7502 may be structured or configured to execute or implement the instructions, commands, and/or control processes described herein with respect to the modules 7510*a*, 7510*b*, 7510*c* of the controller module 7508. The depicted configuration represents the modules 7510*a*, 7510*b*, 7510*c* of the controller module 7508 as machine or computer-readable media. However, as mentioned above, this illustration is not meant to be limiting as the present disclosure contemplates other implementations where the modules 7510*a*, 7510*b*, 7510*c* of the controller module 7508, or at least one circuit of the modules 7510*a*, 7510*b*, 7510*c* of the controller module 7508, is configured as a hardware apparatus. All such combinations and variations are intended to fall within the scope of the present disclosure.

The hardware and data processing components used to implement the various processes, operations, illustrative logics, logical blocks, modules and circuits described in connection with the implementations disclosed herein (e.g., the processor X) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration.

The memory device 7506 (e.g., memory, memory apparatus, storage device) may include one or more devices (e.g., RAM, ROM, Flash memory, hard disk storage) for storing data and/or computer code for completing or facilitating the various processes, layers and modules described in the present disclosure. The memory device 7506 may be communicably connected to the processor 7504 to provide computer code or instructions to the processor 7504 for executing at least some of the processes described herein. Moreover, the memory device 7506 may be or include tangible, non-transient volatile memory or non-volatile memory. Accordingly, the memory device 7506 may include database components, object code components, script components, or any other type of information structure for supporting the various activities and information structures described herein.

In various implementations, the heater control module 7510*a* is configured to adjust the energy output of the one or more heaters 7514*b* that heat the liquid bath within the reactor vessel. In some implementations, the heater control module 7510*a* can be set up as a feedback loop. For example, in some implementations the heater control module 7510*a* is configured to at least temporarily store a target temperature value for the plastic feedstock in the reactor vessel (e.g., a user-defined target temperature value received and stored by the control system 7500 or a target temperature value retrieved from a remote source, such as a remote device or a cloud computing entity). The heater control module 7510*a* communicates with the temperature sensors 7514*a* to monitor the temperature of the plastic feedstock in the reactor vessel. In response to the temperature measured by the one or more temperature sensors 7514*a*, the heater control module 7510*a* adjusts the energy output of the one or more heaters 7514*b* to maintain the temperature of the plastic feedstock within a defined tolerance relative to the target temperature value.

In other implementations, the heater control module 7510*a* can be set up as a feedforward loop. For example, the heater control module 7510*a* can be configured to store a target temperature value for the plastic feedstock in the reactor vessel, monitor the temperature of the plastic feedstock before/as it enters the reactor vessel as measured by the one or more temperature sensors, and, in response to the temperature measured by the one or more temperature sensors, control the one or more heaters to maintain the temperature of the plastic feedstock within a defined tolerance relative to the target temperature value. In yet other implementations, the heater control module 7510*a* can implement both a feedback loop and a feedforward loop, for example, the feedback and feedforward loops described above.

In various implementations, the agitator control module 7510*b* is configured to adjust the rotational speed of the agitator 7514*c*. In some implementations, the agitator control module 7510*b* can be set up as a feedback loop. For example, the agitator control module 7510*b* can be configured to store a target temperature value for the plastic feedstock in the reactor vessel, monitor the temperature of the plastic feedstock in the reactor vessel as measured by the one or more temperature sensors, and, in response to the temperature measured by the one or more temperature sensors, control the rotational speed of the agitator. In other implementations, the agitator control module 7510*b* can be set up as a feedforward loop. For example, the agitator control module 7510*b* can be configured to store a target temperature value for the plastic feedstock in the reactor vessel, monitor the temperature of the plastic feedstock before/as it enters the reactor vessel as measured by the one or more temperature sensors, and, in response to the temperature measured by the one or more temperature sensors, control the rotational speed of the agitator. In yet other implementations, the agitator control module 7510*b* can implement both a feedback loop and a feedforward loop, for example, the feedback and feedforward loops described above.

In various implementations, the transfer line control module 7510*c* is configured to adjust the energy output of the one or more heaters 7514*b* that heat viscous material (e.g., plastic feedstock, liquid bath) that is transferred into and/or out of the reactor vessel via one or more transfer lines, thereby controlling the flow of the viscous material (e.g., decreasing temperature of the viscous material increases its viscosity and, subsequently, decreases its flowability). In some implementations, the transfer line control module 7510*c* can be set up as a feedback loop. For example, in some implementations the transfer line control module 7510*c* is configured to at least temporarily store a target temperature value for the viscous material in the one or more transfer lines (e.g., a user-defined target temperature value received and stored by the control system 7500 or a target temperature value retrieved from a remote source, such as a remote device or a cloud computing entity). The transfer line control module 7510*c* communicates with the temperature sensors 7514*a* to monitor the temperature of the viscous material in the one or more transfer lines. In response to the temperature measured by the one or more temperature sensors 7514*a*, the transfer line control module 7510*c* adjusts the energy output of the one or more heaters 7514*b* to maintain the temperature of the viscous material within a defined tolerance relative to the target temperature value.

In other implementations, the transfer line control module 7510*c* can be set up as a feedforward loop. For example, the transfer line control module 7510*c* can be configured to store a target temperature value for the viscous material in the one or more transfer lines, monitor the temperature of the viscous material before/as it enters the one or more transfer lines as measured by the one or more temperature sensors, and, in response to the temperature measured by the one or more temperature sensors, control the one or more heaters to maintain the temperature of the viscous material within a defined tolerance relative to the target temperature value. In yet other implementations, the transfer line control module 7510*c* can implement both a feedback loop and a feedforward loop, for example, the feedback and feedforward loops described above.

While various modules with particular functionality are shown in FIG. 50, it should be understood that the control system 7500 may include any number of modules for completing the functions described herein. For example, the activities and functionalities of the modules of the controller module 7508 may be combined in multiple modules or as a single circuit. Additional modules with additional functionality may also be included. Further, the control system 7500 may further control other activity beyond the scope of the present disclosure.

As mentioned above and in one configuration, the "modules" may be implemented in machine-readable medium for execution by various types of processors, such as the processor 7504 of FIG. 50. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within modules, and may be implemented in any suitable form and organized within any suitable type of data structure. The operational data may be collected as a single data set, or may be distributed over different locations including over different storage devices, and may exist, at least partially, merely as electronic signals on a system or network.

In various implementations, the pyrolysis control system 7500—through execution of the heater control module or the agitator control module (alone or in combination)—can maintain the temperature within the liquid reactor bath within a tolerance of a target temperature value. By providing precise temperature control of the reactor bath, the pyrolysis control system allows for improved reactor throughput, reduced reactor energy consumption, and/or improved reactor uptime. For example, in some implementations, the pyrolysis control system 7500 can be configured to maintain the temperature of the liquid reactor bath to within 10% or less of a target temperature value (e.g., within 10% above or below the target temperature value). In some implementations, the pyrolysis control system 7500 can be configured to maintain the temperature of the liquid reactor bath to within 5% or less of a target temperature value (e.g., within 5% above or below the target temperature value). In some implementations, such as when the pyrolysis control system 7500 is implemented on the reactor 5000 shown in FIG. 47, the pyrolysis control system 7500 can be configured to maintain the temperature of the liquid reactor bath to within 2% or less of a target temperature value (e.g., within 2% above or below the target temperature value).

Vaporized Product Recovery

Vapor leaving the reactors contains a complex hydrocarbon mixture ranging from light molecules (short carbon chains) to heavy molecules (long carbon chains). The process uses a production collection system comprising, for example, one or more stages of cooling and condensation to condense the vapor product into one or more liquid products. In some examples, the vapor can be subjected to an additional processing step (e.g., further heated, distilled, filtered, etc.) before and/or after condensation.

For example, vapor from the reactors enters a condenser where hydrocarbons that have a boiling point at or above the temperature of the condenser are condensed. The condenser can comprise any suitable condenser. Condensed liquid from the condenser can then be transferred, for example, to a storage tank. In some examples, condensed liquid from the condenser can then be distilled, for example to separate the product into one or more fractions and/or purify the product.

In some examples, the process uses a plurality of stages of cooling and condensation to selectively separate reactor vapor product into a wax product (e.g., comprising long-chain hydrocarbons that are a solid or semi-solid wax at ambient temperatures) and an oil product (e.g., comprising lighter, shorter-chain hydrocarbons that are a liquid at ambient temperatures). In some examples, there is also uncondensed gas.

In some examples, wax condensation takes place inside a first condenser (e.g., a wax condenser). The first condenser can comprise any suitable condenser. For example, vapor from the reactors enters the first condenser where hydrocarbons that have a boiling point at or above the temperature of the first condenser are condensed. Condensed liquid (e.g., liquid wax) from the first condenser can then be transferred, for example, to a storage tank (e.g., a wax storage tank).

In some examples, vapor phase material that passes through the wax condenser can flow to a second condensing system (e.g., a second condenser). The second condenser can comprise any suitable condenser. For example, vapor from the wax condenser enters the second condenser where hydrocarbons that have a boiling point at or above the temperature of the second condenser are condensed. Condensed liquid (e.g., liquid oil) from the second condenser can then be transferred, for example, to a storage tank (e.g., an oil storage tank).

In some examples, vapor phase material that passes through the second condenser, such as uncondensed hydrocarbons (e.g., pentanes and some heavier, longer chain alkanes) and non-condensables (e.g., butane and lighter hydrocarbons and any non-hydrocarbon gases), can flow to a gas-liquid separator and/or to a third condenser. The gas-liquid separator, when present, can comprise any suitable separator.

In some examples, vapor phase material that passes through the second condenser can flow to a third condenser. The third condenser can comprise any suitable condenser. For example, vapor from the second condenser enters to the third condenser where hydrocarbons that have a boiling point at or above the temperature of the third condenser are condensed, such as $C_5$-$C_7$ hydrocarbons. Condensed liquid from the third condenser can then be transferred, for example, to a storage tank.

In some examples, numerous condensers can be used as part of the product recovery collection system (e.g., 1 or more, 2 or more, 3 or more, 4 or more, 5 or more, 6 or more, 7 or more, 8 or more, 9 or more, or 10 or more condensers).

In some examples, the temperature cut-off of each of the one or more condensers can be selected in view of a variety of factors. In some examples, the temperature cut-off of the one or more condensers can be selected such that a portion of the oil product is not condensed. For example, a certain portion of the oil product can, in some examples, comprise a high concentration of contaminants, and the condensers can be configured to selectively allow this portion of the oil product to pass through each of the one or more condensers without condensing.

In some examples, the systems and/or methods described herein can produce the pyrolysis products (e.g., wax and/or oil) at a yield of 50% or more (e.g., 51% or more, 52% or more, 53% or more, 54% or more, 55% or more, 56% or more, 57% or more, 58% or more, 59% or more, 60% or more, 61% or more, 62% or more, 63% or more, 64% or more, 65% or more, 66% or more, 67% or more, 68% or more, 69% or more, 70% or more, 71% or more, 72% or more, 73% or more, 74% or more, 75% or more, 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, or 99% or more). In some examples, the systems and/or methods described herein can produce the pyrolysis products (e.g., wax and/or oil) at a yield of 100% or less (e.g., 99% or less, 98% or less, 97% or less, 96% or less, 95% or less, 94% or less, 93% or less, 92% or less, 91% or less, 90% or less, 89% or less, 88% or less, 87% or less, 86% or less, 85% or less, 84% or less, 83% or less, 82% or less, 81% or less, 80% or less, 79% or less, 78% or less, 77% or less, 76% or less, 75% or less, 74% or less, 73% or less, 72% or less, 71% or less, 70% or less, 69% or less, 68% or less, 67% or less, 66% or less, 65% or less, 64% or less, 63% or less, 62% or less, 61% or less, 60% or less, 59% or less, 58% or less, 57% or less, 56% or less, 55% or less, 54% or less, 53% or less, or 52% or less). The yield of the systems and/or methods described herein can range from any of the minimum values described above to any of the maximum values described above. For example, the systems and/or methods described herein can produce the pyrolysis products (e.g., wax and/or oil) at a yield of from 50% to 100% (e.g., from 50% to 75%, from 75% to 100%, from 50% to 60%, from 60% to 70%, from 70% to 80%, from 80% to 90%, from 90% to 100%, from 50% to 95%, from 50% to 90%, from 50% to 85%, from 50% to 80%, from 50% to 70%, from 50% to 65%, from 50% to 55%, from 55% to 100%, from 60% to 100%, from 65% to 100%, from 70% to 100%, from 80% to 100%, from 85% to 100%, from 90% to 100%, from 55% to 95%, or from 80% to 95%).

Post-Treatment

In some examples, the methods and systems herein produce a raw pyrolysis product with a reduced level of contaminants, for example such that no further post-treatment of the product is needed (e.g., the methods substantially exclude any hydrotreatment or further refining steps after the pyrolysis).

In some examples, the methods and systems herein can further comprise post-treating the pyrolysis products. For example, the wax and/or oil can be further processed by refining, filtering, cracking, hydrotreating, distilling, etc., or a combination thereof, for example in the production of chemicals and/or polymers. In some examples, the post-treatment can reduce the level of one or more contaminants in the pyrolysis product (e.g., oil and/or wax).

Product Storage

After hydrocarbon product has been condensed as wax (molten) and/or oil (and optionally post-treated), it is transferred to storage tanks. Liquid product can be transferred using any suitable means to the storage tanks.

The storage tanks can be constructed of any suitable material. In some examples, the storage tanks can further include a feedback system. For example, liquid levels in the tanks can be monitored using an electronic sensor. In some examples, the feedback system can include a temperature control system (e.g., to control the temperature of the liquid within the storage tank, for example by heating and/or cooling). The feedback system can, for example, activate the heating and/or cooling systems as needed, for example based on particular temperature set-points. In some examples, at least a portion of the storage tank(s) can be insulated.

Heat Tracing

In some examples, the system can further include heat trace components (e.g., electric or non-electric). For example, heat trace cable (e.g., mineral insulated heat trace cable) can be used on some or all process lines conveying either molten plastic or liquid products. This cable can ensure that products within the process lines remain flowable under all conditions. Such cables can be protected through cladded insulation. Thermocouples on each independent section of heat trace can be installed to monitor heat levels within these sections and feedback mechanisms can provide an alert if piping sections may not be receiving proper heating. For example, some or all of the piping running from the extruder into the reactors can be insulated and/or include heat tracing. Such insulating and heat tracing to process lines can be particularly important during colder ambient conditions. It is imperative that all process lines always remain fully open and operable, regardless of the ambient temperature.

System Availability and Reactor Uptime

System availability and reactor uptime are typically expressed as a percentage and refers to the amount of time a system or reactor is operating, divided by the total amount of time in the period. Availability and uptime are a combination of scheduled maintenance (non-operating hours) and reliability (defined as 1 minus forced outages divided by operating hours). Availability and uptime are dependent on several factors, including the quality of equipment, engineering and construction employed, the degree of back-up or redundant equipment, the expertise and effort of personnel, the level of preventative, predictive and corrective maintenance, the replenishment of spare parts, the operating demand placed on a facility, and first year versus mature operation. Reactor uptime, in particular, can be influenced by how long a reactor can be continuously run without char buildup requiring the reactor to be shut down and cleaned out.

In some examples, the systems and methods described herein can have an availability factor of 50% or more (e.g., 55% or more, 60% or more, 65% or more, 70% or more, 75% or more, 80% or more, 85% or more, 90% or more, or 95% or more). In some examples, the systems and methods described herein can have an availability factor of 100% or less (e.g., 95% or less, 90% or less, 85% or less, 80% or less, 75% or less, 70% or less, 65% or less, or 60% or less). The availability factor can range from any of the minimum values described above to any of the maximum values described above. For example, the systems and methods described herein can have an availability factor of from 50% to 100% (e.g., from 50% to 75%, from 75% to 100%, from 50% to 60%, from 60% to 70%, from 70% to 80%, from 80% to 90%, from 90% to 100%, from 50% to 80%, from 50% to 80%, from 50% to 70%, from 60% to 100%, from 70% to 100%, from 80% to 100%, from 90% to 100%, from 95% to 100%, from 55% to 95%, or from 60% to 90%).

In some examples, the reactor can be configured for operating to pyrolyze plastic feedstock for a cumulative period of 324 hours or more during a time period of 360 hours (e.g., 325 hours or more, 326 hours or more, 327 hours or more, 328 hours or more, 329 hours or more, 330 hours or more, 331 hours or more, 332 hours or more, 333 hours or more, 334 hours or more, 335 hours or more, 336 hours or more, 337 hours or more, 338 hours or more, 339 hours or more, 340 hours or more, 341 hours or more, 342 hours or more, 343 hours or more, 344 hours or more, 345 hours or more, 346 hours or more, 347 hours or more, 348 hours or more, 349 hours or more, 350 hours or more, 351 hours or more, 352 hours or more, 353 hours or more, 354 hours or more, 355 hours or more, 356 hours or more, 357 hours or more, 358 hours or more, 359 hours or more, 360 hours). In some examples, the reactor can be configured for operating to pyrolyze plastic feedstock for a cumulative period of 576 hours or more during a time period of 720 hours (e.g., 577 hours or more, 578 hours or more, 579 hours or more, 580 hours or more, 581 hours or more, 582 hours or more, 583 hours or more, 584 hours or more, 585 hours or more, 586 hours or more, 587 hours or more, 588 hours or more, 589 hours or more, 590 hours or more, 591 hours or more, 592 hours or more, 593 hours or more, 594 hours or more, 595 hours or more, 596 hours or more, 597 hours or more, 598 hours or more, 599 hours or more, 600 hours or more, 601 hours or more, 602 hours or more, 603 hours or more, 604 hours or more, 605 hours or more, 606 hours or more, 607 hours or more, 608 hours or more, 609 hours or more, 610 hours or more, 611 hours or more, 612 hours or more, 613 hours or more, 614 hours or more, 615 hours or more, 616 hours or more, 617 hours or more, 618 hours or more, 619 hours or more, 620 hours or more, 621 hours or more, 622 hours or more, 623 hours or more, 624 hours or more, 625 hours or more, 626 hours or more, 627 hours or more, 628 hours or more, 629 hours or more, 630 hours or more, 631 hours or more, 632 hours or more, 633 hours or more, 634 hours or more, 635 hours or more, 636 hours or more, 637 hours or more, 638 hours or more, 639 hours or more, 640 hours or more, 641 hours or more, 642 hours or more, 643 hours or more, 644 hours or more, 645 hours or more, 646 hours or more, 647 hours or more, 648 hours or more, 649 hours or more, 650 hours or more, 651 hours or more, 652 hours or more, 653 hours or more, 654 hours or more, 655 hours or more, 656 hours or more, 657 hours or more, 658 hours or more, 659 hours or more, 660 hours or more, 661 hours or more, 662 hours or more, 663 hours or more, 664 hours or more, 665 hours or more, 666 hours or more, 667 hours or more, 668 hours or more, 669 hours or more, 670 hours or more, 671 hours or more, 672 hours or more, 673 hours or more, 674 hours or more, 675 hours or more, 676 hours or more, 677 hours or more, 678 hours or more, 679 hours or more, 680 hours or more, 681 hours or more, 682 hours or more, 683 hours or more, 684 hours or more, 685 hours or more, 686 hours or more, 687 hours or more, 688 hours or more, 689 hours or more, 690 hours or more, 691 hours or more, 692 hours or more, 693 hours or more, 694 hours or more, 695 hours or more, 696 hours or more, 697 hours or more, 698 hours or more, 699 hours or more, 700 hours or more, 701 hours or more, 702 hours or more, 703 hours or more, 704 hours or more, 705 hours or more, 706 hours or more, 707 hours or more, 708 hours or more, 709 hours or more, 710 hours or more, 711 hours or more, 712 hours or more, 713 hours or more, 714 hours or more, 715 hours or more, 716 hours or more, 717 hours or more, 718 hours or more, 719 hours or more, 720 hours). In some examples, the reactor can be configured for operating to pyrolyze the plastic feedstock for a cumulative period of 756 hours or more during a time period of 1080 hours (e.g., 758 hours or more, 760 hours or more, 762 hours or more, 764 hours or more, 766 hours or more, 768 hours or more, 770 hours or more, 772 hours or more, 774 hours or more, 776 hours or more, 778 hours or more, 780 hours or more, 782 hours or more, 784 hours or more, 786 hours or more, 788 hours or more, 790 hours or more, 792 hours or more, 794 hours or more, 796 hours or more, 798 hours or more, 800 hours or more, 802 hours or more, 804 hours or more, 806 hours or more, 808 hours or more, 810 hours or more, 812 hours or more, 814 hours or more, 816 hours or more, 818 hours or more, 820 hours or more, 822 hours or more, 824 hours or more, 826 hours or more, 828 hours or more, 830 hours or more, 832 hours or more, 834 hours or more, 836 hours or more, 838 hours or more, 840 hours or more, 842 hours or more, 844 hours or more, 846 hours or more, 848 hours or more, 850 hours or more, 852 hours or more, 854 hours or more, 856 hours or more, 858 hours or more, 860 hours or more, 862 hours or more, 864 hours or more, 866 hours or more, 868 hours or more, 870 hours or more, 872 hours or more, 874 hours or more, 876 hours or more, 878 hours or more, 880 hours or more, 882 hours or more, 884 hours or more, 886 hours or more, 888 hours or more, 890 hours or more, 892 hours or more, 894 hours or more, 896 hours or more, 898 hours or more, 900 hours or more, 902 hours or more, 904 hours or more, 906 hours or more, 908 hours or more, 910 hours or more, 912 hours or more, 914 hours or more, 916 hours or more, 918 hours or more, 920 hours or more, 922 hours or more, 924 hours or more, 926 hours or more, 928 hours or more, 930 hours or more, 932 hours or more, 934 hours or more, 936 hours or more, 938 hours or more, 940 hours or more, 942 hours or more, 944 hours or more, 946 hours or more, 948 hours or more, 950 hours or more, 952 hours or more, 954 hours or more, 956 hours or more, 958 hours or more, 960 hours or more, 962 hours or more, 964 hours or more, 966 hours or more, 968 hours or more, 970 hours or more, 972 hours or more, 974 hours or more, 976 hours or more, 978 hours or more, 980 hours or more, 982 hours or more, 984 hours or more, 986 hours or more, 988 hours or more, 990 hours or more, 992 hours or more, 994 hours or more, 996 hours or more, 998 hours or more, 1,000 hours or more, 1002 hours or more, 1004 hours or more, 1006 hours or more, 1008 hours or more, 1010 hours or more, 1012 hours or more, 1014 hours or more, 1016 hours or more, 1018 hours or more, 1020 hours or more, 1022 hours or more, 1024 hours or more, 1026 hours or more, 1028 hours or more, 1030 hours or more, 1032 hours or more, 1034 hours or more, 1036 hours or more, 1038 hours or more, 1040 hours or more, 1042 hours or more, 1044 hours or more, 1046 hours or more, 1048 hours or more, 1050 hours or more, 1052 hours or more, 1054 hours or more, 1056 hours or more, 1058 hours or more, 1060 hours or more, 1062 hours or more, 1064 hours or more, 1066 hours or more, 1068 hours or more, 1070 hours or more, 1072 hours or more, 1074 hours or more, 1076 hours or more, 1078 hours or more, 1080 hours). In some specific implementations, the foregoing reactor uptime ranges may be achieved using the pyrolysis reactor 5000 shown and described with respect to FIG. 47. In some specific implementations, the foregoing reactor uptime ranges may be achieved using the pyrolysis system S100*e* of FIG. 5, where the extruder S107*a* comprises the extruder 800 shown and described with respect to FIG. 33 and the pyrolysis reactor S108*a* comprises the pyrolysis reactor 5000 shown and described with respect to FIG. 47.

In some examples, the reactor can be configured for operating to pyrolyze plastic feedstock with 90% uptime or more over 15 days (e.g., 90.5% uptime or more, 91% uptime or more, 91.5% uptime or more, 92% uptime or more, 92.5% uptime or more, 93% uptime or more, 93.5% uptime or more, 94% uptime or more, 94.5% uptime or more, 95% uptime or more, 95.5% uptime or more, 96% uptime or more, 96.5% uptime or more, 97% uptime or more, 97.5% uptime or more, 98% uptime or more, 98.5% uptime or more, 99% uptime or more, 99.5% uptime or more, 100% uptime). In some specific implementations, the pyrolysis reactor 5000 can be configured for operating to pyrolyze plastic feedstock with 90% uptime or more. In some examples, the reactor can be configured for operating to pyrolyze plastic feedstock with 80% uptime or more over 30 days (e.g., 81% uptime or more, 82% uptime or more, 83% uptime or more, 84% uptime or more, 85% uptime or more, 86% uptime or more, 87% uptime or more, 88% uptime or more, 89% uptime or more, 90% uptime or more, 90.5% uptime or more, 91% uptime or more, 91.5% uptime or more, 92% uptime or more, 92.5% uptime or more, 93% uptime or more, 93.5% uptime or more, 94% uptime or more, 94.5% uptime or more, 95% uptime or more, 95.5% uptime or more, 96% uptime or more, 96.5% uptime or more, 97% uptime or more, 97.5% uptime or more, 98% uptime or more, 98.5% uptime or more, 99% uptime or more, 99.5% uptime or more, 100% uptime). In some specific implementations, the pyrolysis reactor 5000 can be configured for operating to pyrolyze plastic feedstock with 80% uptime or more. In some examples, the reactor can be configured for operating to pyrolyze plastic feedstock with 70% uptime or more over 45 days (e.g., 71% uptime or more, 72% uptime or more, 73% uptime or more, 74% uptime or more, 75% uptime or more, 76% uptime or more, 77% uptime or more, 78% uptime or more, 79% uptime or more, 80% uptime or more, 81% uptime or more, 82% uptime or more, 83% uptime or more, 84% uptime or more, 85% uptime or more, 86% uptime or more, 87% uptime or more, 88% uptime or more, 89% uptime or more, 90% uptime or more, 90.5% uptime or more, 91% uptime or more, 91.5% uptime or more, 92% uptime or more, 92.5% uptime or more, 93% uptime or more, 93.5% uptime or more, 94% uptime or more, 94.5% uptime or more, 95% uptime or more, 95.5% uptime or more, 96% uptime or more, 96.5% uptime or more, 97% uptime or more, 97.5% uptime or more, 98% uptime or more, 98.5% uptime or more, 99% uptime or more, 99.5% uptime or more, 100% uptime). In some specific implementations, the pyrolysis reactor 5000 can be configured for operating to pyrolyze plastic feedstock with 70% uptime or more. In some specific implementations, the foregoing reactor uptime ranges may be achieved using the pyrolysis reactor 5000 shown and described with respect to FIG. 47. In some specific implementations, the foregoing reactor uptime ranges may be achieved using the pyrolysis system S100*e* of FIG. 5, where the extruder S107*a* comprises the extruder 800 shown and described with respect to FIG. 33 and the pyrolysis reactor S108*a* comprises the pyrolysis reactor 5000 shown and described with respect to FIG. 47.

Compositions, Articles of Manufacture, Methods of Use

Also disclosed herein are compositions comprising any of the waxes disclosed herein, any of the oils disclosed herein, any of the blends disclosed herein, or any of the products of the methods or systems disclosed herein.

Also disclosed herein are compositions derived from any of the waxes disclosed herein, any of the oils disclosed herein, any of the blends disclosed herein, or any of the products of the methods or systems disclosed herein.

Also disclosed herein are methods of using any of the compositions described herein (e.g., any of the waxes disclosed herein, any of the oils disclosed herein, any of the blends disclosed herein, or any of the products of the methods or systems disclosed herein).

Also disclosed herein are articles of manufacture comprising any of the compositions described herein (e.g., any of the waxes disclosed herein, any of the oils disclosed herein, any of the blends disclosed herein, or any of the products of the methods or systems disclosed herein).

Also disclosed herein are methods of making any of the compositions or articles of manufacture, for example, wherein the method comprises additional processing of the composition, such as refining, filtering, cracking, hydrotreating, etc., for example in the production of chemicals and/or polymers.

In some examples, the composition or article comprises a lubricating oil, a mineral oil, a group III base oil, a fully refined paraffin wax, or a combination thereof.

In some examples, the composition or article comprises a binder, a processing aid, or a combination thereof.

In some examples, the composition or article comprises kerosene including cosmetic kerosene, white oils, high value paraffin and purified liquid fuels, or a combination thereof.

In some examples, the composition or article comprises naphtha.

In some examples, the composition or article comprises fuel.

In some examples, the composition or article comprises liquefied petroleum gas (LPG), naphtha, kerosene, diesel and gas oil, or a combination thereof.

In some examples, the composition or article comprises lube oil, gasoline, jet fuel, diesel fuel, or a combination thereof.

In some examples, the composition or article comprises packaging, film, and/or fibers for carpets and clothing, molded articles, and extruded pipes, or a combination thereof.

In some examples, the composition or article comprises a medical device.

In some examples, the composition or the article comprises lubricant, candles, adhesives, packaging, rubber, cosmetics, fire logs, bituminous mixtures, superficial wear coatings, asphalt, sealing coatings, or a combination thereof.

In some examples, the composition or article comprises asphalt, automotive fuel, aviation fuels, base oil, bitumen, cadalene, cutting fluid, diesel fuel, fuel oil, gasoline, heating oil, heavy fuel oil, hydrocarbon solvents, jet fuel, kerosene, ligroin, lubricant, mazut, microcrystalline wax, mineral oil, motor fuel, motor oil, naphtha, naphthenic acid, paraffin wax, petroleum benzine, petroleum ether, petroleum jelly, petroleum naphtha, petroleum resin, retene, or a combination thereof.

In some examples, the composition or article comprises gasoline, jet fuel, diesel and other fuels, asphalt, heavy fuel oil, lubricants, paraffin wax, tar, asphalt, fertilizer, flooring, perfume, insecticide, petroleum jelly, soap, vitamin, amino acid, or a combination thereof.

In some examples, the composition or article comprises wood-based composites such as oriented-strand board (OSB), particleboard, hardboard, medium density fiberboard, gypsum board, or a combination thereof.

In some examples, the composition or article comprises fully refined paraffin which is used to produce candles, cosmetics, crayons, food packaging, paper and carton coatings, or a combination thereof.

In some examples, the composition or article comprises a hydrocarbon feedstock for a petroleum refinery, a catalytic cracking system, a thermal cracking system, a polymerization system, or a combination thereof, for example used in the production of chemicals and/or polymers. For example, also disclosed herein are methods of using any of the compositions disclosed herein as a hydrocarbon feedstock for a petroleum refinery, a catalytic cracking system, a thermal cracking system, a polymerization system, or a combination thereof, for example used in the production of chemicals and/or polymers.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

A wax derived from pyrolysis of a feedstock comprising post-consumer and/or post-industrial plastics was produced and analyzed. At ambient temperature and pressure, the wax was a solid with an amber to beige color.

The following techniques were applied to the wax: UV-Vis, FTIR, carbon number distribution by GC, hydrocarbon types by clay-gel absorption chromatography, $^1H$-NMR, and $^{13}C$-NMR.

A summary of the substance identity profile is provided in Table 1.

TABLE 1

Summary of wax product.

| | Concentration (% w/w) |
|---|---|
| Hydrocarbon type | |
| Saturated content | 97.9 |
| Unsaturated content | 1.0 |
| Aromatic content | 1.1 |
| Asphaltene content | <0.1 |
| Hydrocarbon number | |
| C9 | 0.59 |
| C10 | 0.40 |
| C11 | 0.75 |
| C12 | 0.87 |
| C13 | 1.27 |
| C14 | 1.78 |
| C15 | 1.94 |
| C16 | 2.39 |
| C17 | 3.07 |
| C18 | 3.78 |
| C19 | 4.15 |
| C20 | 5.06 |
| C20-C24 | 22.80 |
| C24-C28 | 22.10 |
| C28-C32 | 14.91 |
| C32-C36 | 7.75 |
| C36-C40 | 3.63 |
| C40-C44 | 1.49 |
| C44-C46 | 0.39 |
| C46+ | 0.88 |

Figure 6:
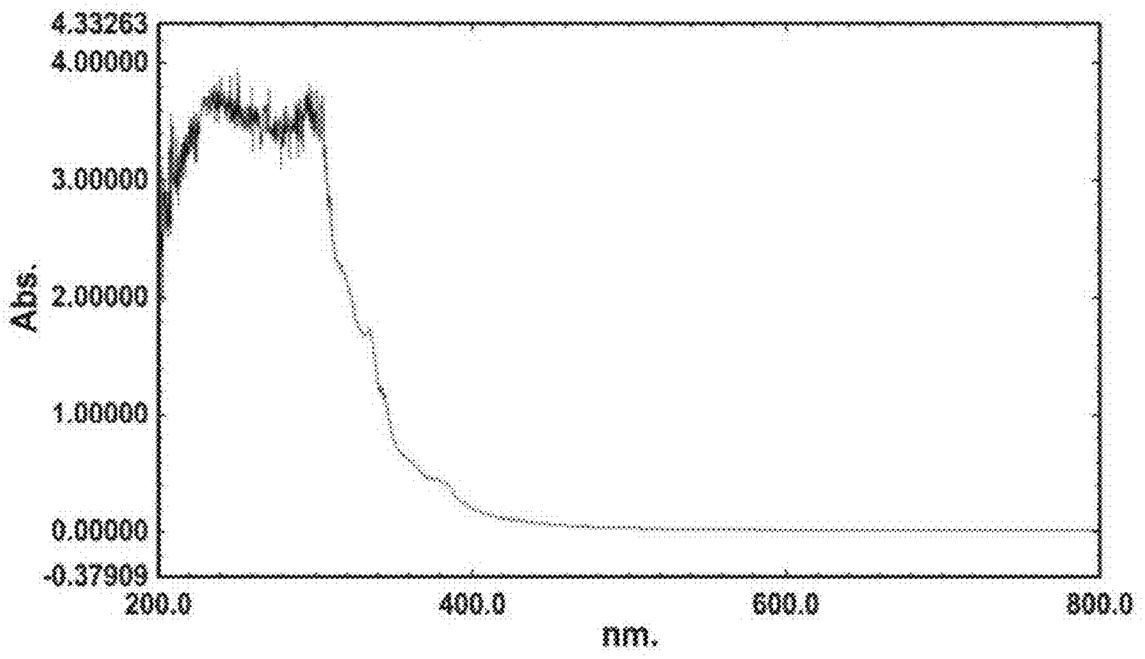
FIG. 6. UV-Vis spectrum of wax product in hexane with a 100× dilution factor.

UV-Vis spectrophotometry was performed using a Shimadzu UV1800 spectrophotometer using a single cell (10 mm) over a wavelength range of from 200 to 800 nm. The sample was dispersed in hexane (dilution factor 100 and 100×). The UV-Vis results (FIG. 6 and FIG. 7) show that the sample had maximum absorptions at wavelengths of 380 nm, 325 nm, 255 nm, and 200 nm.

Figure 7:
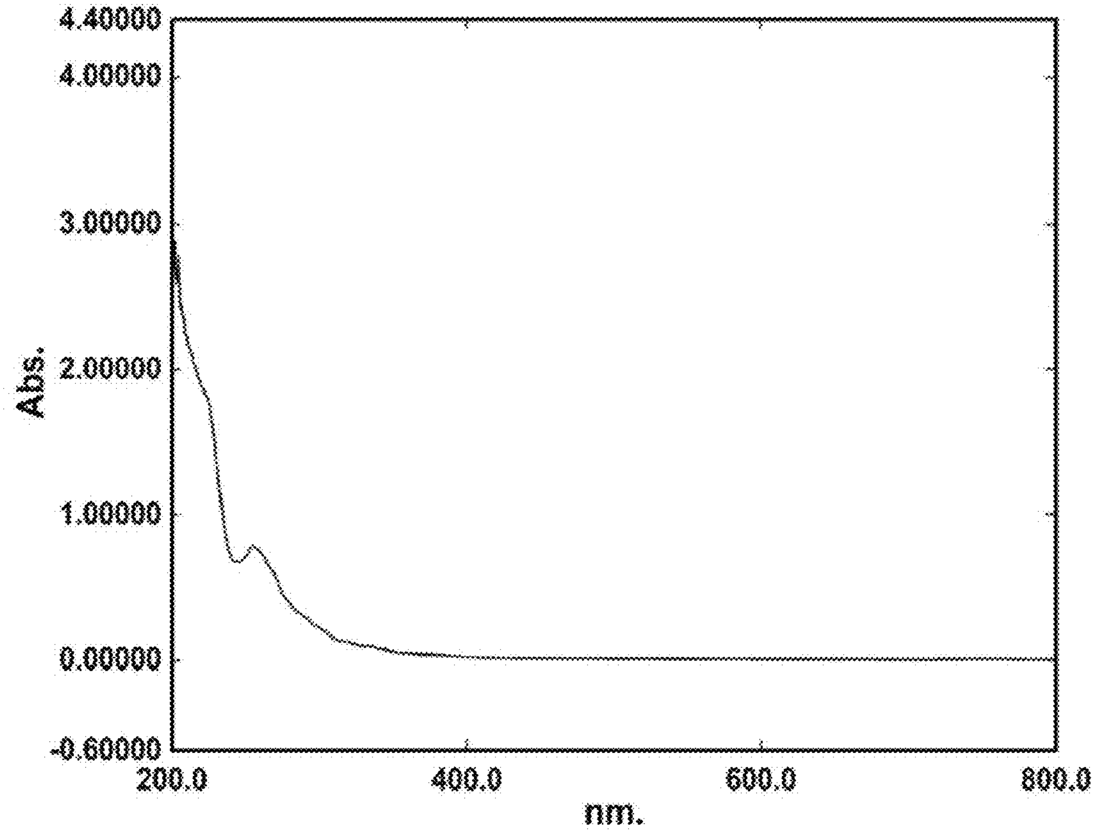
FIG. 7. UV-Vis spectrum of wax product in hexane with a 1,000× dilution factor.
Figure 8:
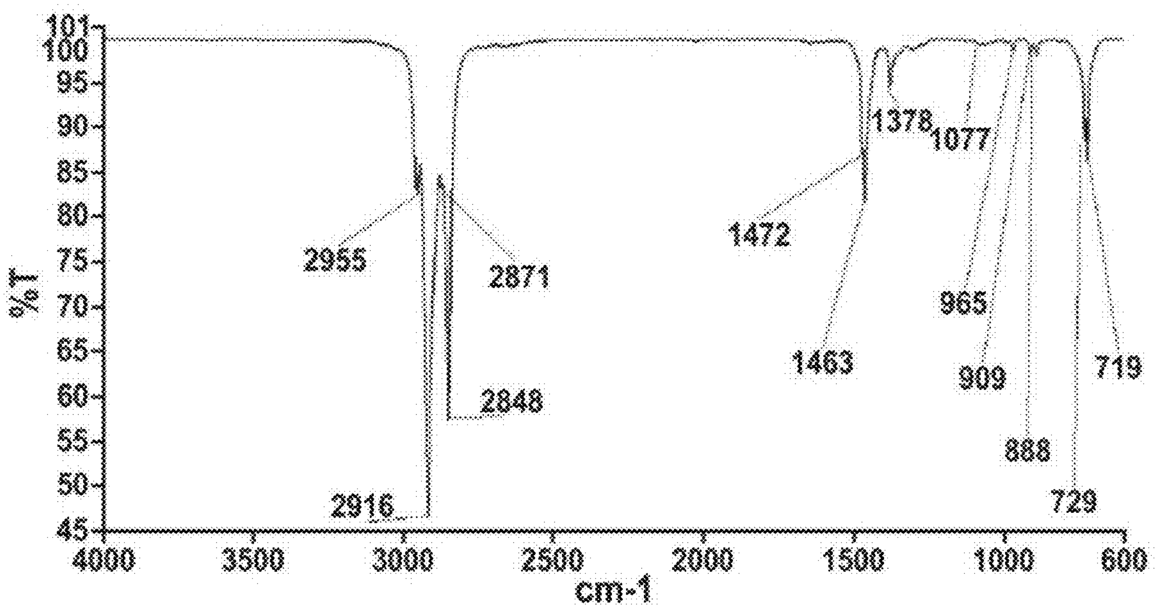
FIG. 8. FTIR-ATR spectrum of wax product.

FTIR-ATR spectroscopy was performed using a Perkin Elmer Instruments Spectrum Three FT-IR Spectrometer, equipped with an ATR Golden Gate bridge (crystal=diamond) over a spectral range of 4,000 to 600 $cm^{-1}$ with baseline correction. The FTIR spectrum is shown in FIG. 7. The FTIR main peaks are summarized in Table 2.

TABLE 2

FTIR main peaks of wax product.

| Main FTIR-ATR Peaks ($cm^{-1}$) | Interpretation |
|---|---|
| 2955 | Anti-symmetric stretching of methyl |
| 2916 | Anti-symmetric stretching of methylene |
| 2871 | Symmetric stretching of methyl |
| 2848 | Symmetric stretching of methylene |
| 1472/1463 | Anti-symmetric bending vibrations of methyl and methylene |
| 1378 | Umbrella bending vibrations of methyl |
| 965 | C-C skeleton vibrations, methyl bending |
| 729/719 | Methylene bending rocking vibrations (crystallinity) |

Figure 9:
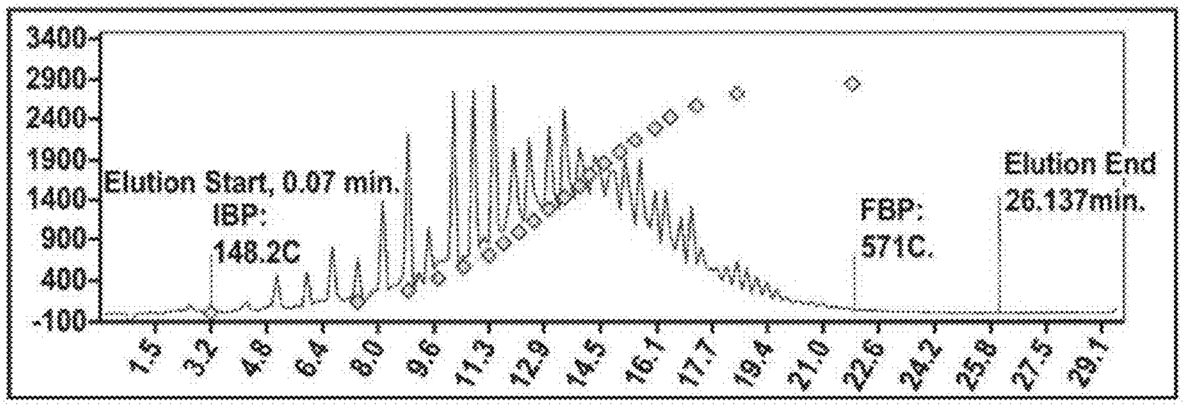
FIG. 9. Gas chromatogram of wax product.
Figure 10:
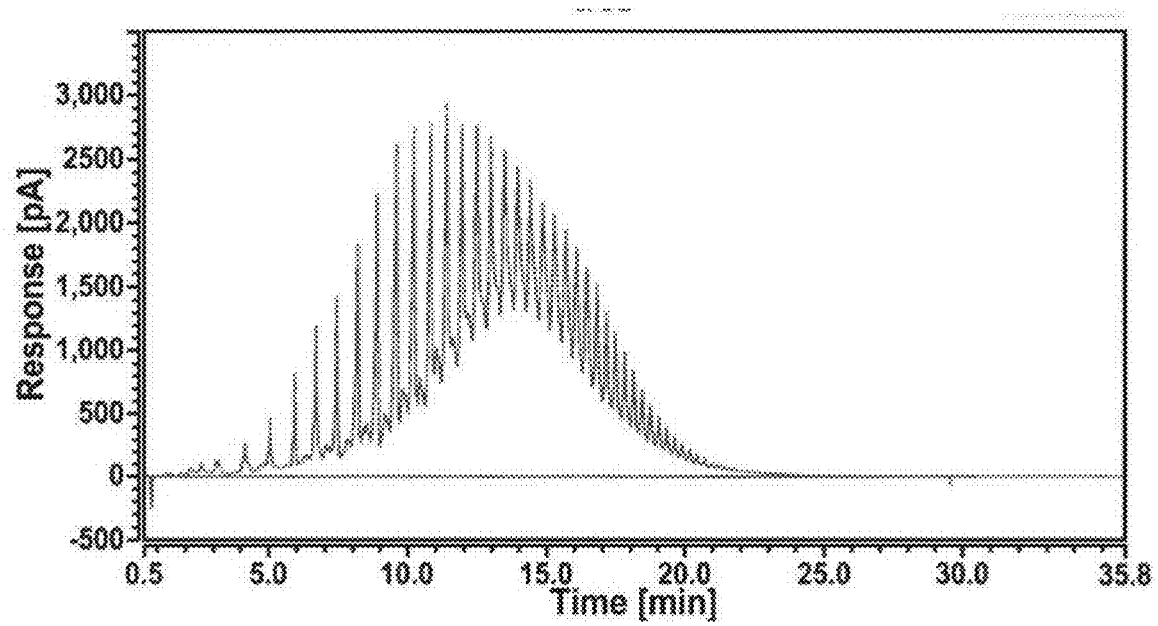
FIG. 10. Gas chromatogram of wax product.

Carbon number distribution in the wax product was assessed by simulated distillation (GC) using ASTM D5442M and ASTM D2887. The GC chromatogram of the wax product is shown in FIG. 9. The results are summarized in Table 3-Table 5.

TABLE 3

Carbon number distribution parameters.

| TEST | RESULT | UNITS |
|---|---|---|
| Initial Boiling Point | 148.2 | ° C. |
| Final Boiling Point (@ 99.5%) | 571.0 | ° C. |
| % OFF | BOILING POINT | UNITS |
| 0.5 | 148.2 | ° C. |
| 5.0 | 251.3 | ° C. |
| 10.0 | 287.0 | ° C. |
| 15.0 | 307.5 | ° C. |
| 20.0 | 325.2 | ° C. |
| 25.0 | 340.0 | ° C. |
| 30.0 | 352.2 | ° C. |
| 35.0 | 363.1 | ° C. |
| 40.0 | 373.1 | ° C. |
| 45.0 | 383.3 | ° C. |
| 50.0 | 393.1 | ° C. |
| 55.0 | 401.9 | ° C. |
| 60.0 | 410.4 | ° C. |
| 65.0 | 419.3 | ° C. |
| 70.0 | 428.7 | ° C. |
| 75.0 | 438.8 | ° C. |
| 80.0 | 450.5 | ° C. |
| 85.0 | 462.6 | ° C. |
| 90.0 | 479.0 | ° C. |
| 95.0 | 503.2 | ° C. |
| 99.5 | 571.0 | ° C. |

TABLE 4

ASTM D86 correlation results.

| % OFF | BOILING POINT | UNITS |
|---|---|---|
| IBP | 239.9 | ° C. |
| 5.0 | 291.9 | ° C. |
| 10.0 | 310.5 | ° C. |
| 20.0 | 334.7 | ° C. |
| 30.0 | 355.9 | ° C. |
| 40.0 | — | ° C. |
| 50.0 | 383.5 | ° C. |

TABLE 4-continued

| ASTM D86 correlation results. | | |
|---|---|---|
| % OFF | BOILING POINT | UNITS |
| 60.0 | — | ° C. |
| 70.0 | 414.3 | ° C. |
| 80.0 | 428.1 | ° C. |
| 90.0 | 451.3 | ° C. |
| 95.0 | 471.3 | ° C. |
| FBP | 484.3 | ° C. |

% vol at 350° C.

TABLE 5

| Cut points. | | |
|---|---|---|
| CARBON NUMBER | BP (° C.) | % OFF |
| C9 | 151 | 0.5907 |
| C10 | 174 | 0.9886 |
| C11 | 196 | 1.7416 |
| C12 | 216 | 2.6140 |
| C13 | 235 | 3.8843 |
| C14 | 254 | 5.6676 |
| C15 | 271 | 7.6124 |
| C16 | 287 | 10.0047 |
| C17 | 302 | 13.0783 |
| C18 | 316 | 16.8539 |
| C19 | 330 | 21.0007 |
| C20 | 344 | 26.0614 |
| C24 | 391 | 48.8578 |
| C28 | 431 | 70.9595 |
| C32 | 466 | 85.8719 |
| C36 | 496 | 93.6182 |
| C40 | 522 | 97.2452 |
| C44 | 545 | 98.7369 |
| C46 | 556 | 99.1241 |

Hydrocarbon types in the wax sample were further assessed using clay-gel absorption chromatography according to ASTM D2007. The results are summarized in Table 6.

TABLE 6

| ASTM D2007 results. | | |
|---|---|---|
| Hydrocarbon | Result | Units |
| Saturate content | 86.1 | Wt % |
| Aromatic content | 12.8 | Wt % |
| Polar content | 1.1 | Wt % |
| Asphaltenes | <0.1 | Wt % |

The wax sample was further subjected to $^{1}H$-NMR spectroscopy. The $^{1}H$ spectra were obtained in $CDCl_3$ solvent (Goss Scientific D, 99.8%) at ambient laboratory temperature and auto referenced against the solvent peak using the JEOL ECS 400 NMR spectrometer.

Figure 11:
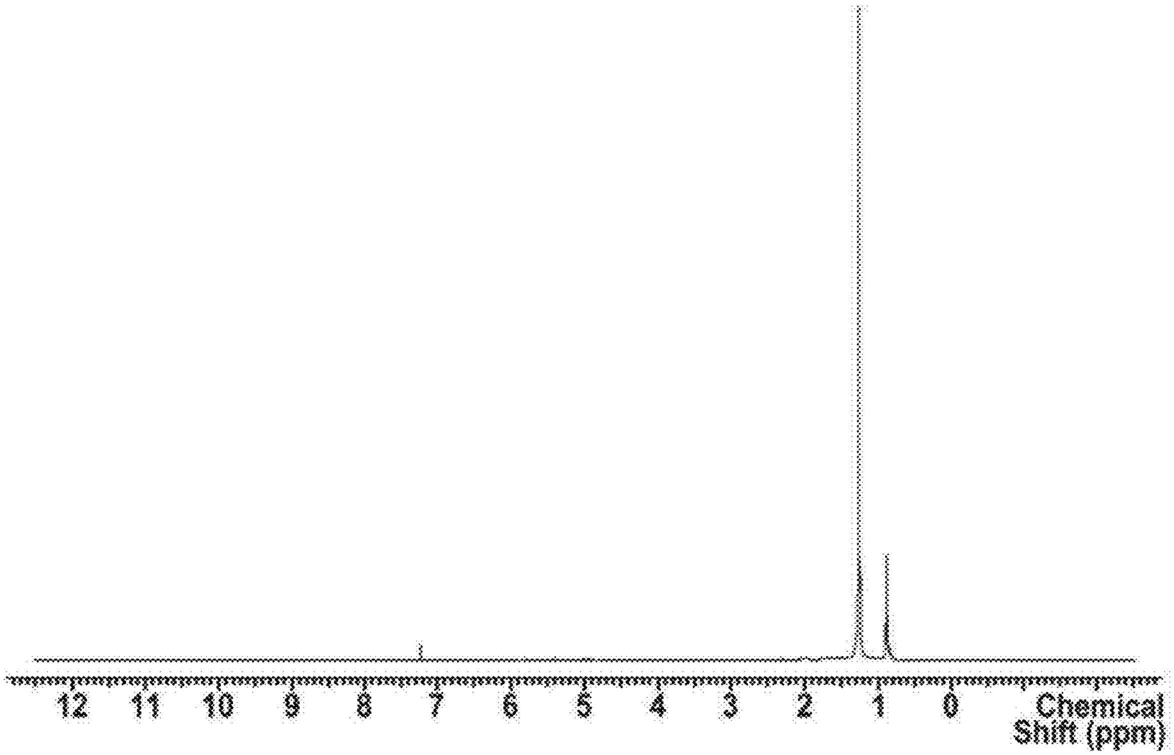
FIG. 11. $^{1}$H-NMR spectrum of wax product.
Figure 12:
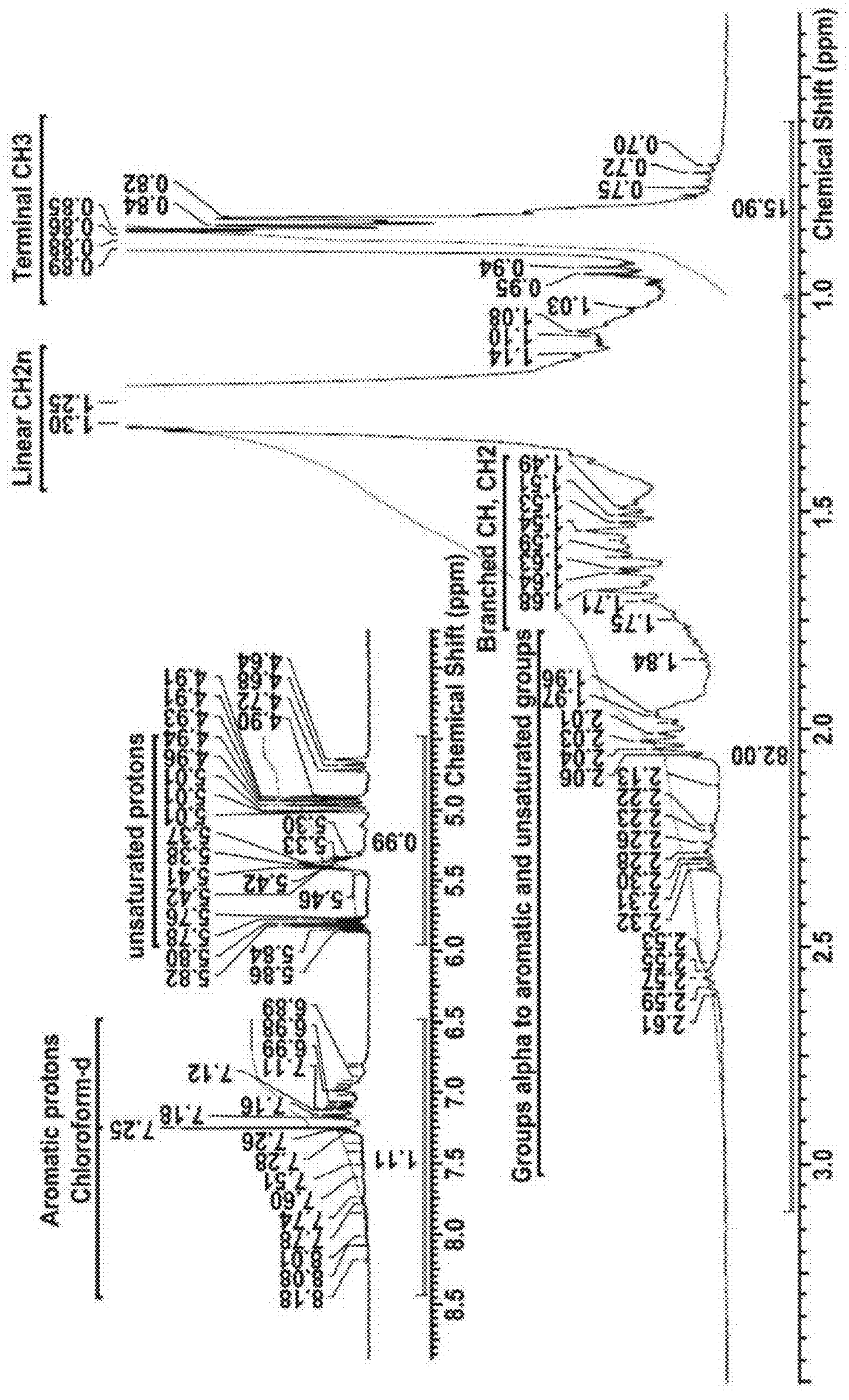
FIG. 12. $^{1}$H-NMR spectrum of wax product with annotations.

The $^{1}H$-NMR spectra are shown in FIG. 11 and FIG. 12. The annotations in FIG. 12 is a guide highlighting certain peaks of interest. The $^{1}H$-NMR spectra generated for the wax sample are dominated by resonances that are consistent with saturated, unsaturated and aromatic hydrocarbons.

The normalized NMR integration values indicate there is 97.9% aliphatic protons (region 0.5-3.2 ppm), 1.0% unsaturated protons (region 4.5-6.0 ppm) and 1.1% aromatic protons (region 6.5-8.5 ppm). This refers to the percentage of proton atoms in the aliphatic saturated, unsaturated and aromatic rings only relative to the total proton content. There were no signals observable outside the range shown in the $^{1}H$-NMR spectra.

The wax sample was further subjected to $^{13}C$-NMR spectroscopy. The $^{13}C$-NMR spectra were obtained in $CDCl_3$ solvent (Goss Scientific D, 99.8%) at ambient laboratory temperature and auto referenced against the solvent peak.

Figure 13:
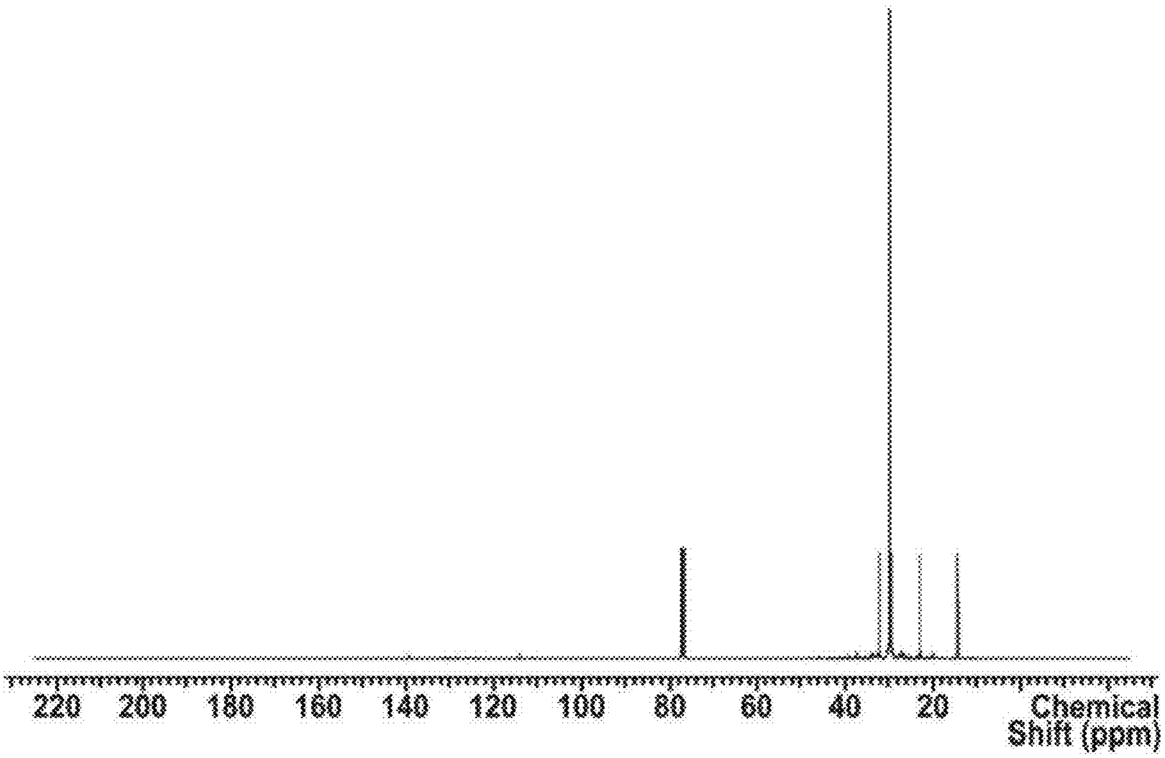
FIG. 13. $^{13}$C-NMR spectrum of wax product.
Figure 14:
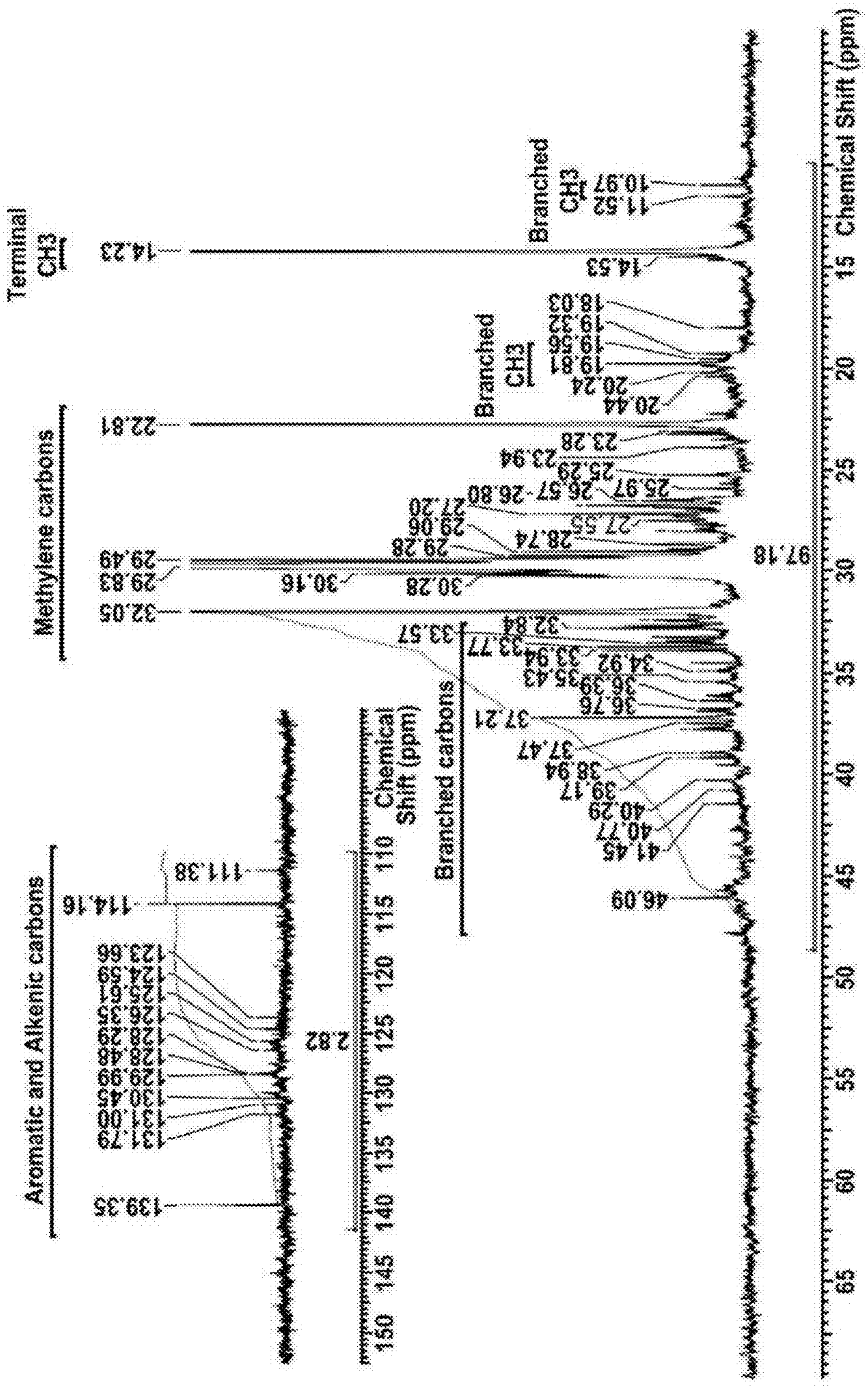
FIG. 14. $^{13}$C-NMR spectrum of wax product with annotations.

The $^{13}C$-NMR spectra are shown in FIG. 13 and FIG. 14. The annotations in FIG. 14 is a guide highlighting certain peaks of interest. The $^{13}C$-NMR spectra generated for the wax sample are dominated by resonances that are consistent with saturated, unsaturated and aromatic hydrocarbons. There were no signals observable outside the range shown in the $^{13}C$-NMR spectra.

Example 2

An oil derived from pyrolysis of a feedstock comprising post-consumer and/or post-industrial plastics was produced and analyzed. At ambient temperature and pressure, the oil was a dark brown, clear liquid.

The following techniques were applied to the wax: UV-Vis, FTIR, GC-FID, GC-MS, kinematic viscosity, flash point, distillation characteristics, $^{1}H$-NMR, and $^{13}C$-NMR.

A summary of the substance identity profile is provided in Table 7.

TABLE 7

| Summary of oil product. | |
|---|---|
| | Concentration (% w/w) |
| Hydrocarbon types | |
| Aliphatic content | 94.8 |
| Unsaturated content | 3.8 |
| Aromatic content | 1.4 |
| Hydrocarbon number | |
| C2 | 0.03 |
| C3 | 0.61 |
| C4 | 1.64 |
| C5 | 6.62 |
| C6 | 9.03 |
| C7 | 5.47 |
| C8 | 8.68 |
| C9 | 14.1 |
| C10 | 6.34 |
| C11 | 7.69 |
| C12 | 5.30 |
| C13 | 5.14 |
| C14 | 6.19 |
| C15 | 4.32 |
| C16 | 3.51 |
| C17 | 3.09 |
| C18 | 2.82 |
| C19 | 2.21 |
| C20 | 1.63 |
| C21 | 1.22 |
| C22 | 0.86 |
| C23 | 0.64 |
| C24 | 0.85 |
| C25 | 0.70 |
| C26 | 0.58 |
| C27 | 0.42 |
| C28 | 0.24 |
| C29 | 0.13 |

Figure 15:
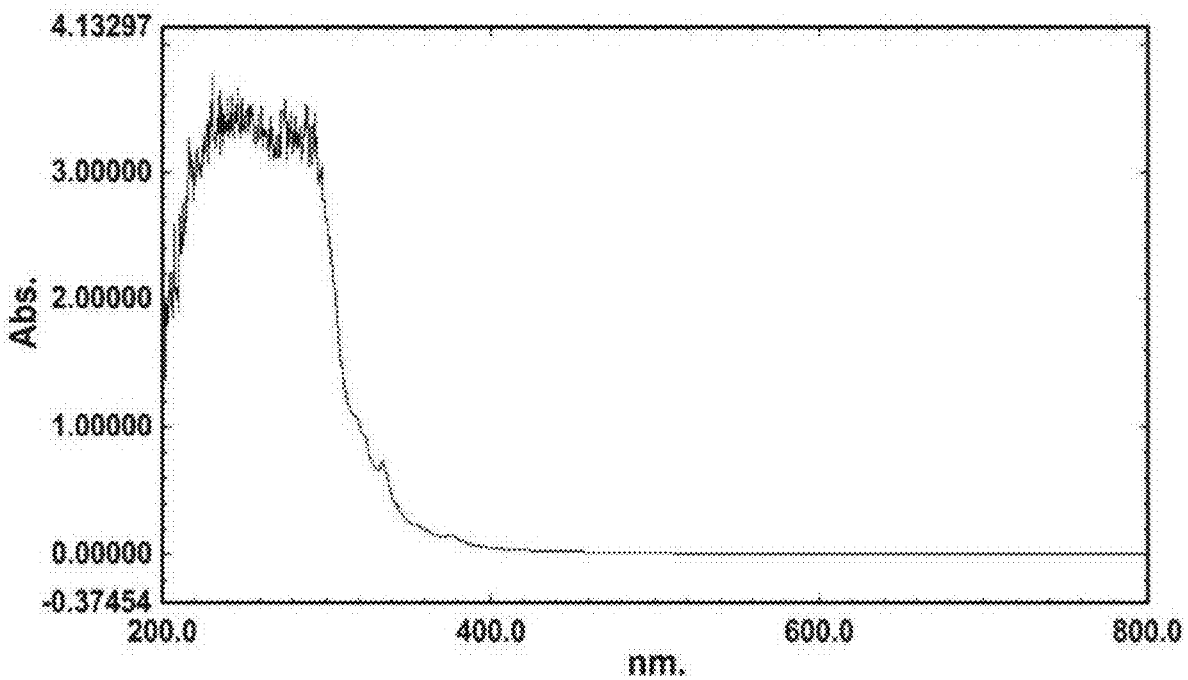
FIG. 15. UV-Vis spectrum of oil product in hexane with a 100× dilution factor.
Figure 16:
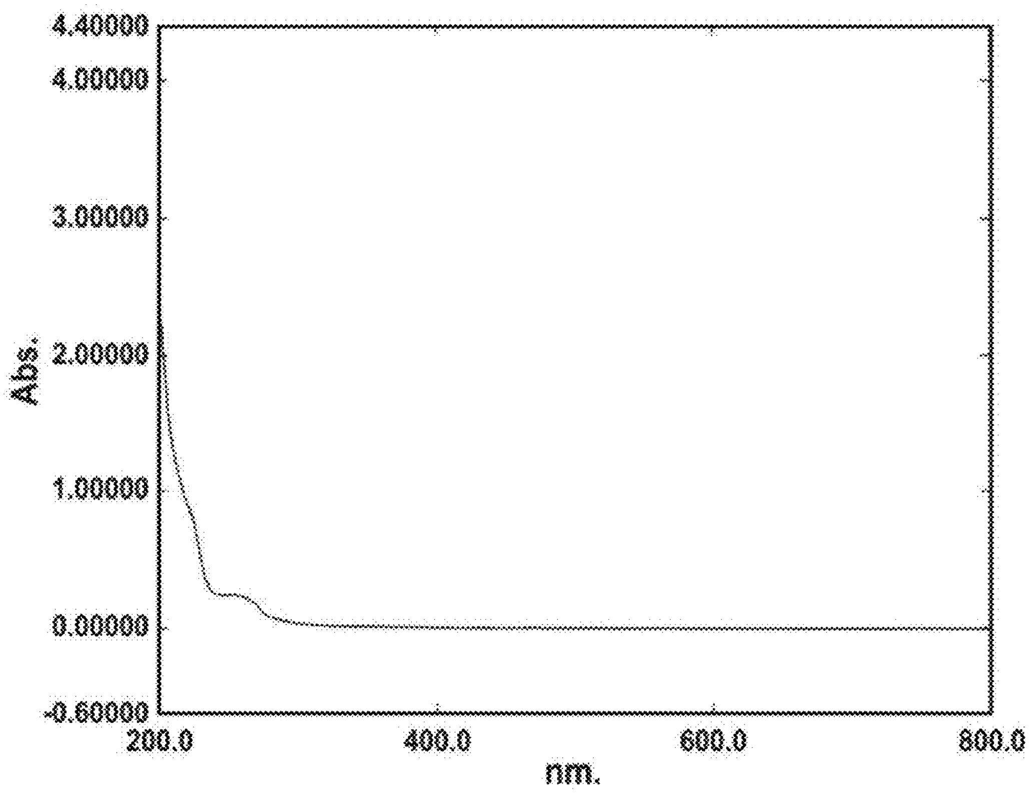
FIG. 16. UV-Vis spectrum of oil product in hexane with a 1,000× dilution factor.

UV-Vis spectrophotometry was performed using a Shimadzu UV1800 spectrophotometer using a single cell (10 mm) over a wavelength range of from 200 to 800 nm. The sample was dispersed in hexane (dilution factor 100 and 100×). The UV-Vis results (FIG. 15 and FIG. 16) show that the sample had maximum absorptions at wavelengths of 335 nm, 245 nm, and 200 nm.

Figure 17:
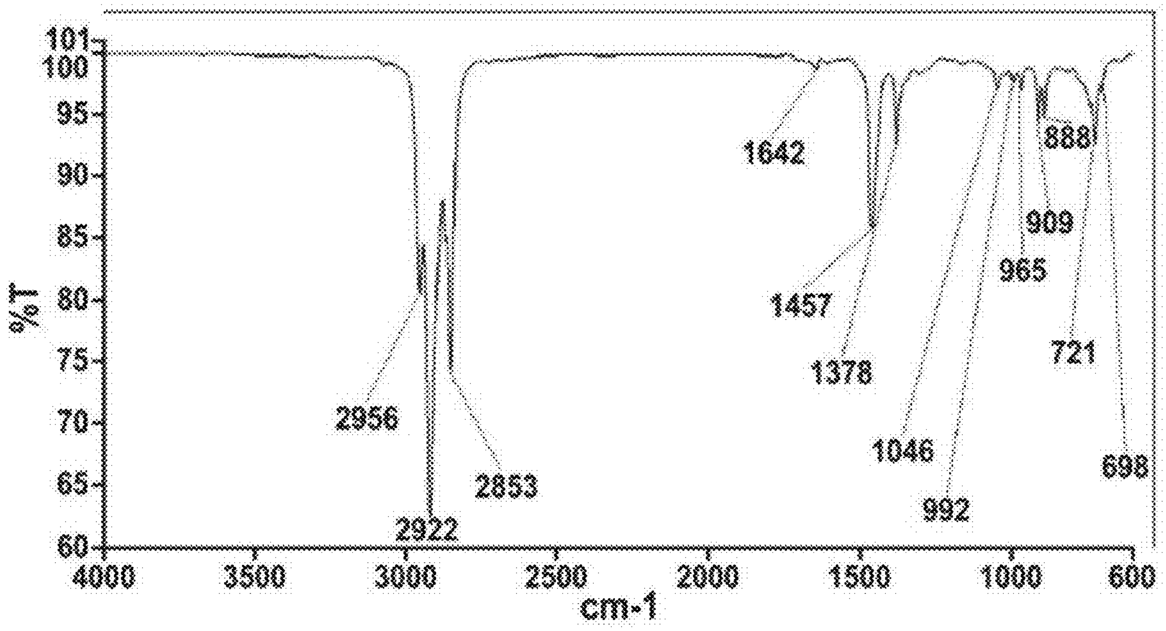
FIG. 17. FTIR-ATR spectrum of oil product.

FTIR-ATR spectroscopy was performed using a Perkin Elmer Instruments Spectrum Three FT-IR Spectrometer, equipped with an ATR Golden Gate bridge (crystal=diamond) over a spectral range of 4,000 to 600 $cm^{-1}$ with baseline correction. The FTIR spectrum is shown in FIG. 17. The FTIR main peaks are summarized in Table 8.

TABLE 8

FTIR main peaks of oil product.

| Main FTIR-ATR Peaks ($cm^{-1}$) | Interpretation |
|---|---|
| 2956 | Anti-symmetric stretching of methyl |
| 2922 | Anti-symmetric stretching of methylene |
| 2853 | Symmetric stretching of methylene |
| 1457 | Anti-symmetric bending vibrations of methylene |
| 1378 | Umbrella bending vibrations of methyl |
| 992 | Methyl bending |
| 965 | C-C skeleton vibrations, methyl bending |
| 721 | Methylene bending rocking vibrations |

Figure 18:
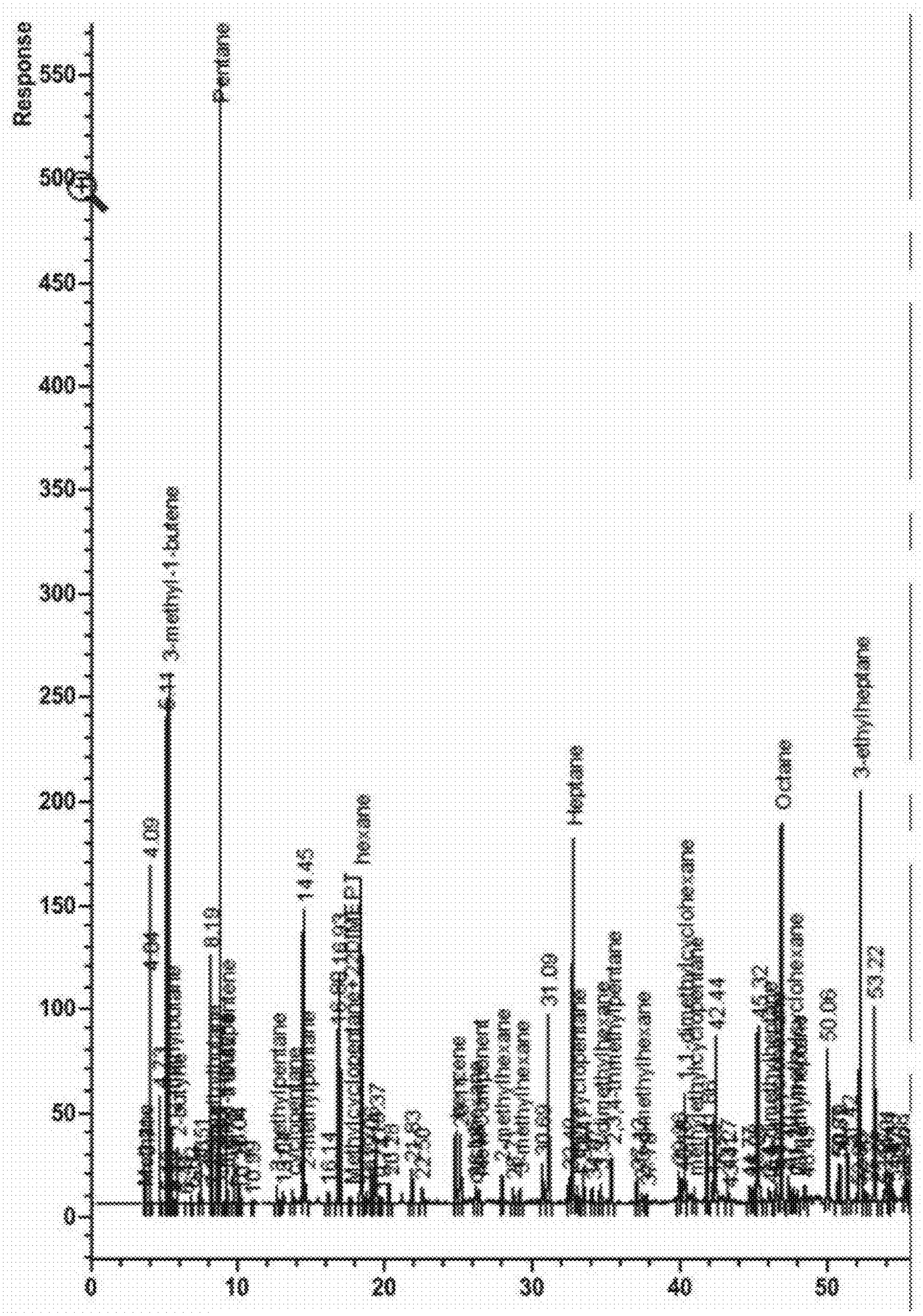
FIG. 18. GC-FID chromatogram of oil product.
Figure 18:
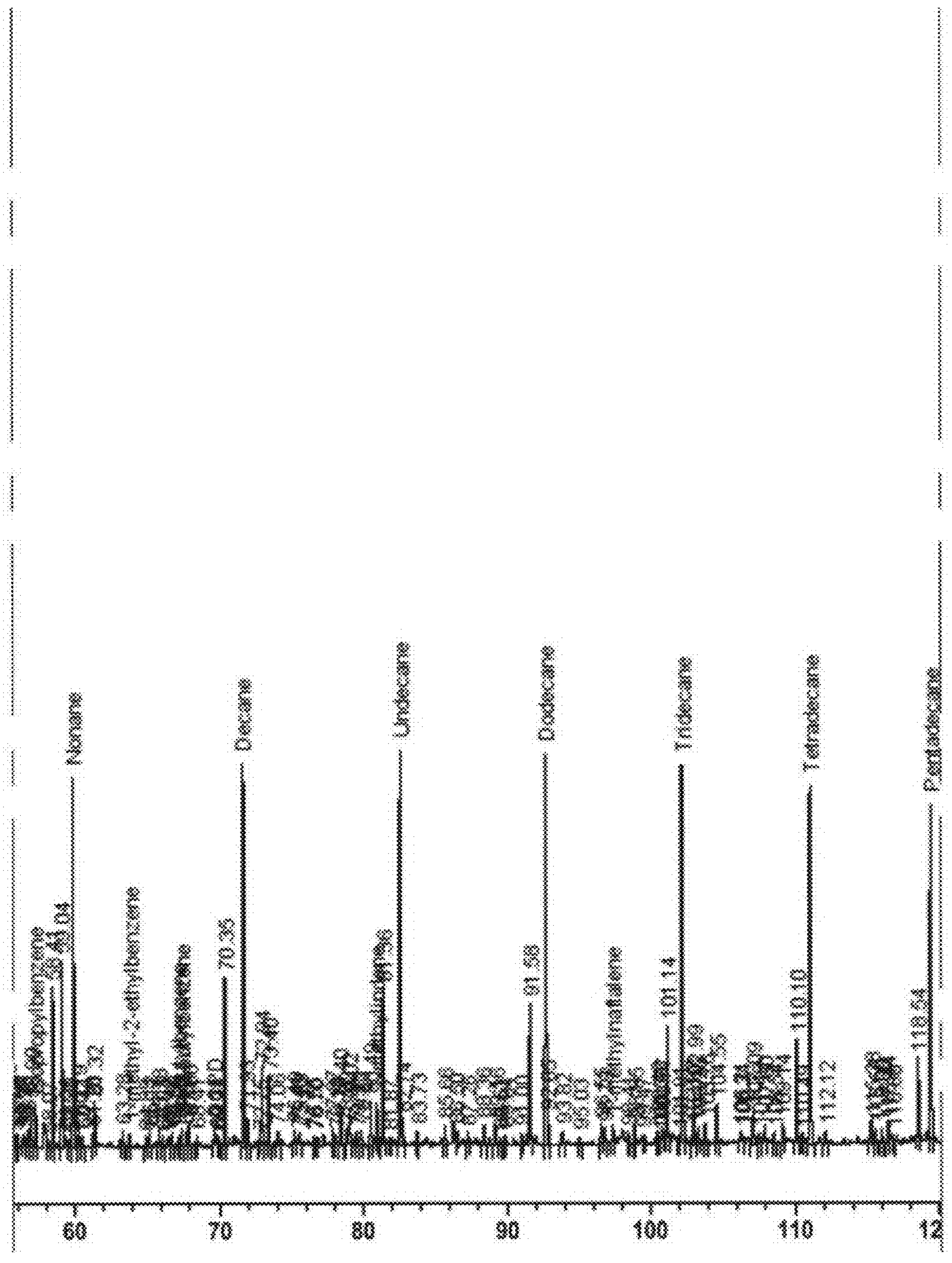
Figure 18:
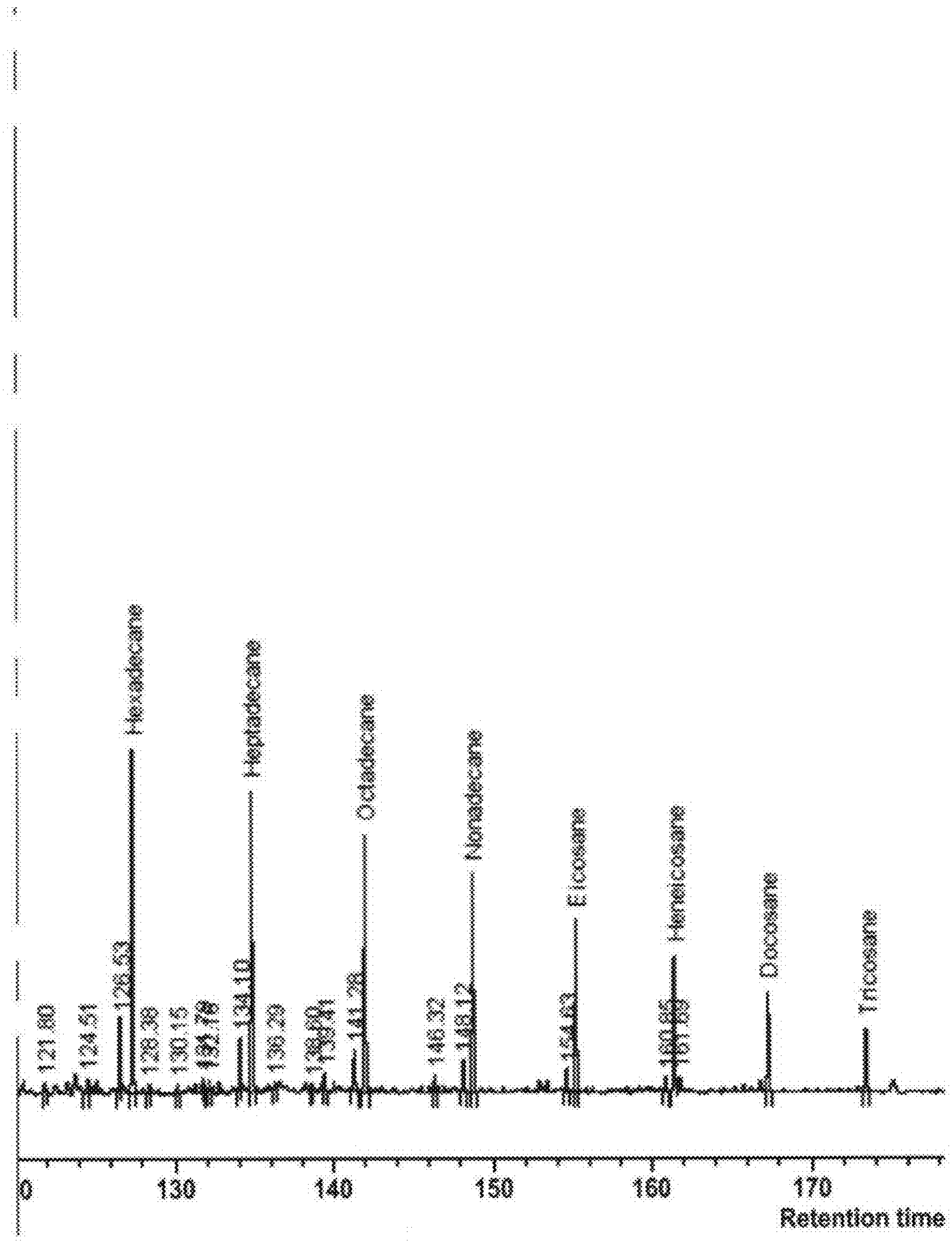
Figure 19:
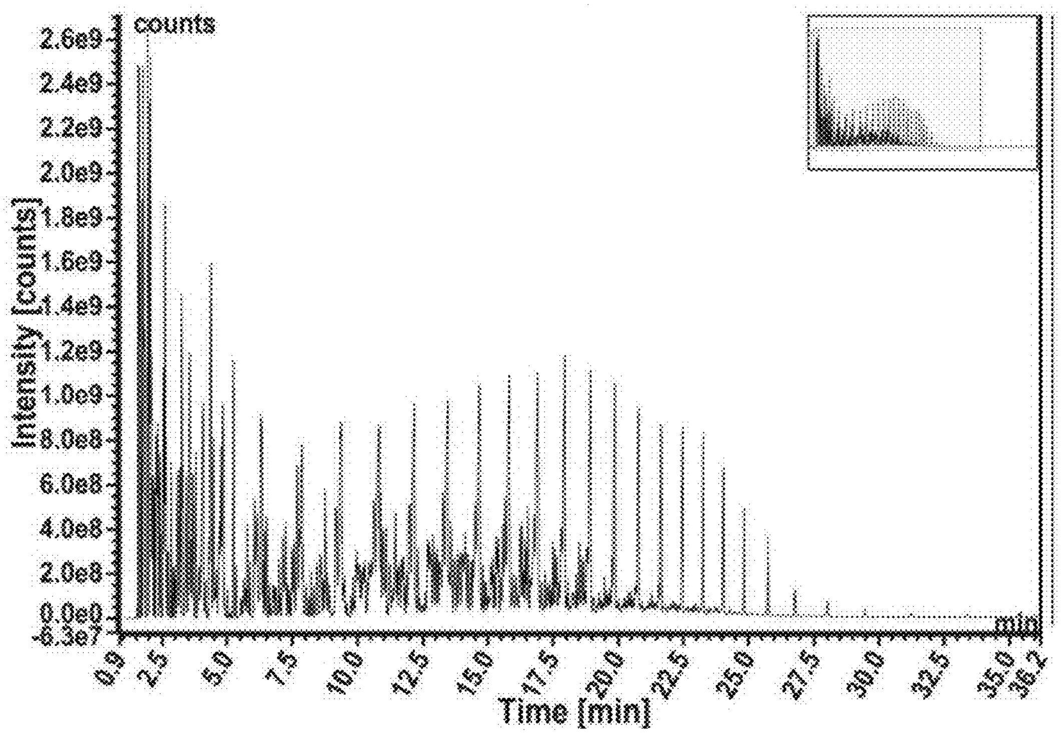
FIG. 19. GC-FID chromatogram of oil product.

Gas chromatography was performed on the oil product using an Agilent 6890 Gas Chromatograph with Atlas software and a flame ionization detector (GC-FID) (GC temperature program: Initial 20° C.-10 minutes; Ramp 1.5° C./min to 250° C.; Final 250° C.-10 minutes). The GC spectra are shown in FIG. 18 and FIG. 19. The results are summarized in Table 9 and Table 10.

TABLE 9

Extended PIONA results.

| Identified carbon chain length | Area % |
|---|---|
| C1 | <0.01 |
| C2 | 0.03 |
| C3 | 0.61 |
| C4 | 1.64 |
| C5 | 6.62 |
| C6 | 9.03 |
| C7 | 5.47 |
| C8 | 8.68 |
| C9 | 14.1 |
| C10 | 6.34 |
| C11 | 7.69 |
| C12 | 5.30 |
| C13 | 5.14 |
| C14 | 6.19 |
| C15 | 4.32 |
| C16 | 3.51 |
| C17 | 3.09 |
| C18 | 2.82 |
| C19 | 2.21 |
| C20 | 1.63 |
| C21 | 1.22 |
| C22 | 0.86 |
| C24 | 0.85 |
| C25 | 0.70 |
| C26 | 0.58 |
| C27 | 0.42 |
| C28 | 0.24 |
| C29 | 0.13 |
| Total | 100 |

TABLE 10

Extended PIONA substance list.

| Substance | Area % | Substance | Area % | Substance | Area % |
|---|---|---|---|---|---|
| Pentane | 3.95 | Decane | 2.82 | Hexadecane | 2.77 |
| Hexane | 2.14 | Undecane | 2.98 | Heptadecane | 2.44 |
| Heptane | 2.48 | Dodecane | 3.14 | Octadecane | 2.19 |
| Octane | 2.59 | Tridecane | 3.14 | Nonadecane | 1.79 |
| 3-ethylheptane | 2.96 | Tetradecane | 3.12 | Eicosane | 1.45 |
| Nonane | 2.68 | Pentadecane | 2.91 | Heneicosane | 1.09 |

Gas chromatography-Mass spectrometry (GC-MS) was performed using a Thermo Scientific Trace 1300 GC with a Thermo Scientific ISQ QD (injection volume—0.5 microliters; split ratio 1:5; injection temperature 250° C.; oven program—70° C., hold 1 min, 10° C./min to 300° C., bold 24 min). The GC-MS results are summarized in Table 11.

TABLE 11

GC-MS results.

| Retention time (min) | Component |
|---|---|
| 1.57 | Propane |
| 1.61 | Isobutane |
| 1.63 | 1-butene |
| 1.65 | 2-butene |
| 1.73 | Butane, 2-methyl- |
| 1.77 | Pentane |
| 1.80 | C5 alkene (m/z 55, 42, 41) |
| 1.91 | 1-Pentene, 4-methyl- |
| 1.94 | Butane, 2,3-dimethyl- |
| 2.01 | Pentane, 2-methyl- |
| 2.05 | n-Hexane |
| 2.08 | C6 alkene (m/z 84, 41, 69) |
| 2.12 | C6 alkene (m/z 41, 55, 84) |
| 2.15 | C6 alkene (m/z 41, 67, 39) |
| 2.18 | Hexane, 2-methyl- |
| 2.20 | Cyclopentane, methyl- |
| 2.28 | 1-Pentene, 2,4-dimethyl- |
| 2.30 | C7 alkene (m/z 83, 98, 41) |
| 2.33 | Cyclopentene, 1-methyl- |
| 2.38 | Hexane, 2-methyl- |
| 2.40 | Benzene |
| 2.44 | Hexane, 3-methyl- |
| 2.54 | C7 alkene (m/z 41, 98, 55) |
| 2.61 | Heptane |
| 2.65 | (m/z 98, 81, 96) |
| 2.71 | C7 alkene (m/z 98, 41, 39) |
| 2.84 | Cyclohexane, methyl- |
| 2.92 | Cyclopentane, ethyl- |
| 2.98 | C7H12 (m/z 81, 96, 79) |
| 3.08 | C7H12 (m/z 81, 96, 95) |
| 3.19 | Heptane, 4-methyl- |
| 3.24 | Toluene |
| 3.28 | C7H12 (m/z 96, 81, 91) |
| 3.39 | C8 alkene (m/z 41, 112, 55) |
| 3.43 | C8 alkene (m/z 41, 55, 43) |
| 3.55 | Octane |
| 3.59 | (m/z 112, 41, 55) |
| 3.61 | Dimethylcyclohexane |
| 3.79 | C9H20 alkane (m/z 85, 43, 41) |
| 3.91 | (m/z 83, 126, 41) |
| 4.07 | C9 alkene (m/z 43, 126, 55) |
| 4.15 | (m/z 110, 95, 109) |
| 4.30 | Cyclohexane, 1,3,5-trimethyl- |
| 4.37 | xylene (m/z 91, 106, 105) |
| 4.47 | xylene + (m/z 106, 91, 109) |
| 4.57 | C9H16 (m/z 109, 124, 83) |
| 4.70 | C9 alkene (m/z 41, 43, 97) |
| 4.76 | C10H20 (m/z 43, 83, 104) |
| 4.82 | xylene + (m/z 106, 43, 91) |
| 4.84 | Nonane |
| 5.23 | Benzene, (1-methylethyl)- |
| 5.32 | (m/z 97, 83, 126) |
| 5.64 | Benzene, propyl- |

TABLE 11-continued

GC-MS results.

| Retention time (min) | Component |
|---|---|
| 5.71 | (m/z 124, 41, 95) |
| 5.76 | aromate C9H12 (m/z 105, 120, 103) |
| 5.79 | aromate C9H12 (m/z 105, 120, 106) |
| 5.86 | aromate C9H12 (m/z 105, 120, 119) |
| 6.05 | aromate C9H12 (m/z 105, 120, 103) |
| 6.14 | C10H20 alkene (m/z 41 97, 55) |
| 6.29 | Decane |
| 6.35 | C10H20 alkene (m/z 140, 97, 41) |
| 6.43 | (m/z 113, 43, 41) |
| 6.50 | C11H24 alkane (m/z 43, 113, 41) |
| 6.79 | (m/z 154, 41, 111) |
| 6.97 | Indane |
| 7.13 | aromate C10H14 (m/z 105, 134, 85) |
| 7.24 | (m/z 119, 43, 85) |
| 7.32 | (m/z 119, 105, 41) |
| 7.48 | (m/z 111, 112, 41) |
| 7.55 | (m/z 119, 111, 112) |
| 7.68 | (m/z 119, 41, 97) |
| 7.76 | aromate C10H12 (m/z 117, 115, 132) |
| 7.86 | Undecane |
| 7.89 | C11H22 alkene (m/z 154, 97, 41 |
| 8.01 | C11H22 alkene (m/z 154, 41, 152) |
| 8.22 | (m/z 152, 125, 41) |
| 8.44 | (m/z 154, 119, 152) |
| 8.57 | aromate (m/z 117, 152, 115) |
| 8.61 | (m/z 131, 119, 146) |
| 8.67 | aromate (m/z 148, 105, 106) |
| 8.75 | aromate (m/z 117, 115, 132) |
| 8.83 | aromate (m/z 148, 119, 115) |
| 8.92 | aromate (m/z 148, 105, 106) |
| 9.17 | C12 alkene (m/z 97, 168, 41) |
| 9.29 | (m/z 131, 170, 43) |
| 9.32 | Naphthalene |
| 9.37 | Dodecane |
| 9.39 | C12 alkene (m/z 168, 97, 131) |
| 9.46 | aromate C11H14 (m/z 131, 146, 115) |
| 9.50 | (m/z 168, 131, 146) |
| 9.82 | (m/z 145, 155, 160) |
| 9.92 | (m/z 162, 166, 155) |
| 9.97 | (m/z 168, 117, 183) |
| 10.02 | (m/z 162, 117, 119) |
| 10.07 | (m/z 145, 166, 160) |
| 10.12 | (m/z 145, 162, 160) |
| 10.21 | (m/z 131, 146, 162) |
| 10.27 | (m/z 162, 166, 91) |
| 10.38 | (m/z 162, 105, 145) |
| 10.43 | (m/z 131, 146, 145) |
| 10.47 | (m/z 146, 131, 144) |
| 10.53 | (m/z 144, 129, 145) |
| 10.62 | 1-tridecene |
| 10.82 | Tridecane |
| 10.84 | (m/z 182, 197, 111) |
| 10.89 | (m/z 111, 43, 125) |
| 10.98 | (m/z 111, 141, 142) |
| 11.09 | (m/z 111, 154, 125) |
| 11.23 | Methylnaphthalene (m/z 142, 141, 115) |
| 11.44 | C13 alkene (m/z 182, 125, 111) |
| 11.51 | (m/z 180, 154, 176) |
| 11.59 | (m/z 155, 145, 154) |
| 11.60 | (m/z 145, 160, 176) |
| 11.69 | (m/z 176, 169, 168) |
| 11.75 | (m/z 111, 125, 168) |
| 11.88 | (m/z 159, 145, 176) |
| 12.00 | 1-Tetradecene |
| 12.17 | Tetradecane |
| 12.30 | (m/z 196, 156, 141) |
| 12.69 | Dimethylnaphthalene (m/z 156, 141, 174) |
| 12.75 | (m/z 156, 155, 154) |
| 12.81 | (m/z 196, 168, 83) |
| 12.90 | (m/z 190, 169, 168) |
| 13.00 | (m/z 156, 183, 182) |
| 13.07 | (m/z 190, 194, 159) |
| 13.14 | (m/z 190, 105, 155) |
| 13.18 | (m/z 156, 157, 172) |
| 13.28 | 1-Pentadecene |
| 13.46 | Pentadecane |

TABLE 11-continued

GC-MS results.

| Retention time (min) | Component |
|---|---|
| 13.51 | (m/z 167, 141, 182) |
| 13.58 | 2,4-Di-tert-butylphenol |
| 13.71 | (m/z 111, 208, 153) |
| 13.82 | (m/z 155, 170, 153) |
| 13.89 | 1-Isopropenylnaphthalene |
| 13.92 | (m/z 153, 97, 204) |
| 14.01 | (m/z 168, 169, 155) |
| 14.04 | (m/z 170, 155, 153) |
| 14.14 | C15 alkene (m/z 183, 210, 182) |
| 14.16 | (m/z 157, 204, 208) |
| 14.23 | (m/z 197, 196, 155) |
| 14.35 | (m/z 204, 208, 170) |
| 14.42 | (m/z 204, 105, 224) |
| 14.51 | Cetene |
| 14.67 | Hexadecane |
| 14.80 | (m/z 224, 111, 195) |
| 15.10 | (m/z 155, 168, 154) |
| 15.18 | (m/z 182, 183, 169) |
| 15.25 | (m/z 167, 196, 182) |
| 15.32 | (m/z 197, 196, 155) |
| 15.36 | (m/z 167, 224, 165) |
| 15.39 | (m/z 218, 211, 210) |
| 15.48 | (m/z 196, 197, 105) |
| 15.57 | (m/z 167, 218, 165) |
| 14.80 | (m/z 224, 111, 195) |
| 15.66 | 1-Heptadecene |
| 15.83 | Heptadecane |
| 15.95 | C17 alkene (m/z 238, 111, 169) |
| 16.06 | C17 alkene (m/z 97, 198, 238) |
| 16.25 | (m/z 168, 180, 182) |
| 16.30 | (m/z 179, 196, 194) |
| 16.38 | (m/z 165, 182, 167) |
| 16.43 | (m/z 211, 181, 210) |
| 16.48 | (m/z 179, 194, 178) |
| 16.53 | (m/z 225, 224, 111) |
| 16.54 | (m/z 179, 232, 194) |
| 16.62 | (m/z 165, 181, 210) |
| 15.95 | C17 alkene (m/z 238, 111, 169) |
| 16.76 | 1-Octadecene |
| 16.91 | Octadecane |
| 17.19 | (m/z 178, 250, 97) |
| 17.49 | (m/z 225, 179, 178) |
| 17.57 | (m/z 239, 179, 194) |
| 17.63 | (m/z 246, 179, 194) |
| 17.72 | (m/z 266, 193, 181) |
| 17.81 | 1-Nonadecene |
| 17.94 | Nonadecane |
| 18.51 | (m/z 179, 239, 208) |
| 18.60 | (m/z 253, 252, 193) |
| 18.69 | (m/z 260, 192, 191) |
| 18.80 | 1-Eicosene |
| 18.93 | Eicosane |
| 19.47 | (m/z 253, 274, 252) |
| 19.76 | 1-Heneicosene |
| 19.87 | Heneicosane |
| 20.77 | Docosane |
| 21.64 | Tricosane |
| 22.47 | Tetracosane |
| 23.27 | Pentacosane |
| 24.04 | Hexacosane |
| 24.84 | Heptacosane |
| 25.74 | Octacosane |
| 26.79 | Nonacosane |

The kinematic viscosity of the oil was assessed using ASTM D445 and ASTM D7042 using an Anton Paar SVM3000 Stabinger Viscometer G2. The oil sample had a kinematic viscosity of 28.2 mm$^2$/s, cSt.

The flash point of the oil was measured using ASTM D93A using a Pensky Martens Herzog, Electronic MP329 instrument. The oil had a flashpoint of 11.3° C.

The oil was subjected to distillation according to EN ISO 405. The results are summarized in Table 12.

TABLE 12

| Distillation results of oil sample. | | | |
|---|---|---|---|
| | Analysis No. 1 | Analysis No. 2 | Units |
| Receiver temperature | 16 | 16 | ° C. |
| Starting Sample Temperature | 22.0 | 22.0 | ° C. |
| Initial Boiling Point | 37 | 37 | ° C. |
| 25% Recovery | 137.7 | 135.8 | ° C. |
| 35% Recovery | 163.1 | 161.8 | ° C. |
| 45% Recovery | 189.6 | 188.5 | ° C. |
| 55% Recovery | 216.1 | 217.6 | ° C. |
| 65% Recovery | 244.9 | 244.4 | ° C. |
| 75% Recovery | 271.6 | 270.8 | ° C. |
| 80% Recovery | 288.9 | 286 | ° C. |
| 85% Recovery | — | 305 | ° C. |

The oil sample was further subjected to $^1$H-NMR spectroscopy. The $^1$H spectra were obtained in $CDCl_3$ solvent (Goss Scientific D, 99.8%) at ambient laboratory temperature and auto referenced against the solvent peak using the JEOL ECS 400 NMR spectrometer.

Figure 20:
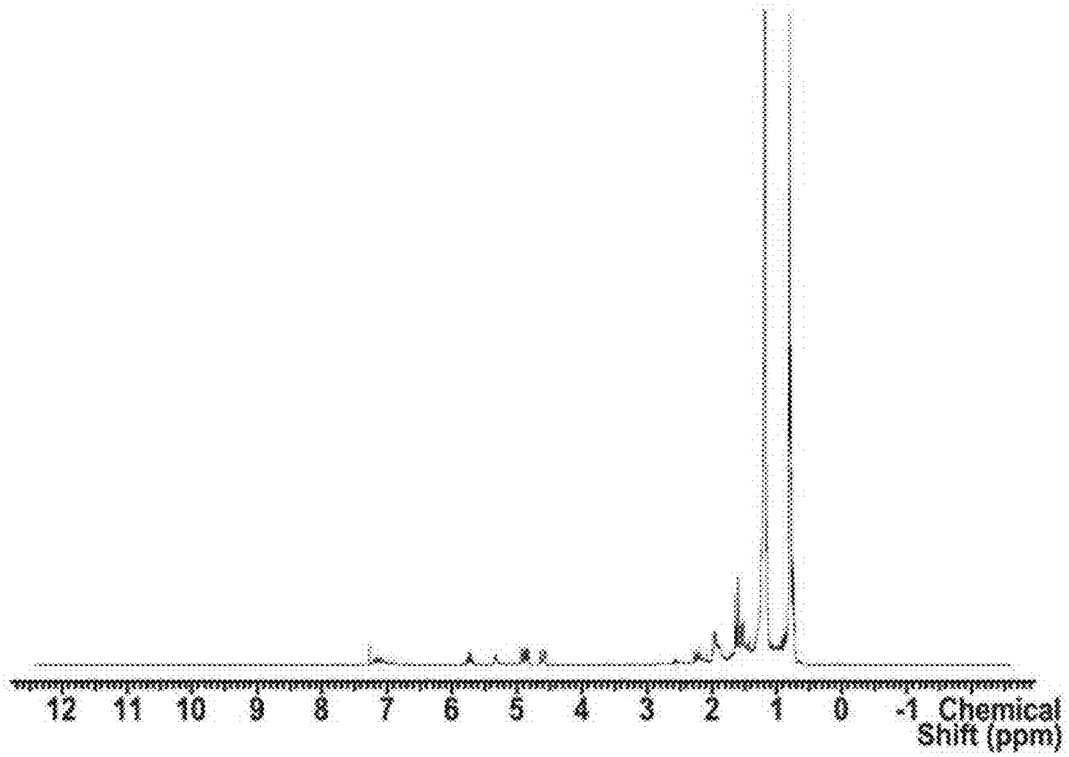
FIG. 20. $^{1}$H-NMR spectrum of oil product.
Figure 21:
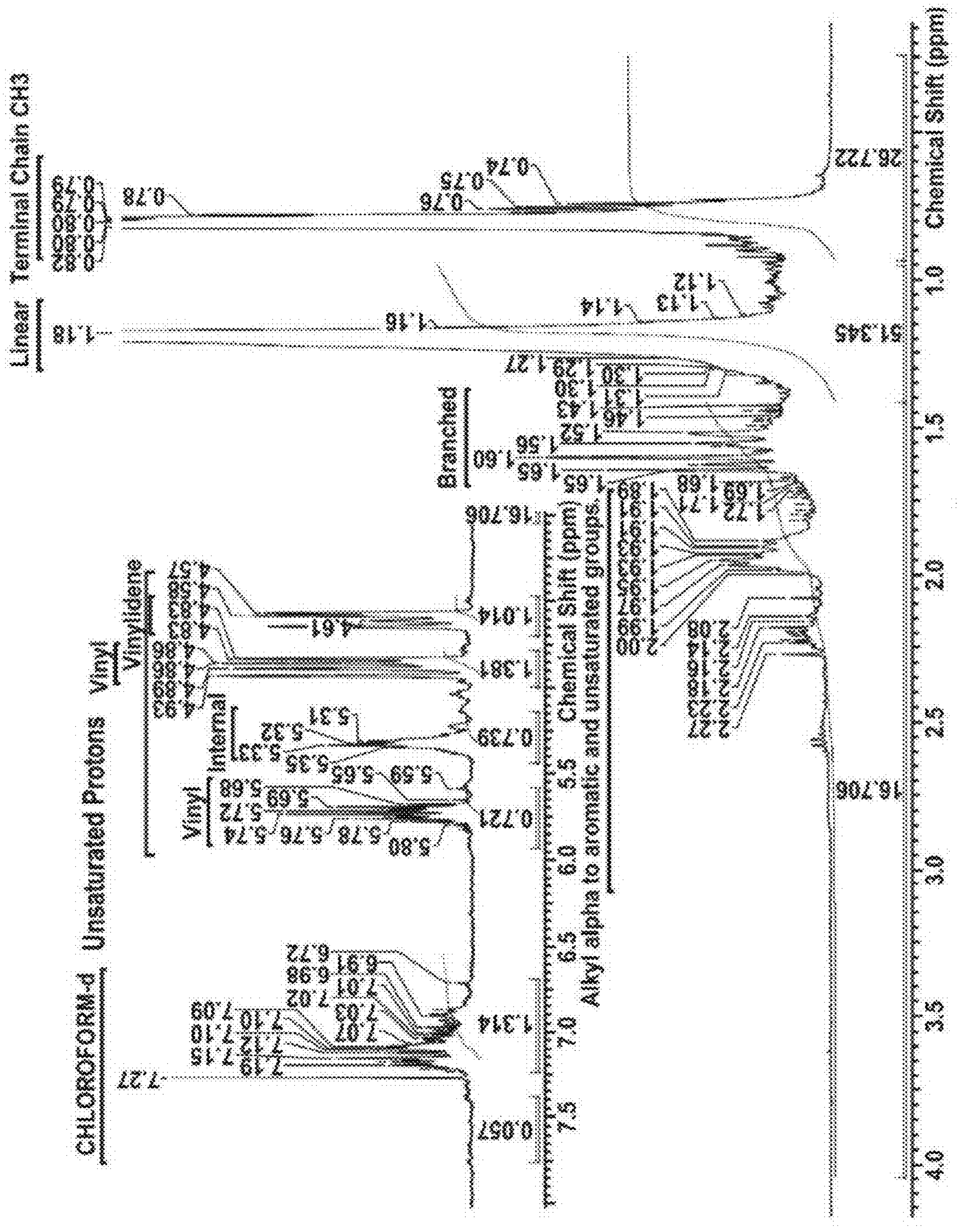
FIG. 21. $^{1}$H-NMR spectrum of oil product with annotations.

The $^1$H-NMR spectra are shown in FIG. 20 and FIG. 21. The annotations in FIG. 21 is a guide highlighting certain peaks of interest. The $^1$H-NMR spectra generated for the oil sample confirm the presence of saturated, unsaturated and aromatic hydrocarbons. 1H-NMR indicates the presence of vinyl, internal and vinylidene olefinic functionalities.

The normalized NMR integration values indicate there is 94.8% aliphatic protons (region 0.2-4 ppm), 3.8% olefinic protons (region 4.5-6.0 ppm) and 1.4% aromatic protons (region 6.7-8.3 ppm). This refers to the percentage of proton atoms in the aliphatic saturated, olefinic and aromatic rings only relative to the total proton content. There were no signals observable outside the range shown in the $^1$H-NMR spectra.

The oil sample was further subjected to $^{13}$C-NMR spectroscopy. The $^{13}$C-NMR spectra were obtained in $CDCl_3$ solvent (Goss Scientific D, 99.8%) at ambient laboratory temperature and auto referenced against the solvent peak.

Figure 22:
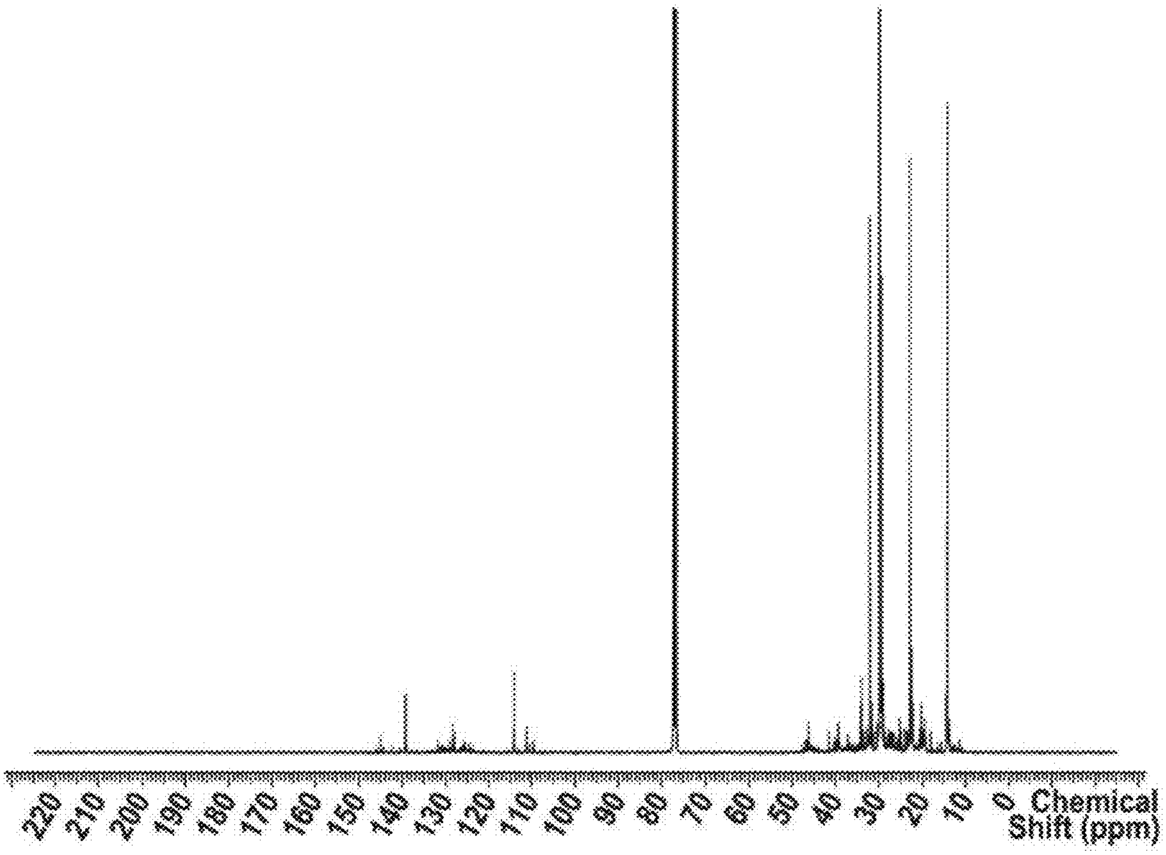
FIG. 22. $^{13}$C-NMR spectrum of oil product.
Figure 23:
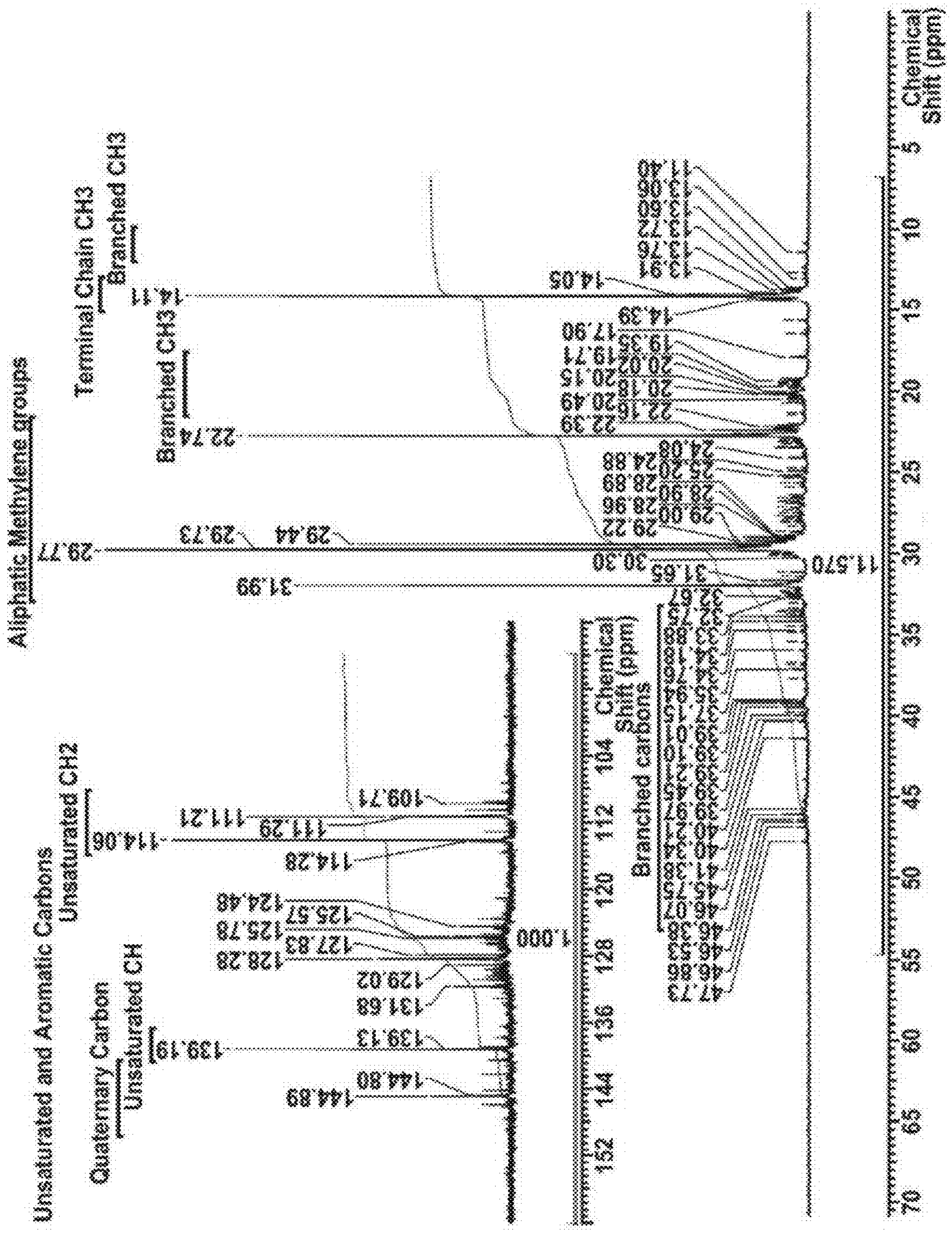
FIG. 23. $^{13}$C-NMR spectrum of oil product with annotations.

The $^{13}$C-NMR spectra are shown in FIG. 22 and FIG. 23. The annotations in FIG. 23 is a guide highlighting certain peaks of interest. The $^{13}$C-NMR spectra generated for the oil sample are dominated by resonances that are consistent with saturated, unsaturated and aromatic hydrocarbons. $^{13}$C-NMR indicates the presence of vinyl, internal and vinylidene olefinic functionalities. There were no signals observable outside the range shown in the $^{13}$C-NMR spectra.

EXAMPLE IMPLEMENTATIONS

Example 1: A reactor for pyrolysis of plastic feedstock comprising post-consumer and/or post-industrial plastics, the reactor comprising: a reactor vessel defining an internal volume configured for receiving and pyrolyzing the plastic feedstock; and one or more heaters configured for heating the feedstock in the reactor vessel's internal volume to a temperature of 200° C. or more; wherein the one or more heaters are configured for applying energy at a combined energy density between 0.05 and 0.7 kW per pound of pyrolyzed product produced within the reactor.

Example 2: The reactor of any one of the examples herein, particularly Example 1, wherein the one or more heaters are configured for applying energy at a combined energy density between 0.05 and 0.5 kW per pound of pyrolyzed product produced within the reactor per hour.

Example 3: The reactor of any one of the examples herein, particularly Example 1, wherein the internal volume of the reactor vessel is between 100 and 20,000 gallons.

Example 4: The reactor of any one of the examples herein, particularly Example 1, wherein the reactor vessel is configured for maintaining a pressure in its internal volume during pyrolysis that is between −7.5 and 14.5 psig.

Example 5: The reactor of any one of the examples herein, particularly Example 1, wherein the one or more heaters are configured for applying heat to the plastic feedstock in the reactor vessel at a heat density between 5 and 55 W/in$^2$.

Example 6: The reactor of any one of the examples herein, particularly Example 1, wherein the one or more heaters comprise one or more electric heaters.

Example 7: The reactor of any one of the examples herein, particularly Example 6, wherein the one or more electric heaters comprise one or more electric heaters positioned around sides of the reactor vessel.

Example 8: The reactor of any one of the examples herein, particularly Example 6, wherein the one or more electric heaters further comprise one or more electric heaters extending into the interior volume of the reactor vessel.

Example 9: The reactor of any one of the examples herein, particularly Example 1, wherein the one or more heaters comprise an array of electric heaters that are vertically oriented and extend into an interior volume of the reactor vessel.

Example 10: The reactor of any one of the examples herein, particularly Example 1, wherein the reactor vessel includes an agitator configured for stirring the plastic feedstock during pyrolysis.

Example 11: The reactor of any one of the examples herein, particularly Example 10, wherein the agitator is configured to continuously stir the feedstock within the reactor vessel during pyrolysis.

Example 12: The reactor of any one of the examples herein, particularly Example 10, wherein the agitator is configured to continuously produce average liquid flow velocities inside the reactor vessel between 0.2 and 10 m/s.

Example 13: The reactor of any one of the examples herein, particularly Example 10, wherein the agitator is configured to continuously produce average liquid flow velocities inside the reactor vessel between 0.5 and 6 m/s.

Example 14: The reactor of any one of the examples herein, particularly Example 10, wherein the agitator comprises a vertically oriented drive shaft and one or more impellers mounted on the drive shaft.

Example 15: The reactor of any one of the examples herein, particularly Example 14, wherein the one or more impellers each comprise a plurality of impeller blades extending radially outwardly from the drive shaft.

Example 16: The reactor of any one of the examples herein, particularly Example 1, further comprising one or more vapor outlets configured for directing hydrocarbon vapor generated during pyrolysis out of the reactor vessel.

Example 17: The reactor of any one of the examples herein, particularly Example 1, wherein the plastic feedstock is a continuous stream of molten or semi-molten feedstock; and wherein the reactor vessel is configured to pyrolyze the continuous stream of molten or semi-molten feedstock.

Example 18: The reactor of any one of the examples herein, particularly Example 1, wherein the reactor vessel's internal volume is configured for receiving and pyrolyzing the plastic feedstock at an industrial scale.

Example 19: A method for pyrolysis of plastic feedstock comprising post-consumer and/or post-industrial plastics, the method comprising: directing the plastic feedstock into an internal volume of a reactor vessel; and pyrolyzing the plastic feedstock in the internal volume of the reactor vessel; wherein the step of pyrolyzing the plastic feedstock comprises: using one or more heaters to heat the plastic feedstock in the reactor vessel's internal volume to a temperature of 200° C. or more; and using the one or more heaters to apply energy at a combined energy density between 0.05 and 0.7 kW per pound of pyrolyzed product produced within the reactor.

Example 20: The method of any one of the examples herein, particularly Example 19, wherein the step of using the one or more heaters to applying energy comprises using the one or more heaters to apply energy at a combined energy density between 0.05 and 0.5 kW per pound of pyrolyzed product produced within the reactor per hour.

Example 21: The method of any one of the examples herein, particularly Example 19, wherein the internal volume of the reactor vessel is between 100 and 20,000 gallons.

Example 22: The method of any one of the examples herein, particularly Example 19, wherein the reactor vessel is configured for maintaining a pressure in its internal volume during pyrolysis that is between −7.5 and 14.5 psig.

Example 23: The method of any one of the examples herein, particularly Example 19, wherein the one or more heaters are configured for applying heat to the plastic feedstock in the reactor vessel at a heat density between 5 and 55 $W/in^2$.

Example 24: The method of any one of the examples herein, particularly Example 19, wherein the one or more heaters comprise one or more electric heaters.

Example 25: The method of any one of the examples herein, particularly Example 24, wherein the one or more electric heaters comprise one or more electric heaters positioned around sides of the reactor vessel.

Example 26: The method of any one of the examples herein, particularly Example 24, wherein the one or more electric heaters further comprise one or more electric heaters extending into the interior volume of the reactor vessel.

Example 27: The method of any one of the examples herein, particularly Example 19, wherein the one or more heaters comprise an array of electric heaters that are vertically oriented and extend into an interior volume of the reactor vessel.

Example 28: The method of any one of the examples herein, particularly Example 19, wherein the reactor vessel includes an agitator configured for stirring the plastic feedstock during pyrolysis.

Example 29: The method of any one of the examples herein, particularly Example 28, wherein the agitator is configured to continuously stir the feedstock within the reactor vessel during pyrolysis.

Example 30: The method of any one of the examples herein, particularly Example 28, wherein the agitator is configured to continuously produce average liquid flow velocities inside the reactor vessel between 0.2 and 10 m/s.

Example 31: The method of any one of the examples herein, particularly Example 28, wherein the agitator is configured to continuously produce average liquid flow velocities inside the reactor vessel between 0.5 and 6 m/s.

Example 32: The method of any one of the examples herein, particularly Example 28, wherein the agitator comprises a vertically oriented drive shaft and one or more impellers mounted on the drive shaft.

Example 33: The method of any one of the examples herein, particularly Example 32, wherein the one or more impellers each comprise a plurality of impeller blades extending radially outwardly from the drive shaft.

Example 34: The method of any one of the examples herein, particularly Example 19, further comprising directing hydrocarbon vapor generated during pyrolysis out of the reactor vessel via one or more vapor outlets provided on the reactor vessel.

Example 35: The method of any one of the examples herein, particularly Example 34, further comprising the steps of: directing the hydrocarbon vapor generated during pyrolysis from the one or more vapor outlets to one or more condensers; and using the one or more condensers to separate the hydrocarbon vapor into a wax product, an oil product, a gas product, or a combination thereof.

Example 36: The method of any one of the examples herein, particularly Example 35, wherein the wax product comprises long-chain hydrocarbons that are solid or semi-solid wax at ambient temperature and pressure.

Example 37: The method of any one of the examples herein, particularly Example 35, wherein the oil product comprises short-chain hydrocarbons that are a liquid at ambient temperature and pressure.

Example 38: The method of any one of the examples herein, particularly Example 35, wherein the gas product comprises hydrocarbons that are non-condensable at ambient temperature and pressure.

Example 39: The method of any one of the examples herein, particularly Example 19, wherein the step of directing the plastic feedstock into an internal volume of a reactor vessel comprises directing a continuous stream of molten or semi-molten feedstock into the internal volume of the reactor vessel; and wherein the step of pyrolyzing the plastic feedstock comprises pyrolyzing the continuous stream of molten or semi-molten feedstock in the reactor vessel.

Example 40: The method of any one of the examples herein, particularly Example 19, wherein the step of directing the plastic feedstock into an internal volume of a reactor vessel comprises: directing the plastic feedstock into one or more extruders, melting the plastic feedstock to produce at least semi-molten feedstock; and directing the at least semi-molten feedstock into the internal volume of the reactor vessel.

Example 41: The method of any one of the examples herein, particularly Example 40, wherein the step of melting the plastic feedstock includes allowing air, steam, and/or low melting-point contaminants to exit the one or more extruders through one or more vents during the melting step.

Example 42: The method of any one of the examples herein, particularly Example 19, wherein the step of pyrolyzing the plastic feedstock in the internal volume of the reactor vessel comprises pyrolyzing the plastic feedstock in the internal volume of the reactor vessel at an industrial scale.

Example 43: A system for pyrolyzing plastic feedstock comprising post-consumer and/or post-industrial plastics, the system comprising: one or more energy transfer apparatuses configured for receiving the plastic feedstock and applying energy to the plastic feedstock; wherein the one or more energy transfer apparatuses comprise one or more reactors configured for receiving and pyrolyzing the plastic feedstock, each of the one or more the reactors comprising: a reactor vessel defining an internal volume configured for receiving and pyrolyzing the plastic feedstock; and one or more heaters configured for heating the feedstock in the reactor vessel's internal volume to a temperature between 200° C. and 1,000° C.; wherein the one or more energy transfer apparatuses are collectively configured for using energy at an average rate of 0.80 KW per pound of pyrolyzed product produced by the system per hour or less.

Example 44: The system of any one of the examples herein, particularly Example 43, wherein the one or more energy transfer apparatuses are collectively configured for using energy at an average rate of 0.50 kW per pound of pyrolyzed product produced by the system per hour or less.

Example 45: The system of any one of the examples herein, particularly Example 43, wherein the one or more energy transfer apparatuses are collectively configured for using energy at an average rate of 0.40 KW per pound of pyrolyzed product produced by the system per hour or less.

Example 46: The system of any one of the examples herein, particularly Example 43, wherein the one or more energy transfer apparatuses are collectively configured for using energy at an average rate of 0.30 KW per pound of pyrolyzed product produced by the system per hour or less.

Example 47: The system of any one of the examples herein, particularly Example 43, wherein the internal volume of the reactor vessel is between 100 and 20,000 gallons.

Example 48: The system of any one of the examples herein, particularly Example 43, wherein the reactor vessel is configured for maintaining a pressure in its internal volume during pyrolysis that is between −7.5 and 14.5 psig.

Example 49: The system of any one of the examples herein, particularly Example 43, wherein the one or more heaters are configured for applying heat to the plastic feedstock in the reactor vessel at a heat density between 5 and 55 $W/in^2$.

Example 50: The system of any one of the examples herein, particularly Example 43, wherein the one or more heaters comprise one or more electric heaters.

Example 51: The system of any one of the examples herein, particularly Example 50, wherein the one or more electric heaters comprise one or more electric heaters positioned around sides of the reactor vessel.

Example 52: The system of any one of the examples herein, particularly Example 50, wherein the one or more electric heaters further comprise one or more electric heaters extending into the interior volume of the reactor vessel.

Example 53: The system of any one of the examples herein, particularly Example 43, wherein the one or more heaters comprise an array of electric heaters that are vertically oriented and extend into an interior volume of the reactor vessel.

Example 54: The system of any one of the examples herein, particularly Example 43, wherein the reactor vessel includes an agitator configured for stirring the plastic feedstock during pyrolysis.

Example 55: The system of any one of the examples herein, particularly Example 54, wherein the agitator is configured to continuously stir the feedstock within the reactor vessel during pyrolysis.

Example 56: The system of any one of the examples herein, particularly Example 54, wherein the agitator is configured to continuously produce average liquid flow velocities inside the reactor vessel between 0.2 and 10 m/s.

Example 57: The system of any one of the examples herein, particularly Example 54, wherein the agitator is configured to continuously produce average liquid flow velocities inside the reactor vessel between 0.5 and 6 m/s.

Example 58: The system of any one of the examples herein, particularly Example 54, wherein the agitator comprises a vertically oriented drive shaft and one or more impellers mounted on the drive shaft.

Example 59: The system of any one of the examples herein, particularly Example 58, wherein the one or more impellers each comprise a plurality of impeller blades extending radially outwardly from the drive shaft.

Example 60: The system of any one of the examples herein, particularly Example 43, wherein the reactor further comprises one or more vapor outlets configured for directing hydrocarbon vapor generated during pyrolysis out of the reactor vessel.

Example 61: The system of any one of the examples herein, particularly Example 60, further comprising one or more condensers; and wherein the one or more vapor outlets are configured for directing hydrocarbon vapor generated during pyrolysis to the one or more condensers for separating the hydrocarbon vapor into a wax product, an oil product, a gas product, or a combination thereof.

Example 62: The system of any one of the examples herein, particularly Example 61, wherein the wax product comprises long-chain hydrocarbons that are solid or semi-solid wax at ambient temperature and pressure.

Example 63: The system of any one of the examples herein, particularly Example 61, wherein the oil product comprises short-chain hydrocarbons that are a liquid at ambient temperature and pressure.

Example 64: The system of any one of the examples herein, particularly Example 61, wherein the gas product comprises hydrocarbons that are non-condensable at ambient temperature and pressure.

Example 65: The system of any one of the examples herein, particularly Example 43, further comprising: one or more temperature sensors configured for sensing the temperature of the plastic feedstock in the reactor vessel; and a pyrolysis control system configured for: at least temporarily storing a target temperature value for the plastic feedstock in the reactor vessel, monitoring the temperature of the plastic feedstock in the reactor vessel as measured by the one or more temperature sensors, and, in response to the temperature measured by the one or more temperature sensors, controlling the one or more heaters to maintain the temperature of the plastic feedstock within a defined tolerance relative to the target temperature value.

Example 66: The system of any one of the examples herein, particularly Example 65, wherein the defined tolerance is within 10° C. of the target temperature value.

Example 67: The system of any one of the examples herein, particularly Example 43, wherein the plastic feedstock is a continuous stream of molten or semi-molten feedstock; and wherein the reactor vessel is configured to pyrolyze the continuous stream of molten or semi-molten feedstock.

Example 68: The system of any one of the examples herein, particularly Example 43, wherein the one or more energy transfer apparatuses further comprise one or more extruders; and wherein each of the one or more extruders is configured for: receiving the plastic feedstock, melting the plastic feedstock to produce at least semi-molten feedstock, and directing the at least semi-molten feedstock to at least one of the one or more reactors Example 69: The system of any one of the examples herein, particularly Example 68, wherein each of the one or more extruders comprises: an extruder barrel; and one or more vents configured to allow air, steam, and/or low melting-point contaminants to exit the extruder barrel.

Example 70: The system of any one of the examples herein, particularly Example 43, wherein the one or more reactors are configured for using energy at an average rate of 0.70 kW per pound of pyrolyzed product produced by the system per hour or less.

Example 71: The system of any one of the examples herein, particularly Example 68, wherein the one or more extruders are configured for using energy at an average rate of 0.40 kW per pound of pyrolyzed product produced by the system per hour or less.

Example 72: The system of any one of the examples herein, particularly Example 41, wherein the one or more pyrolysis reactors are configured for receiving and pyrolyzing the plastic feedstock at an industrial scale; and wherein the reactor vessel's internal volume is configured for receiving and pyrolyzing the plastic feedstock at an industrial scale.

Example 73: A method for pyrolysis of plastic feedstock comprising post-consumer and/or post-industrial plastics at an industrial scale, the method comprising: directing the plastic feedstock into one or more energy transfer apparatuses; pyrolyzing the plastic feedstock by applying energy to the plastic feedstock using the one or more energy transfer apparatuses; wherein, in performing the step of pyrolyzing the plastic feedstock, the one or more energy transfer apparatuses use energy at an average rate of 0.80 kW per pound of pyrolyzed product produced by the system per hour or less.

Example 74: The method of any one of the examples herein, particularly Example 73, wherein, in performing the step of pyrolyzing the plastic feedstock, the one or more energy transfer apparatuses use energy at an average rate of 0.50 kW per pound of pyrolyzed product produced by the system per hour or less.

Example 75: The method of any one of the examples herein, particularly Example 74, wherein, in performing the step of pyrolyzing the plastic feedstock, the one or more energy transfer apparatuses use energy at an average rate of 0.40 KW per pound of pyrolyzed product produced by the system per hour or less.

Example 76: The method of any one of the examples herein, particularly Example 73, wherein, in performing the step of pyrolyzing the plastic feedstock, the one or more energy transfer apparatuses use energy at an average rate of 0.30 KW per pound of pyrolyzed product produced by the system per hour or less.

Example 77: The method of any one of the examples herein, particularly Example 73, wherein the one or more energy transfer apparatuses comprise one or more pyrolysis reactors configured for receiving and pyrolyzing the plastic feedstock at industrial scale. Example 78: The method of any one of the examples herein, particularly Example 77, wherein the one or more reactors each comprise a reactor vessel.

Example 79: The method of any one of the examples herein, particularly Example 78, wherein the step of directing the plastic feedstock into the one or more energy transfer apparatuses comprises directing the plastic feedstock into an internal volume of the reactor vessel of each of the one or more reactors.

Example 80: The method of any one of the examples herein, particularly Example 79, wherein the step of pyrolyzing the plastic feedstock by applying energy to the plastic feedstock using the one or more energy transfer apparatuses comprises pyrolyzing the plastic feedstock in the internal volume of the reactor vessel of each of the one or more reactors at an industrial scale.

Example 81: The method of any one of the examples herein, particularly Example 79, wherein the step of pyrolyzing the plastic feedstock in the internal volume of the reactor vessel of each of the one or more reactors at an industrial scale comprises using one or more heaters of the one or more pyrolysis reactors to heat the plastic feedstock to a temperature between 200° C. and 1,000° C.

Example 82: The method of any one of the examples herein, particularly Example 79, wherein the internal volume of the reactor vessel is between 100 and 20,000 gallons.

Example 83: The method of any one of the examples herein, particularly Example 79, wherein the step of pyrolyzing the plastic feedstock further comprises maintaining a pressure in the internal volume of the reactor vessel during pyrolysis that is between −7.5 and 14.5 psig.

Example 84: The method of any one of the examples herein, particularly Example 81, wherein the step of pyrolyzing the plastic feedstock further comprises using the one or more heaters to apply heat to the plastic feedstock in the reactor vessel at a heat density between 5 and 55 $W/in^2$.

Example 85: The method of any one of the examples herein, particularly Example 81, wherein the one or more heaters comprise one or more electric heaters.

Example 86: The method of any one of the examples herein, particularly Example 85, wherein the one or more electric heaters comprise one or more electric heaters positioned around sides of the reactor vessel.

Example 87: The method of any one of the examples herein, particularly Example 85, wherein the one or more electric heaters further comprise one or more electric heaters extending into the interior volume of the reactor vessel.

Example 88: The method of any one of the examples herein, particularly Example 81, wherein the one or more heaters comprise an array of electric heaters that are vertically oriented and extend into an interior volume of the reactor vessel.

Example 89: The method of any one of the examples herein, particularly Example 78, wherein the step of pyrolyzing the plastic feedstock further comprises stirring the plastic feedstock during pyrolysis using an agitator in the reactor vessel.

Example 90: The method of any one of the examples herein, particularly Example 89, wherein the step of stirring the plastic feedstock comprises continuously stirring the plastic feedstock during pyrolysis.

Example 91: The method of any one of the examples herein, particularly Example 89, wherein the step of stirring the plastic feedstock comprises using the agitator to continuously produce average liquid flow velocities inside the reactor vessel between 0.2 and 10 m/s.

Example 92: The method of any one of the examples herein, particularly Example 89, wherein the step of stirring the plastic feedstock comprises using the agitator to continuously produce average liquid flow velocities inside the reactor vessel between 0.5 and 6 m/s.

Example 93: The method of any one of the examples herein, particularly Example 89, wherein the agitator comprises a vertically oriented drive shaft and one or more impellers mounted on the drive shaft.

Example 94: The method of any one of the examples herein, particularly Example 93, wherein the one or more impellers each comprise a plurality of impeller blades extending radially outwardly from the drive shaft.

Example 95: The method of any one of the examples herein, particularly Example 78, further comprising the step of directing hydrocarbon vapor generated during pyrolysis out of the reactor vessel via one or more vapor outlets provided on the reactor vessel.

Example 96: The method of any one of the examples herein, particularly Example 95, further comprising the steps of: directing the hydrocarbon vapor generated during pyrolysis from the one or more vapor outlets to one or more condensers; and using the one or more condensers to separate the hydrocarbon vapor into a wax product, an oil product, a gas product, or a combination thereof.

Example 97: The method of any one of the examples herein, particularly Example 96, wherein the wax product comprises long-chain hydrocarbons that are solid or semi-solid wax at ambient temperature and pressure.

Example 98: The method of any one of the examples herein, particularly Example 96, wherein the oil product comprises short-chain hydrocarbons that are a liquid at ambient temperature and pressure.

Example 99: The method of any one of the examples herein, particularly Example 96, wherein the gas product comprises hydrocarbons that are non-condensable at ambient temperature and pressure.

Example 100: The method of any one of the examples herein, particularly Example 78, wherein the step of pyrolyzing the plastic feedstock further comprises: using one or more temperature sensors to sense the temperature of the plastic feedstock in the reactor vessel of the one or more pyrolysis reactors; and using a pyrolysis control system to: at least temporarily store at least one target temperature value for the plastic feedstock in the reactor vessel, monitor the temperature of the plastic feedstock in the reactor vessel by communicating with the one or more temperature sensors, and, in response to the temperature measured by the one or more temperature sensors, control the one or more heaters to maintain the temperature of the plastic feedstock within a defined tolerance relative to the target temperature value.

Example 101: The method of any one of the examples herein, particularly Example 100, wherein the defined tolerance is within 10° C. of the target temperature value.

Example 102: The method of any one of the examples herein, particularly Example 79, wherein the step of directing the plastic feedstock into an internal volume of a reactor vessel comprises directing a continuous stream of molten or semi-molten feedstock into the internal volume of the reactor vessel of each of the one or more pyrolysis reactors; and wherein the step of pyrolyzing the plastic feedstock comprises pyrolyzing the continuous stream of molten or semi-molten feedstock in the reactor vessel of each of the one or more pyrolysis reactors.

Example 103: The method of any one of the examples herein, particularly Example 73, wherein the one or more energy transfer apparatuses further comprise one or more extruders.

Example 104: The method of any one of the examples herein, particularly Example 103, wherein each of the one or more extruders comprises an extruder barrel and one or more vents configured to allow air, steam, and/or low melting-point contaminants to exit the extruder barrel.

Example 105: The method of any one of the examples herein, particularly Example 103, wherein the step of directing the plastic feedstock into the one or more energy transfer apparatuses comprises directing the plastic feedstock into an internal volume of the one or more extruders.

Example 106: The method of any one of the examples herein, particularly Example 103, wherein the step of pyrolyzing the plastic feedstock by applying energy to the plastic feedstock using the one or more energy transfer apparatuses comprises: melting the plastic feedstock using the one or more extruders to produce at least semi-molten feedstock; and directing the at least semi-molten feedstock into the internal volume of the reactor vessel.

Example 107: The method of any one of the examples herein, particularly Example 106, wherein the step of melting the plastic feedstock includes allowing air, steam, and/or low melting-point contaminants to exit the one or more extruders through one or more vents during the melting step.

Example 108: The method of any one of the examples herein, particularly Example 77, wherein, in performing the step of pyrolyzing the plastic feedstock, the one or more reactors use energy at an average rate of 0.70 KW per pound of pyrolyzed product produced by the system per hour or less.

Example 109: The method of any one of the examples herein, particularly Example 103, wherein, in performing the step of pyrolyzing the plastic feedstock, the one or more extruders use energy at an average rate of 0.40 KW per pound of pyrolyzed product produced by the system per hour or less.

Example 110: A reactor for pyrolysis of plastic feedstock comprising post-consumer and/or post-industrial plastics, the reactor comprising: a reactor vessel defining an internal volume configured for receiving and pyrolyzing the plastic feedstock; and one or more heaters configured for heating the feedstock in the reactor vessel's internal volume to a temperature between 200° C. and 1,000° C.; wherein the reactor is configured for using energy at an average rate of 0.70 KW per pound of pyrolyzed product produced within the reactor per hour or less.

Example 111: The reactor of any one of the examples herein, particularly Example 110, wherein the reactor is configured for using energy at an average rate of 0.30 kW per pound of pyrolyzed product produced within the reactor per hour or less.

Example 112: The reactor of any one of the examples herein, particularly Example 110, wherein the reactor is configured for using energy at an average rate of 0.20 KW per pound of pyrolyzed product produced within the reactor per hour or less.

Example 113: The reactor of any one of the examples herein, particularly Example 110, wherein the reactor is configured for using energy at an average rate of 0.16 kW per pound of pyrolyzed product produced within the reactor per hour or less.

Example 114: The reactor of any one of the examples herein, particularly Example 110, wherein the internal volume of the reactor vessel is between 100 and 20,000 gallons.

Example 115: The reactor of any one of the examples herein, particularly Example 110, wherein the reactor vessel is configured for maintaining a pressure in its internal volume during pyrolysis that is between −7.5 and 14.5 psig.

Example 116: The reactor of any one of the examples herein, particularly Example 110, wherein the one or more heaters are configured for applying heat to the plastic feedstock in the reactor vessel at a heat density between 5 and 55 $W/in^2$.

Example 117: The reactor of any one of the examples herein, particularly Example 110, wherein the one or more heaters comprise one or more electric heaters.

Example 118: The reactor of any one of the examples herein, particularly Example 117, wherein the one or more electric heaters comprise one or more electric heaters positioned around sides of the reactor vessel.

Example 119: The reactor of any one of the examples herein, particularly Example 117, wherein the one or more electric heaters further comprise one or more electric heaters extending into the interior volume of the reactor vessel.

Example 120: The reactor of any one of the examples herein, particularly Example 110, wherein the one or more heaters comprise an array of electric heaters that are vertically oriented and extend into an interior volume of the reactor vessel Example 121: The reactor of any one of the examples herein, particularly Example 110, wherein the reactor vessel includes an agitator configured for stirring the plastic feedstock during pyrolysis.

Example 122: The reactor of any one of the examples herein, particularly Example 121, wherein the agitator is configured to continuously stir the feedstock within the reactor vessel during pyrolysis.

Example 123: The reactor of any one of the examples herein, particularly Example 121, wherein the agitator is configured to continuously produce average liquid flow velocities inside the reactor vessel between 0.2 and 10 m/s.

Example 124: The reactor of any one of the examples herein, particularly Example 121, wherein the agitator is configured to continuously produce average liquid flow velocities inside the reactor vessel between 0.5 and 6 m/s.

Example 125: The reactor of any one of the examples herein, particularly Example 121, wherein the agitator comprises a vertically oriented drive shaft and one or more impellers mounted on the drive shaft.

Example 126: The reactor of any one of the examples herein, particularly Example 125, wherein the one or more impellers each comprise a plurality of impeller blades extending radially outwardly from the drive shaft.

Example 127: The reactor of any one of the examples herein, particularly Example 110, further comprising one or more vapor outlets configured for directing hydrocarbon vapor generated during pyrolysis out of the reactor vessel.

Example 128: The reactor of any one of the examples herein, particularly Example 110, further comprising: one or more temperature sensors configured for sensing the temperature of the plastic feedstock in the reactor vessel; and a pyrolysis control system configured for: at least temporarily storing a target temperature value for the plastic feedstock in the reactor vessel, monitoring the temperature of the plastic feedstock in the reactor vessel as measured by the one or more temperature sensors, and, in response to the temperature measured by the one or more temperature sensors, controlling the one or more heaters to maintain the temperature of the plastic feedstock within a defined tolerance relative to the target temperature value.

Example 129: The reactor of any one of the examples herein, particularly Example 128, wherein the defined tolerance is within 10° C. of the target temperature value.

Example 130: The reactor of any one of the examples herein, particularly Example 110, wherein the plastic feedstock is a continuous stream of molten or semi-molten feedstock; and wherein the reactor vessel is configured to pyrolyze the continuous stream of molten or semi-molten feedstock.

Example 131: The reactor of any one of the examples herein, particularly Example 110, wherein the reactor vessel's internal volume is configured for receiving and pyrolyzing the plastic feedstock at an industrial scale.

Example 132: A reactor for pyrolysis of plastic feedstock comprising post-consumer and/or post-industrial plastics, the reactor comprising: a reactor vessel defining an internal volume configured for receiving and pyrolyzing the plastic feedstock; and one or more heaters configured for heating the feedstock in the reactor vessel's internal volume to a temperature between 200° C. and 1,000° C.; wherein the reactor is configured for producing an average of 0.30 pounds or more of pyrolyzed product per hour per gallon of the reactor's internal volume for a period of 24 hours or more.

Example 133: The reactor of any one of the examples herein, particularly Example 132, wherein the reactor is configured for producing an average of 0.40 pounds or more of pyrolyzed product per hour per gallon of the reactor's internal volume for a period of 24 hours or more.

Example 134: The reactor of any one of the examples herein, particularly Example 132, wherein the reactor is configured for producing an average of 0.45 pounds or more of pyrolyzed product per hour per gallon of the reactor's internal volume for a period of 24 hours or more.

Example 135: The reactor of any one of the examples herein, particularly Example 132, wherein the reactor is configured for producing an average of 0.50 pounds or more of pyrolyzed product per hour per gallon of the reactor's internal volume for a period of 24 hours or more.

Example 136: The reactor of any one of the examples herein, particularly Example 132, wherein the internal volume of the reactor vessel is between 100 and 20,000 gallons.

Example 137: The reactor of any one of the examples herein, particularly Example 132, wherein the reactor vessel is configured for maintaining a pressure in its internal volume during pyrolysis that is between −7.5 and 14.5 psig.

Example 138: The reactor of any one of the examples herein, particularly Example 132, wherein the one or more heaters are configured for applying heat to the plastic feedstock in the reactor vessel at a heat density between 5 and 55 $W/in^2$.

Example 139: The reactor of any one of the examples herein, particularly Example 132, wherein the one or more heaters comprise one or more electric heaters.

Example 140: The reactor of any one of the examples herein, particularly Example 139, wherein the one or more electric heaters comprise one or more electric heaters positioned around sides of the reactor vessel.

Example 141: The reactor of any one of the examples herein, particularly Example 139, wherein the one or more electric heaters further comprise one or more electric heaters extending into the interior volume of the reactor vessel.

Example 142: The reactor of any one of the examples herein, particularly Example 132, wherein the one or more heaters comprise an array of electric heaters that are vertically oriented and extend into an interior volume of the reactor vessel Example 143: The reactor of any one of the examples herein, particularly Example 132, wherein the reactor vessel includes an agitator configured for stirring the plastic feedstock during pyrolysis.

Example 144: The reactor of any one of the examples herein, particularly Example 143, wherein the agitator is configured to continuously stir the feedstock within the reactor vessel during pyrolysis.

Example 145: The reactor of any one of the examples herein, particularly Example 143, wherein the agitator is configured to continuously produce average liquid flow velocities inside the reactor vessel between 0.2 and 10 m/s.

Example 146: The reactor of any one of the examples herein, particularly Example 143, wherein the agitator is configured to continuously produce average liquid flow velocities inside the reactor vessel between 0.5 and 6 m/s.

Example 147: The reactor of any one of the examples herein, particularly Example 143, wherein the agitator comprises a vertically oriented drive shaft and one or more impellers mounted on the drive shaft.

Example 148: The reactor of any one of the examples herein, particularly Example 147, wherein the one or more impellers each comprise a plurality of impeller blades extending radially outwardly from the drive shaft.

Example 149: The reactor of any one of the examples herein, particularly Example 132, further comprising one or more vapor outlets configured for directing hydrocarbon vapor generated during pyrolysis out of the reactor vessel.

Example 150: The reactor of any one of the examples herein, particularly Example 132, further comprising: one or more temperature sensors configured for sensing the temperature of the plastic feedstock in the reactor vessel; and a pyrolysis control system configured for: at least temporarily storing a target temperature value for the plastic feedstock in the reactor vessel, monitoring the temperature of the plastic feedstock in the reactor vessel as measured by the one or more temperature sensors, and, in response to the temperature measured by the one or more temperature sensors, controlling the one or more heaters to maintain the temperature of the plastic feedstock within a defined tolerance relative to the target temperature value.

Example 151: The reactor of any one of the examples herein, particularly Example 150, wherein the defined tolerance is within 10° C. of the target temperature value.

Example 152: The reactor of any one of the examples herein, particularly Example 132, wherein the plastic feedstock is a continuous stream of molten or semi-molten feedstock; and wherein the reactor vessel is configured to pyrolyze the continuous stream of molten or semi-molten feedstock.

Example 153: The reactor of any one of the examples herein, particularly Example 132, wherein the reactor vessel's internal volume is configured for receiving and pyrolyzing the plastic feedstock at an industrial scale.

Example 154: A method for pyrolysis of plastic feedstock comprising post-consumer and/or post-industrial plastics, the method comprising: directing the plastic feedstock into an internal volume of a reactor vessel; and pyrolyzing the plastic feedstock in the internal volume of the reactor vessel; wherein the step of pyrolyzing the plastic feedstock comprises: using one or more heaters to heat the plastic feedstock in the reactor vessel's internal volume to a temperature between 200° C. and 1,000° C.; and producing an average of 0.30 pounds or more of pyrolyzed product per hour per gallon of the reactor's internal volume for a period of 24 hours or more.

Example 155: The method of any one of the examples herein, particularly Example 154, wherein the step of pyrolyzing the plastic feedstock comprises producing an average of 0.40 pounds or more of pyrolyzed product per hour per gallon of the reactor's internal volume for a period of 24 hours or more.

Example 156: The method of any one of the examples herein, particularly Example 154, wherein the step of pyrolyzing the plastic feedstock comprises producing an average of 0.45 pounds or more of pyrolyzed product per hour per gallon of the reactor's internal volume for a period of 24 hours or more.

Example 157: The method of any one of the examples herein, particularly Example 154, wherein the step of pyrolyzing the plastic feedstock comprises producing an average of 0.50 pounds or more of pyrolyzed product per hour per gallon of the reactor's internal volume for a period of 24 hours or more.

Example 158: The method of any one of the examples herein, particularly Example 154, wherein the internal volume of the reactor vessel is between 100 and 20,000 gallons.

Example 159: The method of any one of the examples herein, particularly Example 112, wherein the step of pyrolyzing the plastic feedstock further comprises maintaining a pressure in the internal volume of the reactor vessel during pyrolysis that is between −7.5 and 14.5 psig.

Example 160: The method of any one of the examples herein, particularly Example 154, wherein the step of pyrolyzing the plastic feedstock further comprises using the one or more heaters to apply heat to the plastic feedstock in the reactor vessel at a heat density between 5 and 55 $W/in^2$.

Example 161: The method of any one of the examples herein, particularly Example 154, wherein the one or more heaters comprise one or more electric heaters.

Example 162: The method of any one of the examples herein, particularly Example 161, wherein the one or more electric heaters comprise one or more electric heaters positioned around sides of the reactor vessel.

Example 163: The method of any one of the examples herein, particularly Example 161, wherein the one or more electric heaters further comprise one or more electric heaters extending into the interior volume of the reactor vessel.

Example 164: The method of any one of the examples herein, particularly Example 154, wherein the one or more heaters comprise an array of electric heaters that are vertically oriented and extend into an interior volume of the reactor vessel.

Example 165: The method of any one of the examples herein, particularly Example 154, wherein the step of pyrolyzing the plastic feedstock further comprises stirring the plastic feedstock during pyrolysis using an agitator in the reactor vessel.

Example 166: The method of any one of the examples herein, particularly Example 165, wherein the step of stirring the plastic feedstock comprises continuously stirring the plastic feedstock during pyrolysis.

Example 167: The method of any one of the examples herein, particularly Example 165, wherein the step of stirring the plastic feedstock comprises using the agitator to continuously produce average liquid flow velocities inside the reactor vessel between 0.2 and 10 m/s.

Example 168: The method of any one of the examples herein, particularly Example 165, wherein the step of stirring the plastic feedstock comprises using the agitator to continuously produce average liquid flow velocities inside the reactor vessel between 0.5 and 6 m/s.

Example 169: The method of any one of the examples herein, particularly Example 165, wherein the agitator comprises a vertically oriented drive shaft and one or more impellers mounted on the drive shaft.

Example 170: The method of any one of the examples herein, particularly Example 127, wherein the one or more impellers each comprise a plurality of impeller blades extending radially outwardly from the drive shaft.

Example 171: The method of any one of the examples herein, particularly Example 154, further comprising the step of directing hydrocarbon vapor generated during pyrolysis out of the reactor vessel via one or more vapor outlets provided on the reactor vessel.

Example 172: The method of any one of the examples herein, particularly Example 171, further comprising the steps of: directing the hydrocarbon vapor generated during pyrolysis from the one or more vapor outlets to one or more condensers; and using the one or more condensers to separate the hydrocarbon vapor into a wax product, an oil product, a gas product, or a combination thereof.

Example 173: The method of any one of the examples herein, particularly Example 172, wherein the wax product comprises long-chain hydrocarbons that are solid or semi-solid wax at ambient temperature and pressure.

Example 174: The method of any one of the examples herein, particularly Example 172, wherein the oil product comprises short-chain hydrocarbons that are a liquid at ambient temperature and pressure.

Example 175: The method of any one of the examples herein, particularly Example 172, wherein the gas product comprises hydrocarbons that are non-condensable at ambient temperature and pressure.

Example 176: The method of any one of the examples herein, particularly Example 154, wherein the step of pyrolyzing the plastic feedstock further comprises: using one or more temperature sensors to sense the temperature of the plastic feedstock in the reactor vessel; and using a pyrolysis control system to: at least temporarily store at least one target temperature value for the plastic feedstock in the reactor vessel, monitor the temperature of the plastic feedstock in the reactor vessel by communicating with the one or more temperature sensors, and, in response to the temperature measured by the one or more temperature sensors, control the one or more heaters to maintain the temperature of the plastic feedstock within a defined tolerance relative to the target temperature value.

Example 177: The method of any one of the examples herein, particularly Example 176, wherein the defined tolerance is within 10° C. of the target temperature value.

Example 178: The method of any one of the examples herein, particularly Example 154, wherein the step of directing the plastic feedstock into an internal volume of a reactor vessel comprises directing a continuous stream of molten or semi-molten feedstock into the internal volume of the reactor vessel; and wherein the step of pyrolyzing the plastic feedstock comprises pyrolyzing the continuous stream of molten or semi-molten feedstock in the reactor vessel.

Example 179: The method of any one of the examples herein, particularly Example 154, wherein the step of directing the plastic feedstock into an internal volume of a reactor vessel comprises: directing the plastic feedstock into one or more extruders; melting the plastic feedstock to produce at least semi-molten feedstock; and directing the at least semi-molten feedstock into the internal volume of the reactor vessel.

Example 180: The method of any one of the examples herein, particularly Example 179, wherein the step of melting the plastic feedstock includes allowing air, steam, and/or low melting-point contaminants to exit the one or more extruders through one or more vents during the melting step.

Example 181: The method of any one of the examples herein, particularly Example 154, wherein the step of pyrolyzing the plastic feedstock in the internal volume of the reactor vessel comprises pyrolyzing the plastic feedstock in the internal volume of the reactor vessel at an industrial scale.

Example 182: A reactor for pyrolysis of plastic feedstock comprising post-consumer and/or post-industrial plastics, the reactor comprising: a reactor vessel defining an internal volume configured for receiving and pyrolyzing the plastic feedstock; and one or more heaters configured for heating the feedstock in the reactor vessel's internal volume to a temperature between 200° C. and 1,000° C.; wherein the reactor is configured for operating to pyrolyze the plastic feedstock for a cumulative period of 324 hours or more during a time period of 360 hours.

Example 183: The reactor of any one of the examples herein, particularly Example 182, wherein the reactor is configured for operating to pyrolyze the plastic feedstock for a cumulative period of 342 hours or more during a time period of 360 hours.

Example 184: The reactor of any one of the examples herein, particularly Example 182, wherein the reactor is configured for operating to pyrolyze the plastic feedstock for a cumulative period of 576 hours or more during a time period of 720 hours.

Example 185: The reactor of any one of the examples herein, particularly Example 182, wherein the reactor is configured for operating to pyrolyze the plastic feedstock for a cumulative period of 756 hours or more during a time period of 1080 hours.

Example 186: The reactor of any one of the examples herein, particularly Example 182, wherein the internal volume of the reactor vessel is between 100 and 20,000 gallons.

Example 187: The reactor of any one of the examples herein, particularly Example 182, wherein the reactor vessel is configured for maintaining a pressure in its internal volume during pyrolysis that is between −7.5 and 14.5 psig.

Example 188: The reactor of any one of the examples herein, particularly Example 182, wherein the one or more heaters are configured for applying heat to the plastic feedstock in the reactor vessel at a heat density between 5 and 55 $W/in^2$.

Example 189: The reactor of any one of the examples herein, particularly Example 182, wherein the one or more heaters comprise one or more electric heaters.

Example 190: The reactor of any one of the examples herein, particularly Example 189, wherein the one or more electric heaters comprise one or more electric heaters positioned around sides of the reactor vessel.

Example 191: The reactor of any one of the examples herein, particularly Example 189, wherein the one or more electric heaters further comprise one or more electric heaters extending into the interior volume of the reactor vessel.

Example 192: The reactor of any one of the examples herein, particularly Example 182, wherein the one or more heaters comprise an array of electric heaters that are vertically oriented and extend into an interior volume of the reactor vessel.

Example 193: The reactor of any one of the examples herein, particularly Example 182, wherein the reactor vessel includes an agitator configured for stirring the plastic feedstock during pyrolysis.

Example 194: The reactor of any one of the examples herein, particularly Example 193, wherein the agitator is configured to continuously stir the feedstock within the reactor vessel during pyrolysis.

Example 195: The reactor of any one of the examples herein, particularly Example 193, wherein the agitator is configured to continuously produce average liquid flow velocities inside the reactor vessel between 0.2 and 10 m/s.

Example 196: The reactor of any one of the examples herein, particularly Example 193, wherein the agitator is configured to continuously produce average liquid flow velocities inside the reactor vessel between 0.5 and 6 m/s.

Example 197: The reactor of any one of the examples herein, particularly Example 193, wherein the agitator comprises a vertically oriented drive shaft and one or more impellers mounted on the drive shaft.

Example 198: The reactor of any one of the examples herein, particularly Example 197, wherein the one or more impellers each comprise a plurality of impeller blades extending radially outwardly from the drive shaft.

Example 199: The reactor of any one of the examples herein, particularly Example 182, further comprising one or more vapor outlets configured for directing hydrocarbon vapor generated during pyrolysis out of the reactor vessel.

Example 200: The reactor of any one of the examples herein, particularly Example 182, further comprising: one or more temperature sensors configured for sensing the temperature of the plastic feedstock in the reactor vessel; and a pyrolysis control system configured for: at least temporarily storing a target temperature value for the plastic feedstock in the reactor vessel, monitoring the temperature of the plastic feedstock in the reactor vessel as measured by the one or more temperature sensors, and, in response to the temperature measured by the one or more temperature sensors, controlling the one or more heaters to maintain the temperature of the plastic feedstock within a defined tolerance relative to the target temperature value.

Example 201: The reactor of any one of the examples herein, particularly Example 200, wherein the defined tolerance is within 10° C. of the target temperature value.

Example 202: The reactor of any one of the examples herein, particularly Example 182, wherein the plastic feedstock is a continuous stream of molten or semi-molten feedstock; and wherein the reactor vessel is configured to pyrolyze the continuous stream of molten or semi-molten feedstock.

Example 203: The reactor of any one of the examples herein, particularly Example 182, wherein the reactor vessel's internal volume is configured for receiving and pyrolyzing the plastic feedstock at an industrial scale.

Example 204: A method for pyrolysis of plastic feedstock comprising post-consumer and/or post-industrial plastics, the method comprising: directing the plastic feedstock into an internal volume of a reactor vessel; and pyrolyzing the plastic feedstock in the internal volume of the reactor vessel; wherein the step of pyrolyzing the plastic feedstock comprises: using one or more heaters to heat the plastic feedstock in the reactor vessel's internal volume to a temperature between 200° C. and 1,000° C.; and operating the reactor to pyrolyze the plastic feedstock for a cumulative period of 324 hours or more during a time period of 360 hours.

Example 205: The method of any one of the examples herein, particularly Example 204, wherein the step of pyrolyzing the plastic feedstock comprises operating the reactor to pyrolyze the plastic feedstock for a cumulative period of 342 hours or more during a time period of 360 hours.

Example 206: The method of any one of the examples herein, particularly Example 204, wherein the step of pyrolyzing the plastic feedstock comprises operating the reactor to pyrolyze the plastic feedstock for a cumulative period of 576 hours or more during a time period of 720 hours.

Example 207: The method of any one of the examples herein, particularly Example 204, wherein the step of pyrolyzing the plastic feedstock comprises operating the reactor to pyrolyze the plastic feedstock for a cumulative period of 756 hours or more during a time period of 1080 hours.

Example 208: The method of any one of the examples herein, particularly Example 204, wherein the internal volume of the reactor vessel is between 100 and 20,000 gallons.

Example 209: The method of any one of the examples herein, particularly Example 204, wherein the step of pyrolyzing the plastic feedstock further comprises maintaining a pressure in the internal volume of the reactor vessel during pyrolysis that is between −7.5 and 14.5 psig.

Example 210: The method of any one of the examples herein, particularly Example 204, wherein the step of pyrolyzing the plastic feedstock further comprises using the one or more heaters to apply heat to the plastic feedstock in the reactor vessel at a heat density between 5 and 55 W/in$^2$.

Example 211: The method of any one of the examples herein, particularly Example 204, wherein the one or more heaters comprise one or more electric heaters.

Example 212: The method of any one of the examples herein, particularly Example 211, wherein the one or more electric heaters comprise one or more electric heaters positioned around sides of the reactor vessel.

Example 213: The method of any one of the examples herein, particularly Example 211, wherein the one or more electric heaters further comprise one or more electric heaters extending into the interior volume of the reactor vessel.

Example 214: The method of any one of the examples herein, particularly Example 204, wherein the one or more heaters comprise an array of electric heaters that are vertically oriented and extend into an interior volume of the reactor vessel.

Example 215: The method of any one of the examples herein, particularly Example 204, wherein the step of pyrolyzing the plastic feedstock further comprises stirring the plastic feedstock during pyrolysis using an agitator in the reactor vessel.

Example 216: The method of any one of the examples herein, particularly Example 215, wherein the step of stirring the plastic feedstock comprises continuously stirring the plastic feedstock during pyrolysis.

Example 217: The method of any one of the examples herein, particularly Example 215, wherein the step of stirring the plastic feedstock comprises using the agitator to continuously produce average liquid flow velocities inside the reactor vessel between 0.2 and 10 m/s.

Example 218: The method of any one of the examples herein, particularly Example 215, wherein the step of stirring the plastic feedstock comprises using the agitator to continuously produce average liquid flow velocities inside the reactor vessel between 0.5 and 6 m/s.

Example 219: The method of any one of the examples herein, particularly Example 215, wherein the agitator comprises a vertically oriented drive shaft and one or more impellers mounted on the drive shaft.

Example 220: The method of any one of the examples herein, particularly Example 219, wherein the one or more impellers each comprise a plurality of impeller blades extending radially outwardly from the drive shaft.

Example 221: The method of any one of the examples herein, particularly Example 204, further comprising directing hydrocarbon vapor generated during pyrolysis out of the reactor vessel via one or more vapor outlets provided on the reactor vessel.

Example 222: The method of any one of the examples herein, particularly Example 221, further comprising the steps of: directing the hydrocarbon vapor generated during pyrolysis from the one or more vapor outlets to one or more condensers; and using the one or more condensers to separate the hydrocarbon vapor into a wax product, an oil product, a gas product, or a combination thereof.

Example 223: The method of any one of the examples herein, particularly Example 222, wherein the wax product comprises long-chain hydrocarbons that are solid or semi-solid wax at ambient temperature and pressure.

Example 224: The method of any one of the examples herein, particularly Example 222, wherein the oil product comprises short-chain hydrocarbons that are a liquid at ambient temperature and pressure.

Example 225: The method of any one of the examples herein, particularly Example 222, wherein the gas product comprises hydrocarbons that are non-condensable at ambient temperature and pressure.

Example 226: The method of any one of the examples herein, particularly Example 204, wherein the step of pyrolyzing the plastic feedstock further comprises: using one or more temperature sensors to sense the temperature of the plastic feedstock in the reactor vessel; and using a pyrolysis control system to: at least temporarily store a target temperature value for the plastic feedstock in the reactor vessel, monitor the temperature of the plastic feedstock in the reactor vessel by communicating with the one or more temperature sensors, and, in response to the temperature measured by the one or more temperature sensors, control the one or more heaters to maintain the temperature of the plastic feedstock within a defined tolerance relative to the target temperature value.

Example 227: The method of any one of the examples herein, particularly Example 226, wherein the defined tolerance is within 10° C. of the target temperature value.

Example 228: The method of any one of the examples herein, particularly Example 204, wherein the step of directing the plastic feedstock into an internal volume of a reactor vessel comprises directing a continuous stream of molten or semi-molten feedstock into the internal volume of the reactor vessel; and wherein the step of pyrolyzing the plastic feedstock comprises pyrolyzing the continuous stream of molten or semi-molten feedstock in the reactor vessel.

Example 229: The method of any one of the examples herein, particularly Example 204, wherein the step of directing the plastic feedstock into an internal volume of a reactor vessel comprises: directing the plastic feedstock into one or more extruders, melting the plastic feedstock to produce at least semi-molten feedstock; and directing the at least semi-molten feedstock into the internal volume of the reactor vessel.

Example 230: The method of any one of the examples herein, particularly Example 229, wherein the step of melting the plastic feedstock includes allowing air, steam, and/or low melting-point contaminants to exit the one or more extruders through one or more vents during the melting step.

Example 231: The method of any one of the examples herein, particularly Example 204, wherein the step of pyrolyzing the plastic feedstock in the internal volume of the reactor vessel comprises pyrolyzing the plastic feedstock in the internal volume of the reactor vessel at an industrial scale.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method for pyrolysis of plastic feedstock comprising post-consumer and/or post-industrial plastics, the method comprising:

melting the plastic feedstock to produce at least semi-molten feedstock;

directing the at least semi-molten feedstock into an internal volume of a reactor vessel; and pyrolyzing the at least semi-molten feedstock in the internal volume of the reactor vessel;

wherein the step of pyrolyzing the at least semi-molten feedstock comprises:

using one or more heaters to heat the at least semi-molten feedstock in the reactor vessel's internal volume to a temperature between 200° C. and 1,000° C.; and operating the reactor to pyrolyze the at least semi-molten feedstock for a cumulative period of 324 hours or more during a time period of 360 hours.

2. The method of claim 1, wherein the step of pyrolyzing the at least semi-molten feedstock comprises operating the reactor to pyrolyze the at least semi-molten feedstock for a cumulative period of 342 hours or more during a time period of 360 hours.

3. The method of claim 1, wherein the step of pyrolyzing the at least semi-molten feedstock comprises operating the reactor to pyrolyze the at least semi-molten feedstock for a cumulative period of 576 hours or more during a time period of 720 hours.

4. The method of claim 1, wherein the step of pyrolyzing the plastic at least semi-molten feedstock comprises operating the reactor to pyrolyze the at least semi-molten feedstock for a cumulative period of 756 hours or more during a time period of 1080 hours.

5. The method of claim 1, wherein the internal volume of the reactor vessel is between 100 and 20,000 gallons.

6. The method of claim 1, wherein the step of pyrolyzing the at least semi-molten feedstock further comprises maintaining a pressure in the internal volume of the reactor vessel during pyrolysis that is between-7.5 and 14.5 psig.

7. The method of claim 1, wherein the step of pyrolyzing the at least semi-molten feedstock further comprises using the one or more heaters to apply heat to the at least semi-molten feedstock in the reactor vessel at a heat density between 5 and 55 $W/in^2$.

8. The method of claim 1, wherein the one or more heaters comprise one or more electric heaters.

9. The method of claim 8, wherein the one or more electric heaters comprise one or more electric heaters positioned around sides of the reactor vessel.

10. The method of claim 8, wherein the one or more electric heaters further comprise one or more electric heaters extending into the interior volume of the reactor vessel.

11. The method of claim 1, wherein the one or more heaters comprise an array of electric heaters that are vertically oriented and extend into an interior volume of the reactor vessel.

12. The method of claim 1, wherein the step of pyrolyzing the at least semi-molten feedstock further comprises stirring the at least semi-molten feedstock during pyrolysis using an agitator in the reactor vessel.

13. The method of claim 12, wherein the step of stirring the at least semi-molten feedstock comprises continuously stirring the at least semi-molten feedstock during pyrolysis.

14. The method of claim 12, wherein the step of stirring the at least semi-molten feedstock comprises using the agitator to continuously produce average liquid flow velocities inside the reactor vessel between 0.2 and 10 m/s.

15. The method of claim 12, wherein the step of stirring the at least semi-molten feedstock comprises using the agitator to continuously produce average liquid flow velocities inside the reactor vessel between 0.5 and 6 m/s.

16. The method of claim 12, wherein the agitator comprises a vertically oriented drive shaft and one or more impellers mounted on the drive shaft.

17. The method of claim 16, wherein the one or more impellers each comprise a plurality of impeller blades extending radially outwardly from the drive shaft.

18. The method of claim 1, further comprising directing hydrocarbon vapor generated during pyrolysis out of the reactor vessel via one or more vapor outlets provided on the reactor vessel.

19. The method of claim 18, further comprising the steps of:

directing the hydrocarbon vapor generated during pyrolysis from the one or more vapor outlets to one or more condensers; and using the one or more condensers to separate the hydrocarbon vapor into a wax product, an oil product, a gas product, or a combination thereof.

20. The method of claim 19, wherein the wax product comprises long-chain hydrocarbons that are solid or semi-solid wax at ambient temperature and pressure.

21. The method of claim 19, wherein the oil product comprises short-chain hydrocarbons that are a liquid at ambient temperature and pressure.

22. The method of claim 19, wherein the gas product comprises hydrocarbons that are non-condensable at ambient temperature and pressure.

23. The method of claim 1, wherein the step of pyrolyzing the at least semi-molten feedstock further comprises:

using one or more temperature sensors to sense the temperature of the at least semi-molten feedstock in the reactor vessel; and using a pyrolysis control system to:

at least temporarily store a target temperature value for the at least semi-molten feedstock in the reactor vessel, monitor the temperature of the at least semi-molten feedstock in the reactor vessel by communicating with the one or more temperature sensors, and in response to the temperature measured by the one or more temperature sensors, control the one or more heaters to maintain the temperature of the at least semi-molten feedstock within a defined tolerance relative to the target temperature value.

24. The method of claim 23, wherein the defined tolerance is within 10° C. of the target temperature value.

25. The method of claim 1, wherein the step of directing the at least semi-molten feedstock into an internal volume of a reactor vessel comprises directing a continuous stream of molten or semi-molten feedstock into the internal volume of the reactor vessel; and wherein the step of pyrolyzing the at least semi-molten feedstock comprises pyrolyzing the continuous stream of molten or semi-molten feedstock in the reactor vessel.

26. The method of claim 1, wherein the step of melting the plastic feedstock comprises directing the plastic feedstock into one or more extruders, thereby melting the plastic feedstock to produce at least semi-molten feedstock.

27. The method of claim 26, wherein the step of melting the plastic feedstock includes allowing air, steam, and/or low melting-point contaminants to exit the one or more extruders through one or more vents during the melting step.

28. The method of claim 1, wherein the step of pyrolyzing the at least semi-molten feedstock in the internal volume of the reactor vessel comprises pyrolyzing the at least semi-molten feedstock in the internal volume of the reactor vessel at an industrial scale.

* * * * *